United States Patent [19]

Downing et al.

[11] 3,991,406

[45] Nov. 9, 1976

[54] PROGRAM CONTROLLED DATA PROCESSING SYSTEM

[75] Inventors: Randall W. Downing; John S. Nowak, both of Wheaton, Ill.

[73] Assignee: Bell Telephone Laboratories, Incorporated, Murray Hill, N.J.

[22] Filed: Nov. 24, 1967

[21] Appl. No.: 685,519

Related U.S. Application Data

[62] Division of Ser. No. 334,875, Dec. 31, 1963, Pat. No. 3,570,008.

[52] U.S. Cl. .............................................. 340/172.5

[51] Int. Cl.[2] .......................................... G06F 11/04

[58] Field of Search....................... 340/172.5; 445/1

[56] References Cited

UNITED STATES PATENTS 3,286,239 11/1966 Thompson et al. .............. 340/172.5

3,419,849 12/1968 Anderson et al. ............... 340/172.5

*Primary Examiner*—Harvey E. Springborn

*Attorney, Agent, or Firm*—John C. Albrecht

[57] ABSTRACT

A program controlled data processing system which comprises circuits for detecting that the processor is experiencing difficulty in executing programs, such circuits are responsive to the detection of such troubles for generating processor control signals for effecting changes in the processor configuration. These changes serve to restore the processor to an operating condition. The control signals are generated by a sequence circuit which operates independently of the ability of the processor to execute programs and independently of the operability of the processor clock circuit.

45 Claims, 89 Drawing Figures

FIG. I

INVENTORS R. W. DOWNING
J. S. NOWAK
BY John A. Albrecht
ATTORNEY

NETWORK

FILED BY AMENDMENT DOWNING 5-4(87-...)

INTER OFFICE OUTGOING (LINE TO TRUNK) CALL

INTER OFFICE INCOMING (TRUNK TO LINE) CALL

FILED BY AMENDMENT DOWNING 5-4(87-

SINGLE RAIL TO TWO RAIL CONVERTING GATE
OCG. SEQ. CCT. & DEC. MISC. INPUT CABLE
UNMASKED BUS
2608
2014
BIT 5
3013
3011
3012
ENABLE - VERIFY
30A06
30A02
30A03
30A01
30A05
30A04
DATA "1'S ONLY
"0"
"1"
I
1812
1508
3004
3005
3001
3003
3006
3002
3008
3009
Y REG.
Z REG.
0
23
22
VBYR [4T29]
MBYR [OT6, 10T14, 16T20]
3000
2605
REYR [4T6]
YRUB [OT8, 10T16, 16T22]
MBZR [OT6, 10T14, 16T20]
3014
ZRUB [OT8, 10T16, 16T22]
MASKED BUS
2011
2923
2921
2922
3900
ORDER CABLE

LOCATION 6
ERROR SUMMARY CABLE
BUFFER REG. INPUT BUS
MTCE DECODER CABLE
CPD EXEC. RESPONSE CABLE
CPD CABLE
1719
1605
4609
3209
1218
4731
3622
3123
MODE CONTROL REG. (MOCR)
4603
S R X 1 0
S R Y 1 0
S R MS 1 0
S R TD 1 0
S R CB 1 0
S R PB 1 0
S R TR 1 0
S R IC 1 0
S R I 1 0
S R HM 1 0
S R E 1 0
S R F 1 0
4606
5113
4605
4601
BR-MOCR [5T7]
4602
MOCR-BR [0T8]
4607
4608
MAINTENANCE DECODER
4609
ASMO, PAMO, MBMO, BOMO, UBMI, SEMI, IAMI,
ISTO, PCTO, SHTO, ITOI, TOC-INC, IE STOP-MTCE, IF STOP-MTCE
4107
4600
5506
4610
2600
1812
3900
BUFFER REG. OUTPUT BUS
OCG, ETC. CABLE
ORDER CABLE

LOCATION 7
MATCH CYCLE CONTROL
ERROR SUMMARY CABLE
BUFFER REG. INPUT BUS
MTCE DECODER CABLE
CPD EXEC. RESPONSE CABLE
CPD CABLE
BUFFER REG. OUTPUT BUS
OCG, ETC. CABLE
ORDER CABLE
2-CELL BINARY COUNTER
PU
WR
RE
EC
MC-0
MC-1
MRC
MRP
BR-7R [5T7]
7R-BR [0T8]
5029 (Y23)

LOCATION 16
PROTECTED AREA FF
LOCATION 18
MAINTENANCE INTERRUPT SOURCES
ERROR SUMMARY CABLE
BUFFER REG. INPUT BUS
MTCE DECODER CABLE
TO MASTER SCANNER
BUFFER REG. OUTPUT BUS
OCG, ETC. CABLE
ORDER CABLE
BIT 18
BR-PTA [5T7]
PTA-S [10T14, 16T20]
PTA-R [9T11, 16T20]
PTA
PTA-BR [0T8]
PUEE
DI
BR-MAIS [5T7]
MAIS-BR [0T8]
PERF
PTA
EAI
MMIO
MMII
CSRRF
PSRRF
PUEE
PUEI
PTAV
TRI
BPI
CE
LTO
SETO
PERF
3209
1218
4609
5209
5204
5210
5217
5215
5218
5216
5200
5220
5201
5203
5219
5207
5211
5208
5213
5214
5205
2218
2219
3900
1812
2600

LOCATION 21
INTERRUPT LEVEL
ACTIVITY REGISTER
ERROR SUMMARY CABLE
BUFFER REG. INPUT BUS
MTCE DECODER CABLE
4609
3209
1218
6302
6305
6300
6301
6304
LA
LB
LC
LD
LE
LF
LG
LH
LJ
IHO
CSFI
6307
BR-ILA [5T7]
ILA-BR [OT8]
[3T5]
6306
6303
2600
1812
3900
BUFFER REG. OUTPUT BUS
OCG, ETC. CABLE
ORDER CABLE

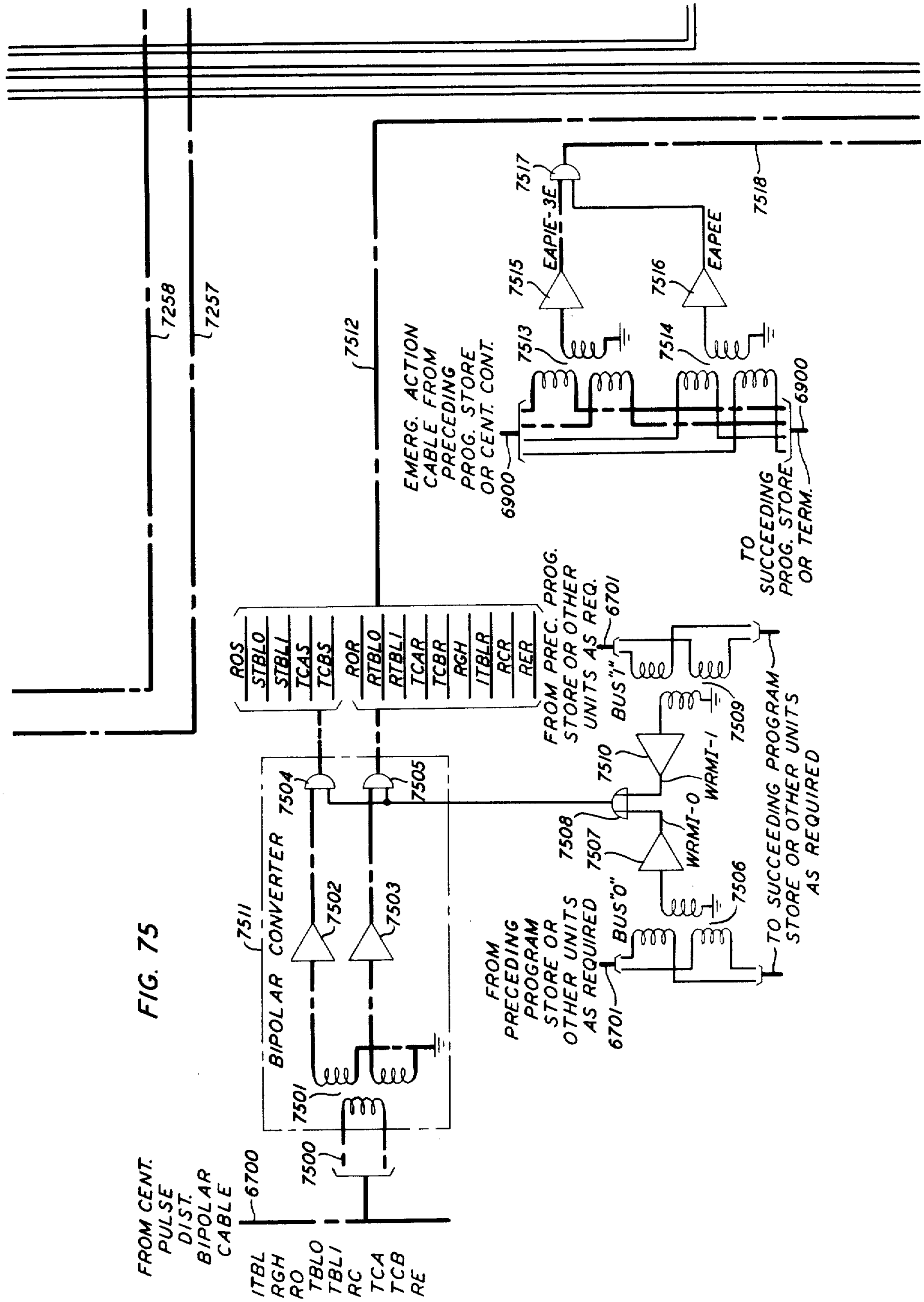

FIG. 75
7258
7257
7512
7517
7518
EAPIE-3E
EAPEE
7515
7516
7513
7514
EMERG. ACTION CABLE FROM PRECEDING PROG. STORE OR CENT. CONT.
6900
TO SUCCEEDING PROG. STORE OR TERM.
FROM PREC. PROG. STORE OR OTHER UNITS AS REQ.
6701
BUS "1"
7509
ROS
STBLO
STBLI
TCAS
TCBS
ROR
RTBLO
RTBLI
TCAR
TCBR
RGH
ITBLR
RCR
RER
TO SUCCEEDING PROGRAM STORE OR OTHER UNITS AS REQUIRED
7510
WRMI-1
7504
7505
7508
WRMI-0
7507
7506
BUS "0"
TO SUCCEEDING PROGRAM STORE OR OTHER UNITS AS REQUIRED
FROM PRECEDING PROGRAM STORE OR OTHER UNITS AS REQUIRED
7511
BIPOLAR CONVERTER
7502
7503
7501
7500
6700
FROM CENT. PULSE DIST. BIPOLAR CABLE
ITBL
RGH
RO
TBLO
TBLI
RC
TCA
TCB
RE

FIG. 87

CENTRAL CONTROL

| | | | | | | | |
|---|---|---|---|---|---|---|---|
| FIG. 10 | FIG. 11 | FIG. 12 | FIG. 13 | FIG. 14 | FIG. 15 | FIG. 16 | FIG. 17 |
| | FIG. 18 | FIG. 19 | FIG. 20 | FIG. 21 | FIG. 22 | | |
| | FIG. 23 | FIG. 24 | FIG. 25 | FIG. 26 | FIG. 27 | | |
| | FIG. 28 | FIG. 29 | FIG. 30 | FIG. 31 | FIG. 32 | | |
| | FIG. 33 | FIG. 34 | FIG. 35 | FIG. 36 | FIG. 37 | | |
| | FIG. 38 | FIG. 39 | FIG. 40 | FIG. 41 | FIG. 42 | | |
| | FIG. 43 | FIG. 44 | FIG. 45 | FIG. 46 | FIG. 47 | | |
| | FIG. 48 | FIG. 49 | FIG. 50 | FIG. 51 | FIG. 52 | | |
| | | FIG. 53 | FIG. 54 | FIG. 55 | FIG. 56 | | |
| | | FIG. 57 | FIG. 58 | FIG. 59 | FIG. 60 | | |
| | | FIG. 61 | | FIG. 62 | FIG. 63 | | |

FIG. 88

COMMUNICATIONS BUS CCTS

| | | |
|---|---|---|
| FIG. 64 | FIG. 65 | FIG. 66 |

| | |
|---|---|
| FIG. 67 | FIG. 68 |

| |
|---|
| FIG. 69 |

FIG. 89

PROGRAM STORE

| | | |
|---|---|---|
| FIG. 72 | FIG. 73 | FIG. 74 |
| FIG. 75 | FIG. 76 | FIG. 77 |
| FIG. 78 | FIG. 79 | FIG. 80 |
| | FIG. 81 | FIG. 82 |

PROGRAM CONTROLLED DATA PROCESSING SYSTEM

CROSS REFERENCE TO RELATED APPLICATIONS

This is a division of application Ser. No. 334,875, filed Dec. 31, 1963, now U.S. Pat No. 3,570,008, which issued Mar. 9, 1971.

BACKGROUND OF THE INVENTION

Advances in high speed data processing circuitry have brought about an ever increasing time sharing of circuits in data processing systems. Although fully time-shared electronic control of a telephone switching system brings about many system advantages such as increased flexibility, new and advantageous system services and uniformity of system design independent of system traffic handling capacity, such systems do have inherent problems which are not present in prior art telephone switching systems and which are not present to the same degree in other data processing systems.

For example, in prior art electromechanical telephone switching systems such as the well-known Bell System crossbar system, a plurality of control circuits, i.e., markers, are provided in sufficient numbers to serve the traffic requirements of the switching center. Each marker is time-shared by a large number of lines and trunks; however, in such arrangements the loss of a single marker or of a relatively few markers of the group results only in a reduction in system traffic handling capacity and such a loss is not fatal to system operation.

A telephone switching system is a "near real time" machine in that it must serve the lines and trunks terminating in the office without unreasonable delays. Furthermore, a telephone switching system must run continuously if customer satisfaction is to be achieved. That is, it is not possible to stop the service of a telephone office during the course of the day or night to effect changes in wiring or to effect repairs on the system. A telephone exchange must be prepared to handle calls continuously as serious personal emergencies which require the use of the telephone system cannot be scheduld to occur at times which are convenient to the telephone system.

The above limitations of machine operation with regard to near real time response of the system and the requirement that the system be continuously operable do not generally apply to other electronic data processing arrangements and, if they do apply, are not applicable to the same degree.

An example of an electronically controlled telephone switching system wherein a single central control is time-shared to control all of the lines and trunks of the office is shown in U.S. Pat. No. 2,955,165 which issued to W. A. Budlong, G. G. Drew, J. A. Harr on Oct. 4, 1960. In a system such as this a failure in the central control or any other of the time-shared units of the system will result not only in a reduction in traffic handling capacity but, rather, a complete failure of the system. Furthermore, mere mechanical switching of duplicate units in such a system is not sufficient as the problems of switching from regular to standby units are such that the traffic handling capacity of the system may be unreasonably interrupted during switching.

The usual methods of evaluating the performance of electromechanical telephone systems and data processing systems and the remedial actions taken in response thereto are also not adequate in a commercial electronic program controlled telephone switching system. Subscriber satisfaction is based upon consistent and uninterrupted service. Accordingly, every effort must be made to assure early detection of potential trouble, to avoid recurrence of troubles and, once a trouble has been detected, to rapidly diagnose and repair the defect in order to assure the availability of backup facilities in the case of further troubles.

It is an object of this invention to increase the dependability of electronic program controlled telephone switching systems.

It is another object of this invention to increase the maintainability of electronic program controlled telephone switching systems and to simplify the manual maintenance checks attendent such systems.

These and other objects of this invention are achieved in one specific illustrative embodiment wherein system control is generally by means of a "central processor" which comprises a central control and memory wherein there is stored data and a logical program for performing both the normal operating functions of a telephone switching system and the maintenance functions of such a system. The program is arranged to accomplish the normal functions of a telephone switching system on a near real time basis and to also perform the following maintenance functions:

A. A plurality of subsystem checks during the course of normal call processing;

B. Maintenance routines to detect and isolate trouble;

C. Switching of subsystems to remove faulty units from the active combination of equipments; and D. A systematic diagnosis of the source of a detected system failure.

Normal call processing may be functionally divided into two general classes:

(1) The collection and transmission of data from and to lines, trunks, and service circuits; and (2) The processing of such data.

The collection and transmission of data must be accomplished on a near real time basis; therefore, such work functions are accomplished repeatedly with a high degree of timing precision. The data processing, however, may be carried on with a lower degree of timing precision. Both the interleaving of the normal call processing and maintenance functions and the execution of the "near real time call processing tasks" are accomplished by means of a system interrupt hierarchy which includes a plurality of interrupt levels and a base level.

System dependability is increased by providing an "emergency action sequencer" within the central processor, and by providing emergency action program procedures. A program controlled telephone switching system is capable of correcting faults within the system by way of program sequences only if the central control is capable of properly processing program order words and of acquiring such words from the store. In the event of a detected trouble which involves a major element of the central processor and which trouble is not remedied by program actions, the "emergency action sequencer" is enabled. The emergency action sequencer is a wired configuration which is capable of completing its assigned "emergency actions" even though the central processor is unable to process and/or acquire program order words. The emergency actions rearrange system components to make the system operative by avoiding the system failure. In the event that the first emergency action rearrangement is not successful in restoring the system to normal operation, successive emergency rearrangement actions are undertaken.

Heretofore both telephone switching systems and data processing systems have employed certain duplicated units of equipment and have provided means for switching between regular and standby units in the event of failure of one or the other. Such arrangements, however, generally employ electromechanical or mechanical swiches for transferring operation from one unit to another. In the present system greater flexibility of operation is achieved by switching between duplicate units by electronic means which avoid the inherent introduction of noise and delay which are present in prior art systems.

Further, with the advent of high speed electronic switching of duplicate units there is a greater tendency upon the part of the system programmer to switch system operation between duplicated units and thereby exercise duplicated units in regular service. This mode of operation is advantageous as it is possible that a unit may exhibit a trouble condition in regular service but not in standby service.

System data processing capability is enhanced by a number of measures provided in our system. The central control is arranged to operate in a mode of operation which is termed "three-cycle overlap" herein. In this mode of operation the central control is concurrently performing work functions relating to three successive single cycle orders. That is, while it is completing the operational step of a first order it is receiving the next succeeding order and is generating and transmitting the code-address of the second succeeding order. The data processing capacity of our system is further enhanced by the provision of sequence circuits which extend the period for completing the operational step of an order beyond a single machine cycle. Certain sequence circuits momentarily halt the flow of program order words; however, others extend the degree of overlap between successive orders.

The program order structure adopted herein is designed to optimize the system data processing capacity and to efficiently use the information capacity of the program order words. Although most orders in the order structure are general purpose orders which find application in many facets of machine operation, there are, however, individual orders which are designed to be employed in conjunction with one or more other orders to efficiently perform routine tasks which the machine must repeatedly perform.

In accordance with one feature of our invention the major divisions of the system are duplicated and means are provided for rapidly switching duplicate elements into active and standby combinations of equipment.

In accordance with another feature of our invention access is provided to large numbers of test points within all of the major elements of our system.

In accordance with another feature of our invention an emergency action sequencer serves to effect rearrangements of active combinations of major elements of the central processor even though the currently active combination is unable to process and/or acquire program order words.

The above and other objects and features of this invention will be more readily understood from the following description when read with respect to the drawing in which:

FIGS. 72 through 82 (arranged as shown in FIG. 89) are a schematic representation of one illustrative embodiment of a program store employed in our system;

FIGS. 87 through 89 are key sheets showing the arrangement of portions of our system as enumerated earlier herein.

Figure 1:
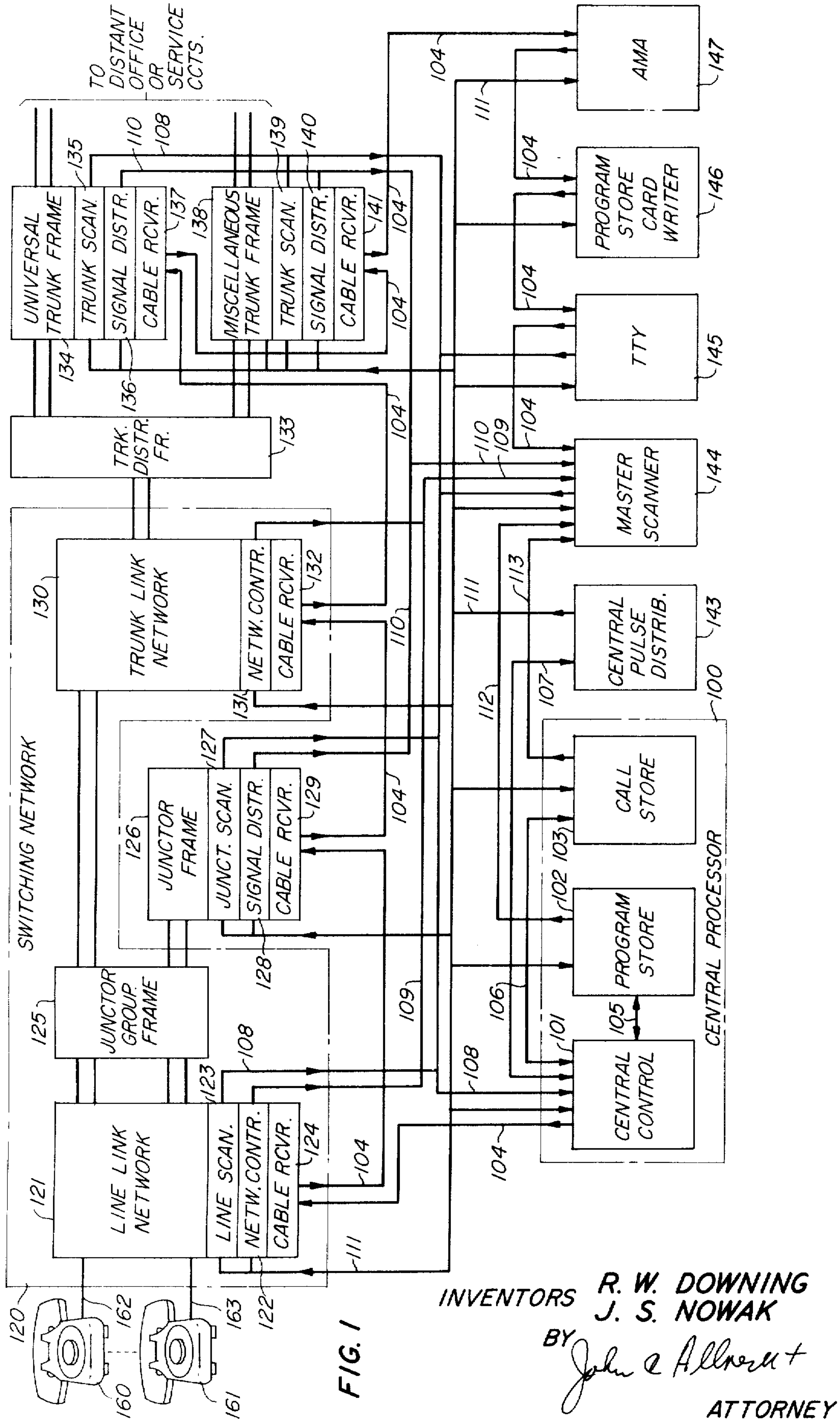
FIG. 1 is a general block diagram of a switching system in accordance with the broad aspects of this invention.
Figure 2:
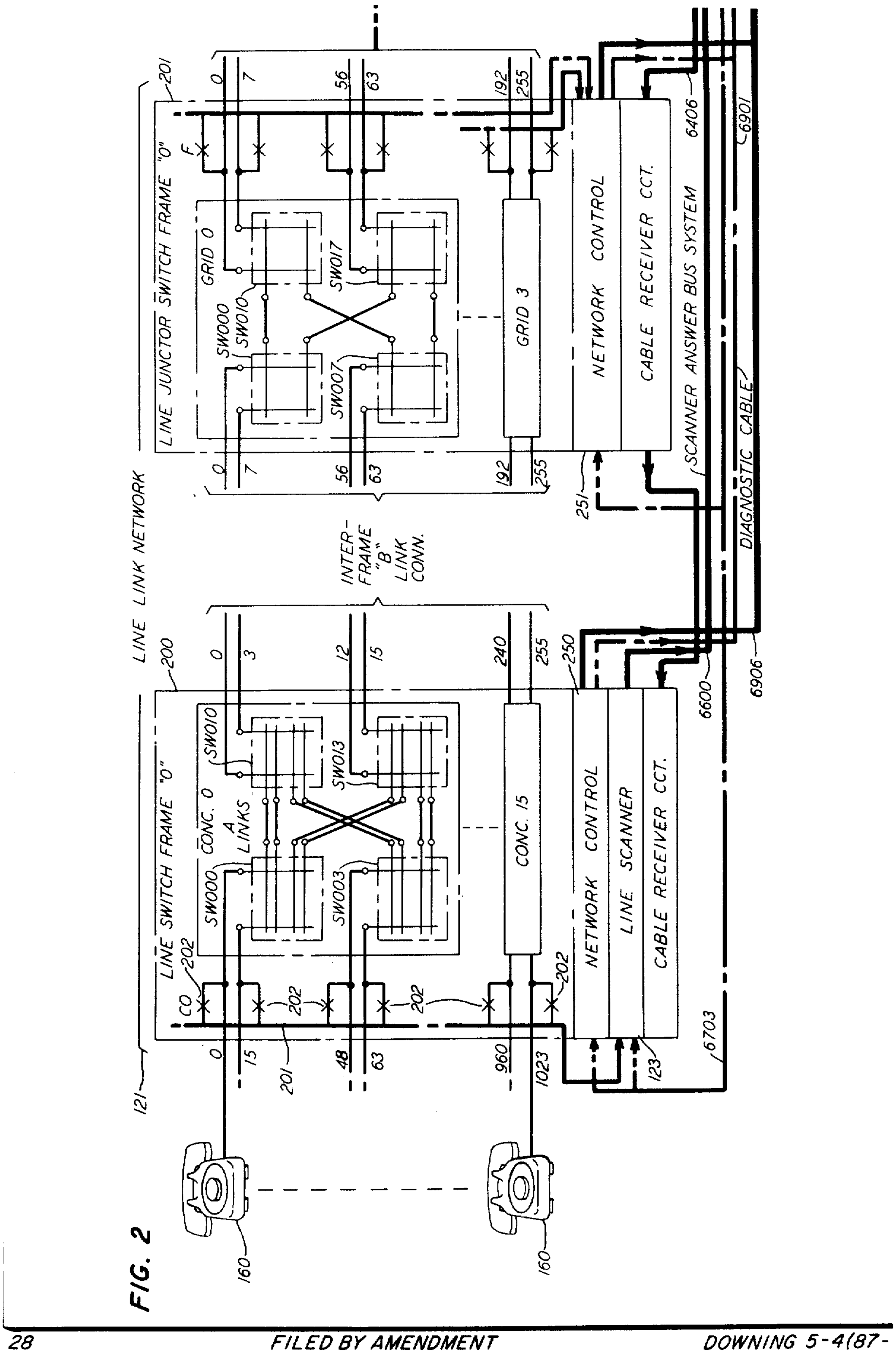
FIGS. 2 through 4 (arranged as shown in FIG. 5) are a schematic representation of one illustrative embodiment of the switching network of our invention.
Figure 3:
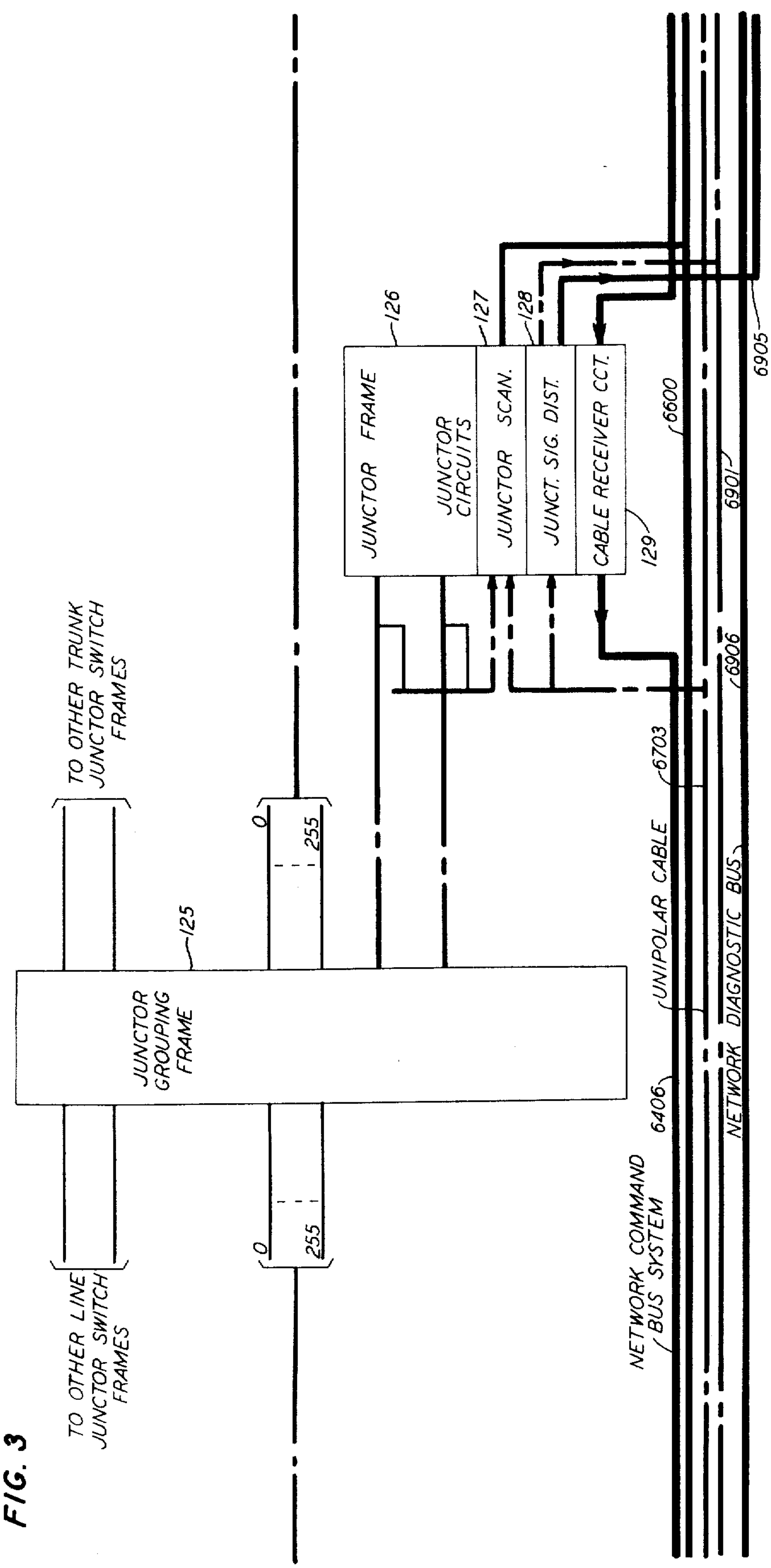
Figure 4:
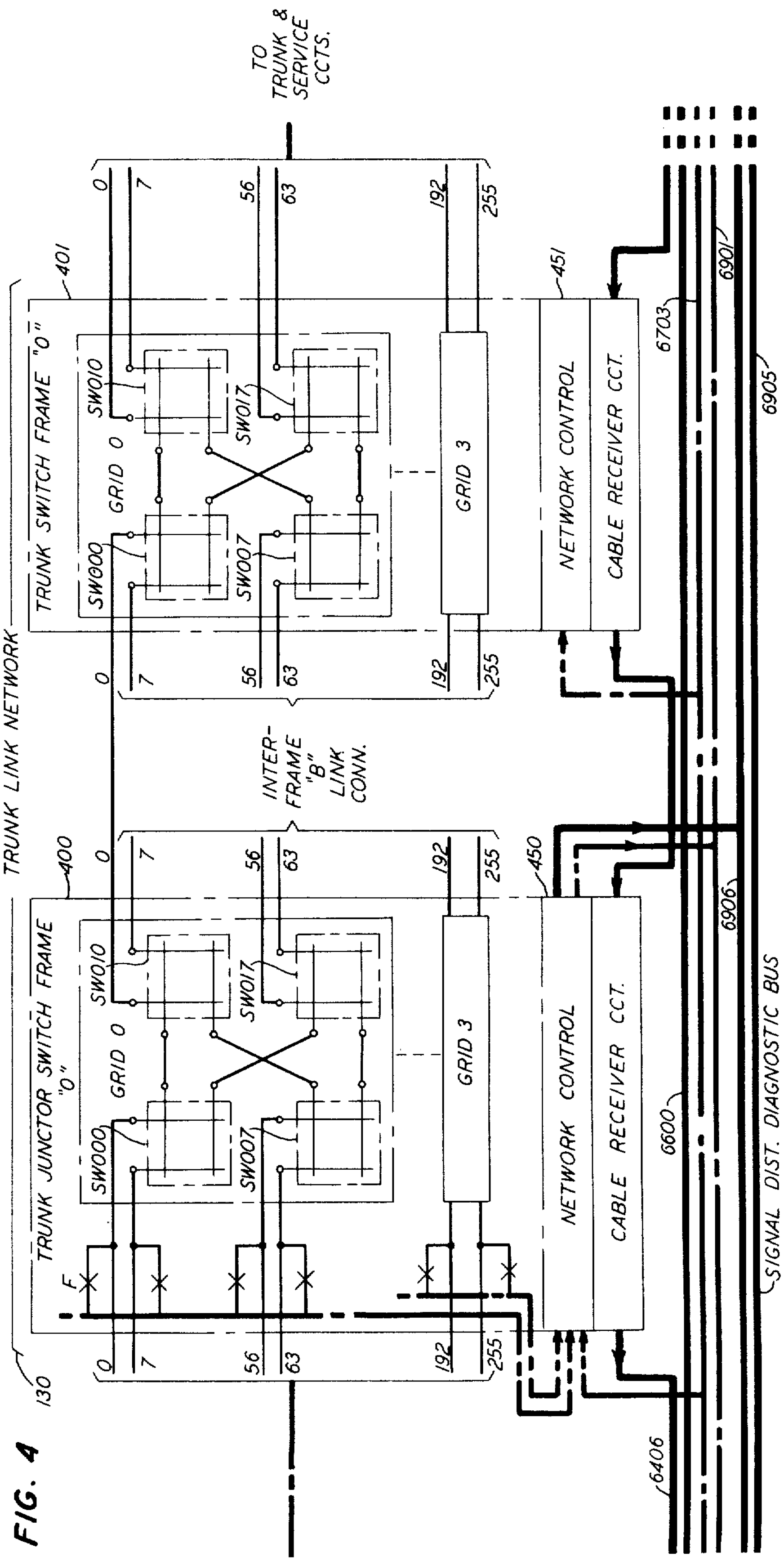

The principal divisions of a telephone switching system in accordance with this invention are shown in FIG. 1. The functional designations employed therein are broadly descriptive of the tasks assigned each block of the figure. Short functional descriptions of each block of FIG. 1 are given below to establish a background of knowledge to promote an understanding of the system. This description is followed by a general discussion of telephone and maintenance functions, a more specific discussion of the blocks shown in FIG. 1 and, subsequently, there is a discussion which shows the utilization of the various system elements in performing the telephone maintenance and administrative functions of a telephone switching system.

The general organization of the telephone switching system shown in FIG. 1 resembles the system organization set forth in the previously noted Budlong et al. U.S. Pat. No. 2,955,165; however, in specific equipments, in details of system organization, and in details of system operation there are major departures in the present system from that shown in the Budlong et al, patent.

Central Processor (100)

The Central Processor 100 is a centralized data processing facility which is employed to implement the varied telephone, maintenance, and administrative functions of a telephone switching system. The central processor may be divided into three basic elements:

(1) Central Control 101;

(2) Program Store 102;

(3) Call Store 103.

Functionally, the Central Control 101 may be divided into three parts:

(1) Basic data processing facilities;

(2) Facilities for communicating with input and output equipment; and (3) Maintenance facilities.

As far as possible common circuits within the Central Control 101 are employed to accomplish all of these functions.

The program Store 102, in this one specific embodiment, is a permanent magnet-magnetic wire memory (Twister) and therefore affords nondestructive read out of the information stored therein. The Program Store 102, being semipermanent in nature, is employed to store the less volatile system information including the system programs, a variety of translation information including directory number to line equipment number translations and line class of service information. The information is written into the Program Store 102 by means of a Program Store Card Writer 146.

The Call Store 103, in this one specific embodiment, is a ferrite sheet memory; therefore, information may be written into a read from the Call Store 103. Since information in the Call Store 103 is readily changed at the normal system speed, the more volatile system information is stored therein. This information includes:

(1) Information relating to calls (registered call signaling information, et cetera);

(2) Information relating to recent changes in directory number to line equipment number translations;

(3) Recent changes in subscriber class of service information;

(4) System administrative information;

(5) Subscriber and trunk busy-idle information;

(6) Network path busy-idle information; and (7) System work lists and queues.

By using, with only minor exceptions, separate memory units, i.e., Program Store 102 and Call Store 103 for the system instructions and for the system data respectively, it is possible to take advantage of both parallel and overlap operation. Thus the Central Processor 100 is able to perform more data processing per unit time and therefore increase the call handling capacity of the Central Processor 100.

Central Control (101)

The Central Control System 101 comprises two independent central controls for purposes of system reliability. The independent central controls are both arranged to perform all of the necessary system actions. In the most usual mode of operation both independent central controls carry on the same work functions on the basis of duplicate input information. This is termed the in-step mode of operation. However, only one of the two central controls can alter the system status or control the execution of telephone functions at any given instant. That is, the two independent central controls provide control and maintenance information to the remainder of the system on a mutually exclusive basis. The manner in which the decision is reached as to which of the two central controls is in control of the system at any given instant is described later herein.

In this one specific embodiment the Central Control 101 executes one order, other than a transfer, a program store data word reading or variety of work operations which require the use of the special purpose sequence circuits which are described later herein, per basic 5.5 microsecond instruction cycle, which is the time cycle of the Program Store 102 and of the Call Store 103. A microsecond clock in the Central Control 101 provides ½ microsecond pulses at ¼ microsecond intervals which pulses permit the Central Control 101 to perform a series of sequential actions within one basic 5.5 microsecond instruction cycle.

The design of the Central Control 101 is predicated upon the demands of real time, the internal functions it must perform and the basic instructions necessary to accomplish these ends. The instructions have been designed to permit versatile programming of the office functions and to permit the basic programs to be applicable to a wide variety of offices having great differences in traffic capacity and providing a variety of special services.

Program Store (102)

The Program Store 102 is a word organized random access high capacity memory system. As previously noted, in this one specific illustrative embodiment, a word organized magnetic wire memory employing magnet card coding and non-destructive read out is employed as the memory element of the Program State 102. A Program Store System 102 comprises at least two independent program stores. The number of stores in a Program Store System 102 is determined principally by the size of the switching system, i.e., the number of lines and trunks served and the variety of services rendered the lines and trunks; however, a Program Store System 102 never comprises fewer than two stores in order to achieve system dependability through carefully utilized duplication.

In this one specific illustrative embodiment each Program Store 102 comprises a number of memory (Twistor) modules not to exceed 16. Each memory (Twistor) module comprises 8,192 44 bit words. The memory words are associated in pairs an each module comprises 4,096 discrete word pair addresses and means for selecting the appropriate forty-four bit word of the pair of 44 bit words for utilization by the switching system.

A Program Store 102 comprises three major divisions, namely:

(1) Magnetic Wire (Twistor) memory elements along with access and readout circuitry for selectively obtaining data therefrom;

(2) Program Store control circuitry; and (3) Program Store maintenance circuitry.

A magnetic wire memory of the type employed herein is shown in U.S. Pat. No. 3,295,111 which issued to C. F. Ault, L. E. Gallaher, T. S. Greenwood on Dec. 27, 1966.

Any number of stores from two to six may be employed in this one particular system embodiment.

The information capacity of a store is divided into a left (H) half and a right (G) half. Where the number of stores employed exceeds two, the information in the right half of the first store is duplicated in the left half of the second store; the information in the right half of the second store is duplicated in the left half of the succeeding store; and the information in the right half of the last store is duplicated in the left half of the first store. This arrangement of information in the stores of a Program Store System 102 is disclosed in the copending patent application Ser. No. 334,725, filed Dec. 31, 1963, now U.S. Pat. No. 3,312,947, Apr. 4, 1967 of M. Raspanti and the theory behind this mode of operation will not be discussed in detail here. However, it should be noted that through this duplication arrangement an odd number of stores may be employed which, in certain instances, effects a considerable saving in store apparatus. This arrangement is not limited to the Program Store System 102 but, as will be seen later herein, is also applicable to the Call Store System 103.

Call Store (103)

The Call Store 103 is a word organized random access high capacity memory system wherein the more volatile system information is stored. In this one specific illustrative embodiment a word organized ferrite sheet memory is employed as the memory element of the Cell Store 103.

A ferrite sheet memory of the type employed herein is shown in U.S. Pat. No. 3,299,278 which issued to P. A. Harding on Jan. 17, 1967. The control and maintenance circuits for the store of the type employed herein are shown in the previously noted U.S. Pat. No. 3,312,947, Apr. 4, 1967 of M. Raspanti.

A Call Store System 103 comprises at least two independent call stores. The number of stores in a Call Store System 103 is determined principally by the size of the switching system, i.e., the number of lines and trunks served and the variety of services rendered the lines and trunks; however, a Call Store System 103 never comprises fewer than two call stores in order to achieve system reliability.

In this one specific illustrative embodiment each Call Store 103 has capacity for 8,192 24 bit words.

As in the case of the Program Store 102, the Call Store 103 comprises three major divisions, namely:

(1) Ferrite sheet memory along with access, readout and writing circuitry for selectively obtaining data from the Call Store 103 and for placing data in the Call Store 103;

(2) Call Store control circuitry; and (3) Call Store maintenance circuitry.

Any number of stores from two to 32 may be employed in this one particular system embodiment. The organization of the Call Stores 103 into left and right halves and the general system of duplication is as described previously herein with respect to the Program Stores 102 and as disclosed in U.S. Pat. No. 3,312,947, Apr. 4, 1967 of M. Raspanti.

Communications between major divisions of this systems are by way of bus systems and by way of multiple conductor cables which provide discrete communication paths between selected divisions of the systems. The buses and cables are detailed later herein.

Communication within a major division of this system, such as a Central Control 101, may be by way of bus systems; however, such internal bus systems comprise a plurality of single rail parallel paths and are not intended to be covered by the following discussion.

A bus system, as defined herein, comprises a plurality of pairs of conductors which may, in many respects, be compared to a tapped delay line. The time delay of a bus system is not necessarily an advantageous aspect of the bus system but, rather, is an inherent characteristic thereof. A bus is a transmission means for transferring information from one or more sources to a plurality of destinations. A bus is transformer coupled to both the information source or sources and to the destination loads. The information sources are connected to the bus conductors in parallel and the loads are coupled to transformers which are serially connected in the bus conductors. Dual winding load transformers are employed and the two windings of the pair of windings are connected in series with the individual conductors of a pair of conductors of a bus. The load is lightly coupled to the bus as are the taps of a delay line and the bus is terminated in its characteristic impedance also in a manner well known in the manufacture of delay lines.

A bus system is connected to a number of equipments which may be physically separated by distances which are large compared to the distances between taps of a normal delay line. Data transmitted over a bus is in pulsed form and in this particular embodiment extremely short pulses in the order of one-half microsecond are transmitted. Information on a bus system is transmitted in parallel, that is, a data word or a command is transmitted in parallel over the plurality of pairs of conductors of the bus and it is important that such parallel data elements arrive at a given load equipment at a common time. Accordingly, the pairs of conductors of a bus system are arranged to follow similar physical paths and their lengths are kept substantially identical.

There are a number of bus systems and these are described with respect to the major divisions of the system along with the general description of those divisions. Although the buses of this illustrative embodiment are shown in the drawing to be a single continuous path from a source to one or more destinations, there are, in fact, many special techniques employed to minimize propagation time from an information source to a destination point and to equalize propagation times between an information source and similar destinations. Such techniques are not discussed herein as they are not essential to an understanding of this invention; however, in a large office the routing of buses and the special techniques which are designed to achieve the above-noted desirable result are relatively important to an optimum system.

A bus system generally comprises two duplicate buses which in the drawing are labeled bus "0" and bus "1". In that there are a number of bus systems as will be set forth later herein, there are a number of buses labeled bus "0" and bus "1"; however, each bus system is identified in the drawing.

In addition to the bus systems there are a plurality of multiple conductor cables which provide discrete communication paths between selected divisions of the switching system. The conductor pairs of these cables are in many instances transformer coupled both to the information source and the destination load; however, there are also a number of cables wherein D-C connections are made to both the source and the destination load.

While a bus is a unidirectional transmission means, there are specific instances wherein a cable pair comprises a bidirectional transmission means.

The multiple conductor cables generally provide unduplicated paths between the selected divisions of the system while, as previously noted, the buses of a bus system generally provide duplicated paths between selected divisions of the system.

SWITCHING NETWORK (120)

The Switching Network 120 serves to selectively interconnect through metallic paths lines to lines via junctor circuits, lines to trunks, trunks to trunks, lines and trunks to tones, signal transmitters, signal receivers, maintenance circuits, and, in the case of lines, to provide connections to coin supervisory circuits, et cetera. Two-wire paths between the above enumerated equipments are provided through the network of this one specific illustrative embodiment.

The Switching Network 120 only provides communication paths, means for estabishling such paths and means for supervising such paths. The Central Processor 100 maintains a record of the busy and idle states of all network links and a record of the make-up of every established or reserved path through the network. These records are maintained in the Call Store 103 of the Central Processor 100. The record relating to the busy-idle states of the network elements is generally referred to as the Network Memory Map. The Central Processor 100 interprets requests for connection between specific pieces of equipment and determines a free path through the network by examining the connection rquirements and the above-noted busy-idle states of the possible paths.

The network is divided into two major portions, namely, line link networks which terminate lines and junctors (both wire junctors and junctor circuits) and the trunk line networks which terminate trunks and wire junctors, service circuits such as tone circuits, signal receivers, signal transmitters, et cetera. A line link network comprises four switching stages, the first two stages of which are concentrating stages, while a trunk line network comprises four stages generally without concentration. In this one specific illustrative embodiment there is a single path provided between a line and each of a plurality of line link network junctor terminals. There are four paths through a trunk line network between a trunk terminal and each of a plurality of trunk line network junctor terminals.

Certain junctor terminals of each line link network are connected directly through wire junctors (a pair of wires without other circuit elements) to certain junctor terminals of the trunk link networks; others of the line link network junctor terminals are interconnected either by way of junctor circuits (which provide talking battery and call supervision facilities) or, in very large offices, by way of junctor circuits and additional stages of switching.

Junctor terminals of a trunk link network which are not connected to junctor terminals of a line link network are directly interconnected by wire junctors or, in extremely large offices, by way of wire junctors and additional switching stages.

Control of the network and the control and supervision of the elements connected to the network are distributed through a number of control and supervisory circuits. This disbursement provides an efficient and convenient buffer between the extremely high speed Central Processor 100 and the slower network elements. The principal control and supervisory elements are:

1. The network control circuits which accept commands from the Central Processor 100 and, in response to such commands, selectively establish portions of a selected path through the network or, in response to such commands, execute particular test or maintenance functions.

2. The network scanners which comprise a ferrod scanning matrix to which system elements such as lines, trunks and junctor circuits are connected for purposes of observing the supervisory states of the connected elements; the network scanners, in response to commands from the Central Processor 100, transmit to the Central Processor 100 indications of the supervisory states of a selected group of circuit elements.

3. The network signal distributors which, in response to commands from the Central Processor 100, provide an operate or a release signal on a selected signal distributor output terminal which is termed herein a signal distributor point. A signal of a first polarity is an operate signal and a signal of the opposite polarity is a release signal. Signal distributor output signals are employed to operate or release control relays in junctor circuits, trunk circuits, and service circuits. A magnetically latched wire spring relay is used generally throughout the junctor circuits and trunk circuits for purposes of completing the transmission paths through these elements and for circuit control in general. The magnetically latched relay operates in response to an operate signal (−48V) from a signal distributor and releases in response to a release signal (+24V) from a signal distributor. The network signal distributors are relatively slow operating devices in that they comprise pluralities of relays. Signal distributor output signals are pulsed signals and a single signal distributor can be addressed to only one of its output points at any given instant.

Of the three above-noted network control and supervisory elements (there are pluralities of each of these) the network controllers and the signal distributors are relatively slow operating devices and to assure completion of a task, each of these devices is addressed at the maximum repetition rate of once every 25 milliseconds. This period of time is sufficient to assure completion of the work function associated with a network controller or signal distributor command. Therefore, there is no need for the Central Processor 100 to monitor these devices to assure completion of their assigned tasks before transmitting a subsequent command to the same controller. However, to assure continued trouble free operation scan points which reflect the successful completion of a preceding order are examined before sending a new command to the controller. The network scanners, however, are relatively fast operating devices and these may be addressed at a maximum rate of once every 11 microseconds.

SUBSCRIBER CIRCUITS

The subscriber sets such as 160, 161 are standard sets such as are employed with present day telephone switching systems. That is, these are sets which connect to the central office via a two-wire line, respond to normal 20 cycle ringing signals and may be arranged to transmit either dial pulses or TOUCH-TONES or may be arranged for manual origination. Subscriber stations comprising one or more subscriber sets such as 160, 161 all terminate at line terminals of a line link network. A subscriber line may have either TOUCH-TONE sets or dial pulse sets or combinations of TOUCH-TONE and dial pulse sets. Information concerning the type of call signaling apparatus associated with a subscriber's line is included in the class of service mark which is maintained normally in the Program Store 102; however, after a recent change this information is found in whole or part in the Call Store 103.

Supervision of a subscriber's line is by way of the line scanners which are located in the vicinity of a line link network. Such scanners, however, are generally employed only to detect requests for service. After a request for service has been served and a subscriber's line has been connected through the network to a trunk or to a service circuit such as a subscriber's dial pulse receiver, subscriber's TOUCH-TONE receiver, a tone source, et cetera, or to another subscriber via a junctor circuit, the scanning element associated with a subscriber's line is disconnected and subsequent supervision for answer and disconnect is transferred either to the trunk, the service circuit, or the junctor circuit. The subscriber's line scanning element is reconnected only after the subscriber's line has been released from the prior connection.

Service circuits such as subscriber call signaling receivers and subscriber information tone sources such as busy tone, ringing tone, ringing induction tone, recorded announcements, vacant level tone, et cetera, are terminated at trunk terminals of the trunk link network. Connections between a subscriber's station and a service circuit such as a dial pulse receiver or a TOUCH-TONE receiver and connections between a subscriber's set and a tone source include the four stages of a line link network and the four stages of a trunk link network.

Communication with a distant office or an operator is by way of two-way trunks, outgoing trunks, incoming trunks, operator trunks, et cetera, which are located in the Trunk Frames 134, 138 and which all terminate at trunk terminals of a trunk link network. In the case of a call between a subscriber's station and a trunk or service circuit, talking battery to the subscriber is provided through the trunk or service circuit and supervision for disconnect is accomplished by scanning the scanning elements of the connected trunk or service circuit.

CENTRAL PULSE DISTRIBUTOR (143)

The Central Pulse Distributor 143 is a high speed electronic translator which provides two classes of output signals in response to commands from the Central Processor 100. The two classes of output signals are termed unipolar signals and bipolar signals and are respectively associated with central pulse distributor output terminals designated CPD unipolar points and CPD bipolar points. Both classes of signals comprise pulses transmitted from the CPD output points to the using devices via individual transmission pairs which are transformer coupled both to the CPD output points and to the load devices.

Central pulse distributors for purposes of reliability are employed in pairs and corresponding bipolar output points of the two central pulse distributors of a pair are employed to address the same circuit element. Similarly, unipolar points are associated in pairs to accomplish related system functions.

The address coding associated with each central pulse distributor is sufficient to define 1,024 CPD points. Of these 1,024 points, 512 are assigned to unipolar points while the other 512 are assigned to 256 pairs of bipolar points.

The most common use of the unipolar signals is to momentarily enable a particulr piece of equipment such as a Network Controller 122, a Network Scanner 123, et cetera. The enablement signals comprise relatively important information; therefore, in response to an enablement signal the enabled circuit, shortly after the receipt thereof, transmits a verify signal back to the Central Pulse Distributor 143 over the same pair that was used to transmit the enable signal. The verify signal is received at the Central Pulse Distributor 143 and is translated to the same form as the address portion of the command which was transmitted from the Central Control 101 to the Central Pulse Distributor 143. The translated verify signal is transmitted to the Central Control 101 where it is compared against the address which was transmitted. A match assures enablement of the correct unit of equipment. Not all unipolar output signals represent information which is as important as the enable signals; therefore, certain unipolar signals are not verified.

Both unipolar output signals and bipolar output signals comprise pulses and, as in the case of the signal distributors, only one CPD output point, either unipolar or bipolar, can be enabled at any given instant. Unipolar output signals while generally employed to provide transient gating signals to enable the receiving circuit are also used to set and reset flip-flops in particular instances. Bipolar output signals are employed to both selectively set and reset flip-flops at the receiving circuits. A bipolar signal is accompanied by a WRMI security signal when employed to control certain critical circuits. A signal of the first polarity serves to set a flip-flop and a signal of the other polarity serves to reset a flip-flop. The system generally has means for verifying the setting or resetting of a flip-flop in response to CPD bipolar signals; therefore, bipolar signals are not directly verified in the manner employed in the case of unipolar signals.

The Central Pulse Distributor 143 is an electronic device; therefore, its output signals are employed to control other relatively high speed circuits. For example, central pulse distributor output signals are employed to control the sending of both multifrequency signals and dial pulses from a switching center to a distant office via a trunk circuit and central pulse distributor output points are also employed to set or reset control flip-flops in a variety of system equipments. Generally these control flip-flops must be set or reset at speeds which approach a basic system instruction cycle; therefore, the slow speed signal distributor output signals are not adequate.

Commands are transmitted from the Central Control 101 to a CPD in the form of half microsecond pulses. The information required to control a CPD is transmitted in three successive waves which are each separated by 1.25 microseconds. The bus choice information which indicates that the CPD's are to accept information from either the "O" or the "1" bus of the Address Bus System 6403 [FIG. 64] is first transmitted in the first wave to all CPD's via the CPD Bus Choice Bus 6405 [FIG. 64]. The CPD Bus Choice Bus 6405 comprises two pairs labeled bus "O" and bus "1". The bus choice information is followed 1.25 microseconds later by address information on one of the buses "O" or "1" of the CPD Address Bus System 6403. Each bus of the CPD bus system comprises 34 parallel pairs. CPD address information is transmitted from the Central Control 101 to a CPD in the form of 1-out-of-8, 1-out-of-8, 1-out-of-16 code which accounts for 32 of the 34 pairs of each of the CPD address buses and, in addition, each bus includes a test conductor and a reset conductor.

The particular CPD of the plurality of CPD's which is to respond to a command is indicated by means of a CPD execute signal on one of the pairs of the CPD Execute Cable 6404. The pairs of the Execute Cable 6404 are discrete to individual central pulse distributors and the signal on the CPD execute pair follows the CPD address information by 1.25 microseconds.

The Central Control 101 verifies proper receipt of the address information and execution of the command by means of central pulse distributor verify signals which are transmitted from a central pulse distributor to the Central Control 101 by way of one of the CPD verify buses "O" or "1" of the Verify Bus System 6704. Only unipolar signals are verified; therefore, it is possible to transmit the verify information from a central pulse distributor to the Central Control 101 in a 1-out-of-8, 1-out-of-8, 1-out-of-8 code. The remaining 8 bits of the 1-out-of-16 portion of the address are employed only in the generation of bipolar CPD output signals.

A central pulse distributor input synchronizing signal is transmitted from the central control to all CPD's at the same time that the CPD execute signal is transmitted. The CPD input synchronizing signal is transmitted over the CPD Input Sync Bus System 6702 which comprises two cable pairs which are designated the "O" and the "1" bus. The CPD input synchronizing signal is transmitted over the "O" and "1" bus on a mutually exclusive basis; therefore, there is no effort made to selectively gate the synchronizing signal from the driven bus to the central pulse distributor which has received the execute signal.

In addition to verifying the address information which was transmitted from a Central Control 101 to a central pulse distributor, central control also verifies the enablement of the appropriate central pulse distributor. This is accomplished by means of a CPD execute response signal which is transmitted from a central pulse distributor to the Central Control 101 by a discrete pair of the CPD Execute Response Cable 6502. The CPD response pair is merely an extension of the CPD execute pair. Therefore, an execute signal is transmitted from a central control, passes through a serially connected transformer in a CPD and is returned to the Central Control 101 where it is also picked off by a serially connected transformer which is terminated in the characteristic impedance of the transmission pair.

Further, the central pulse distributor performs certain internal functions which check the operation of particular circuit elements within the pulse distributor and also check the validity of the address coding. These checks serve to verify the operation of the Address Pulse Stretchers and to assure that one, and only one, of each of the elements of the address are enabled. That is, a valid address should comprise one, and only one, signal out of each of the groups A0 through A7, B0 through B7, and C0 through C15. In the event that either of these checks fails, responses to the Central Control 101 via the Central Pulse Distributor Maintenance Response Bus System 6904 are omitted thus indicating to the Central Control 101 a possible trouble within the central pulse distributor.

In addition to transmitting to the Central Control 101 a twenty-four bit verify signal which designates the enabled CPD output point, the central pulse distributor also transmits to the central control an All Seems Well signal, individual signals which indicate the validity of the A, B, and C portions of the address code, and a maintenance signal which indicates that the current employed to drive the output point transformers is within prescribed limits.

The All Seems Well signal is returned to the central control to indicate proper functioning of the Central Pulse Distributor.

A test may be performed on the operation of the CPD without concern for the content of the C address portion of the command and without enabling either a bipolar or a unipolar point. In a test command the bus choice signal, the A and B portions of the address code, and the execute signal are all transmitted to the central pulse distributor and, in addition, the test conductor which is one of the conductors of the Network Command Bus System 6406 is enabled.

For purposes of maintenance one central pulse distributor may be taken out of or returned to service by means of a control signal from another central pulse distributor. A flip-flop and its associated power relay are under control of flip-flop setting and resetting signals from the companion central pulse distributor. When the flip-flop is in its reset state, the relay is operated and power is applied to the power distribution circuit of the Central Pulse Distributor. When the flip-flop is reset by means of a signal from the companion central pulse distributor, the power relay releases and removes power from the central pulse distributor. The state of the power relay, i.e., operated or released, is transmitted to a ferrod in the master scanner.

MASTER SCANNER (144)

The Master Scanner System 144 comprises a ferrod matrix for terminating circuits to be supervised and means for selectively transmitting to Central Control 101 the supervisory states of a selected group of supervised circuits in response to a command from the Central Processor 100. The scanning element employed is the ferrod device. A ferrod comprises an apertured stick of ferromagnetic material having control, interrogate, and readout windings. The control windings are placed in series with electrical connections which indicate the supervisory state of the supervised circuit. For example, where a ferrod is employed to supervise a subscriber's line, the ferrod is placed in series with the line conductors and the subscriber's subset. When the subscriber's subset is in the on-hook state there is no current flowing in the ferrod control winding, while when the subscriber is in the off-hook state current does flow in the ferrod control winding. The interrogate and readout windings merely comprise individual conductors which thread through the two apertures of the ferrod, that is, both the interrogate conductor and the readout conductor are threaded through both apertures of the ferrod. An interrogate signal comprises a bipolar pulse which when applied to the interrogate conductor causes an output signal in the readout conductor of every ferrod which is supervising a circuit which is in the on-hook state. If the ferrod is supervising a circuit in the off-hook state, a readout pulse is not generated due to saturation of the ferrod.

The Master Scanner System 144 comprises one or more scanners each capable of supervising 512 circuits. The scanners of the Master Scanner 144 are not duplicated; however, there is a complete duplication of access circuitry within a scanner to provide system reliability. The Master Scanner 144 is generally like the Network Scanners (123, 127, 135, 139) which are distributed through the network frames; however, the Master Scanner 144 is employed to supervise certain circuit elements which reflect the operating state of the system and, therefore, the supervisory states of these elements are helpful in system maintenance and trouble diagnosis. For example, scan points of the Master Scanner 144 are employed to monitor the voltage levels of critical voltage supplies, and the states of control relays and logic packages such as flip-flops to assure proper operation thereof. In addition, the Master Scanner 144 is employed to monitor a few circuits which terminate on the Switching Network 120 and which for efficiency of grouping are more conveniently examined by way of the Master Scanner 144.

TELETYPE UNIT (145)

The Teletype Unit 145 provides means for communicating information from maintenance personnel to the switching system and for transmitting information from the switching system to maintenance personnel.

By means of the Teletype Unit 145 maintenance and operating personnel may request limited specific system actions. Included in the system actions is the ability to enter in the Call Store 103 recent change translation information. That is, in the course of daily routine business there are often requirements for changes in directory number to line equipment number translations. For example, when a line is disconnected for any reason, a new line is added, or changes are made in the service afforded a line, a recent change entry is required. Recent change information is held in a Call Store 103 until such time as the coding of a Program Store 102 is changed to reflect the recent change information.

In the course of routine operations the system may encounter abnormal or trouble operating conditions and information relating to such abnormal or trouble conditions is printed out on the teletype for the information of the maintenance personnel.

PROGRAM STORE CARD WRITER (146)

The Program Store Card Writer 146 provides means for coding the information cards of the Program Store 102. Information to be placed on the magnet cards is obtained either from a magnetic tape source or from the Central Processor 100. The card writer serves to magnetize the card magnets wherever a "O" is to be inserted in the memory and to demagnetize the card magnets wherever a "1" is to be inserted in the memory.

MESSAGE ACCOUNTING TAPE UNIT (147)

The automtic Message Accounting Tape Unit 147 is utilized by the system to store telephone charging information. This information is stored in a single complete entry on magnetic tape. The tapes or the information on the tapes are subsequently transmitted to a data processing accounting center where the charge information is employed in computing a subscriber's cumulative charges.

The switching system collects certain data pertaining to both message rate and toll calls and this data is assembled in a Call Store 103. After all of the information which the data processing accounting center will require to compute a subscriber's charge has been collected, the information is transferred from the Call Store 103 to the tape unit.

The tape units are employed in pairs to assure system reliability.

Central Processor

Figure 8:
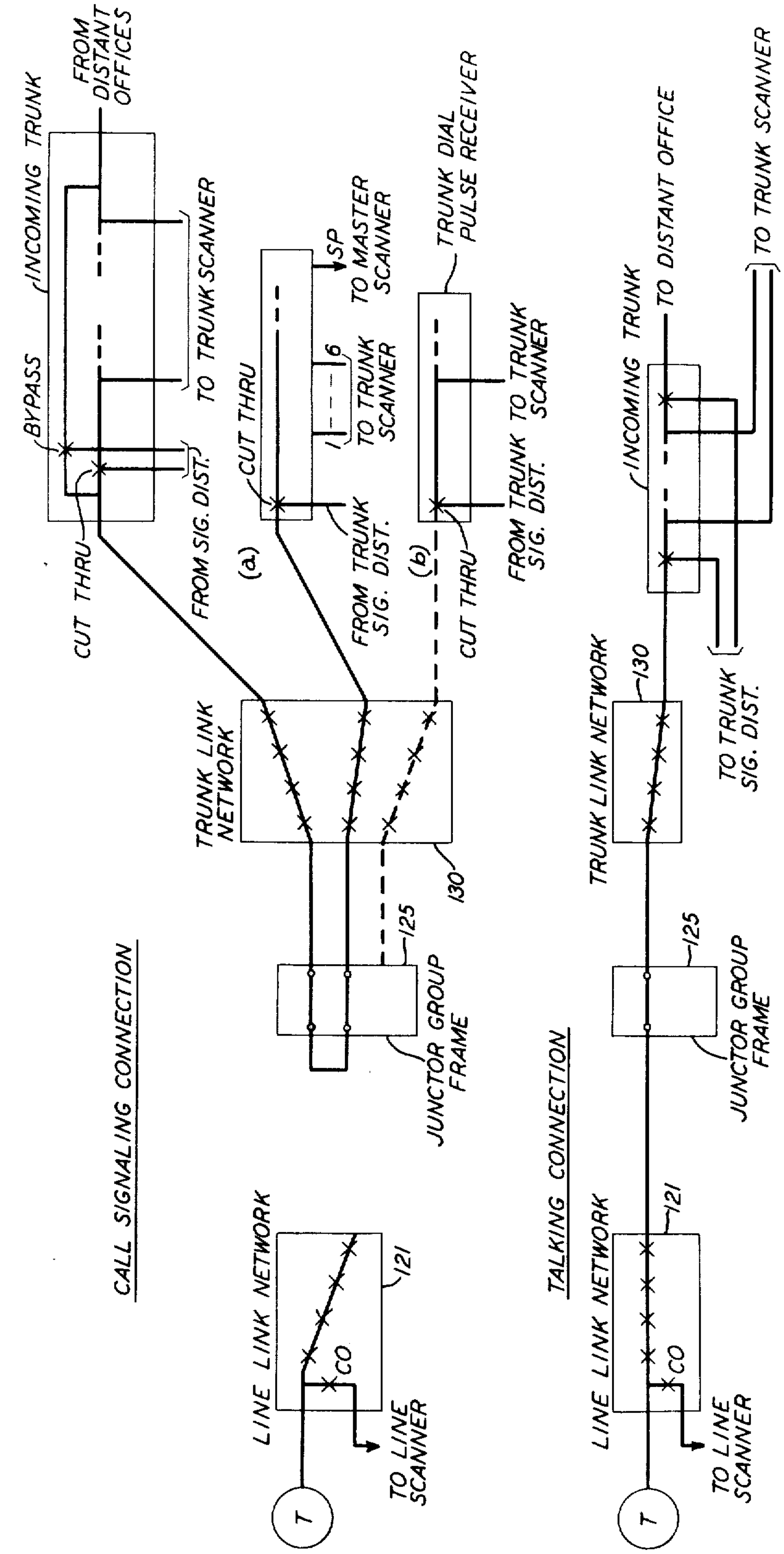
Figure 9:
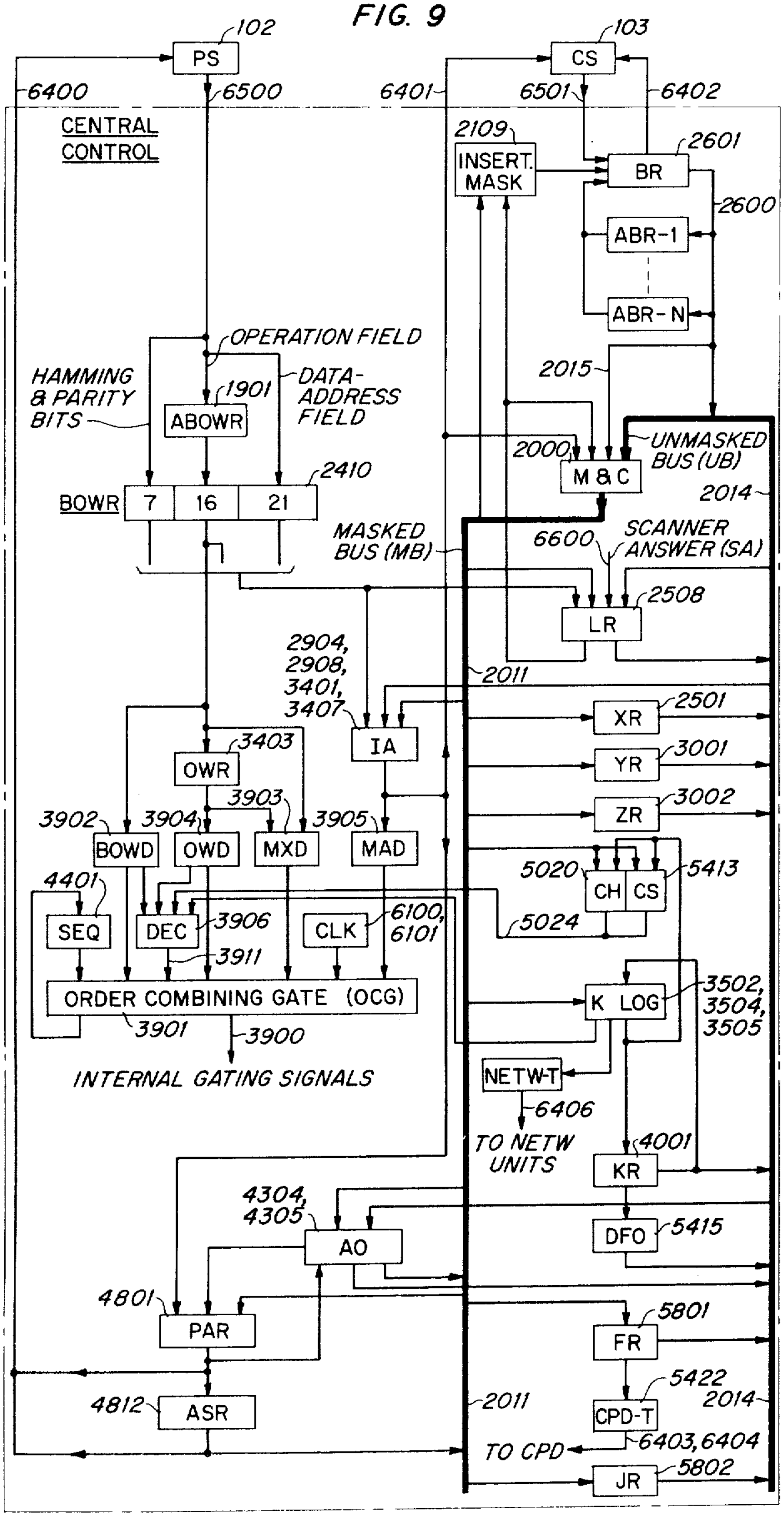
FIG. 9 is a simplified schematic representation of the central control of our system.

As seen in FIG. 1, the Central Processor 100 comprises a Central Control 101, the Program Store 102 and the Call Store 103. The Central Processor is also shown in FIG. 9 and in that figure there is a schematic diagram of the data processing portion of the Central Control 101. FIG. 9 is directed to an unduplicated central processor and there is no attempt therein to show the maintenance facilities and the facilities for interconnecting two central controls in accordance with this invention. A relatively detailed discussion of the operational checking facilities and the facilities for maintaining the two central controls "in step" are described herein with respect to FIGS. 10 through 63. The Program Store 102 of FIGS. 1 and 9 is shown in block diagram form in FIG. 7 and the Call Store 103 of FIGS. 1 and 9 is shown in block diagram form in FIG. 8.

CENTRAL CONTROL (101)

Figure 10:
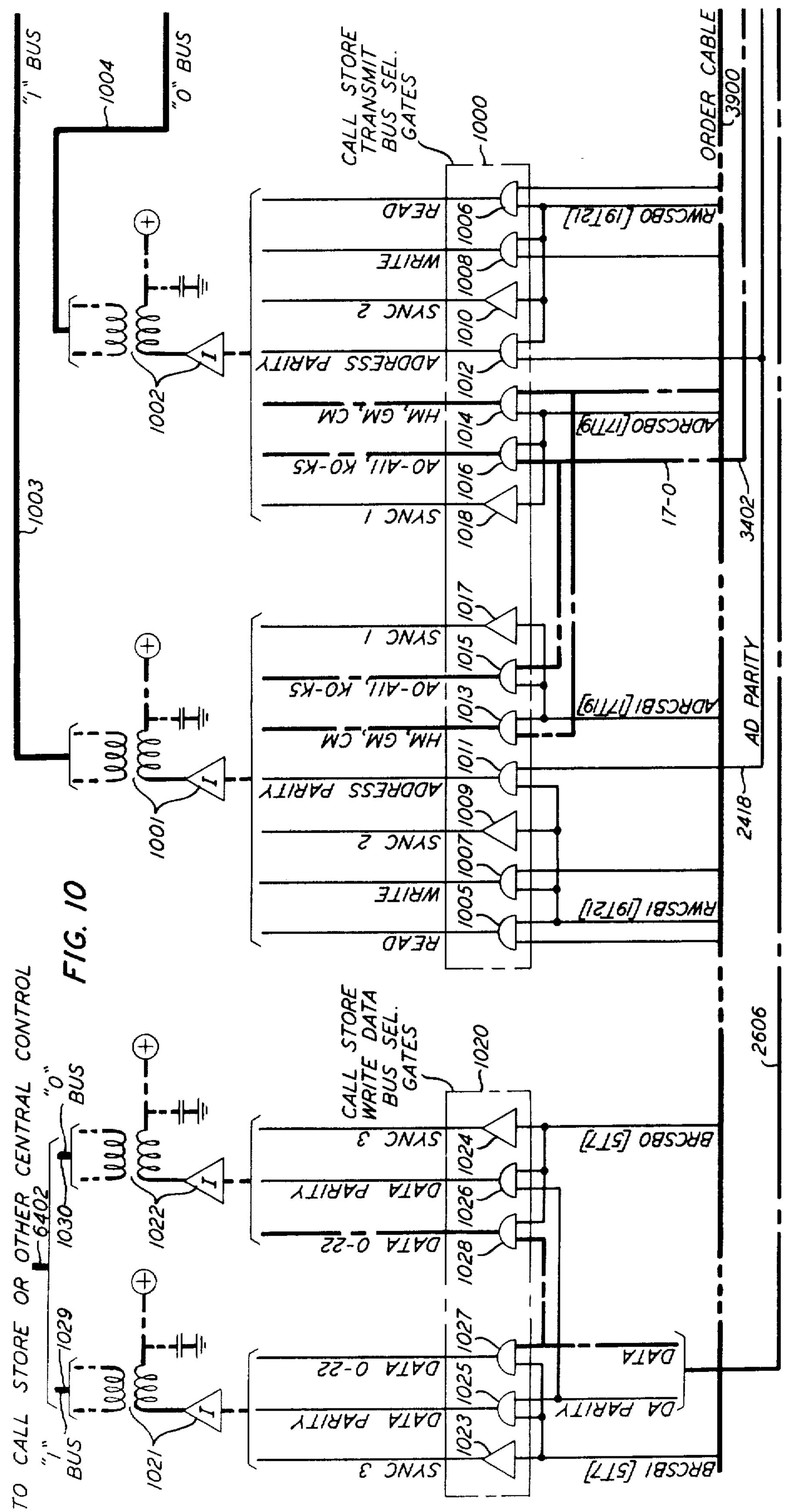
FIGS. 10 through 63 (arranged as shown in FIG. 87) are a detailed schematic representation of the central control of our system.
Figure 63:
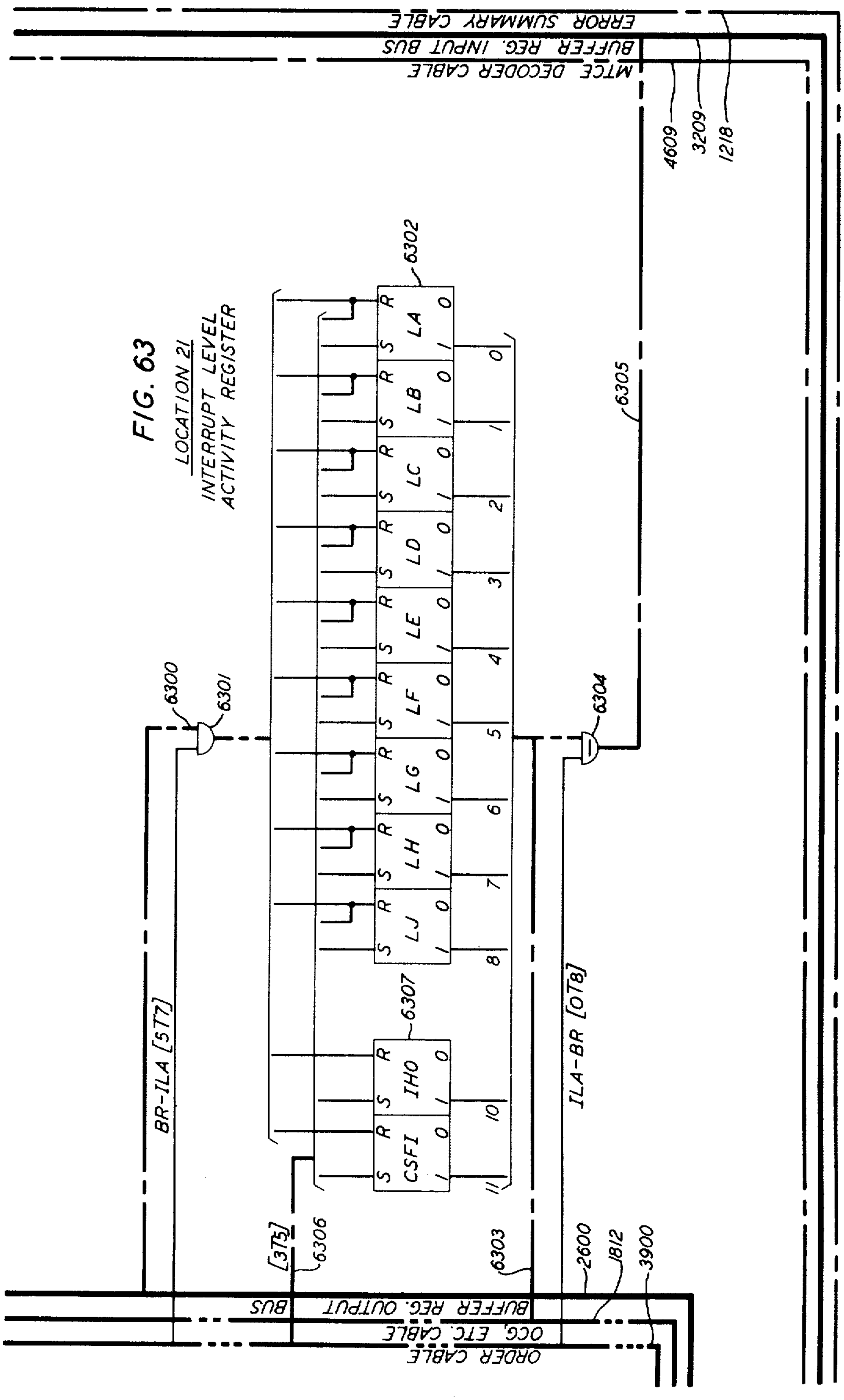

The Central Control 101, which is shown in simplified block diagram form in FIG. 9 and in detail in FIGS. 10 through 63, is the system data processing unit. For the purpose of discussion the Central Control 101 may be divided into three basic parts:

1. Basic data processing facilities;
2. Facilities for communicating with central control input sources and output devices; and
3. Maintenance facilities.

The central control performs system data processing functions in accordance with program orders which are stored principally in the Program Store 102. In a few specialized instances program orders are found in the Call Store 103. The program orders are arranged within the memories in ordered sequences. The program orders fall into two general classifications, namely, decision orders and nondecision orders.

Decision orders are generally employed to institute desired actions in response to changing conditions either with regard to lines or trunks served by the switching system or changing conditions with respect to the maintenance of the system.

Decision orders dictate that a decision shall be made in accordance with certain observed conditions and the result of the decision causes central control to advance to the next order of the current sequence of order words or to transfer to an order in another sequence of order words. The decision to transfer to another sequence may be coupled with a further determination that the transfer shall be made to a particular one of a plurality of sequences. Decision orders are also termed conditional transfer orders.

Nondecision orders are employed to communicate with units external to Central Control 101 and to both move data from one location to another and to logically process the data. For example, data may be merged with other data by the logical functions of AND, OR, EXCLUSIVE-OR, product mask, et cetera, and also data may be complemented, shifted, and rotated.

Nondecision orders perform some data processing and/or communicating actions, and upon completion of such actions most nondecision orders cause the Central Control 101 to execute the next order in the sequence. A few nondecision orders are termed unconditional transfer orders and these dictate that a transfer shall be made from the current sequence of program orders to another sequence of order words without benefit of a decision.

The sequences of order words which are stored principally in the program store comprise ordered lists of both decision and nondecision orders which are intended to be executed serially in time. The processing of data within the central control is on a purely logical basis; however, ancillary to the logical operations, the Central Control 101 is arranged to perform certain minor arithmetic functions. The arithmetic functions are generally not concerned with the processing of data but, rather, are primarily employed in the process of fetching new data from the memories such as from the Program Store 102, the Call Store 103, or particular flip-flop registers within the Central Control 101.

The individual order words are designed to complement the physical characteristics of the central processor and to complement each other. Thus, through careful design of the program order word structure it is possible to maximize the data process capacity of the central processor.

The Central Control 101, in response to the order word sequences, processes data and generates and transmits signals for the control of other system units. The control signals which are called commands are selectively transmitted to the Program Store 102, the Call Store 103, the Central Pulse Distributor 143, the Master Scanner 144, the network units such as the Network Scanners 123, 127, 135, 139, Network Controllers 122, 131, Network Signal Distributors 128, 136, 140, and the miscellaneous units such as the Teletype Unit 145, the Program Store Card Writer 146, and the AMA Unit 147.

The Central Control 101 [FIG. 9] is, as its name implies, a centralized unit for controlling all of the other units of the system. A Central Control 101 principally comprises:

A. A plurality of multistage flip-flop registers;

B. A plurality of decoding circuits;

C. A plurality of private bus systems for communicating between various elements of the central control;

D. A plurality of receiving circuits for accepting input information from a plurality of sources;

E. A plurality of transmitting circuits for transmitting commands and other control signals;

F. A plurality of sequence circuits;

G. Clock sources; and

H. A plurality of gating circuits for combining timing pulses with D-C conditions derived within the system.

The Central Control 101 is a synchronous system in the sense that the functions within the Central Control 101 are under the control of a multiphase Microsecond Clock 6100 which provides timing signals for performing all of the logical functions within the system. The timing signals which are derived from the Microsecond Clock 6100 are combined with D-C signals from a number of sources in the Order Combining Gate Circuit 3901. The details of the Order Combining Gate Circuit 3901 are not shown in the drawing as the mass of this detail would merely tend to obscure the inventive concepts of this system.

Sequence of Central Control Operations

All of the system functions are accomplished by execution of the sequences of orders which are obtained from the Program Store 102 or the Call Store 103. Each order of a sequence directs Central Control 101 to perform one operational step. An operational step may include several logical operations as set forth above, a decision where specified, and the generation and transmission of commands to other system units.

Figure 61:
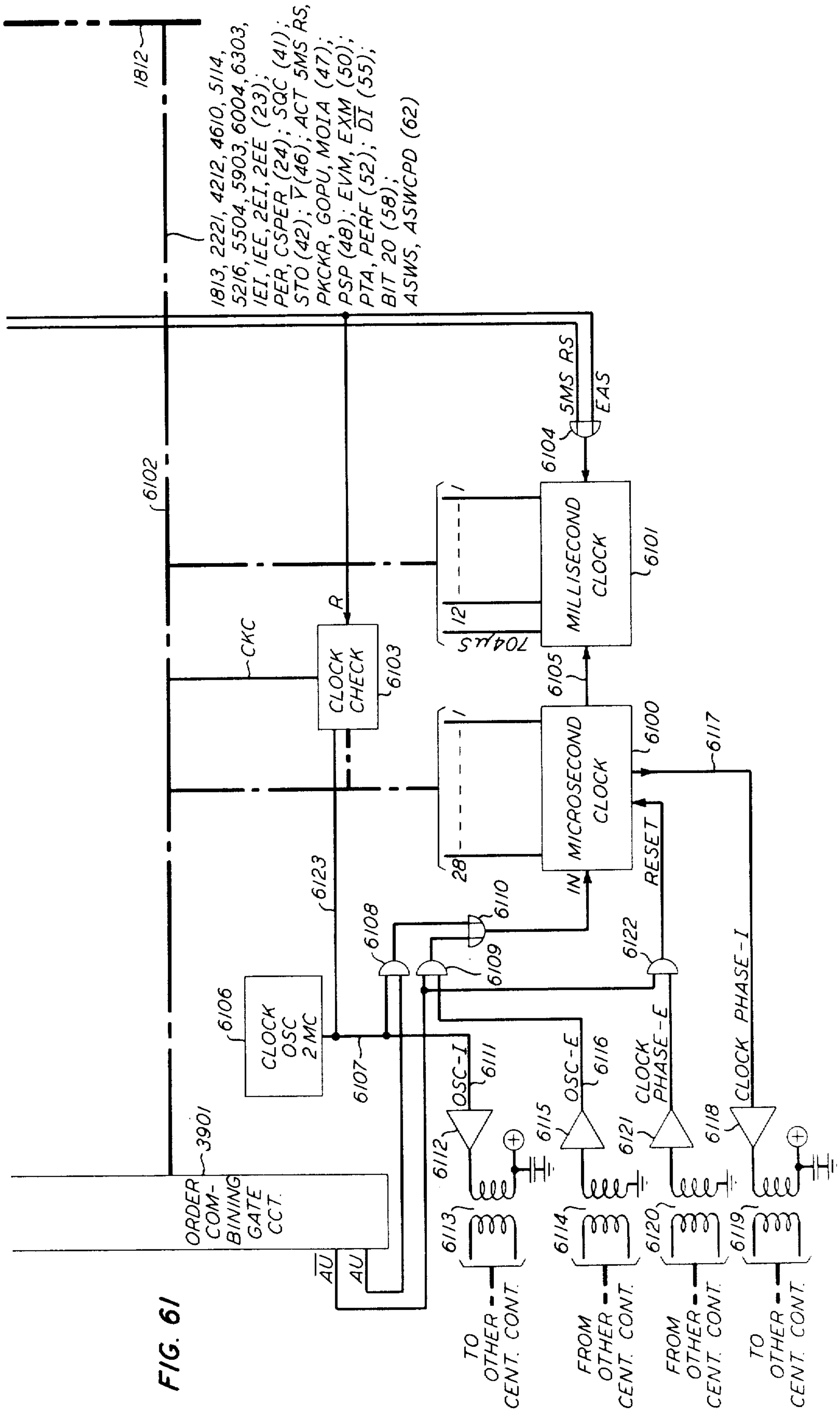

The Central Control 101 at the times specified by phases of the Microsecond Clock 6100 [FIG. 61] performs the operational step actions specified by an order. Some of these operational step actions occur simultaneously within Central Control 101, while others are performed in sequence. The basic machine cycle, which in this one illustrative embodiment is 5.5 microseconds, is divided into three major phases of approximately equal duration. For purposes of controlling sequential actions within a basic phase of the machine cycle each phase is further divided into ½ microsecond periods which are initiated at ¼ microsecond intervals.

The basic machine cycle for purposes of designating time is divided into one-quarter microsecond intervals, and the beginning instants of these intervals are labeled T0 through T22. The major phases are labeled phase 1, phase 2, and phase 3. These phases occur in a 5.5 microsecond machine cycle as follows:

A. Phase 1 - T0 to T8,

B. Phase 2 - T10 to T16,

C. Phase 3 - T16 to T22.

For convenience in both the following description and in the drawing, periods of time are designated *b*T*e* where *b* is the number assigned the instant at which a period of time begins and *e* the number assigned the instant at which a period of time is ended. For example, the statement 10T16 defines phase 2 which begins at time 10 and ends at time 16. The division of time is shown in FIG. 83.

As seen in FIG. 61, each central control has a 2 megacycle Clock Oscillator 6106. The Clock Oscillator 6106 of the active central control serves to drive the Microsecond Clock 6100 in both the active central control and the standby central control. The Oscillator 6106 of the active central control is connected to the input of the Microsecond Clock 6100 of the active central control via AND gate 6108 and OR gate 6110. AND gate 6108 is enabled by a signal on order cable conductor 61AU which indicates that the active unit flip-flop 55AU is in the "1" state. The output of the Oscillator 6106 is transmitted to the other central control via conductor 6111, amplifier 6112, transformer 6113, and an interconnecting transmission pair. In the other central control the oscillator output signal is received via a transformer such as 6114, an amplifier such as 6115, conductor 6116 and in the standby central control this signal is transmitted to the Microsecond Clock 6100 via a path which includes AND gate 6109 and OR gate 6110. AND gate 6109 is enabled by a signal on order cable conductor $\overline{\mathbf{61AU}}$. The Microsecond Clock 6100 in the active central control generates a clock phasing pulse labeled Clock Phase-I which is transmitted from the active central control to the standby central control via conductor 6117, amplifier 6118, transformer 6119 and an interconnecting transmission pair. In the standby central control the phasing signal is received over transformer 6120, amplifier 6121 and is transmitted to the microsecond clock reset terminal via AND gate 6122. AND gate 6122 is enabled by a signal on order cable conductor $\overline{\mathbf{61AU}}$. The clock phasing signal serves to keep the two microsecond clocks in correspondence.

Figure 83:
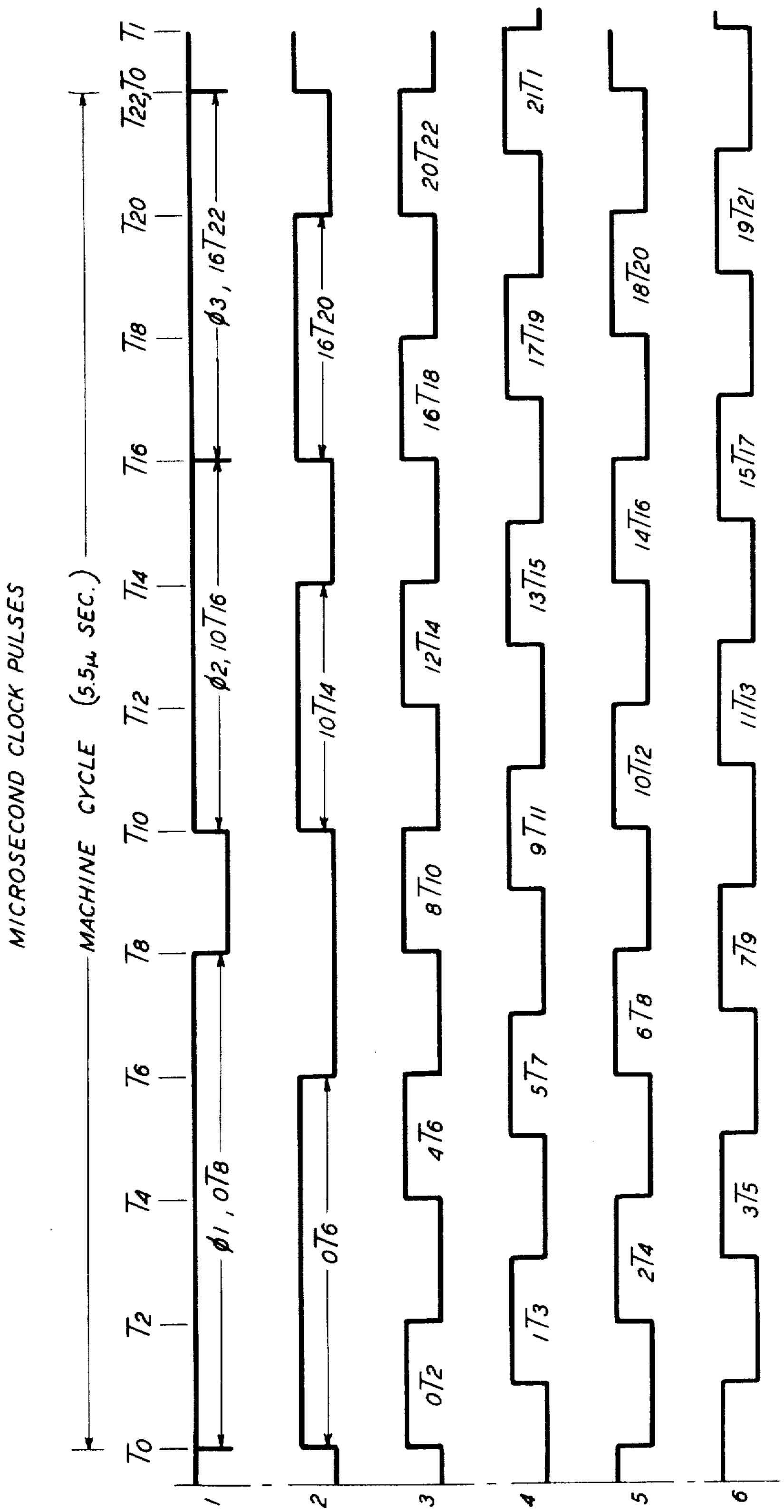
FIG. 83 is a time diagram showing the fundamental pulses employed herein.

The Microsecond Clock 6100 generates output signals as shown in FIG. 83. These output signals are transmitted to the Order Combining Gate 3901 [FIG.

39]. Further, the Microsecond Clock 6100 provides input signals to the Millisecond Clock 6101 via conductor 6105. These input signals occur once every 5.5 microseconds.

The Millisecond Clock 6101 comprises 12 binary counter stages along with counter recycling circuitry. The 12 stages are arranged as a series of recycling counters, the output of each counter providing an input to the next succeeding counter. Stages 1 through 4 provide a count of 13 and thus, with 5.5 microsecond input signals, provide an output signal once every 71.5 microseconds. Stages 5 through 7 provide a count of 7 and thus, with an input once every 71.5 microseconds, provide an output once every 500.5 microseconds (once per half millisecond). Stage 8 provides a count of 2 and thus, with a half millisecond input interval, provides an output pulse once every millisecond. Stages 9, 10, and 11 provide a count of 5 and, with input pulses once per millisecond, provide output pulses once every 5 milliseconds. Stage 12 provides a count of 2 and thus, with input pulses once every 5 milliseconds, provides an output pulse once every 10 milliseconds.

Figure 42:
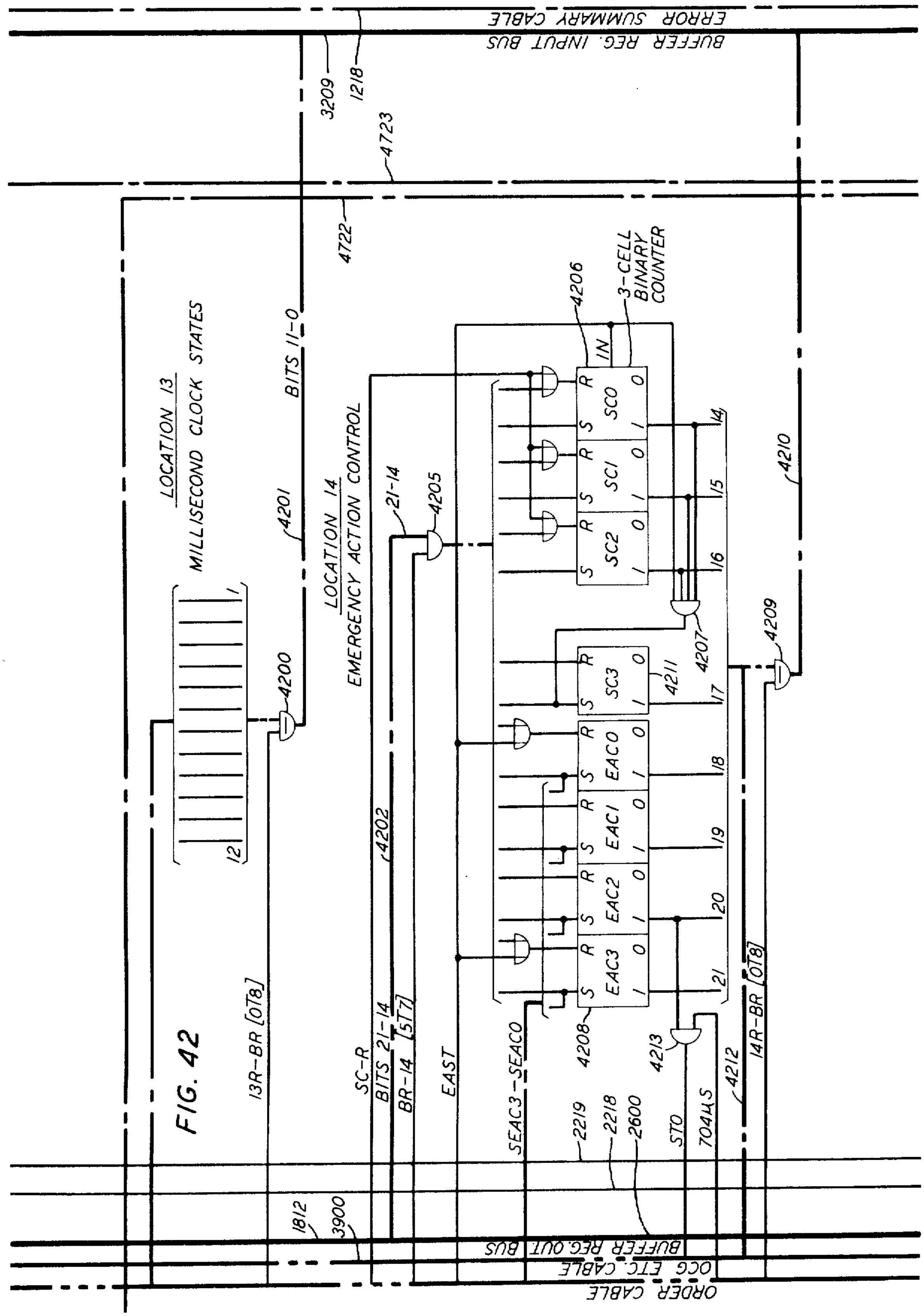

The output conductors of the "1" side of each counter stage of the Millisecond Clock 6101 are connected to the Order Combining Gate Circuit 3901 and these conductors appear in FIG. 42 as inputs to symbolic AND gate 4200. Thus, the states of these 12 counters may be gated to the buffer register input bus system via AND gate 4200 when enabled by a signal on order cable conductor 13R-BR.

As explained later herein, the 704 microsecond output conductor of the Millisecond Clock 6101 is employed to count up to 128 machine cycles.

In order to maximize the data processing capacity of Central Control 101 three cycle overlap operation is employed. In this mode of operation central control simultaneously performs:

A. The operational step for one instruction;
B. Receives from the Program Store 102 the order for the next operational step; and
C. Sends an address to the Program Store 102 for the next succeeding order.

Figure 84:
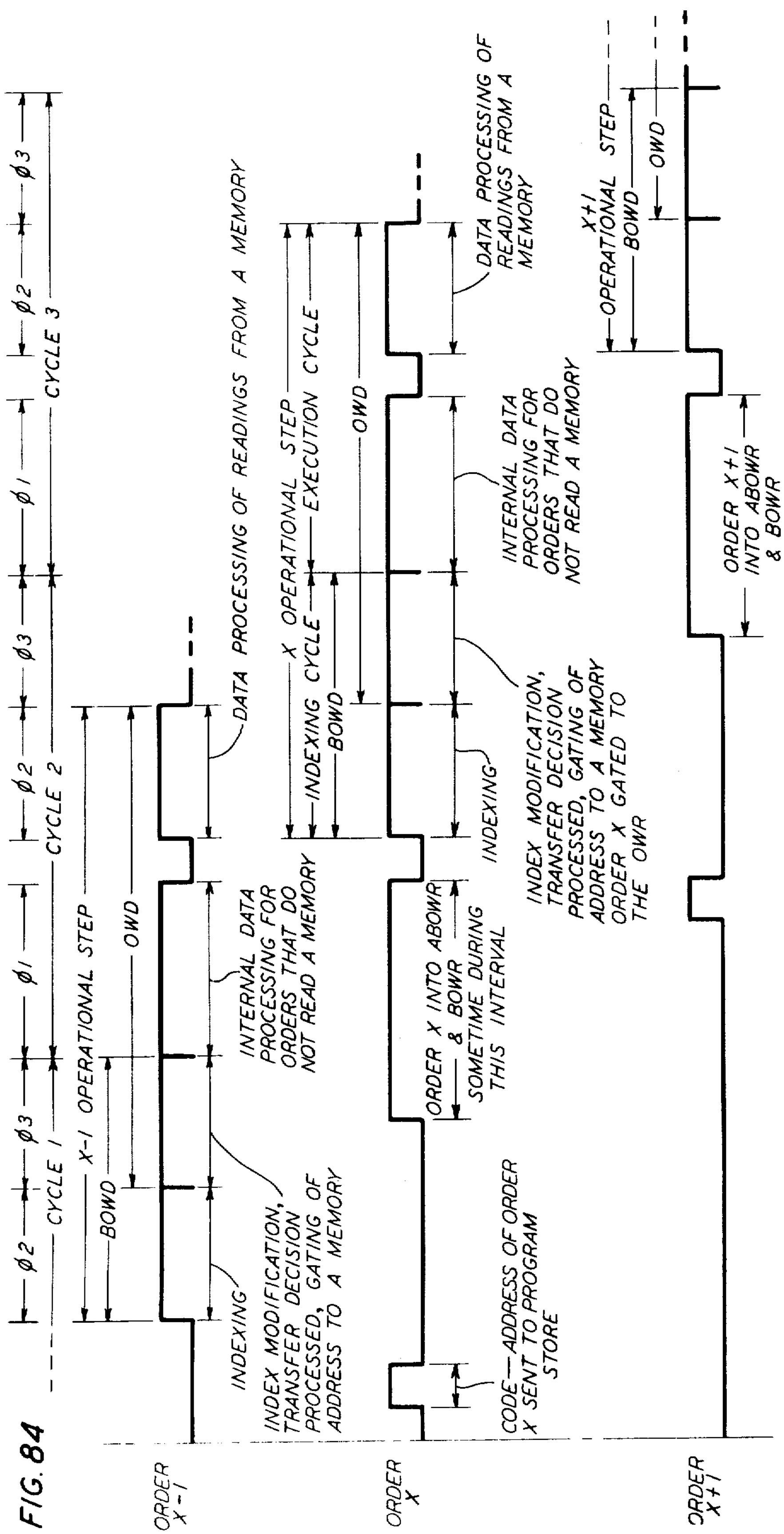
FIG. 84 is a time diagram which illustrates the processing of three successive program order units.

This mode of operation is illustrated in FIG. 84. Three cycle overlap operation is made possible by the provision of both a Buffer Order Word Register 2410, an Order Word Register 3403 and their respective decoders, the Buffer Order Word Decoder 3902 and the Order Word Decoder 3904. A Mixed Decoder 3903 resolves conflicts between the program words in the Order Word Register 3403 and the Buffer Order Word Register 2410. The Auxiliary Buffer Order Word Register 1901 absorbs differences in time of program store response.

The initial gating action signals for the order X (herein designated the indexing cycle) are derived in the Buffer Order Word Decoder 3902 in response to the appearance of order X in the Buffer Order Word Register 2410. The order X is gated to the Order Word Register 3403 (while still being retained in the Buffer Order Word Register 2410 for the indexing cycle) during phase 3 of cycle 2; upon reaching the Order Word Register 3403 the final gating actions (herein indicated as the execution cycle) for the order X are controlled via Order Word Decoder 3904.

The indexing cycle and the execution cycle are each less than a 5.5 microsecond machine cycle in duration. In the executing of the operational steps of a sequence of orders like those shown in FIG. 84 each order remains in the Order Word Register 3403 and the Buffer Order Word Register 2410 each for one 5.5 microsecond cycle. The Buffer Order Word Decoder 3902 and the Order Word Decoder 3404 are D-C combinational circuits; the D-C output signals of the decoders are combined with selected microsecond clock pulses (among those indicated in FIG. 83) in the Order Combining Gate Circuit 3901. This Order Combining Gate Circuit 3901 thus generates the proper sequences of gating signals to carry out the indexing cycle and the execution cycle of each of the sequence of orders in turn as they appear first in the Buffer Order Word Register 2410 and then in the Order Word Register 3403.

The performance of the operational steps for certain orders requires more time than one operational step period, i.e., more than 5.5 microseconds. This requirement for additional time may be specified directly by the order; however, in other instances this requirement for additional time is imposed by indicated trouble conditions which occur during the execution of an order. Where an order specifies that the execution thereof will require more than one operational step period, the additional processing time for that order may be gained by:

1. Performing the additional data processing during and immediately following the indexing cycle of the order and before the execution cycle of the order; or
2. Performing the additional data processing during and immediately after the normal execution cycle of the order.

The performance of these additional work functions is accomplished by way of a plurality of sequence circuits within Central Control 101. These sequence circuits are hardware configurations which are activated by associated program orders or trouble indications and which serve to extend the time in the operational step beyond the normal operational step period illustrated in FIG. 84. The period of time by which the normal operational step period is extended varies depending upon the amount of additional time required and is not necessarily an integral number of machine cycles. However, the sequences which cause delays in the execution of other orders always cause delays which are an integral number of machine cycles.

The sequence circuits share control of data processing within the Central Control 101 with the decoders, i.e., the Buffer Order Word Decoder 3902 (BOWD), the Order Word Decoder 3904 (OWD), and the Mixed Decoder 3903 (MXD). In the case of orders in which the additional work functions are performed before the beginning of the execution cycle, the sequence circuit or, as more commonly referred to, the "sequencer" controls the Central Control 101 to the exclusion of decoders BOWD, OWD, and MXD. However, in the case of orders in which the additional work functions are performed during and immediately after the execution cycle of the order, the sequencer and the decoders jointly and simultaneously share control of the Central Control 101. In this latter case there are a number of limitations placed on the orders which follow an order which requires the enablement of a sequencer. Such limitations assure that the central control elements which are under the control of the sequencer are not simultaneously under control of the program order words.

Each sequence circuit contains a counter circuit, the states of which define the gating actions to be performed by the sequence circuit. The activation of a sequence circuit consists of starting its counter. The output signals of the counter stages are combined with other information signals appearing within Central Control 101 and with selected clock pulses in the Order Combining Gate Circuit 3901 to generate gating signals. These signals carry out the required sequence circuit gating actions and cause the counter circuit to advance through its sequence of internal states.

Sequence circuits which extend the period of an operational step by seizing control of a Central Control 101 to the exclusion of the decoders BOWD, OWD, and MXD are arranged to transmit the address of the next succeeding program order word concurrently with the completion of the sequencer gating actions. Thus, although the execution of the order immediately succeeding an order which enabled the sequencer of the above character is delayed, the degree of overlap shown in FIG. 84 is maintained.

Sequence circuits which do not exclude the decoders BOWD, OWD, and MXD provide additional overlap beyond that shown in FIG. 84. That is, the transmission of the address of and acceptance of the order immediately succeeding an order, which enabled a sequencer, are not delayed. The additional gating actions required by such sequence circuits are carried out not only concurrently with the indexing cycle of the immediately succeeding order, but also concurrently with at least a portion of the execution cycle of the immediately succeeding order.

A few examples will serve to illustrate the utility of the sequence circuits. A program order which is employed to read data from the Program Store 102 requires an additional two 5.5 microsecond machine cycle periods for completion. This type of order gains the additional two cycles by delaying the acceptance of the immediately succeeding order and performs the additional work operations after termination of the indexing cycle of the current order and before the execution cycle of the current order.

When errors occur in the reading of words from the Program Store 102, the Program Store Correct-Reread Sequencer 5301 is enabled to effect a correction or a rereading of the Program Store 102 at the previously addressed location. This sequence circuit is representative of the type of sequence circuit which is enabled by a trouble indication and which seizes control of the Central Control 101 to the exclusion of the decoders.

The Command Order Sequencer 4902 which serves to transmit network commands to the Switching Network 120 and to the miscellaneous network units, i.e., Master Scanner 144, AMA Tape Unit 147, and Card Writer 146, is representative of the sequence circuits which, when enabled, increase the degree of overlap beyond that shown in FIG. 84. That is, the transmission of network commands extends into the execution cycle of the order following the network command order.

In the processing of certain multicycle orders a plurality of sequence circuits may be activated so that the processing of the multicycle order may include both kinds of gating actions; first additional gating cycles may be inserted between the indexing cycle and the execution cycle of the order, and then a second sequence circuit may be activated to carry out gating actions which extend the degree of overlap to an additional cycle or cycles.

The drawing employed herein in many instances shows single lines as the connections between blocks; it is to be understood that single lines are merely symbolic and may indicate numerous connections such as a cable or a bus as previously defined herein.

Figure 11:
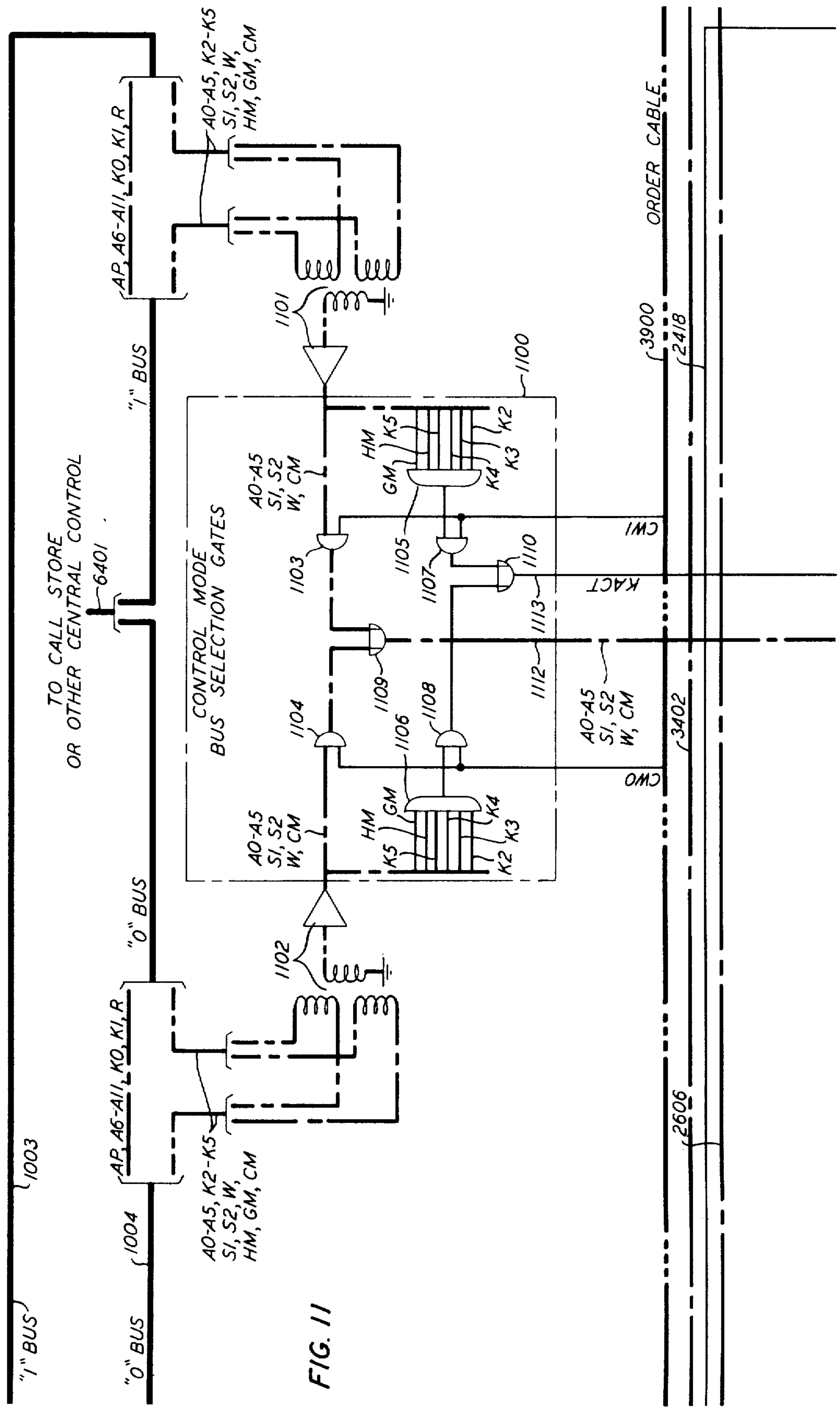

In certain instances, the binary states of a circuit are provided on a pair of output conductors which are alternatively energized. Such an arrangement is called a 2-rail circuit and binary devices which provide individual "0" and "1" state output signals are called 2-rail logic elements herein. In other instances, only one of the two states of a binary device is employed as an output signal, and such arrangements are called single rail circuits. Throughout the drawing gates, symbols of amplifiers, et cetera, are understood to be in many cases a plurality of gates or amplifiers comprising a number of channels equal to the number of individual signals to be transmitted therethrough. For example, in FIG. 11 the AND gate 1104 when enabled, transmits the ten information bits A0-A5, S1, S2, W, and CM from the output of the Cable Receiver 1102 to the input of the symbolic plural OR gate 1109. Accordingly, Cable Receiver 1102 comprises 10 transformers and 10 amplifiers; AND gate 1104 comprises ten AND gates, and OR gate 1109 comprises ten OR gates. Further, in the drawing there are two types of AND gates symbolized, the first being a conventional AND gate such as AND gate 3006 shown in FIG. 30. This symbol represents a plurality of AND gates equal in number to the number of information paths included in a cable. If the cable conveys information on a single rail basis, then there is one AND gate per information bit; however, if the cable conveys information on a 2-rail basis, then the number of AND gates represented by the symbol equals two times the number of information bits.

Figures 30, 30A:
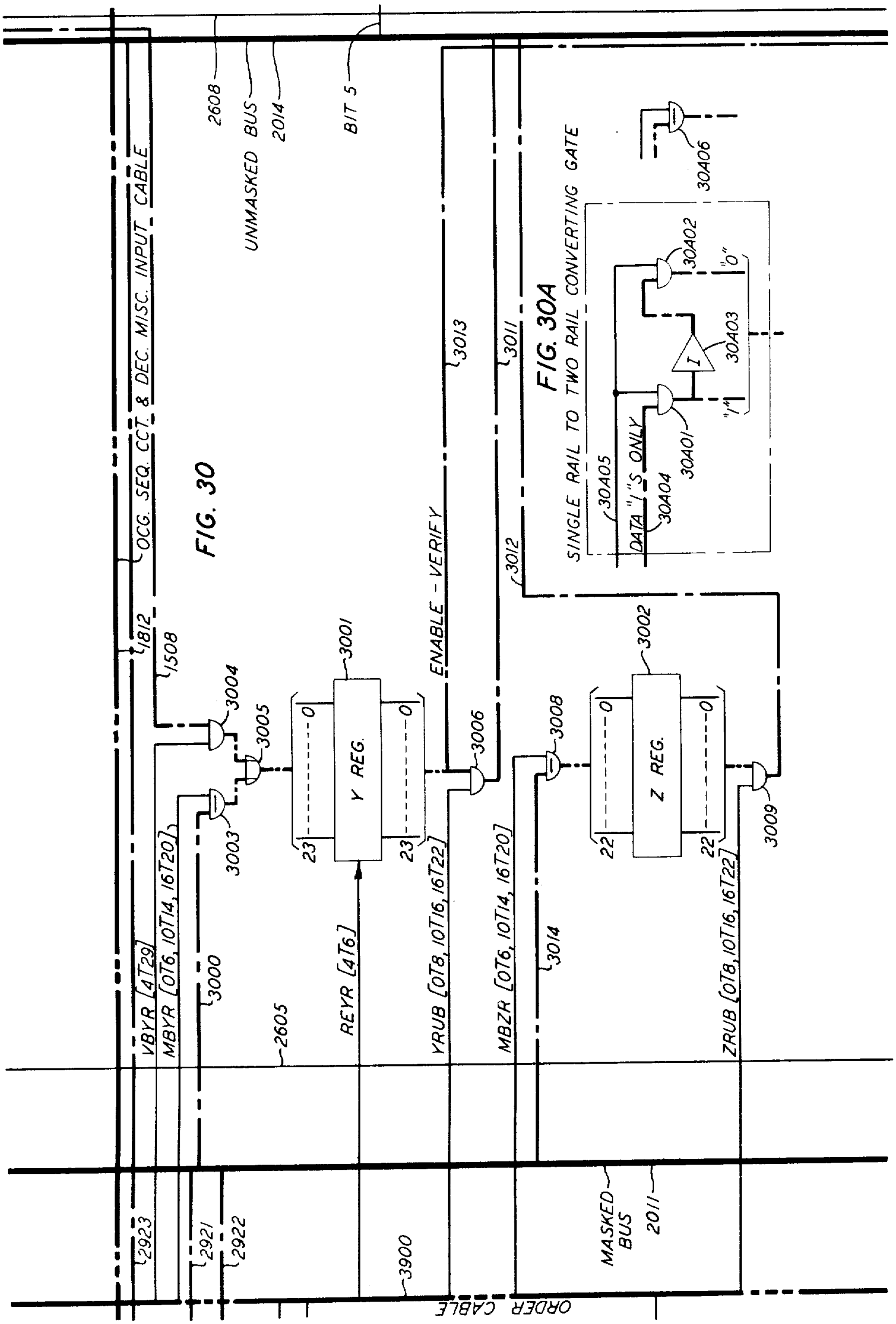

The second type of AND gate which converts information from 1-rail to 2-rail is symbolized in FIG. 30 wherein gate 3008 is shown as a conventional AND gate with a bar included inside the symbol. This type of AND gate is shown in schematic detail in FIG. 30A. The data on cable 30A04 is on a single rail basis, that is, the cable 30A04 comprises one conductor for each of the information bits included in the data and these conductors are energized when a "1" is transmitted and are de-energized or held near ground when a "0" is transmitted. The single rail data on cable 30A04 is inverted on a bit-by-bit basis by the symbolic inverter 30A03, the output conductors of which comprise the input cable to conventional AND gate 30A02. The input signals to the AND gate 30A02 are the complement of the input signals to the AND gate 30A01. The AND gates 30A01 and 30A02 may be enabled by a signal on conductor 30A05 and the output terminals of these gates represent the "1" and "0" rails which are employed to set and reset registers. The symbol for this type of converting AND gate is shown in FIG. 30A and is labeled 30A06.

Program Store (102) [FIGS. 72 through 82]

Figure 64:
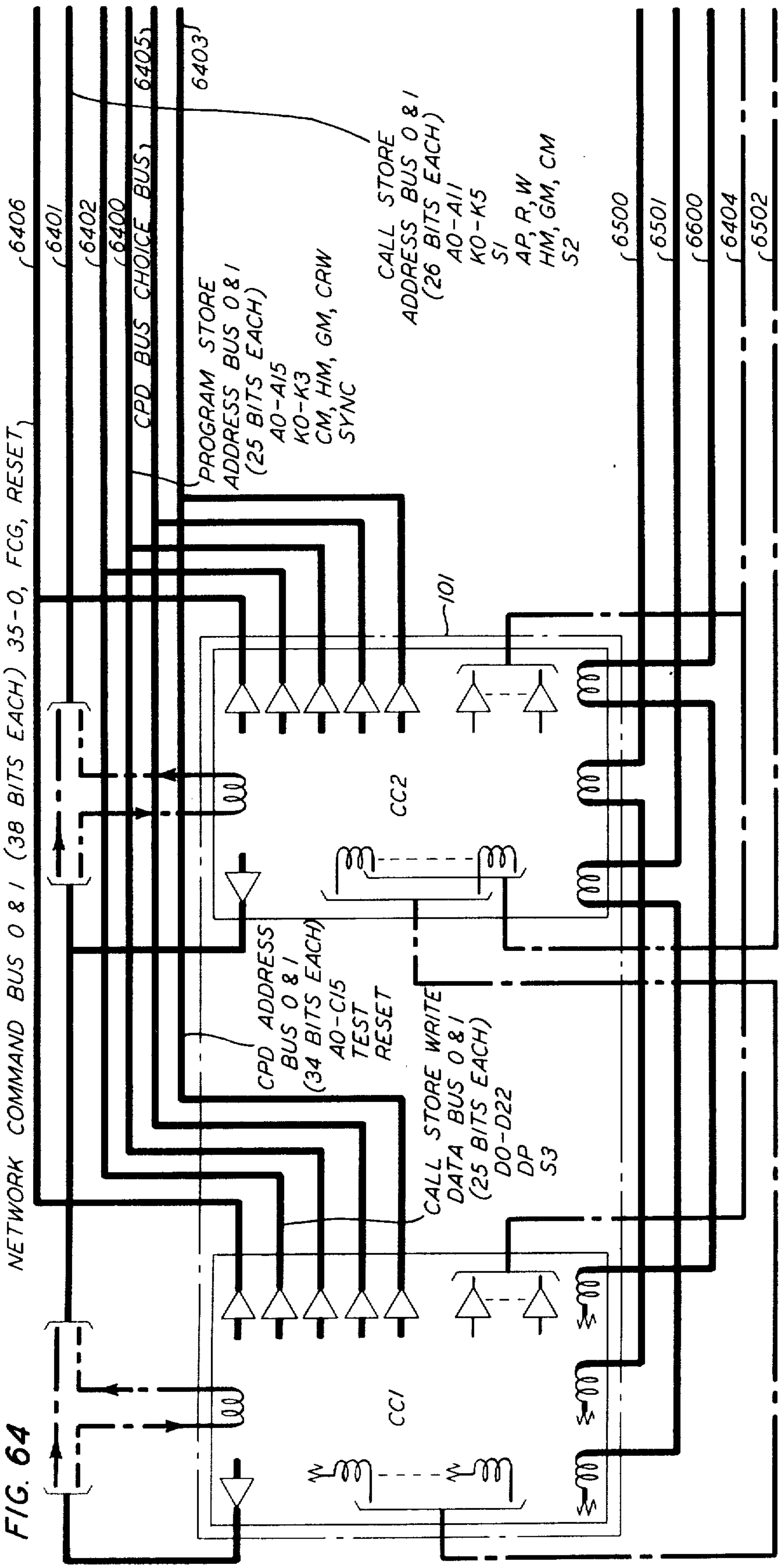
FIGS. 64 through 69 (arranged as shown in FIG. 88) are a schematic representation of the major communication paths employed in our invention.
Figure 65:
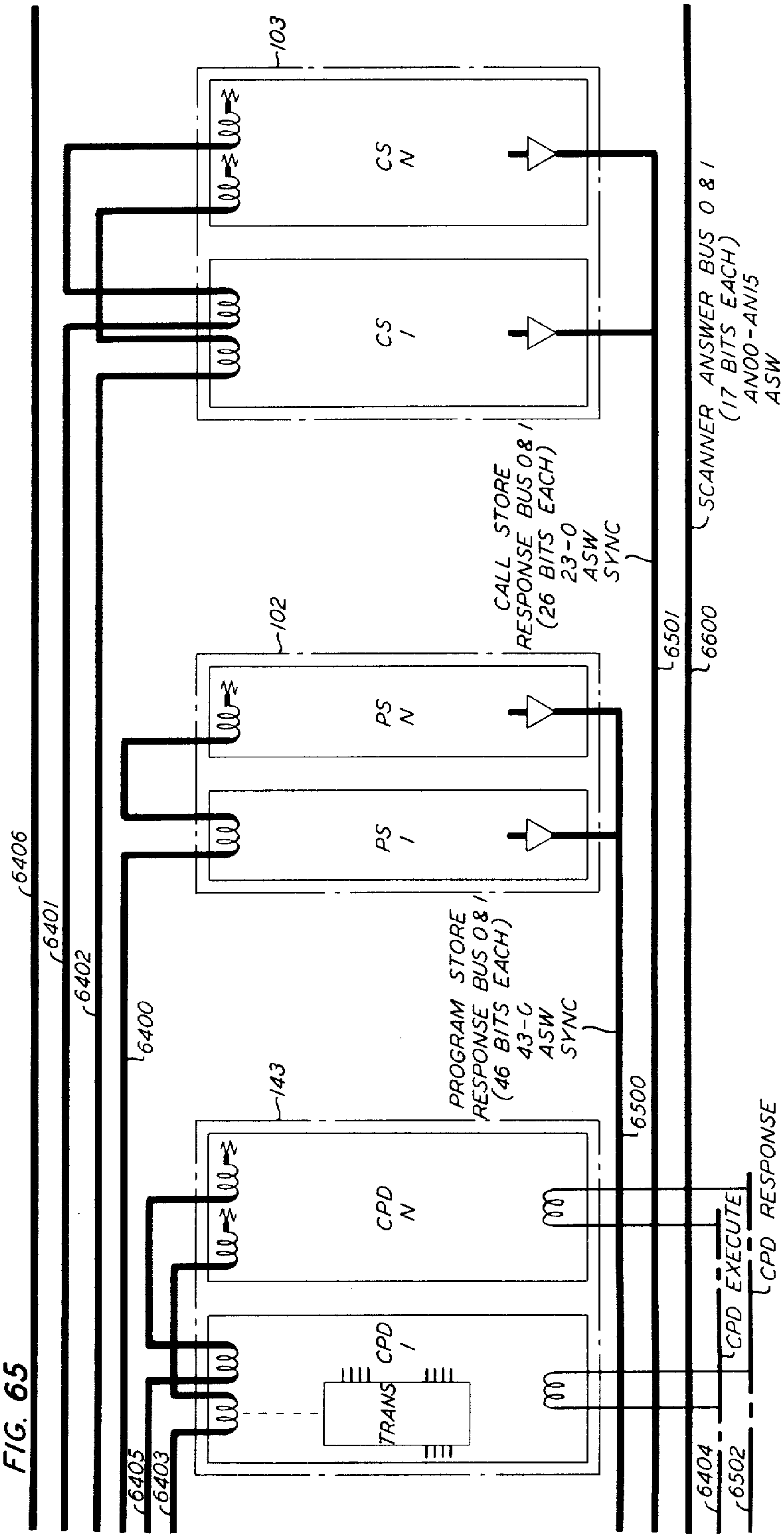
Figure 66:
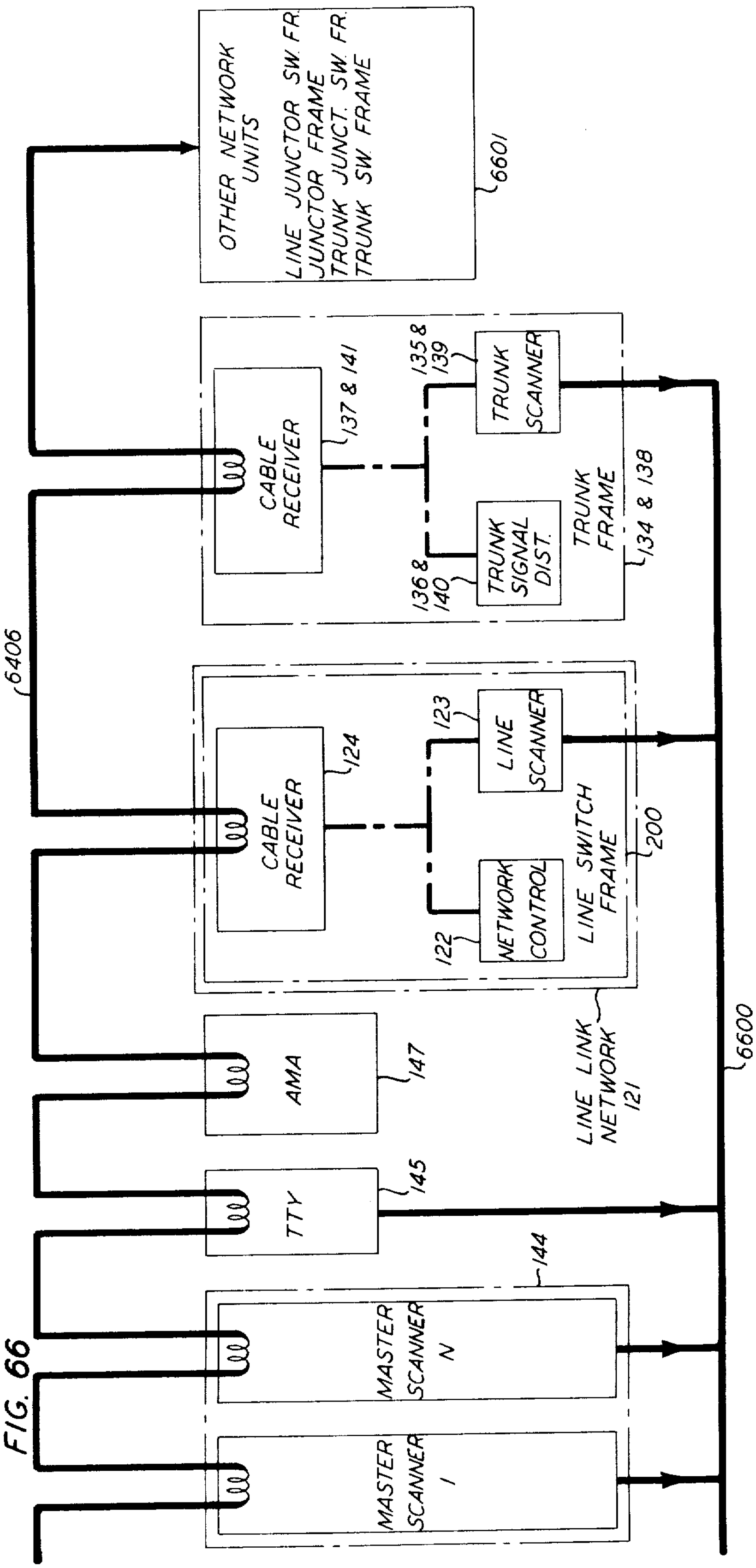

The central processor 100 of FIG. 1 comprises a central control system 101, a program store system 102, a call store system 103 and a plurality of interconnecting communication buses. As shown in FIG. 64 through 66 and in FIGS. 67 and 85, the central control system 101 comprises first and second central control CC1 and CC2; the program store system 102 comprises a plurality of independent program stores PS1 through PSN; and the call store system 103 comprises a plurality of call stores CS1 through CSN. An independent program store of the program store system 102 is shown in FIGS. 72 through 82 and such a program store is fully described in the U.S. Pat. No. 3,570,008 at column 21, line 18 through column 36, line 71. This detailed description in the parent patent is incorporated herein by reference. Information is written into the Program Store by means of the Program Store Card Writer 146 (FIG. 1) under commands from the Central Control 101.

Figure 7:
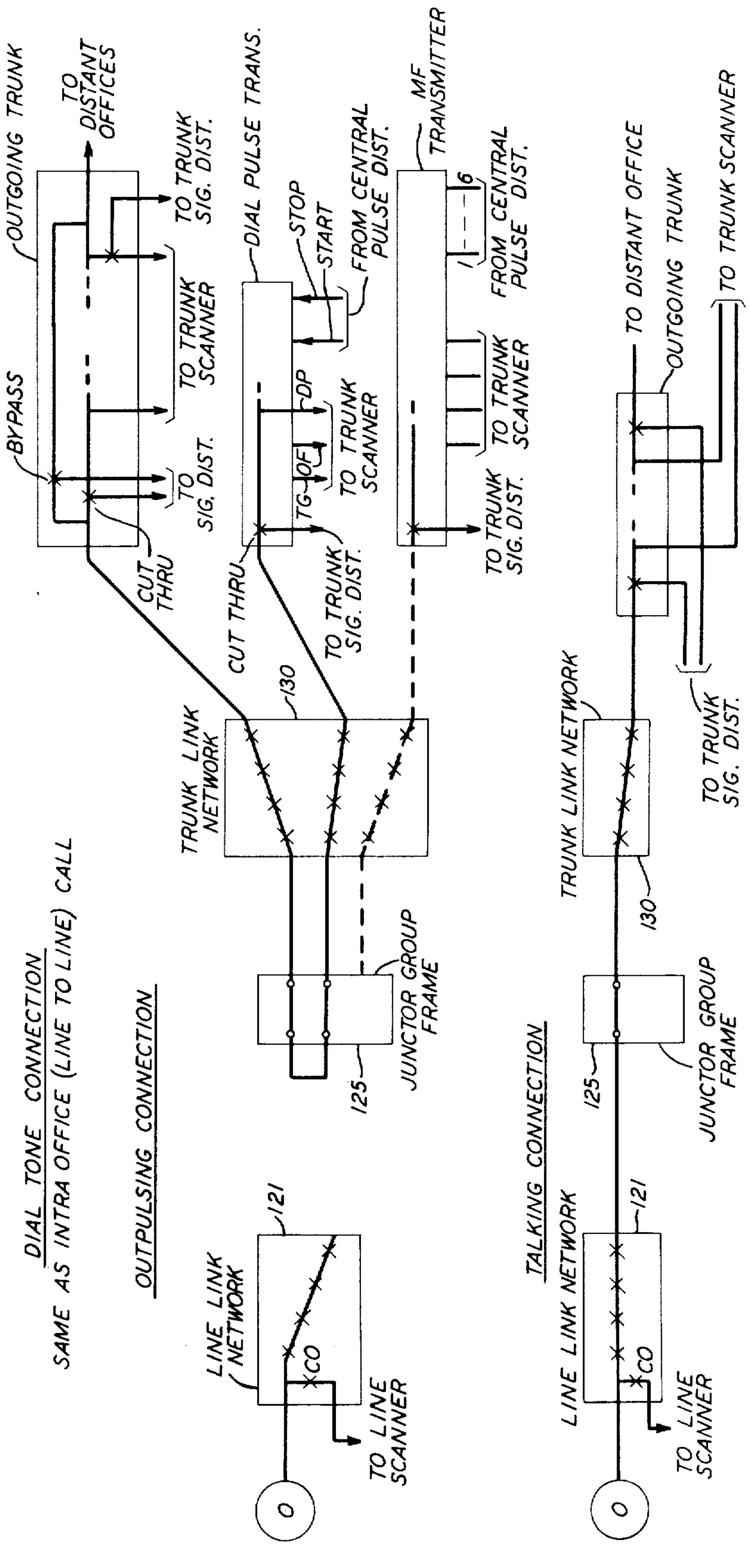

Commands for controlling the Program Store are transmitted from the Central Control to the Program Store via the Bus System 6400, which comprises a "0" bus and an identical "1" bus. As seen in FIG. 7, information can be selectively gated from the "0" bus or the "1" bus to the Control 701 via the Input Path Selection Gates 702 and 703, respectively. The Gates 702 and 703 are selectively enabled in accordance with the contents of the Route Register 501. The Control 701 responds to commands from the Central Control to: (a) enable the Timing Circit 7800, 7801 to initiate a memory timing cycle, (b) generate control signals for the Access Circuit 7401, 7402, and (c) generate signals for the Operational Check Circuit 7728. Output signals of the Timing Circuit 7800, 7801 serve to advance the Control 701 through a fixed sequence and to provide gating signals for the Access Circuits 7401, 7402 and for the Readout Circuit 7703 through 7706. The Memory 704 of the Program Store of FIG. 7 comprises a plurality of memory (Twistor) modules not to exceed 16 in number. Each memory module comprises 8,192 44 bit words. The memory words are associated in pairs at 4096 discrete word pair addresses. The readout circuits 7703 through 7706 have provisions for selecting a chosen 44 bit word of the pair of words which are obtained by addressing one of these discrete word pair addresses. The Operational Check Circuit 7728 monitors the internal operation of the Program Store of FIG. 7 and generates a check signal (termed an all seems well ASW signal), which is returned to the Central Control along with the information which is read from the memory module. Output signals of the Timing Circuit 7800, 7801, along with signals generated within the Control 701, provide gating signals for selectively transmitting information read from the Memory 704 to one of the two identical buses of the Program Store Response Bus System 6500. That is, the Output Path Selection Gates 705 and 706 are selectively enabled to gate the information read from the Memory 704 to the "0" bus and to the "1" bus, respectively.

As seen in FIG. 7, the Route Register 501 is selectively controlled by signals received over the Cables 6700, 6701. The Cables 6700 and 6701 are output cables of the Central Pulse Distributor 143. The Central Pulse Distributor 143 selectively generates output signals on conductors of these cables in accordance with commands received from the Central Control 101.

The Central Control 101 manipulates the information in the Route Register 501 to achieve a desired association of an independent Program Store memory unit and the buses of the Command Bus System 6400 and of the Response Bus System 6500.

In summary, an independent Program Store memory unit, such as is shown in FIG. 7, accepts command signals from the Central Control over a selected one of the buses "0" or "1" of the Program Store Command Bus System 6400 and transmits responses to the Central Control via a selected one of the buses "0" or "1" of the Response Bus System 6500. The Program Store of FIG. 7, through the Operational Check Circuit 7728, monitors the internal operation of that program store memory unit and generates check signals for transmission to the Central Control along with information read from the Memory 704. The internal operation of a program store unit is in accordance with timing signals generated by the Timing Circuit 7800, 7801 and information is transmitted to the Central Control at times determined by such internally generated timing signals. The timing circuit is arranged to initiate a timing sequence when a command is received from the Central Control.

Figure 5:
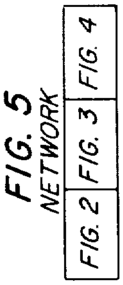
FIG. 5 is a key sheet showing the arrangement of FIGS. 2 through 4.
Figure 6:
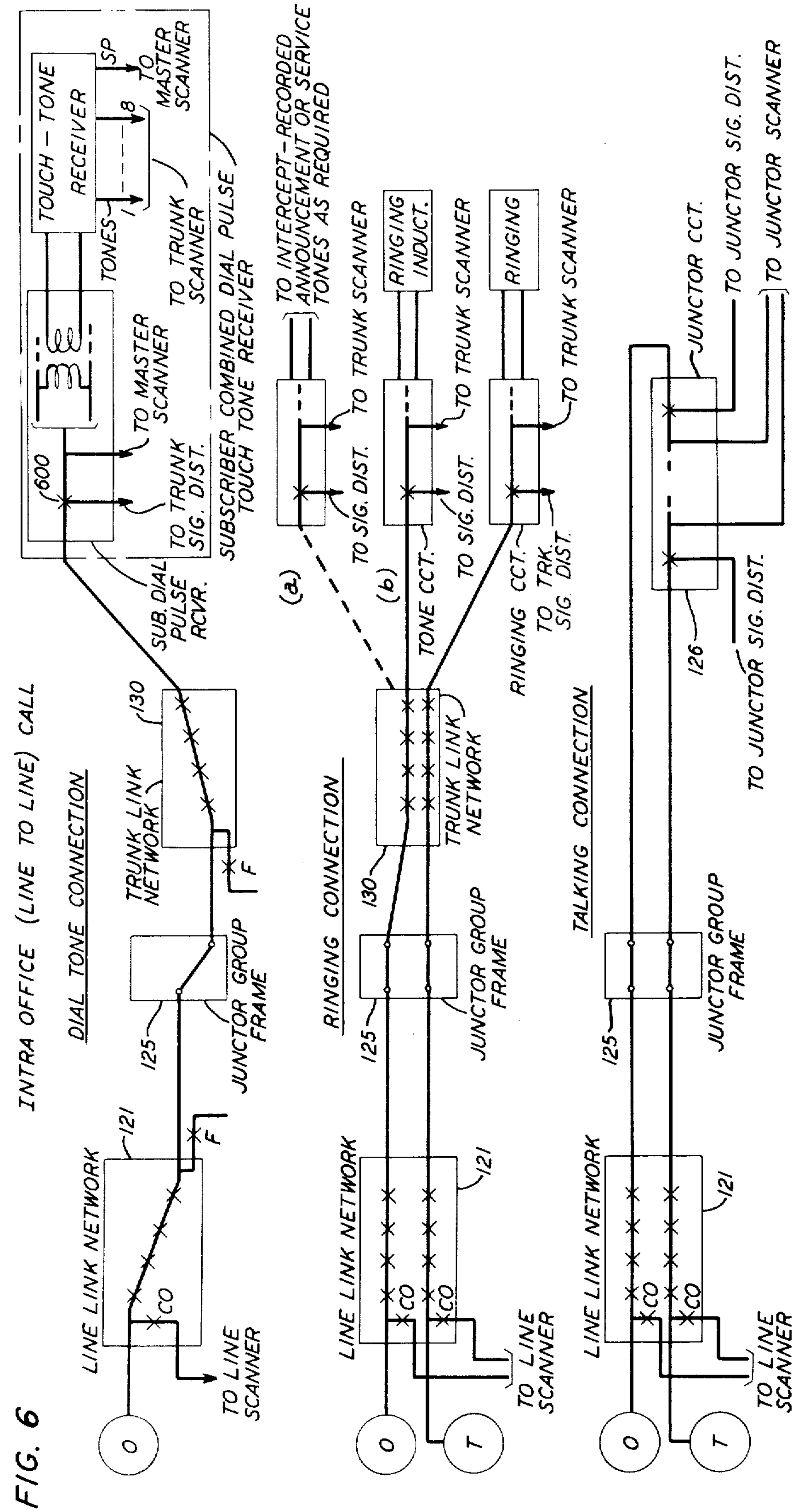
FIGS. 6 through 8 are schematic representations of various connections which are made through the switching network of FIGS. 2 through 4.

As seen in FIG. 5, the Memory System 371 comprises a plurality of independent Program Stores PS1 through PSN and a plurality of independent Call Stores CS1 through CSN. The organization of the long term data and program information into one type of memory unit and the rapidly changing data into other types of memory units is not essential to the present invention, but rather is a characteristic of the illustrative data processing system which is described herein. That is, the Memory System 371 could comprise a plurality of independent read and write memories in which all of the system information was stored.

The number of Program Stores PS1 through PSN is determined principally by the size of the switching system, i.e., the number of lines and trunks served by the system and the variety of services rendered the lines and trunks. However, at least two program stores are always used to achieve system dependability through the teachings of this invention.

Figure 85:
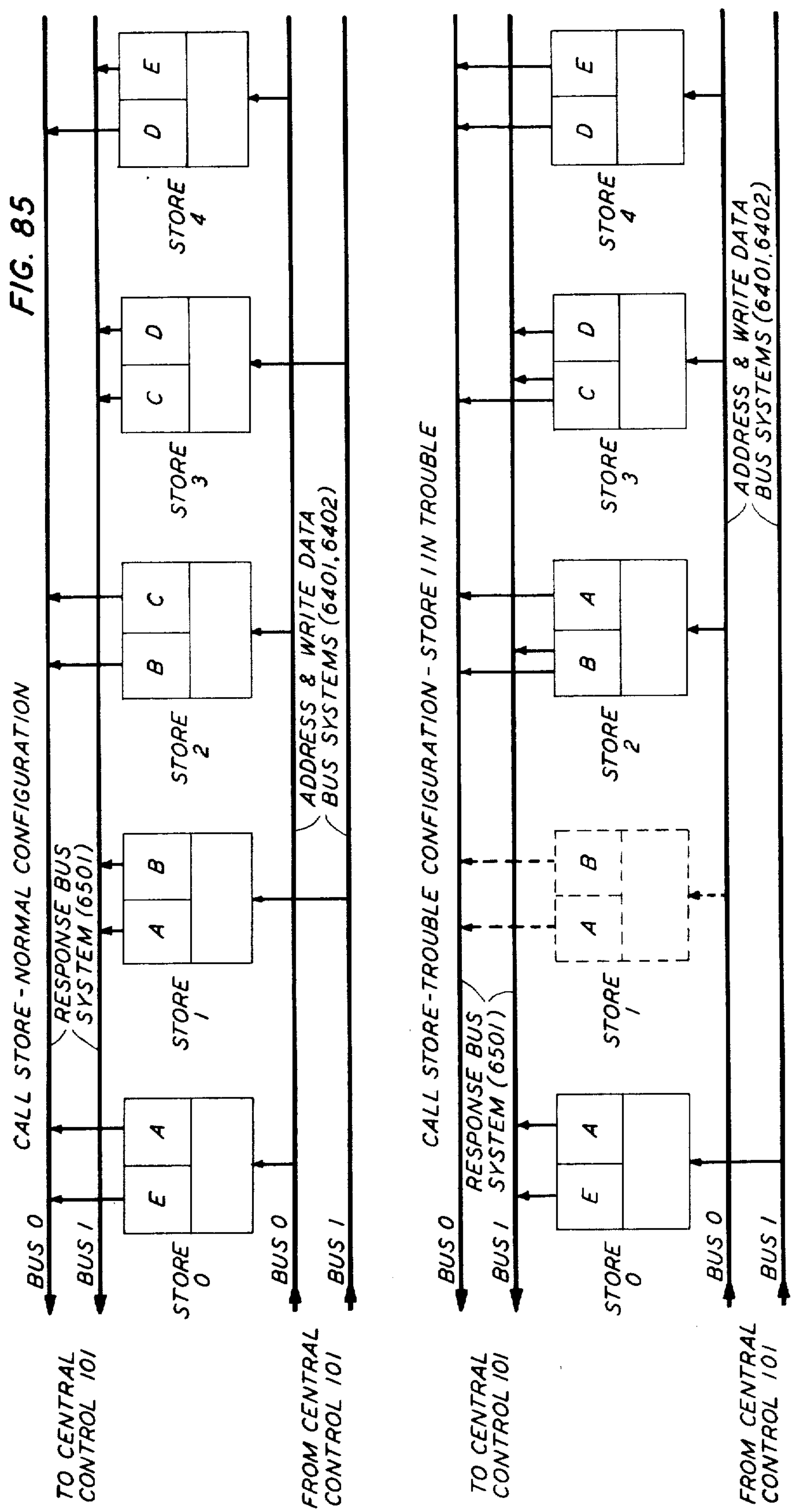
FIG. 85 illustrates the arrangement of information within the memories of our system.

The information capacity of a program store is divided into a left half and a right half [see FIG. 85]. Where the number of program stores employed exceeds two, the information in the right half of the first store is duplicated in the left half of the second store; the information in the right half of the second store is duplicated in the left half of the succeeding store; and the information in the right half of the last store is duplicated in the left half of the first store. This arrangement permits full duplication of information with either an even or an odd number of stores.

Figure 67:
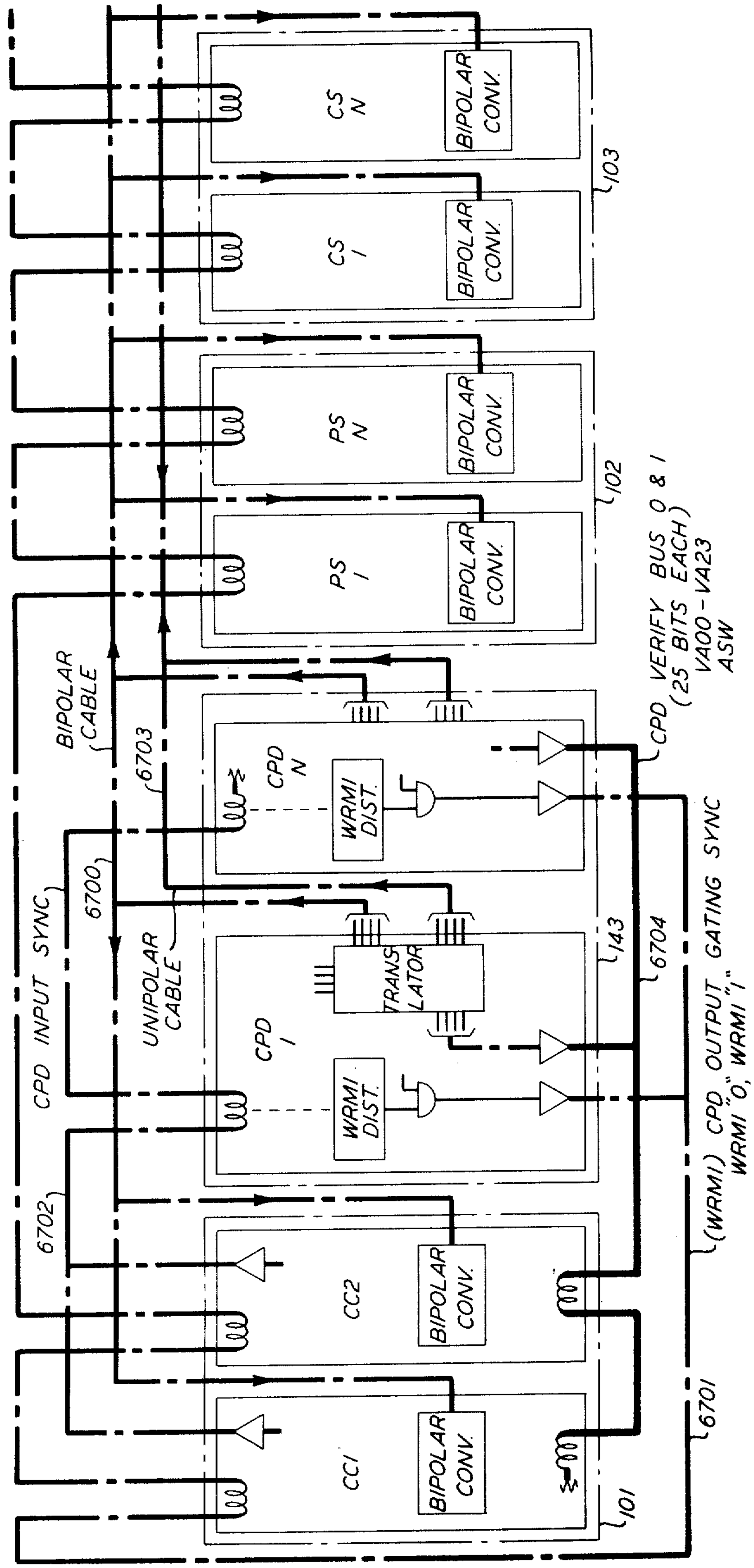
Figure 68:
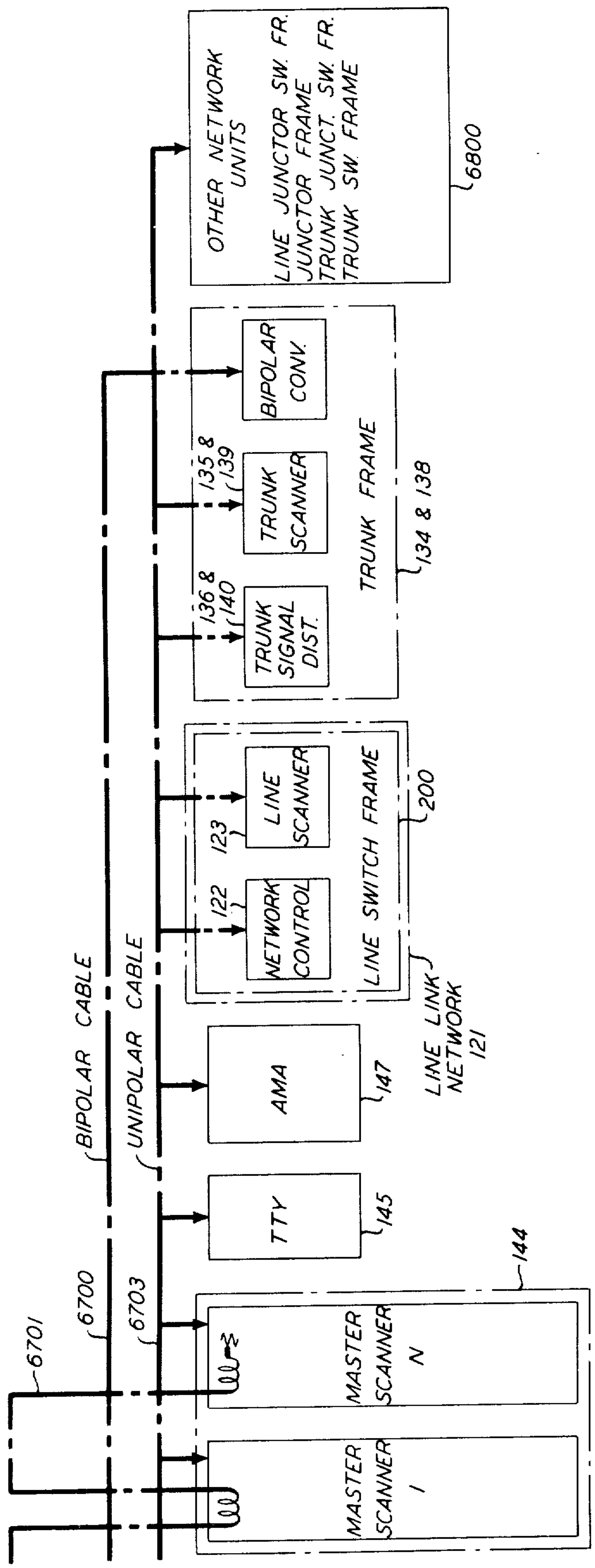
Figure 69:
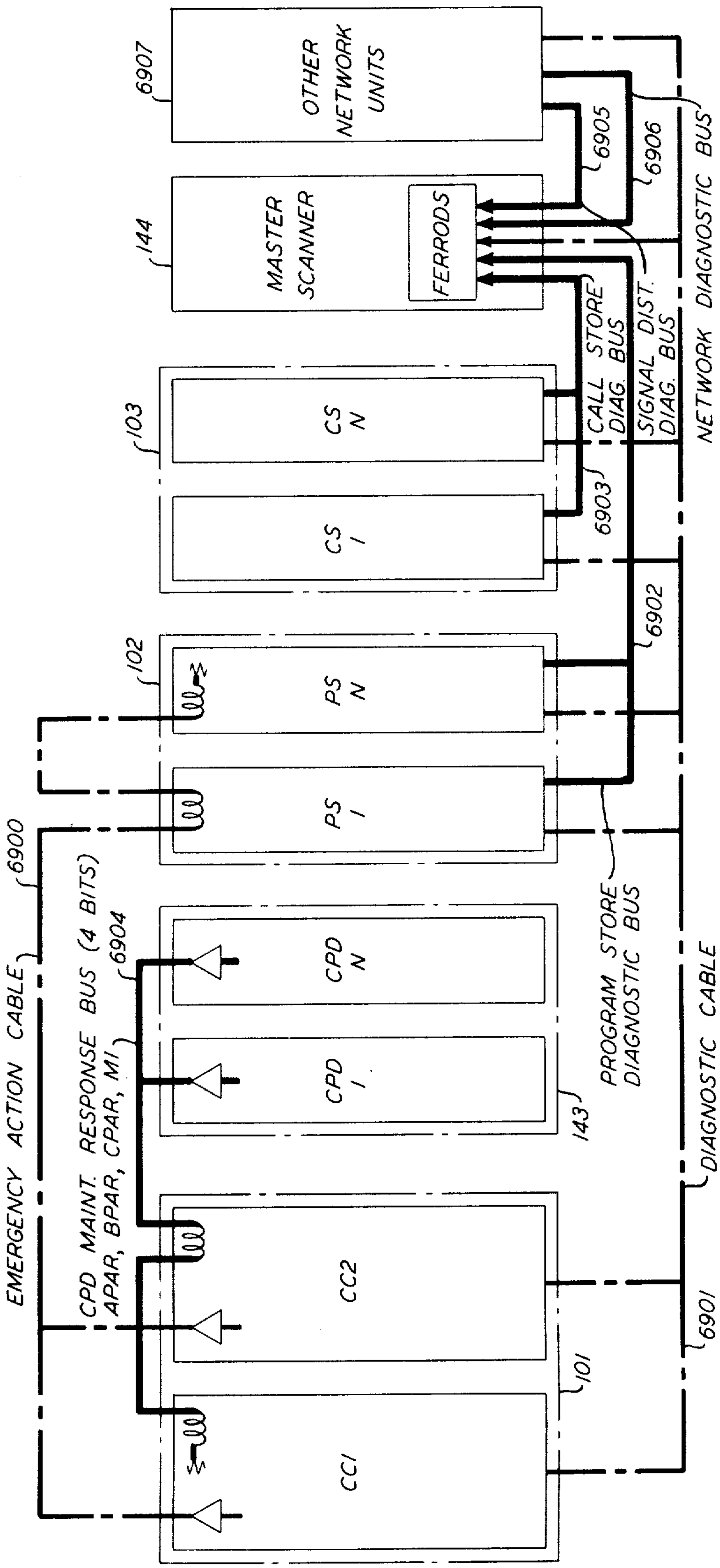
Figure 70:
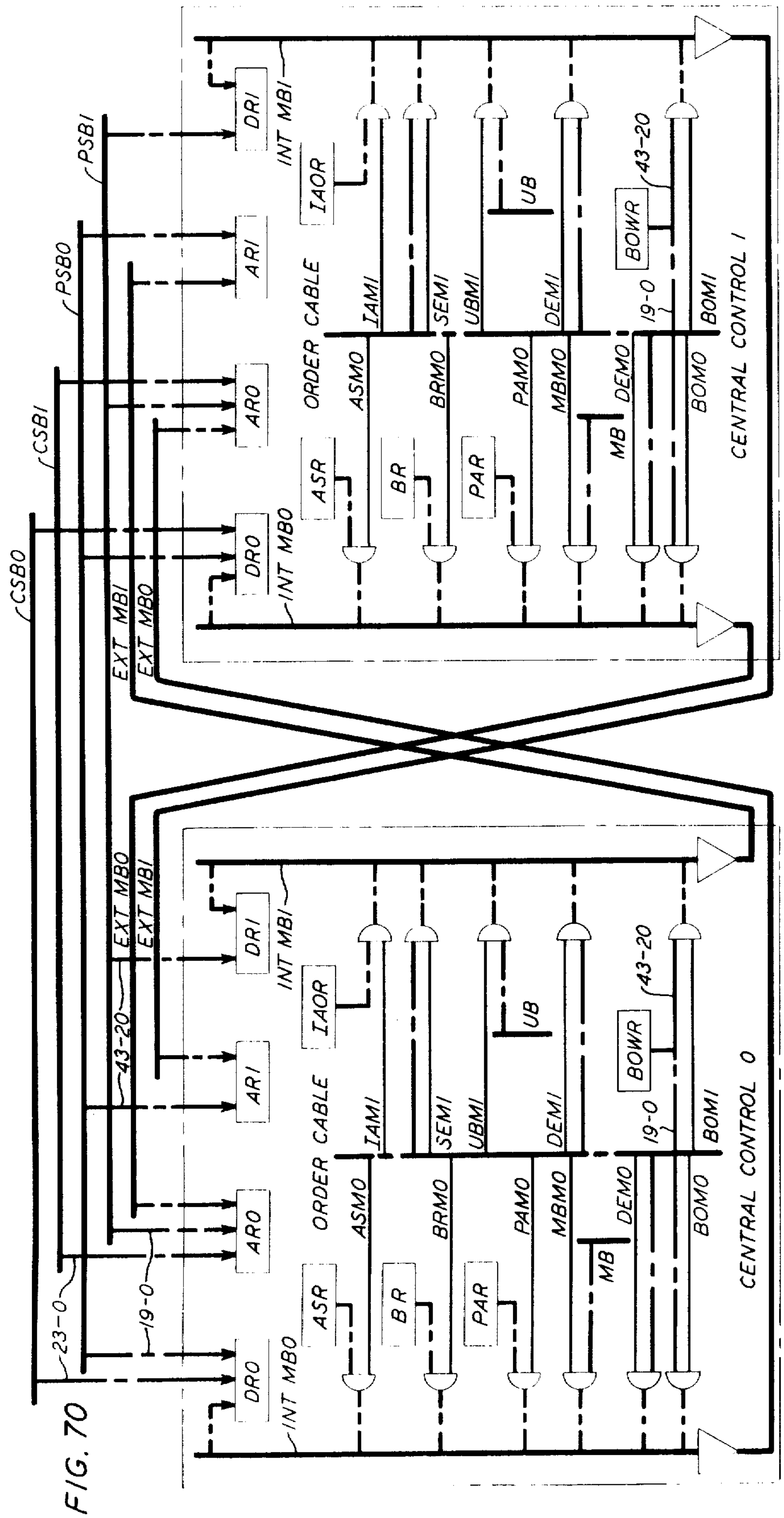
FIG. 70 is a schematic representation of the interconnection of central controls for purposes of matching test points within the central controls.
Figure 71:
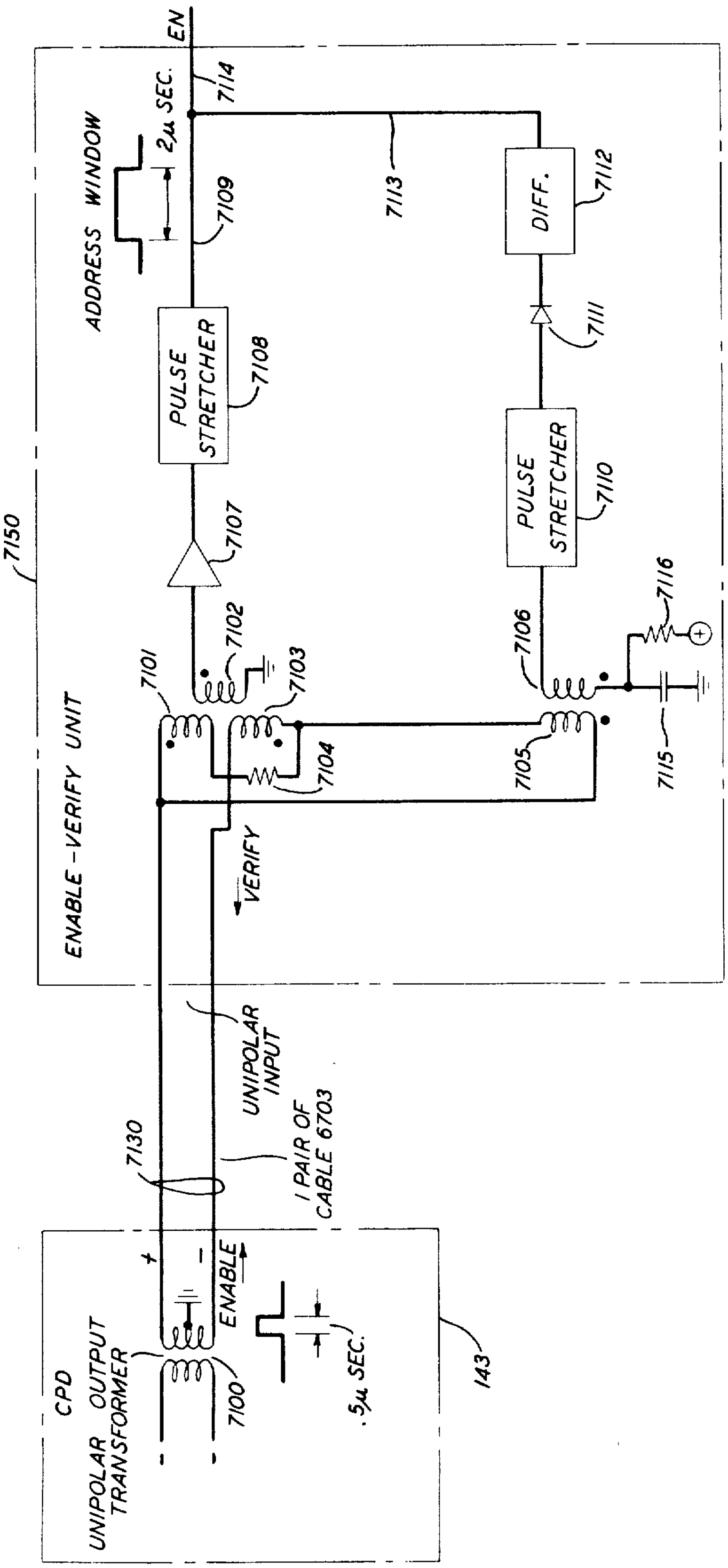
FIG. 71 is a schematic representation of the enable-verify circuitry employed in our system.

FIGS. 64 through 69 show the major paths of communication between the major divisions of this system. FIGS. 64, 65 and 66 are devoted to a showing of the various address and control buses and the response buses of the various units; FIGS. 67 and 68 are directed to the distribution of Central Pulse Distributor 143 output signals and the timing of such signals under the control of Central Control 101 by way of CPD input sync signals; and FIG. 69 is devoted to a showing of the principal maintenance and diagnostic communication paths.

As seen in FIGS. 64 and 65, the Central Control System 101 comprising CC1 and CC2 is connected to the Program Store System 102 comprising PSI through PSN via the Program Store Address Bus System 6400. The Address Bus System 6400 comprises two buses designated "0" and "1" and each bus comprises twenty-five conductor pairs. Both CC1 and CC2 may selectively transmit to the Program Store System 102 via either bus "0" or bus "1" of the Program Store Address Bus System 6400. The Program Store Address Bus System 6400 is coupled by way of serially connected transformers to receiving circuitry in each of the program stores PS1 through PSN of the Program Store System 102.

As seen in FIGS. 64 and 65 the Program Store Response Bus System 6500 comprises two buses termed "0" and "1" and each bus comprises 46 conductor pairs. The buses are driven in parallel by cable drivers in each of the plurality of program stores and these buses are coupled by way of serially connected transformers to receiving circuitry in both of the central controls CC1 and CC2. The significance of the information transmitted from the central controls to the Program Stores System 102 via the Program Store Address Bus System 6400 and the significance of the information transmitted from the Program Store System 102 to the central controls by way of the Program Store Response Bus System 6500 is set forth later herein.

A program store may be operated in the following modes:

1. Normal Mode - In this mode of operation Central Control 101 defines an address location in a particular block of store information and requests that the information found at this address be transmitted to Central Control 101. A block of store information is defined as a duplicated segment of information. In a small office, i.e., one wherein only two stores comprise the Program Store System 102, there will be but two blocks of store information, namely, the first block which is found in the right half of the first store and the left half of the second store, and the second block of information which is found in the right half of the first store and the left half of the second store. As the size of the system is increased and the number of stores comprising the Program Store System 102 is increased, additional blocks of information are added. Each block of duplicated information is assigned a code name in a four bit code and each name comprises two "1's" and two "O's". Accordingly, two program stores which have duplicate information stored therein will respond to a single code name.

2. H Maintenance Mode - In this mode of operation Central Control 101 defines an address in a particular block of store information and only the store wherein this information is stored in the H, i.e., left side, will respond.

3. G Maintenance Mode - In this mode of operation Central Control 101 defines an address in a particular block of store information and only the store wherein this information is stored in the G, i.e., right side, will respond.

4. Read Control Mode - This is a maintenance mode of operation and in this mode status information in binary form relating to a number of test points, approximately 176 in number, is transmitted from a program store to Central Control 101 via the Program Store Response Bus System 6500. The 176 test points are divided into four basic groups called rows, each row comprising 44 test points.

5. Write Control Mode - This mode permits Central Control 101, for purposes of trouble diagnosis, to selectively write binary information into various elements of the Program Store System 102 such as the address registers, the routing registers, et cetera. A combination of write control mode orders and read control mode orders permits Central Control 101 to pinpoint trouble in the control circuitry of a program store by performing sequences of logical acts on the store control elements. It is not possible to write into all test points which may be read under the read control mode as there are a large number of test points which merely reflect the state of a circuit within the store and this state cannot be externally altered by a write control mode order.

The Program Stores 102 are passive in the absence of commands from Central Control 101, that is, the Program Stores 102 are dependent upon commands from the Central Control 101.

In the most common mode of central processor operation the stores which contain duplicate information are addressed over separate input buses, that is, the first store which has a block of information in its left half is addressed over, for example, the "0" bus, while the other store which has the duplicate block of information stored in its right half is addressed over the "1" bus. Similarly, the first store transmits its responses over the "0" response bus, while the other store transmits its responses over the "1" response bus. This is but one of a number of possible bus and store configurations and the exact storebus configuration is determined by the Central Processor 100.

There are seven bistable flip-flops in each store which are provided to control the inputs from the buses and the outputs to the buses. Certain of these flip-flops are set or reset by output signals from the Central Pulse Distributor 143, while others are set or reset by operating the store in the write control mode. A table of these flip-flops, the source of information for setting or resetting the flip-flop and the significance of the flip-flop being set or reset is set forth below.

ROUTING FLIP-FLOP SETTING SOURCE AND SIGNIFICANCE

| Flip-Flop | Set and Reset By | Significance |
|---|---|---|
| R0 | CPD | Set — Receive from bus "0". Send maintenance and control readout on bus "0". Reset — Receive from bus "1". Send maintenance and control readout on bus "1". |
| HS0 | Write Control | Set — Send normal readouts from H on bus "0". |
| HS1 Write Control | Set — Send normal readouts | from H on bus "1". |
| GS0 | Write Control | Set — Send normal readout from G on bus "0". |
| GSI | Write Control | Set — Send normal readout from G on bus "1". |
| TBL0 | CPD | Set — Inhibit operation with bus "0" (both receive and send). |
| TBL1 | CPD | Set — Inhibit operation with bus "1" (both receive and send). |

These flip-flops are manipulated by the Central Control 101 to obtain desired store-bus configurations not only during times when all stores and all bus systems are operating properly, but also during times when trouble is encountered and either the facilities of a bus or a particular store are not available.

The set and reset signals for the central pulse distributor controlled flip-flops R0, TBL0, and TBL1 are received over the Bipolar Cable 6700. There are bipolar signals other than those set forth above which are applied to the Program Store 102 and the functions of these will be described later herein.

The bipolar signals are brought into the Program Store 102 via individual cable pairs of the Bipolar Cable 6700 and they each terminate in a transformer such as 7501. The transformer 7501 is connected to provide an input signal to a first amplifier such as 7502 for a bipolar signal of a first polarity, i.e., a set signal, and to provide an input signal to another amplifier such as 7503 in response to a bipolar input signal of the opposite polarity for a reset signal. A security signal termed herein a WRMI gating pulse accompanies each bipolar signal. WRMI signals are transmitted from the Central Pulse Distributor 143 to the various locations throughout the system via the WRMI Bus System 6701 which comprises a first cable pair which is labeled bus "0" and a second cable pair which is labeled bus "1".

In the event that the Central Control 101 encounters trouble in obtaining information from the Program Store 102 and the effects of this trouble are not readily overcome by a fault finding routine and rearrangement of equipment in accordance with information thus derived, Central Control 101 will undertake certain "emergency actions." These emergency actions comprise standard rearrangements of program stores and bus configurations until such time as Central Control 101 is able to resume operation without error. Emergency action signals are transmitted from the Central Control 101 to the Program Store 102 via the Emergency Action Cable 6900. The emergency action cable comprises four cable pairs which are labeled EAP1E-EAP3E and a synchronizing and security signal is transmitted on the fourth pair which is labeled EAPEE. The emergency action cable pairs each terminate in a transformer such as 7513 and the presence of a signal on an emergency action cable pair will provide an input signal to its associated receiving amplifier 7515 and thus provide an input signal to an associated AND gate such as 7517. Information is gated through the AND gate such as 7517 under the control of an EAPEE signal which is received via transformer 7514 and amplifier 7516. This information when decoded serves to set and reset the 79R0, the 79TBL0, and the 79TBL1 flip-flops. An emergency action command always comprises a synchronzing signal on the EAPEE lead, a signal on the EAP3E lead and a signal on either EAP1E or EAP2E. The Emergency Action Decoder 7519 is merely a cross-connection pattern which is discrete to a store in accordance with its position in the pattern of stores within a store system.

In the case of the first emergency action Central Control 101 transmits signals on the following leads: EAP1E, EAP3E and EAPEE. The first emergency action signals when decoded in the respective emergency action decoders such as 7519 provide a State A signal in the first store, a State B signal in the second store and State C signals in all other stores. The effect of the State A signal is to cause the first store to receive signals from the "0" address and control bus of the Program Store Address and Control Bus System 6400 and to transmit all responses on the "0" response bus of the Program Store Response Bus System 6500. The effect of the State B signal at the output of the decoder 7519 in the second store is to cause this store to receive address and control information on the "1" bus of the Bus System 6400 and to transmit responses on the "1" response bus of the Bus System 6500.

The effect of the State C signal at the output of the Emergency Action Decoder 7519 in the stores other than the first and second store is to place the stores in the trouble state and thereby inhibit their operation.

In the second emergency action the Central Control 101 transmits signals on the following leads: EAP2E, EAP3E, and EAPEE. These signals when decoded provide a State B signal in the first store of the store system, a State A signal in the second store of the store system and State C signals in the remaining stores of the store system. In accordance with this command the first store receives addresses and commands over the "1" bus and responds over the "1" response bus; the second store receives over the "0" bus and responds over the "0" response bus; and the remaining stores of the system are placed in the trouble condition and therefore are inhibited from responding. The output signals of the Emergency Action Decoder 7802 are transmitted via cable 7803 and the respective state conductors to the set and reset terminals of the 79R0, 79TBL0, and 79TBL1 flip-flops via input OR gates 7901, 7902, 7916, 7917, 7918, and 7919. For example, a signal on the State A conductor serves to set the 79R0 flip-flop, set the 79GS0 flip-flop, reset the 79GS1 flip-flop, set the 79HS0 flip-flop, reset the 79HS1 flip-flop, reset the 79TBL0 flip-flop and set the 79TBL1 flip-flop. The following table sets forth the states of the control flip-flops as a result of the receipt of a State A, State B, or a State C signal.

| State Signal | R0 | GS0 | GS1 | HS0 | HS1 | TBL0 | TBL1 |
|---|---|---|---|---|---|---|---|
| A | Set | Set | Reset | Set | Reset | Reset | Set |
| B | Reset | Reset | Set | Reset | Set | Set | Reset |
| C | | | Don't Care | | | Set | Set |

In the above table it is noted that when a store is placed in State C, i.e., when the flip-flops 79TBL0 and 79TBL1 are set, the state of the remaining flip-flops is unimportant; therefore, these are indicated to be in a "don't care" state in the table above.

In the in-step mode of operation of Central Control 101, which is the normal mode in the absence of trouble, the Central Control System 101 will transmit identical address and control information over the two Program Store Address Buses of the Bus System 6400. This identical information on the two buses of 6400 may come from the active central control, or one address and control bus of the Bus System 6400 may be addressed by the active central control while the other address and control bus of the Bus System 6400 may be addressed by the standby central control.

Figure 72:
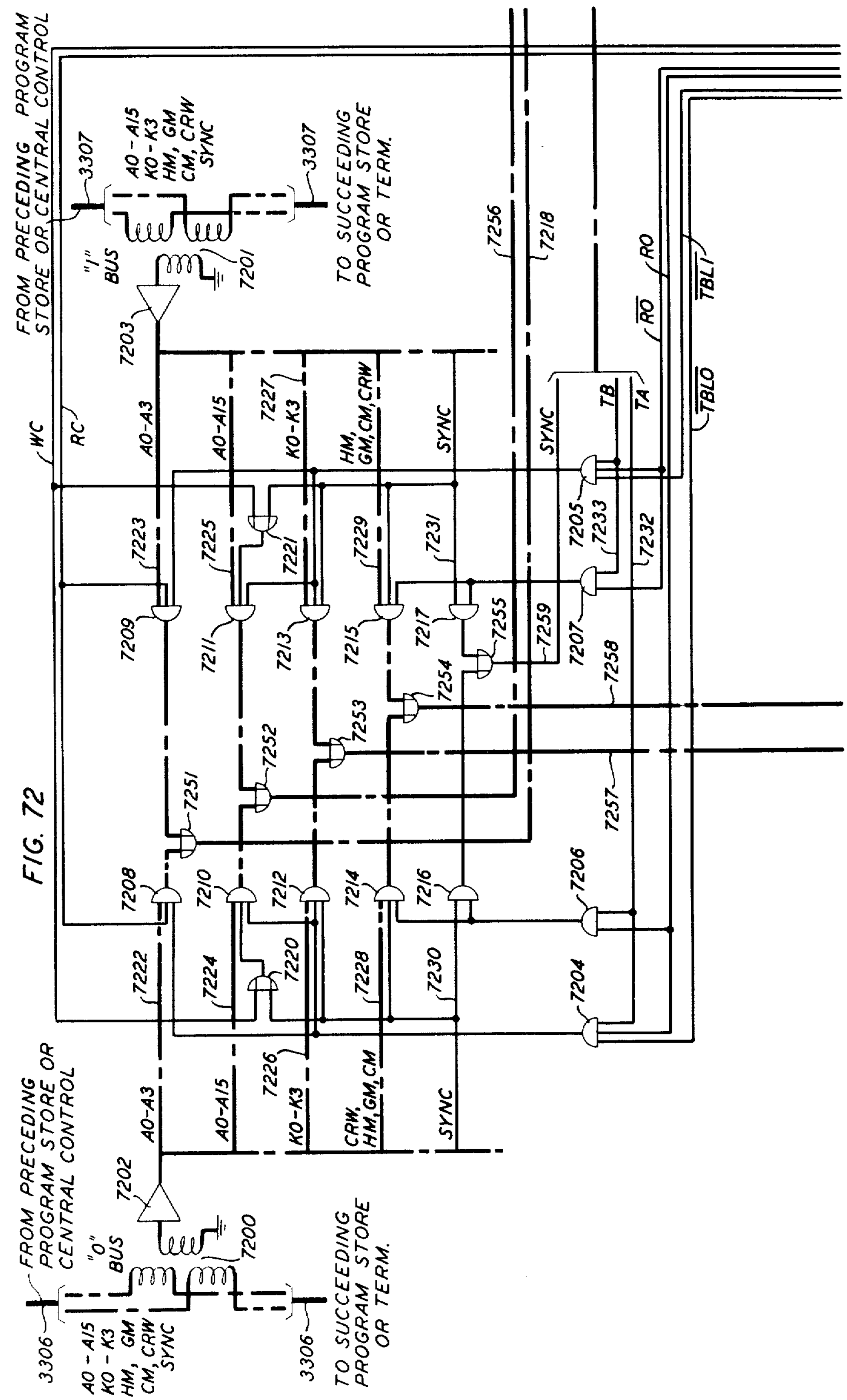
Figure 73:
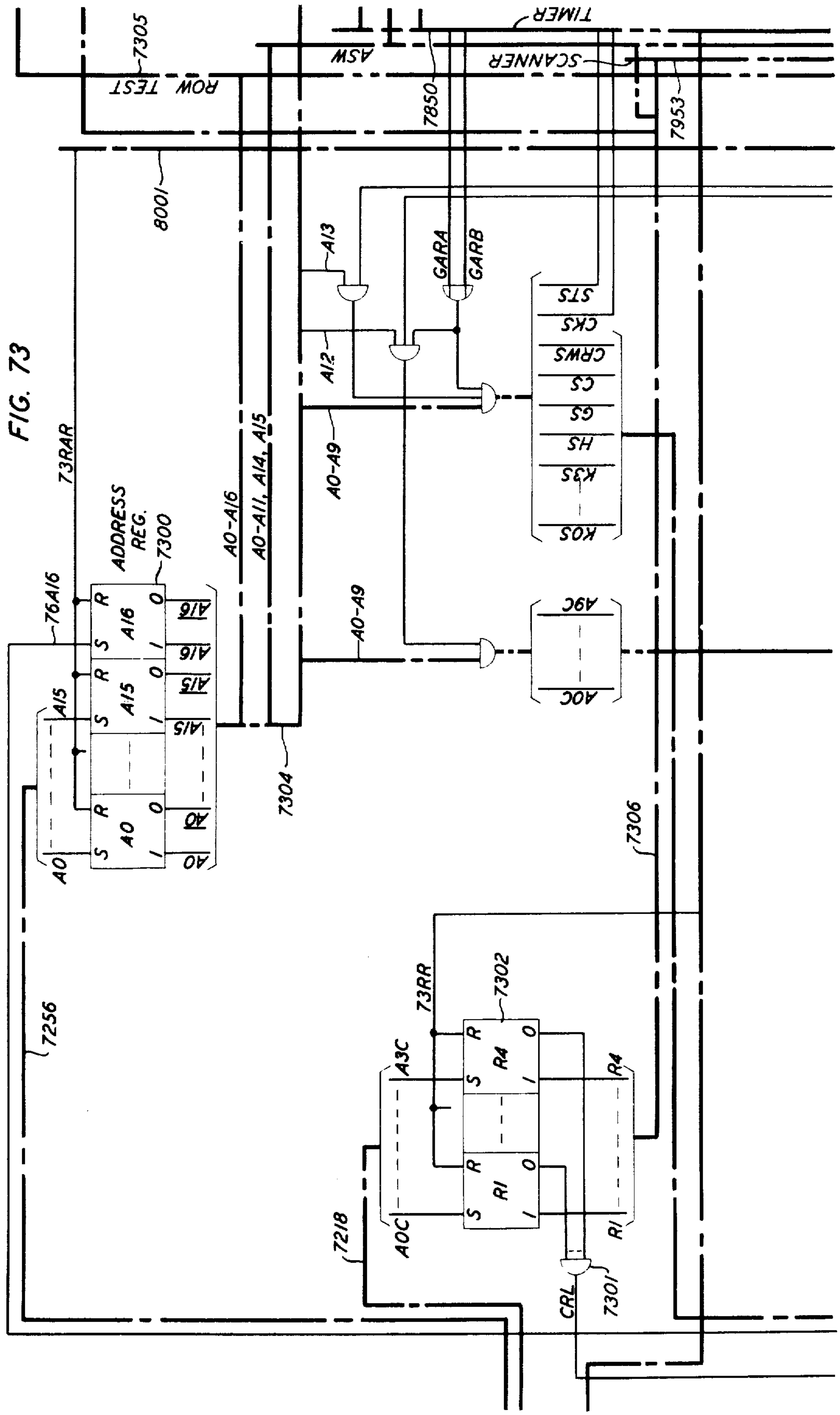
Figure 74:
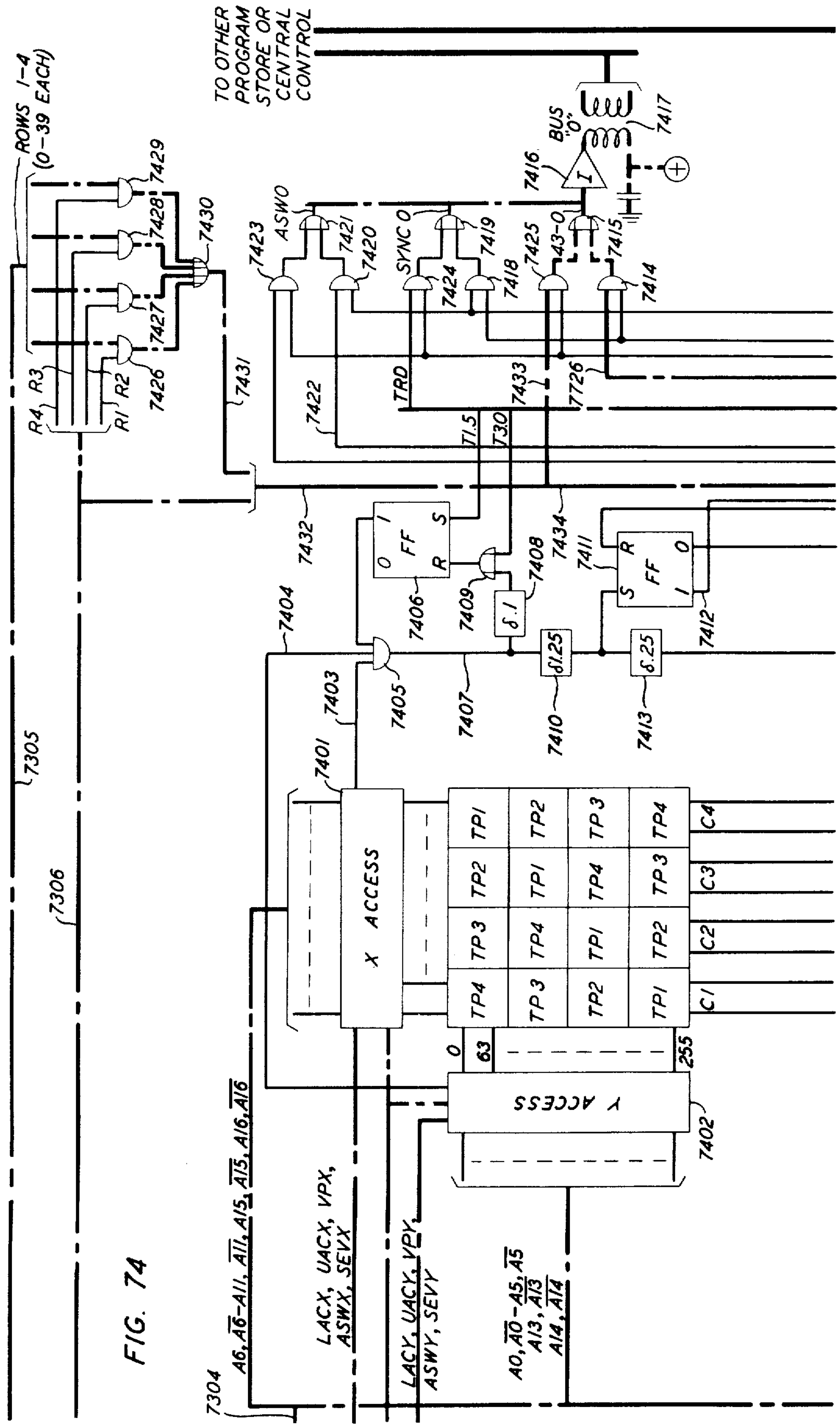
Figure 76:
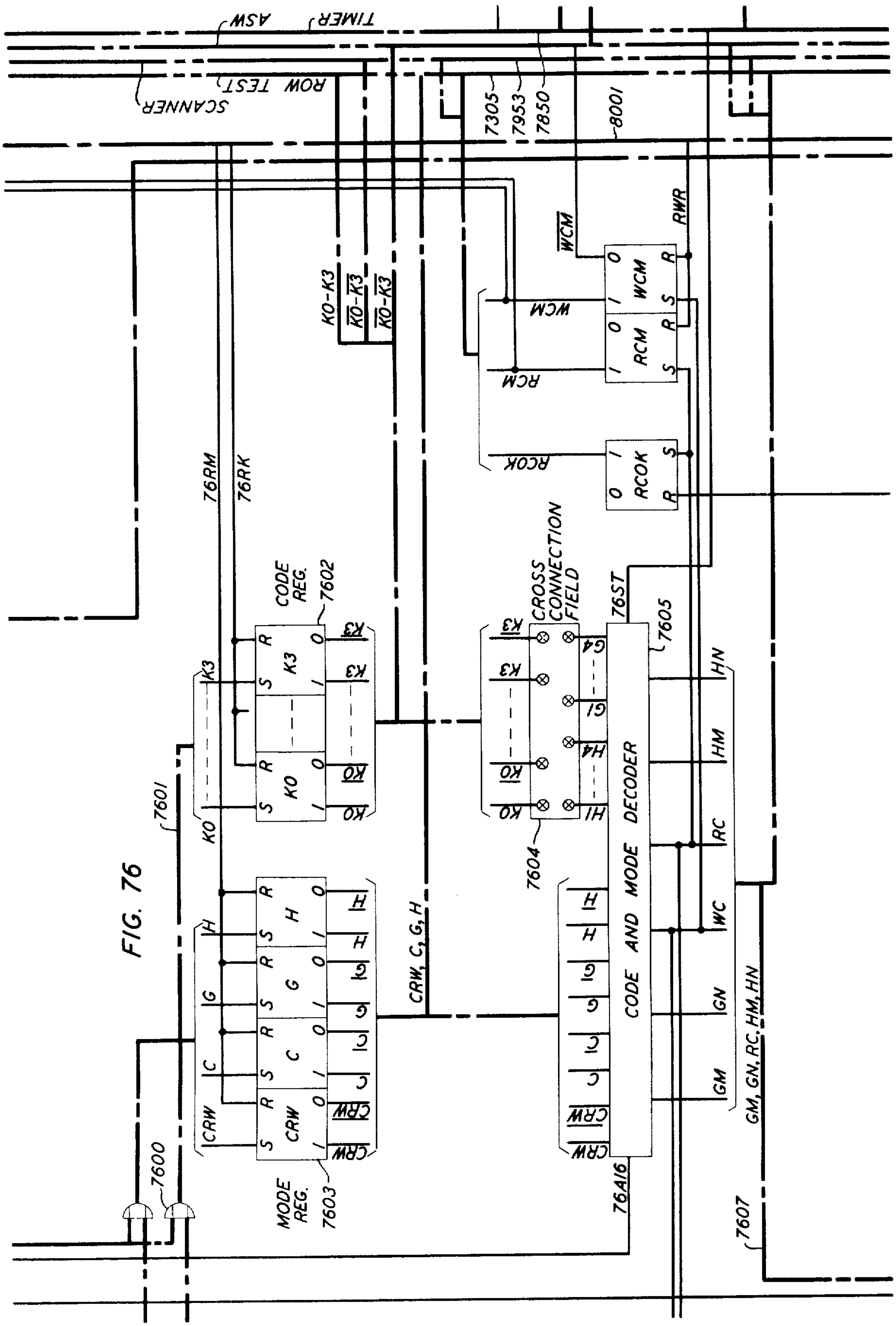
Figure 77:
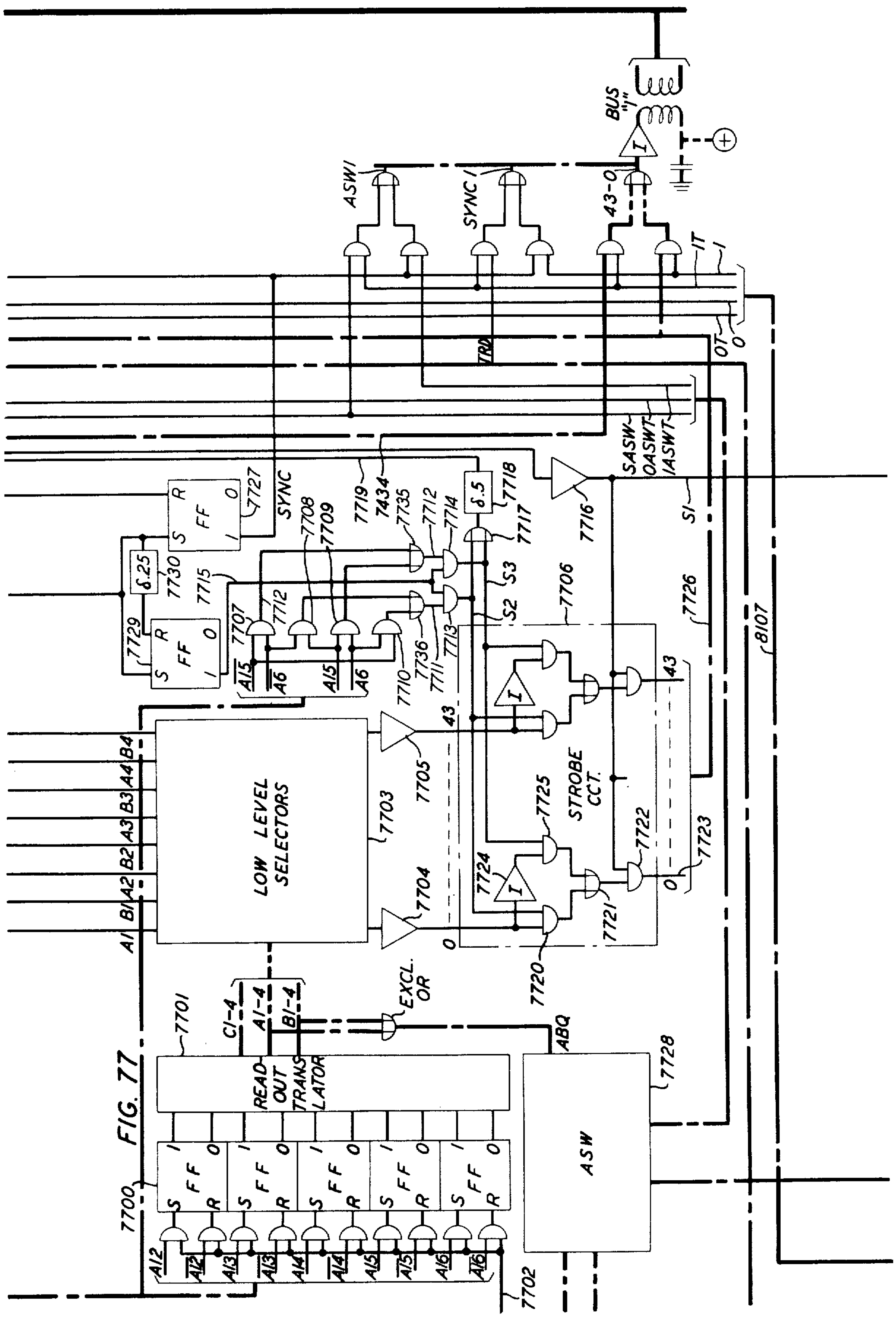
Figure 78:
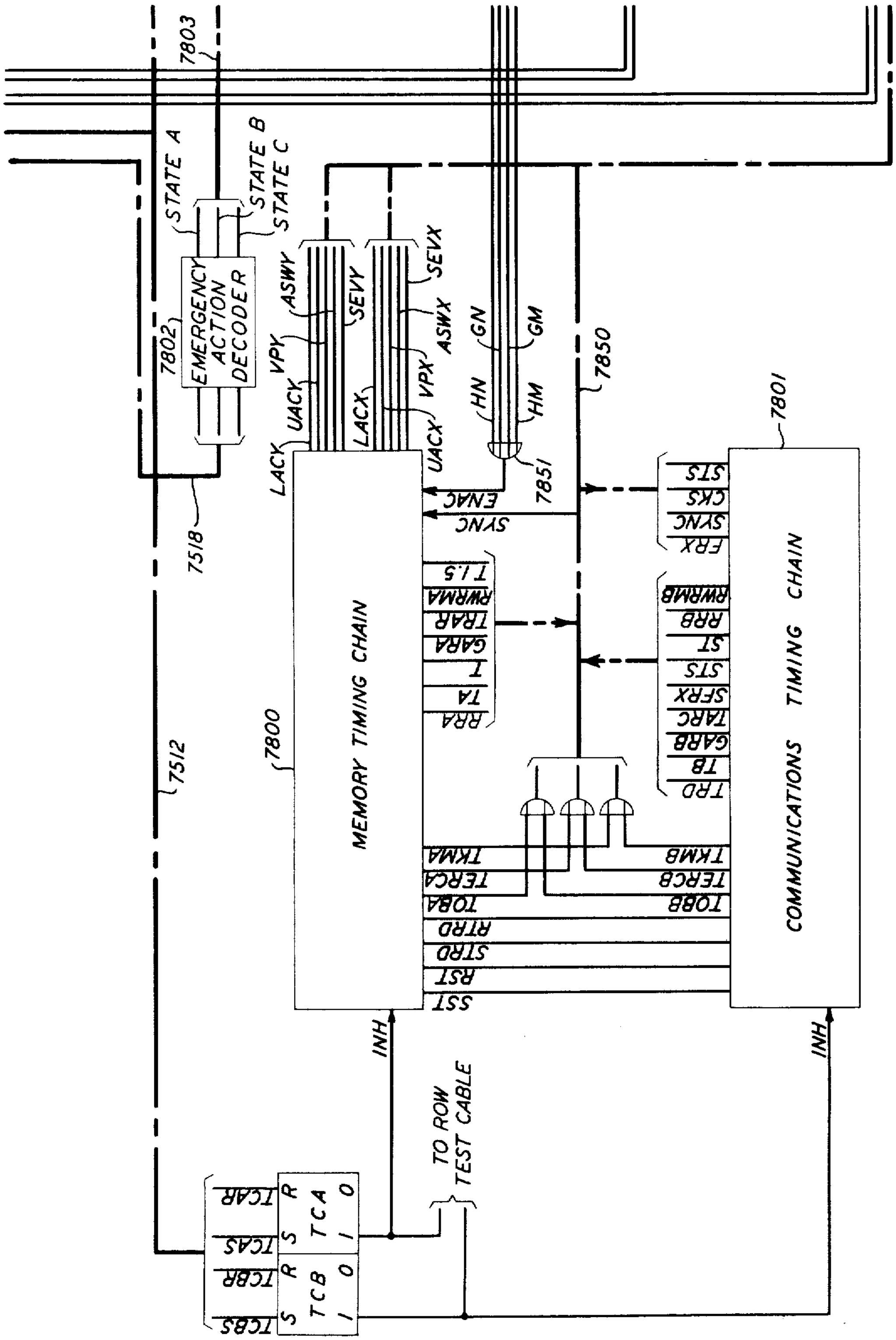
Figure 79:
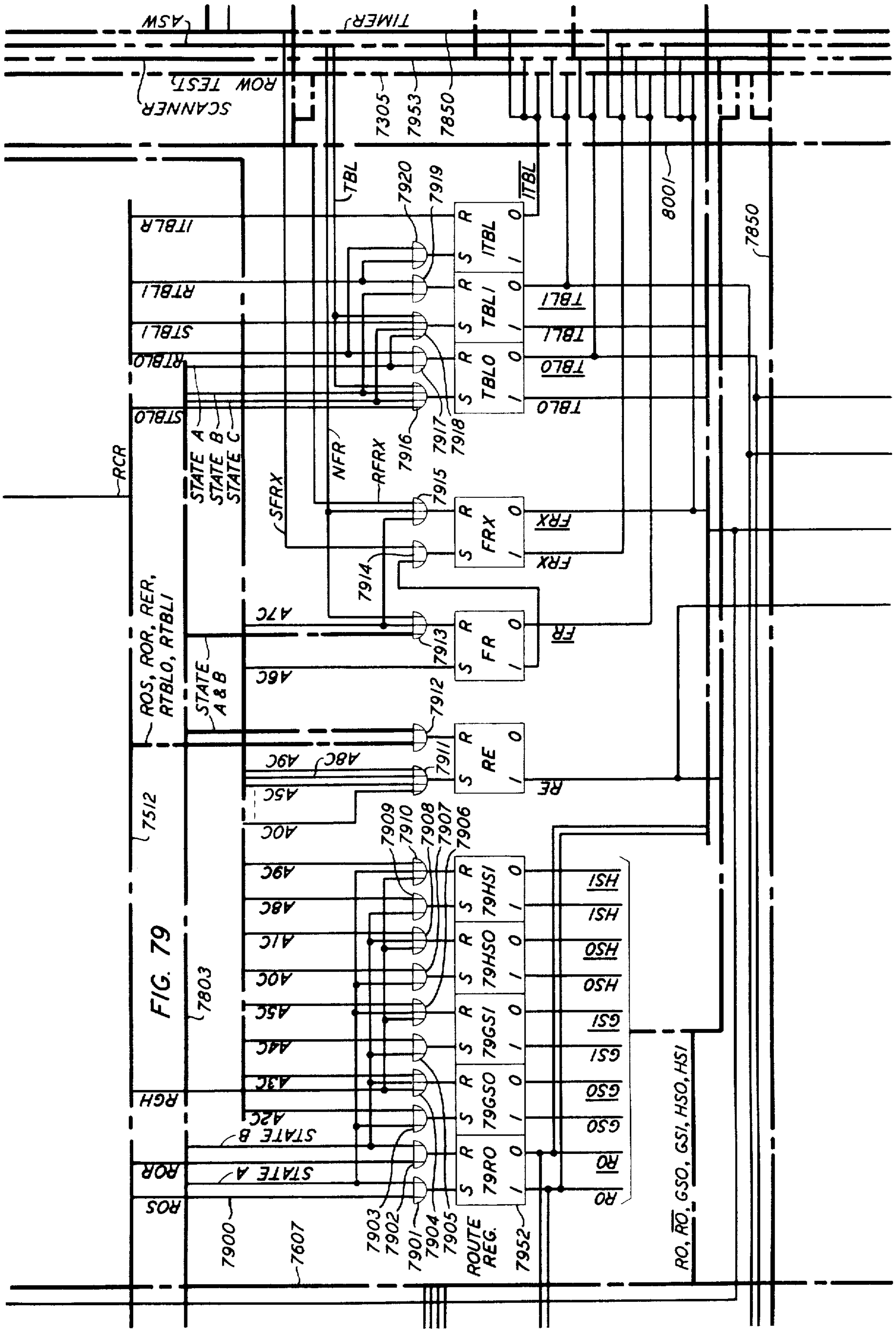
Figure 80:
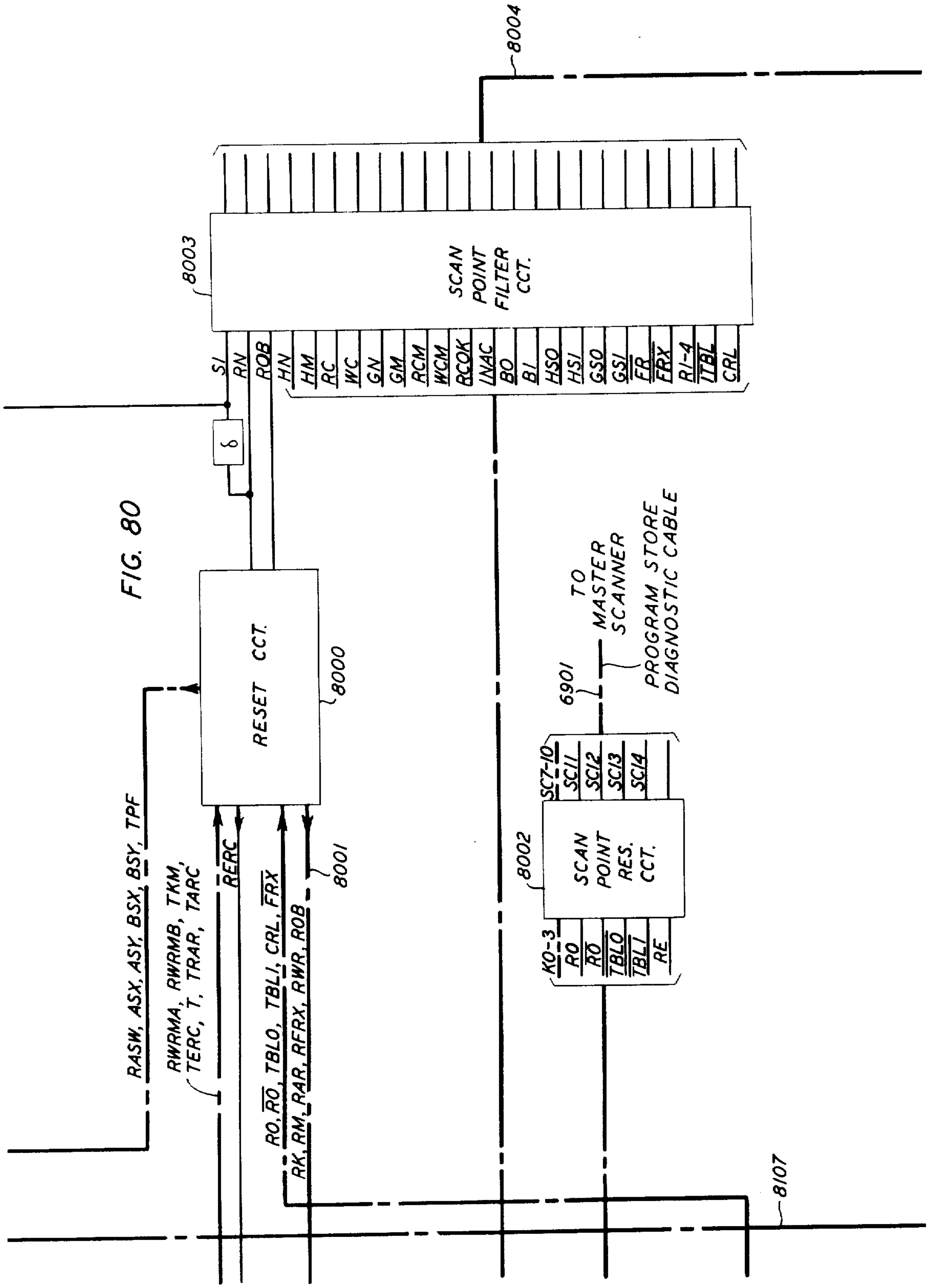
Figure 81:
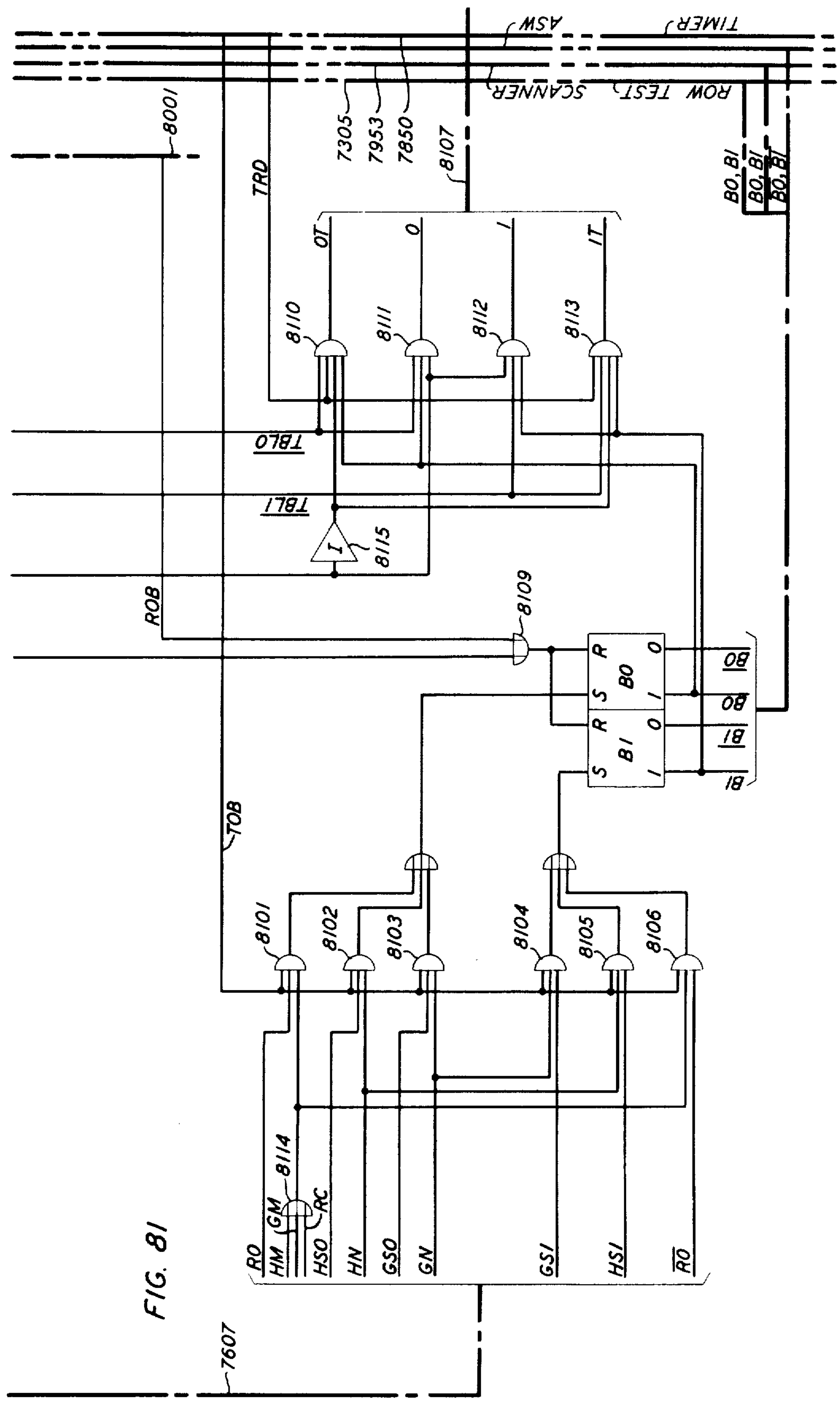
Figure 82:
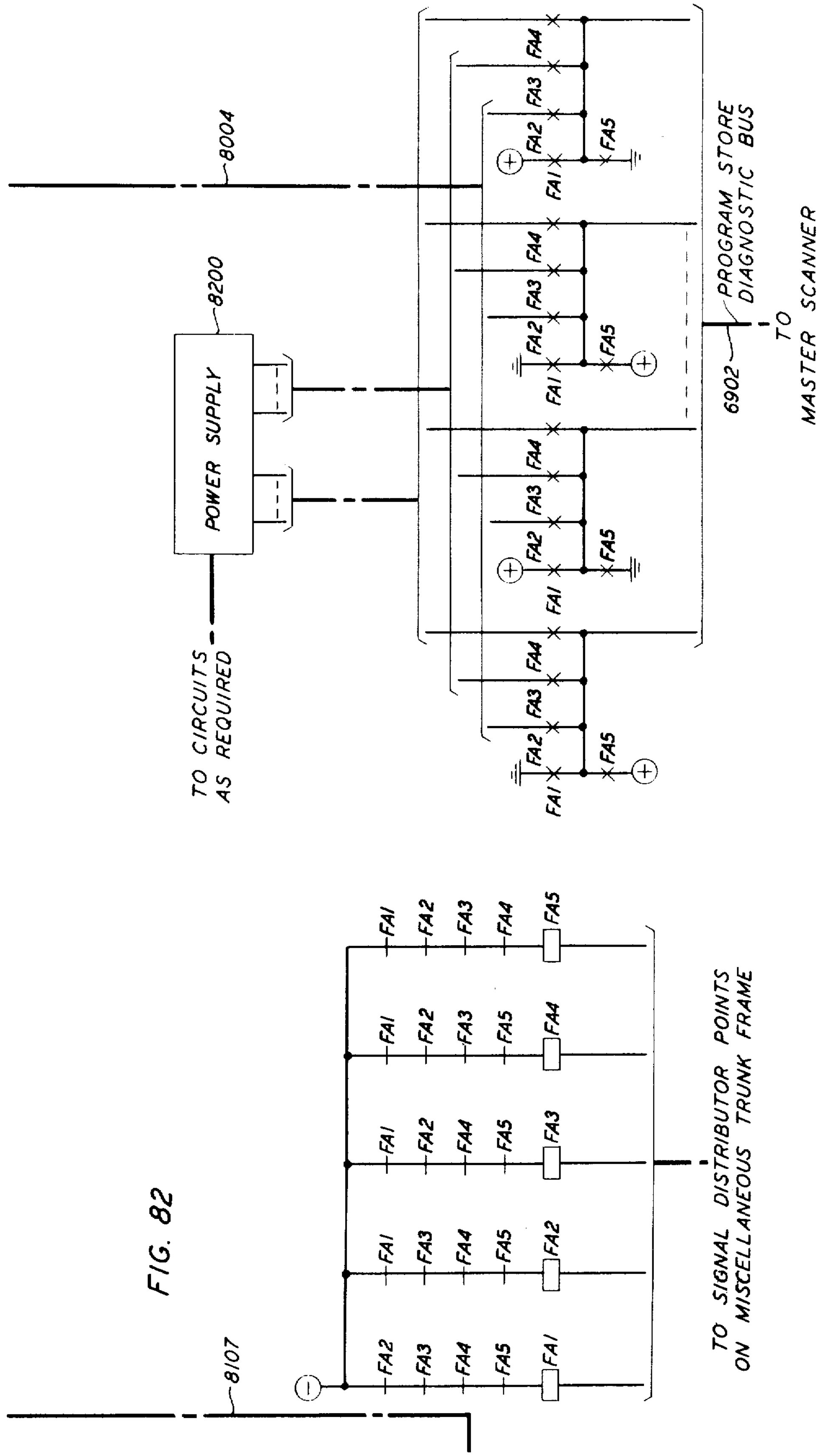

The connection of the address buses to a program store is shown in FIG. 72. In accordance with the symbology used throughout the drawing, the transformer 7200 and the amplifier 7202 are representative of a plurality of transformers and amplifiers, respectively, the number of transformers and amplifiers represented being equal in number to the number of address and control bits of information which are found in the "0" bus of the Address and Control Bus System 6400. The "0" bus, like the "1" bus as shown in FIG. 64, comprises twenty-five bits as follows:

A. 16 address bits A0-A15;

B. 4 code bits K0-K3;

C. 4 mode bits CM, HM, GM, CRW; and

D. a single synchronizing bit.

As previously noted, each Twistor module comprises 4,096 discrete information addresses and at each address there is located a pair of 44 bit words. The 4,096 address locations of a Twistor module are arranged in a square array and a word location is thus defined by coincidence of input signals on 1-out-of-64 X axis drive windings and 1-out-of-64 Y axis drive windings. The 16 modules are also arranged in a 4 × 4 square array. Accordingly, an information location within the store may be defined by the coincident enablement of 1-out-of-256 X axis drive windings and 1-out-of-256 Y axis drive windings. Both the X and the Y access circuitry therefore requires an 8 bit binary address to define the selected 1-out-of-256 drive windings. A word pair address within the store is thus defined by 16 binary bits. In addition, 1 binary bit is required to select one word from the pair of words at the selected address location. Accordingly, an address word comprising seventeen binary bits is required to define the store location from which a word is to be read. The 17 bit word address is derived from the 16 address bits A0-A15 and the information code bits K0-K3. The address bits A0-A11 and A13-A15 along with an additional bit which is derived from a decoding of the 4 code bits K0-K3 defines the word pair address and the address bit A12 defines the word of the pair of words.

Pulses on the four leads HM, GM, CM, and CRW specify the mode of operation of the store as follows:

| HM | GM | CM | CRW | Mode |
|---|---|---|---|---|
| 0 | 0 | 0 | 0 | Normal |
| 0 | 1 | 1 | 0 | Maintenance H |
| 1 | 0 | 1 | 0 | Maintenance G |
| 1 | 1 | 0 | 0 | Read Control |
| 1 | 1 | 0 | 1 | Write Control |

The sync pulse is employed as a gating signal and reduces the time during which the program stores are vulnerable to noise signals on the buses.

In summary, information may be read from the Program Store 102 in the normal and the maintenance modes; information may be read from discrete test points within the program store control circuitry by means of a control mode read operation; information may be written into selected portions of the program store control circuitry by means of a control mode write operation; and, in addition, a large number of test points are connected to their associated scanning elements in the Master Scanner 144 either by way of the Program Store Diagnostic Cable 6901 or by way of the Program Store Diagnostic Bus 6902.

As indicated earlier herein the call store system 103 of FIG. 1 comprises a plurality of independent call stores. One such call store is shown in the parent U.S. Pat. No. 3,570,008 in FIGS. 83 through 94 and is described therein at column 36, line 74 through column 42, line 26. This detailed description and the referenced FIGS. 83 through 94 are incorporated herein by reference.

CENTRAL PROCESSOR DETAILS

The Central Processor 100 always comprises two central controls. In the usual mode of operation both central controls are performing the same work operations. Whenever possible the central controls obtain the same input information from different sources and over different transmission facilities. That is, in that the information in both the Program Stores 102 and the Call Stores 103 is duplicated in separate stores of the respective store systems, the first central control will receive information from a first store having the desired information and via a first bus of a bus system, while the second central control will receive information from the other store having the desired information via the other bus of the bus system. Assuming that the information obtained from the two stores, either Program Store 102 or Call Store 103, is identical and that the communication paths, i.e., buses are operating properly, the two central controls will perform the same work functions. However, at any given instant only one central control can alter the connections through the network or, in general, control the operation of the system. There are a few exceptions whereby the other central control may perform off line work functions which are different from those which are performed by the central control is in control of the system functions.

In the normal in-step mode of operation set forth above the two central controls theoretically are operating upon identical input information; therefore, their operation should be identical. Correspondence of action of the two central controls is carefully checked by routinely comparing the flow of data through each central control. In the event that a mismatch is found between the data as it flows through the two central controls, the system is alerted.

In addition to matching the flow of data through the two central controls each central control performs a plurality of checks on the data which it processes. That is, information which is obtained from both the Program Store 102 and the Call Store 103 is protected by means of parity bits and, in the case of the Program Store 102, information is further protected by means of Hamming encoding which permits the detection of errors and the correction of single errors. In the event that either central control detects an error, either single or double, in the information received from a program store, the operation of the system is momentarily halted. In the event of a single error, the correction is made and in the case of a double error, the information is reread from the program store information source. In the case of call stores, a parity failure causes the system to momentarily halt and the information is reread from the call store.

At this point it might be well to differentiate between trouble indications which represent errors and faults. An error as defined herein is a malfunction of equipment which the system is not able to reproduce by a systematic logical procedure, while a fault is a malfunction of equipment which the system is able to reproduce repeatedly by a systematic logical procedure. When a trouble indication is first noted it is not known whether this indication represents an error or a fault; therefore, the system must undertake steps to make this determination. For example, as previously noted, if an error is detected in reading the Call Store 103 or an address error or a double error in the case of the Program Store 102, the system temporarily halts and rereads the particular store. If the trouble indication persists, a possible fault is indicated, while if the trouble indication does not persist, a more transient error is indicated and the central controls proceed with their assigned tasks. It should be noted, however, that the central control increments a physical binary counter each time an error is noted and from time to time this counter is reset. At some time before resetting the counter, however, the output of the counter is examined to assure that the number of errors which have occurred in a fixed unit of time have not exceeded a certain maximum number. This procedure assures that he system is not overly burdened by large numbers of ingle nonrepeatable errors which probably indicate a ystem trouble. Nonrepeatable errors reduce the call rocessing capacity of the system in that the rereading peration requires additional time.

The realization of system maintenance objectives elies heavily on maintenance programs. Upon detecion of trouble, a fault recognition program is called pon to recover the system's call processing ability. he fault recognition programs are assigned a high riority; however, their length is held to a minimum to void disrupting call processing. The fault recognition rograms control any necessary switching or rearrangeent of equipment; and request, for subsequent execuion, an appropriate low priority diagnostic program hich is designed to localize the fault within the faulty nit of equipment. The results of the diagnostic prorams are printed out via the Teletype Unit 145 for the se of the maintenance personnel.

In addition to making routine checks on the validity f information which is received from the stores and to naking routine checks upon the flow of information hrough the Central Processor 100, the system also erforms a plurality of routine test programs. The test rograms have a low execution priority and are designed to search for system faults which are likely to go ndetected in normal call processing. The routine test rograms can be initiated either automatically on a cheduled basis or as a function of other programs or nay be manually requested by means of the Teletype Jnit 145.

Central Control Responses to Program Order Words

FIG. 9, which is a simplified sketch of the Central Control 101, aids in understanding the basic operaonal step actions that are performed by Central Conrol 101 in response to various program order words. ach program order word comprises an operational eld, a data-address field, and Hamming error detectng and correcting bits.

The operation field is a fourteen or a sixteen bit biary word which defines the order and specifies the perational step actions to be performed by the Central Control 101 in response to the order. The operation eld is 14 or 16 bits long, depending on the particular rder which is defined by the operation field.

There are sets of "options" that may be specified ith each of the program order words. The operational tep of each order consists of a specific set of gating ctions to process data contained in Central Control 01 and/or communicate information between the Central Control 101 and other units in our system. When an option is specified with the program order eing executed, additional data processing is included the operational step. The specific gating actions and e data processing performed for each of the options re described elsewhere herein. Accordingly, a portion f the fourteen or sixteen bit operation field of a proram order word specifies the program order, and the emaining portion of the field may select one or more f the options to be executed.

Certain of the options are compatible with and provide additional data processing for nearly all of the rders. An example of such an option is that of "indexng" in which none or one of seven flip-flop registers ithin Central Control 101 are selected for additional ata processing. In the orders which permit indexing a hree bit portion of the operation field is reserved as the indexing field to indicate the choice of none or the one of seven registers to be employed.

Other options are limited to those orders for which the associated gating actions do not conflict with other portions of the operational step and are also excluded from those orders to which the options do not provide useful additions. Accordingly, portions of the operation field are reserved for those options only where applicable. That is, Central Control 101 is responsive to such options only if the program order word being executed is one to which the options are applicable. If an option is not applicable, then that portion of the operation field instead serves in the specification of other program orders or options. The assignment of the binary codes in portions of the operation field to options is therefore selectively conditioned upon the accompanying program order if the option is to have limited availability. This conditional assignment advantageously permits the inclusion of a larger variety of orders and options than could otherwise be included in the 14 to 16 bit operation field.

The data-address field of a program order word is either a 23 bit data word to be placed in a selected flip-flop register in Central Control 101 or a 21 bit word which may be used directly or with indexing to form a code-address for addressing memory. In all order words the sum of the bits of the operation field (16 or 14) plus the bits of the data-address field 21 or 23 is always 37 bits. If the order word has a 16 bit operation field, its data-address field will be 21 bits long; if the operation field is 14 bits long, the data-address is a 23 bit number. The shortened D-A field is utilized to obtain more combinations in the correspondingly lengthened operation field and therefore a larger and more powerful collection of program order words.

The Central Control 101 performs the operational steps for most orders at the rate of one order per 5.5 microsecond cycle. Although such orders are designated single cycle order, the total time involved in obtaining the order word and the central control responses thereto is in the order of three 5.5 microsecond cycles. The overlap operation previously noted herein permits Central Control 101 to achieve the stated rate of performing one such single cycle order every 5.5 microseconds.

The sequence of gating actions for a typical order, order X, and their relationship to the gating actions for the preceding order, order X-1, and a succeeding order, order X+1, are shown in FIG. 84. As shown on line 2 of FIG. 84, during phase 1 of a 5.5 microsecond cycle that is arbitrarily designated cycle 1, the code and address of program order word X appears in the Program Address Register 4801 (PAR) and is gated to the Program Store 102 via the Program Store Address Bus 6400. The code and address is interpreted by the Program Store 102 and the order word X is returned to central control over the Program Store Response Bus 6500 sometime during phase 3 of cycle 1 or phase 1 of cycle 2. The operation field portion of the program order word is gated into the Auxiliary Buffer Order Word Register 1901 (ABOWR), and the data-address field, and the Hamming bits of the order word are gated into the Buffer Order Word Register 2410 (BOWR).

The operation field is first gated into the Auxiliary Buffer Order Word Register 1901 (ABOWR) since it is possible that the program order word which is returned from the Program Store 102 reaches Central Control 101 prior to completion of the gating actions by the Buffer Order Word Decoder 3902 (BOWD) on the preceding order word, in this case order word X−1. This may be seen by reference to FIG. 84 where in the line labeled X−1, the gating directed by the Buffer Order Word Decoder 3902 (BOWD) for the order word X−1 is completed at the end of phase 3 of cycle 1; and, as shown in the line labeled X, the program order word X may reach central control in the latter portion of phase 3 of cycle 1. The Auxiliary Buffer Order Word Register 1901 (ABOWR) resolves this conflict. The same situation does not obtain with respect to either the Hamming encoding bits or the data-address word as by the end of phase 2 of cycle 1 all of the actions with respect to both the Hamming encoding bits and the data-address bits for the order X−1 have been completed.

The time at which a program order word reaches the Central Control 101 is subject to variation as a result of a number of factors. For example, since there are two central controls and a number of program stores, the physical distance between a particular central control and each of the program stores is different and this difference is reflected in both the Program Store Address Bus 6400 and in the Program Store Response Bus 6500. Further, there may be differences in the response times of the various program stores and their access circuits and these variations may be cumulative with the differences in bus lengths.

The decoded outputs of the Buffer Order Word Decoder 3902 (BOWD) are combined with selected clock pulses from the Microsecond Clock 6100 (CLK) in the Order Combining Gate Circuit 3901 (OCG) which operates selected gates within Central Control 101 in the proper time sequence during phase 2 and phase 3 of the second cycle to perform indexing, index modification, and certain other gating actions with respect to order X.

During phase 3 of the second cycle the operation field of order X (FIG. 84) is gated from the Buffer Order Word Register 2410 (BOWR) to the Order Word Register 3403 (OWR). The Order Word Decoder 3904 (OWD) decodes the operation field of the order X which is in the Order Word Register 3403 (OWR) for the performance of the remaining gating actions. D-C output signals from the Order Word Decoder 3904 (OWD) are combined with selected pulses from the Microsecond Clock 6100 (CLK) in the Order Combining Gate 3901 (OCG) to complete the gating actions of the single cycle order X during phase 1 and phase 2 of the third cycle.

During phase 2 of the third cycle order X is completing its last gating action from the Order Word Register 3403 (OWR) and the Order Word Decoder 3904 (OWD), and order X+1 is simultaneously performing the indexing step from the Buffer Order Word Register 2410 (BOWR) and the Buffer Order Word Decoder 3902 (BOWD). Since the simultaneous gating actions may conflict in the use of the flip-flop registers such as XR, YR, ZR, et cetera, the Mixed Decoder 3903 (MXD) decodes the contents of both the Buffer Order Word Register 2410 (BOWR) and the Order Word Register 3403 (OWR). The Mixed Decoder 3903 (MXD) outputs, which are D-C signals, are combined with the outputs of the Buffer Order Word Decoder 3902 (BOWD) in the Order Combining Gates 3901 (OCG) to modify gating actions so as to resolve conflicts in the two operational steps.

A conflict which is resolved by the Mixed Decoder 3903 occurs when a first order specifies a particular one of the index registers as the destination register for a memory word obtained by the execution of that order while the immediately succeeding order specifies that the contents of that same index register be employed in indexing. In the performance of indexing, the contents of the specified index register are normally gated from the output of the specified index register to the Unmasked Bus 2014 and from there to the Augend Register 2908. However, where successive orders specify the same index register as a destination register for memory reading and as a source register, there is insufficient time to complete the transfer of the information to the destination register; therefore, the Mixed Decoder 3903 in these instances transfers the desired information from the Masked Bus 2011 directly to the Augend Register 2908 at the same time that this information is being transmitted to the specified destination index register.

Mask and Complement Circuit 2000 (M&C)

The internal data processing structure is built around two multiconductor buses, the Unmasked Bus 2014 (UB) and the Masked Bus 2011 (MB), which provide a link for moving a multibit word of data from one of a specific group of flip-flop registers to another. This group consists of the Index Registers 2601 (BR), 5801 (FR), 5802 (JR), 4001 (KR), 2501 (XR), 3001 (YR), and 3002 (ZR) and the Logic Register 2508 (LR).

The Mask and Complement Circuit 2000 (M&C) connects the Unmasked Bus UB to the Masked Bus MB and provides means for logically operating upon the data as it passes from the Unmasked Bus UB to the Masked Bus MB. The logical operation to be performed, product masking (AND), union masking (OR), exclusive OR masking (EXCLUSIVE-OR), and complementing is prescribed by the operation field of the program order as decoded by either the Buffer Order Word Decoder BOWD or the Order Word Decoder OWD. Only one masking operation may be performed in a single pass of data through the circuit M&C; however, the masking operation may be followed by a complementing operation in gating data through the circuit M&C. Each of the masking operations requires two operands and the contents of the Logic Register LR always comprises one of the operands.

Figure 20:
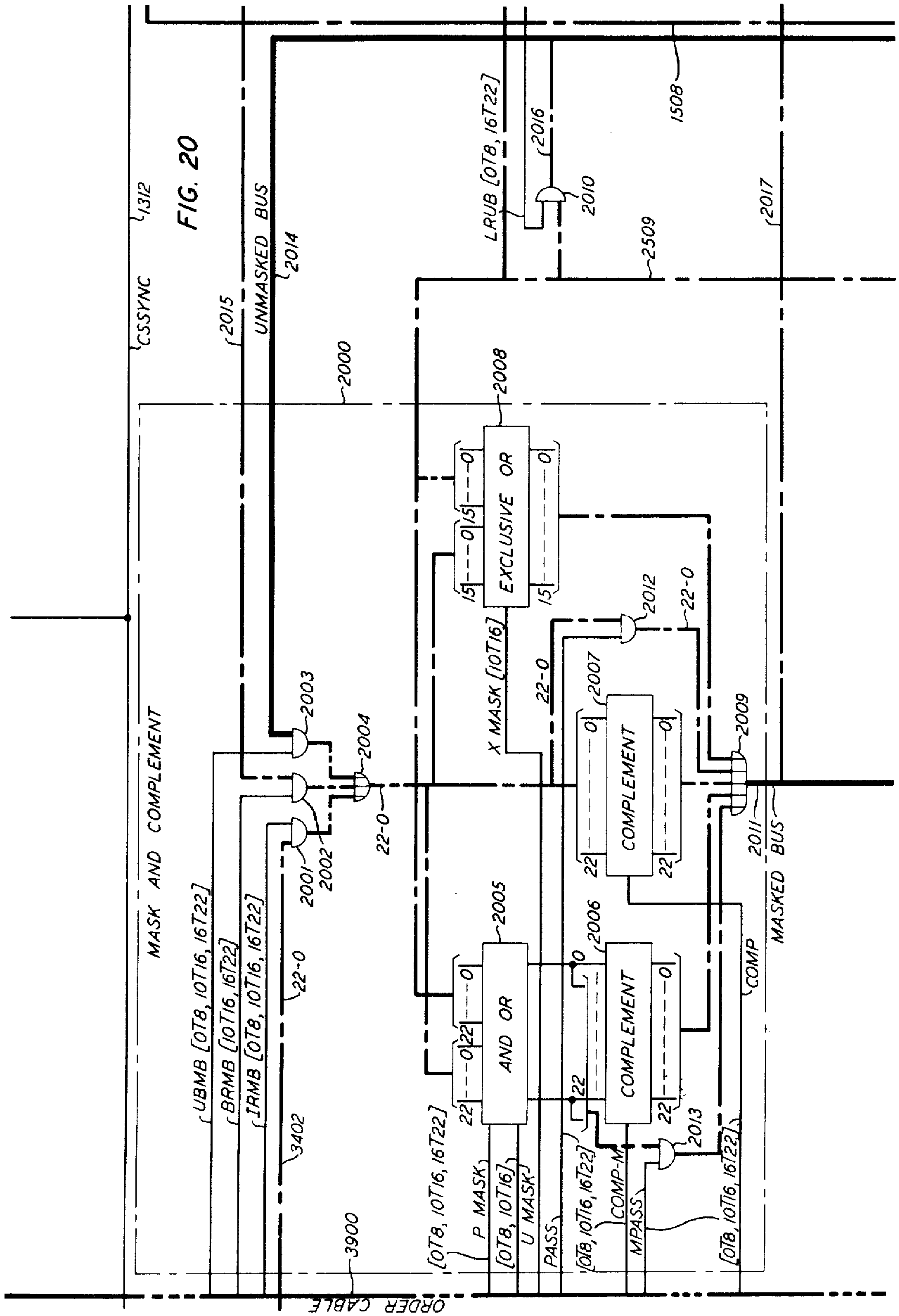

The Mask and Complement Circuit M&C (2000) which is shown in greater detail in FIG. 20 also provides a convenient means for connecting the Data Buffer Register 2601 and the Index Adder Output Register 3401 to the Masked Bus 2011. The data word which appears at one of the input AND gates 2001–2003 of the Mask and Complement Circuit 2000 may be selectively gated directly to the Masked Bus 2011 without alteration or may be masked and/or complemented during transmission through the mask and complement circuit. The AND-OR Circuit 2005 serves to "Union" mask or "Product" mask the input data word when enabled by order cable signals on conductors 20UMASK and 20PMASK, respectively. The word appearing at the output of the AND-OR Circuit 2005 may be complemented in the Complement Circuit 2006 by enabling order cable conductor 20COMP or may be transmitted directly to the Masked Bus 2011 by enabling order cable conductor 20MPASS.

The input data word may be gated directly to the Masked Bus 2011 by enabling AND gate 2012 by an order cable signal on conductor 20PASS or may be complemented in the Complement Circuit 2007 by enabling order cable conductor 20COMP.

Exclusive OR masking may be achieved in the EXCLUSIVE-OR Circuit 2008 by enabling order cable conductor 20XMASK. It should be noted that it is not possible to complement the data word appearing at the output of the EXCLUSIVE-OR Circuit 2008.

K Register 4001 (KR); K Logic (KLOG); Detect First-One Circuit 5415 (DFO)

The K Register KR, the K Logic KLOG, and the Detect First-One Circuit 5415 (DFO) provide a second major internal data processing facility. The K Logic KLOG comprises input and output circuitry surrounding the K Register 4001. The K Logic KLOG includes the K A Input Register 3502, the K B Input Register 3504, the K Input Logic 3505, the K Logic Homogeneity Circuit 4502; and at the output of the K Register 4001 the Rotate Shift Circuit 4500 and the K Register Homogeneity Circuit 5403. The K Logic KLOG may be directed by output signals of the Order Combining Gate OCG to perform one of four logical operations on two operands. One operand is the content of the K Register KR; the other is the information on the Masked Bus MB. The Order Word Decoder OWD and the K Register Sequence Circuit (part of SEQ) generate signals which cause the K Logic KLOG to combine the two operands in the operations of AND, OR, EXCLUSIVE-OR, or ADDITION. The word resulting from the logical combination, according to the order in the Order Word Register OWR, may either be gated to the K Register KR or to the Control Homogeneity Circuit CH and the Control Sign Circuit CS.

A word appearing on the Masked Bus MB may in some instances be gated directly to the K Register KR via the K Logic KLOG. The K Register KR may thereby be employed as a simple destination register for data like other flip-flop reisters in central control such as XR, YR, ZR, et cetera.

In carrying out the ADDITION operation in the K Logic KLOG the two operands are treated as 22 bit signed numbers. The 23rd bit of each operand is the sign bit. If this bit has the value 0 the number is positive, and the magnitude of the number is given by the remaining 22 bits. If the sign bit is 1 the number is negative, and the magnitude of the number is given by the one's complement of the remaining 22 bits. (The magnitude is determined by inverting each bit of the twenty-two bit number.) The add circuit within K Logic KLOG can correctly add any combination of positive and negative operands as long as the magnitude of the algebraic sum of the two operands is equal to or less than $2^{22}-1$.

The K Logic KLOG and the K Register KR can perform other logical operations on the contents of the K Register KR. One of these operations is given the name SHIFT. The gating action performed by SHIFT is based, in part, on the least significant 6 bits of the number that appears in the Index Adder IA at the time the shift is to be performed. The least significant 5 bits constitute a number that indicates the magnitude of the shift, and the sixth bit determines the direction of the shift. A 0 in the 6th bit is interpreted as a shift to the left, and the remaining 5 bits indicate the magnitude of this shift. A 1 in the 6th bit is interpreted as a shift to the right, and the one's complement of the remaining 5 bits indicates the magnitude of the shift to the right. Although in shifts to the right the least significant five bits contain the one's complement of the magnitude of the shift, the 6 bit number will be referred to hereafter as comprising a sign and a magnitude.

Figure 40:
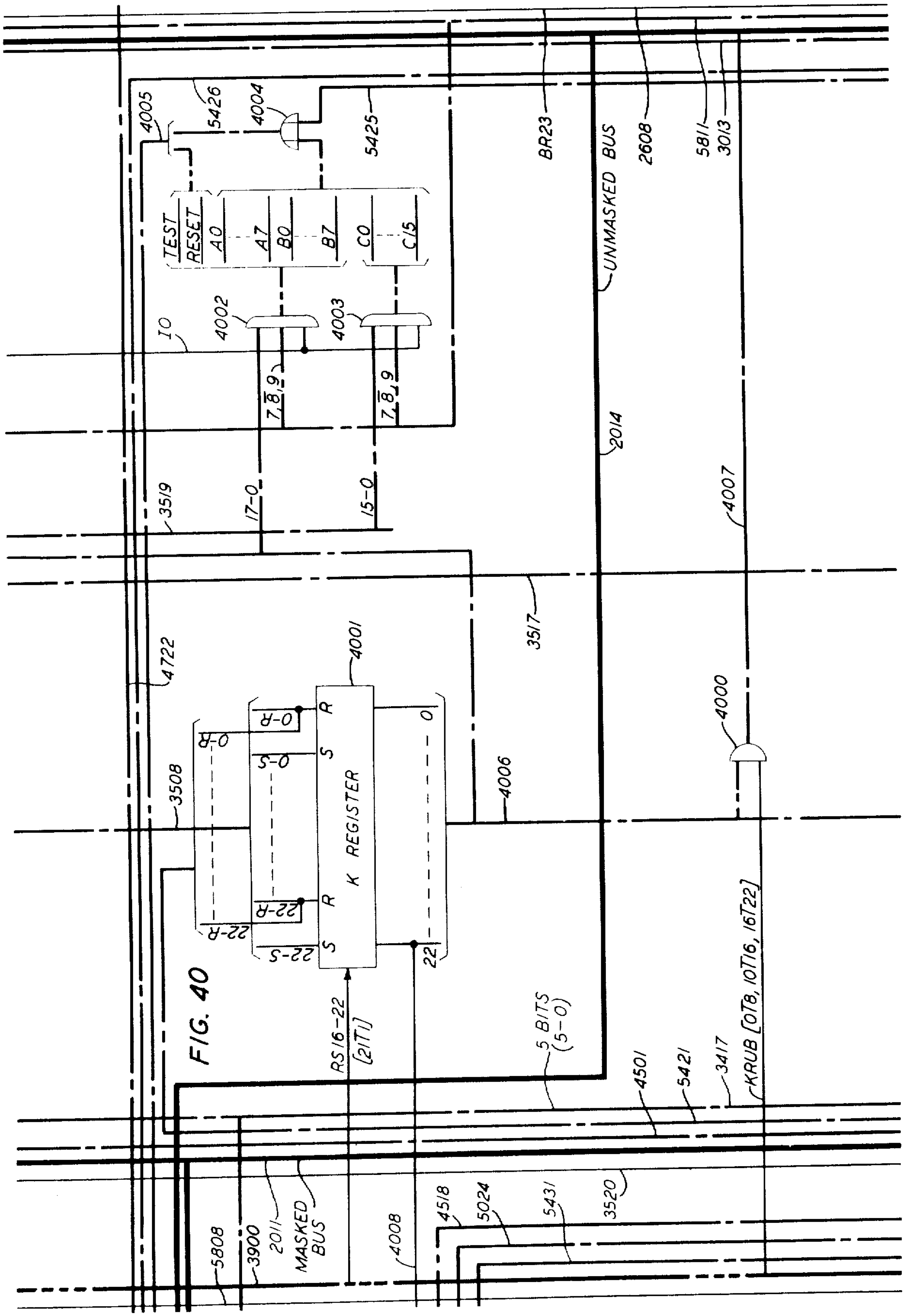
Figure 41:
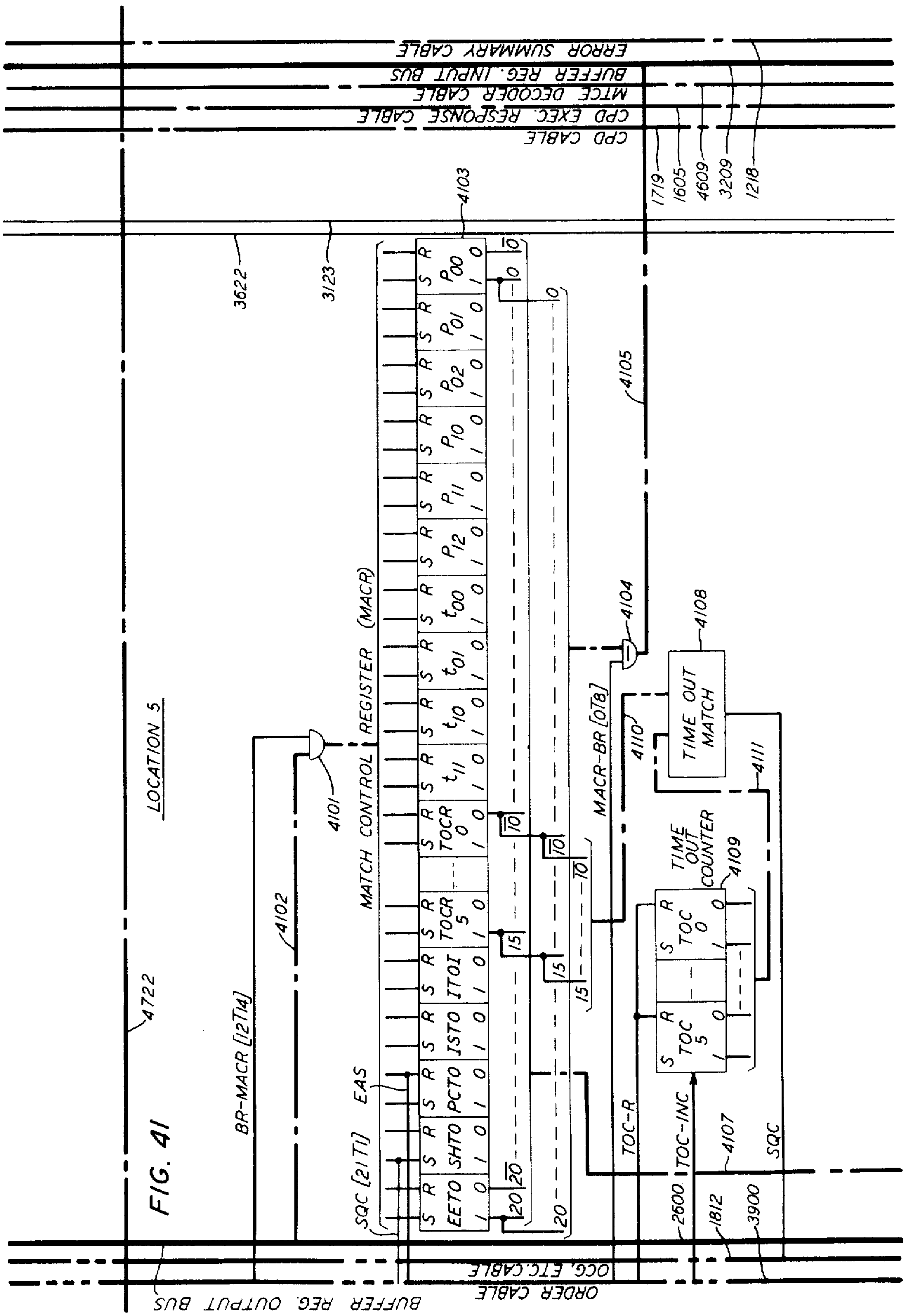

A shift of one to the left results in the contents of each flip-flop in the K Register KR being gated to the adjacent flip-flop to the left where the register is viewed as in FIG. 40. (The most significant bit of the K Register KR, bit 22, is on the extreme left; and the least significant bit, bit 0, is on the extreme right.) A 0 replaces the contents of the least significant bit position of the K Register KR (there is no flip-flop to the right of the 0 position flip-flop) and the most significant bit is shifted out of the register. That is, the bit 22 flip-flop has no flip-flop to its left and the information is not retained.

A shift of two to the left is equivalent to two successive shifts of one to the left, a shift of three to the left is equivalent to three successive shifts of one to the left, et cetera. A shift of 23 to the left causes all zeros to be placed in the K Register KR. A shift of one to the right results in the contents of each flip-flop in the K Register KR being gated to the adjacent flip-flop to the right. A 0 replaces the contents of the most significant bit of the K Register KR, and the original least significant bit of the K Register KR is thus not retained.

A shift of two to the right is equivalent to two successive shifts of one to the right, a shift of three to the right is equivalent to three successive shifts of one to the right, a shift of 23 to the right results in the contents of the K Register KR being made all zeros.

A logical operation similar to the shift is the operation ROTATE. As in shifting, the 6 bits of the Index Adder IA are treated as a direction and magnitude for the rotation just as described for the shift.

A rotate of one to the left is identical to a shift of one to the left except for the gating of the flip-flops at each end of the K Register KR. In a rotation of one to the left the content of bit 22 is not lost as in the shift but instead replaces the content of the least significant zero bit of the K Register KR. A rotate of two to the left is identical to two rotates of one to the left in succession, a rotate of three to the left is identical to three rotates of one to the left, et cetera. A rotate of 23 to the left has the same effect on the K Register KR as no rotation. A rotation to the right bears a similar relation to a shift to the right.

In summary, the gating action of rotation is identical to that of shift except that the register is arranged in a circular fashion wherein the most significant bit is treated as being to the right of the least significant bit of the K Register KR.

A complement option may be employed with shift and rotate orders and, where specified, the significance of the sign bit is inverted, that is, where the complement option is specified a 0 in the sixth bit is interpreted as a shift to the right while a 1 in the sixth bit is interpreted as a shift to the left.

A special purpose rotate order applies rotation to only bits 6 through 21 of the K Register KR and leaves the remaining positions of the K Register KR unchanged.

Another logical gating action is the determination of the rightmost one in the contents of the K Register KR. The action is accomplished by gating the contents of the Detect First-One Circuit DFO to the F Register FR via the Unmasked Bus UB, the Mask and Complement Circuit M&C, and the Masked Bus MB. The number gated is a five bit binary number corresponding to the first stage (reading from the right) in the K Register KR which contains a 1. If the least significant bit of the K Register KR contains a 1, zero is the number gated to the F Register FR. If the first 1 reading from the right is in the next position, one is the number gated to the F Register FR. If the only 1 appearing in the K Register KR is in the most significant position, 22 is the number gated to the F Register FR. If the K register contains no 1's, then nothing is gated to the F Register FR.

Index Adder (IA)

A third major data processing configuration within the Central Control 101 is the Index Adder IA which is used to:

1. Form a quantity designated herein as the indexed DAR word consisting of the sum of the D-A field of the program order word being executed and the contents of an index register specified in an order, or 2. To perform the task of a general purpose adder; the operands in this latter instance may be the contents of two index registers or the D-A field and the contents of an index register.

The outputs of the Index Adder IA are selectively connected to the Program Address Register PAR, the Memory Address Decoder MAD, and the Call Store Address Bus System 6401 when employed for indexing; the outputs of the adder may also be connected to the Masked Bus MB via the Mask and Complement Circuit M&C when employed as a general purpose adder. Access to the Masked Bus MB permits the word formed to be employed for a number of purposes, for example:

1. Data to be placed in the K Register KR without modification or to be combined with the contents of the K Register KR in the K Logic KLOG;

2. A number for determining the magnitude and direction of a shift or rotate;

3. Data to be placed in a specified index register;

4. Data to be transmitted over the Network Command Bus 6406 via the K Logic KLOG and the Network Translator NETW-T;

5. Data to be sent to the Central Pulse Distributor 143 via the F Register FR and the Central Pulse Distributor Translator CPD-T.

Indexing is the adding of two numbers in the Index Adder IA. The D-A field of the order as it appears in the Buffer Order Word Register BOWR is one operand used in indexing and the other operand, if required, is the contents of one of the seven Index Registers BR, FR, JR, KR, XR, YR, and ZR. For orders which include the indexing option a three bit number within the operation field specifies either (1) no indexing, or (2) indexing on one of the seven flip-flop registers according to the following table.

| X34 | X33 | X32 | Register |
|---|---|---|---|
| 0 | 0 | 0 | No register |
| 0 | 0 | 1 | BR |
| 0 | 1 | 0 | FR |
| 0 | 1 | 1 | JR |
| 1 | 0 | 0 | KR |
| 1 | 0 | 1 | XR |
| 1 | 1 | 0 | YR |
| 1 | 1 | 1 | ZR |

If no register is specified for indexing, then only the D-A field is gated to the Index Adder IA and the output of the Index Adder IA will be the D-A field (the sum of the D-A field and zero). If an index register is specified, the contents thereof are normally gated onto the Unmasked Bus UB and from there directly into the Index Adder IA.

If the order X specifies indexing, and if the index constant is obtained by a memory reading operation of the preceding order X-1, then the Mixed Decoder MXD substitutes the Masked Bus MB for the index register. The Mixed Decoder MXD insures that the Index Adder IA always has the correct operands to perform the timely addition to complete the operational step for order X.

A number of the orders have as an option specified by a combination of bits in the operation field the loading of the D-A field into the Logic Register LR. This option permits the placing of specified new data into the Logic Register LR for use in subsequent masking operations. If the D-A field is used to load the Logic Register LR, then it is considered not available for indexing and the only operand gated to the Index Adder IA is the contents of a specified index register.

The sum appearing at the output of the Index Adder IA is referred to as the DAR address or word. If indexing is not specified in an order, the DAR address or word is the D-A field of that order. If indexing is specified and the D-A field is not gated to the Logic Register LR, the DAR address or word will be the sum of the D-A field and the contents of the specified index register. If the D-A field is used for loading the Logic Register LR, the DAR will be the contents of the specified index register.

The Index Adder IA, as well as the add circuit within the K Logic KLOG, utilizes one's complement binary arithmetic. All inputs of the index adder are treated as twenty-two bit numbers with the twenty-third bit a sign bit. A positive number is indicated by a 0 in the 23rd bit and a negative number by a 1 in the 23rd bit. End-around-carry is provided so that the Index Adder IA can correctly handle all four combinations of positive and negative operands as long as the algebraic sum of the two operands does not exceed $2^{22}-1$.

Some orders, as previously mentioned, have a 23 bit D-A field, and others have a 21 bit D-A field. If the D-A field is only 21 bits long, then the 21st bit is treated as the sign bit; this bit is expanded to also become the 22nd and 23rd bits of the effective D-A field gated to the Index Adder IA. Expansion converts a twenty-one bit D-A field to an effective 23 bit D-A field for indexing. Expansion preserves the end-around-carry for indexing with 21 bit D-A fields.

Decision Logic 3906 (DECL)

The Central Control 101 in the execution of a decision order in a sequence of orders either continues with the current sequence of orders or transfers to a new sequence of orders. The decision is made by the Decision Logic 3906 (DECL) in accordance with the order being processed. The order specifies the information to be examined and the basis for the decision. The information may be obtained from the Control Homogeneity Flip-Flop 5020 of the Control Homogeneity Circuit CH, the Control Sign Flip-Flop 5413 of the Control Sign Circuit CS or selected outputs of the K Logic KLOG. The basis of the decision may be that the information examined is (or is not) arithmetic zero, less than zero, greater than zero, et cetera. A decision to advance does not disturb the current sequence of obtaining and executing orders. A decision to transfer to a new sequence of orders is coupled in accordance with the particular word being executed to a determination of whether the transfer is an "early transfer" or a "late transfer". Accordingly, if the decision is made to transfer, either the early transfer conductor ETR or the late transfer conductor LTR will be energized and thereby activate the Transfer Sequencer 4401. Transfer signals from these conductors lead to the gating of the transfer address to the Program Address Register PAR. This causes the next program order word to be obtained from a new sequence of order words. The transfer address may be obtained from a number of sources and the source is indicated by the order being executed. In the case of "early transfer" orders, the transfer address comprises the contents of a preselected one of the J Register JR or the Z Register ZR. In the case of "late transfer" orders the transfer address may be obtained directly, in which case the DAR code-address which is formed in the index adder is employed, or indirectly, in which case the transfer address comprises a memory reading at the location specified by the DAR code-address which is formed in the Index Adder IA. This latter case is referred to herein as indirect addressing.

The distinction between "early transfer" and "late transfer" orders is based on whether or not the decision order requires a memory reading or writing in the event of an advance. A decision order which requires a memory to be read or written into after a decision to advance is an "early transfer" order. If the decision on such an early transfer order is to advance, then the memory reading or writing operation is carried out as a normal gating action under control of the Buffer Order Word Decoder BOWD and the Order Word Decoder OWD. However, if the decision is to transfer, the decision is advantageously made "early" to inhibit the gating associated with the memory reading or writing operation.

Other transfer orders which do not require a memory reading operation but which do require extensive data processing prior to making the decision are termed "late transfer" orders. These orders cannot employ the early transfer timing sequence in that the data processing operations required thereby are not necessarily completed by the time the early transfer signal would be generated.

Two input information sources for the decision logic comprise the output signals of the control homogeneity flip-flop and the control sign flip-flop which are employed to register homogeneity and sign information which is obtained from a number of locations. For example, a 23 bit data word appearing on the Masked Bus MB may be transmitted to the Control Homogeneity Circuit CH. If the data word comprises either all 0's or all 1's, the Control Homogeneity Flip-Flop 5020 will be set to its 1 state, otherwise the flip-flop will be reset. The Control Sign Circuit CS serves to retain the sign of the data word; the Control Sign Flip-Flop 5413 is set if the word is negative and is reset if the word is positive.

The Control Homogeneity Circuit CH and the Control Sign Circuit CS are utilized by some decision orders by gating the output of a selected index register onto the Unmasked Bus UB, through the Mask and Complement Circuit M&C, onto the Masked Bus MB, and from there into the Control Homogeneity Circuit CH and the Control Sign Circuit CS. The contents of one of the seven index registers specified in the decision order being processed are thereby summarized in the Control Homogeneity Flip-Flop 5020 and Control Sign Flip-Flop 5413. Further gating actions associated with a decision order carry out the transfer or advance according to the output of the Decision Logic DECL.

Similar homogeneity and sign circuits comprise part of the K Logic KLOG to provide facilities for a class of decision orders which transfer or advance according to combinations of the homogeneity and sign of 23 bit words contained in the K Register KR.

Communication Between the Central Control 101 and Connecting Units

A second basic function of Central Control 101 is the communication between itself and various other units such as the various memories within the Central Processor 100, the Switching Network 120, the Master Scanner 144, the Central Pulse Distributor 143, et cetera. Generally, communication is accomplished by way of the various bus systems of FIGS. 64–69 and logic circuits which are located in both Central Control 101 and the connecting units.

This communication consists of three general classes. The first class comprises the obtaining of program order words which determine the sequence of actions within Central Control 101. Program order words are primarily obtained from the Program Store 102; however, in special instances program order words for limited actions may be obtained from a Call Store 103. The second class comprises the obtaining of data (excluding program order words) from the memory units within the Central Processor 100, and the third class comprises the generation and transmission of commands to the various network units such as the Switching Network 120, the Master Scanner 144, the Central Pulse Distributor 143, et cetera.

The several memories within the Central Processor 100, namely the Program Store 102, the Call Store 103, the Auxiliary Buffer Registers 3105, 3118, 3605, 3617, 4103, 4603, 5105-5107, 5500, 5902, 6205, 3206, 3703-3708, 4206, 4211, 4717, 4725, 5201, 5209-5211, 5604, 5605, 6002, 6003, 6302 and 6307 (ABR-1 . . . ABR-N [FIG. 9]), and certain other special locations within Central Control 101 are treated as a memory unit and distinct blocks of addresses are individually assigned to each of the memories. There are a number of memory orders which are employed to selectively obtain information from the above memories and to place this information in selected registers within Central Control 101; these are memory reading orders. There are other memory orders which are employed to selectively transmit data from designated registers within Central Control 101 to one of the above memories; these are memory writing orders. The order structure is thus simplified since access to all of the above-mentioned memory locations is by way of a single memory address format.

A memory code-address within Central Control 101 always comprises a twenty bit word consisting of:

1. A code to define a block of information; and
2. An address within the specified block.

The code and the address each vary in length according to the memory unit addressed. For example, the codes for specifying information blocks in the program store are 4 bits long, and the corresponding address is sixteen bits long; the codes for specifying information blocks in the Call Store 103 are 8 bits long and are accompanied by 12 bit addresses. However, as will be seen later, the code-address which is transmitted to the Call Store 103 comprises an 18 bit portion of the word, namely a six bit code and a 12 bit address.

Program Order Words

The communication between the Central Control 101 and the Program Store 102 to obtain program order words may be understood generally with reference to FIG. 9 and in greater detail through a consideration of the central control detail drawings FIGS. 10 through 63 and the timing diagram FIG. 84. The Program Address Register 4801 (PAR FIG. 9) and the Auxiliary Storage Register 4812 (ASR FIG. 9) are selectively employed in transmitting commands to the Program Store 102. The Program Address Register 4801 is employed in the absence of uncorrectable program store reading errors. The Auxiliary Storage Register 4812 is employed whenever a Program Store 102 must be reread. When a command is transmitted from the Program Address Register 4801 to the Program Store Address Bus System 6400 the code-address of the command is also transmitted to the Auxiliary Storage Register 4812. The Auxiliary Storage Register 4812 thus serves to temporarily hold the code-address which is employed in the performance of Hamming error checks. These checks are applied simultaneously to the order returned and the address employed in obtaining the order. Commands to the Program Store 102 to read information from the memory proper as opposed to test points within the memory access and control circuitry comprise twenty-five bits as follows:

A. 16 address bits A0 through A15,
B. 4 code bits K0 through K3,
C. 4 mode bits CM, HM, GM, CRW,
D. a single synchronizing bit SYNC.

The code bits K0 through K3 define the block of information in which the selected program store word is located and the address bits A0 through A15 define the memory location within the above defined block of information. The four mode bits specify the mode of operation of the program stores as set forth below. It should be noted that the Program Store 102 is always operated in the normal mode in the course of obtaining program order words. The two maintenance modes and the read control and write control modes are reserved for obtaining from the program store information which is to be treated as data as opposed to program order words.

| HM | GM | CM | CRW | Mode |
|---|---|---|---|---|
| 0 | 0 | 0 | 0 | Normal |
| 0 | 1 | 1 | 0 | Maintenance H |
| 1 | 0 | 1 | 0 | Maintenance G |
| 1 | 1 | 0 | 0 | Read Control |
| 1 | 1 | 0 | 1 | Write Control |

Figure 33:
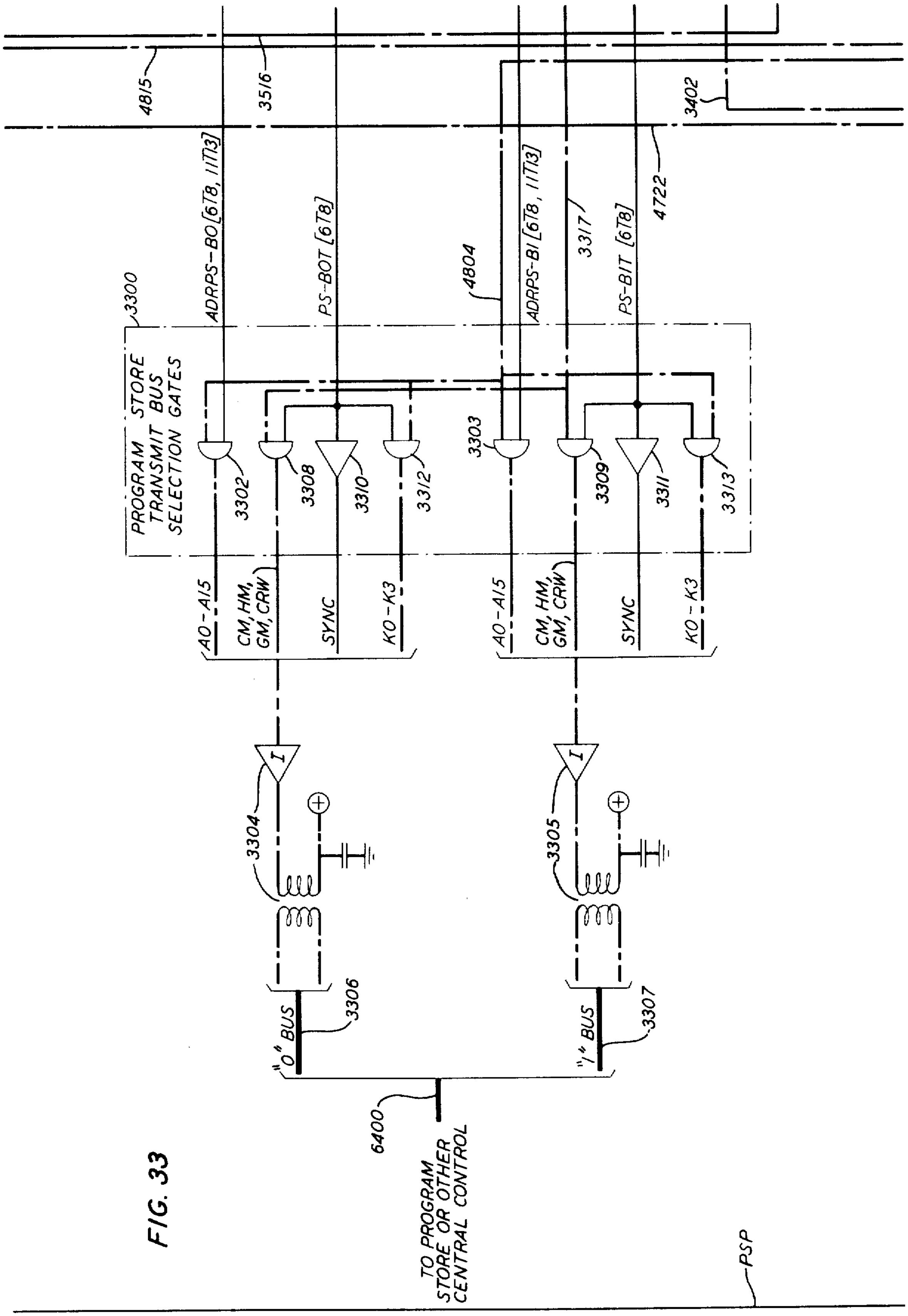
Figure 34:
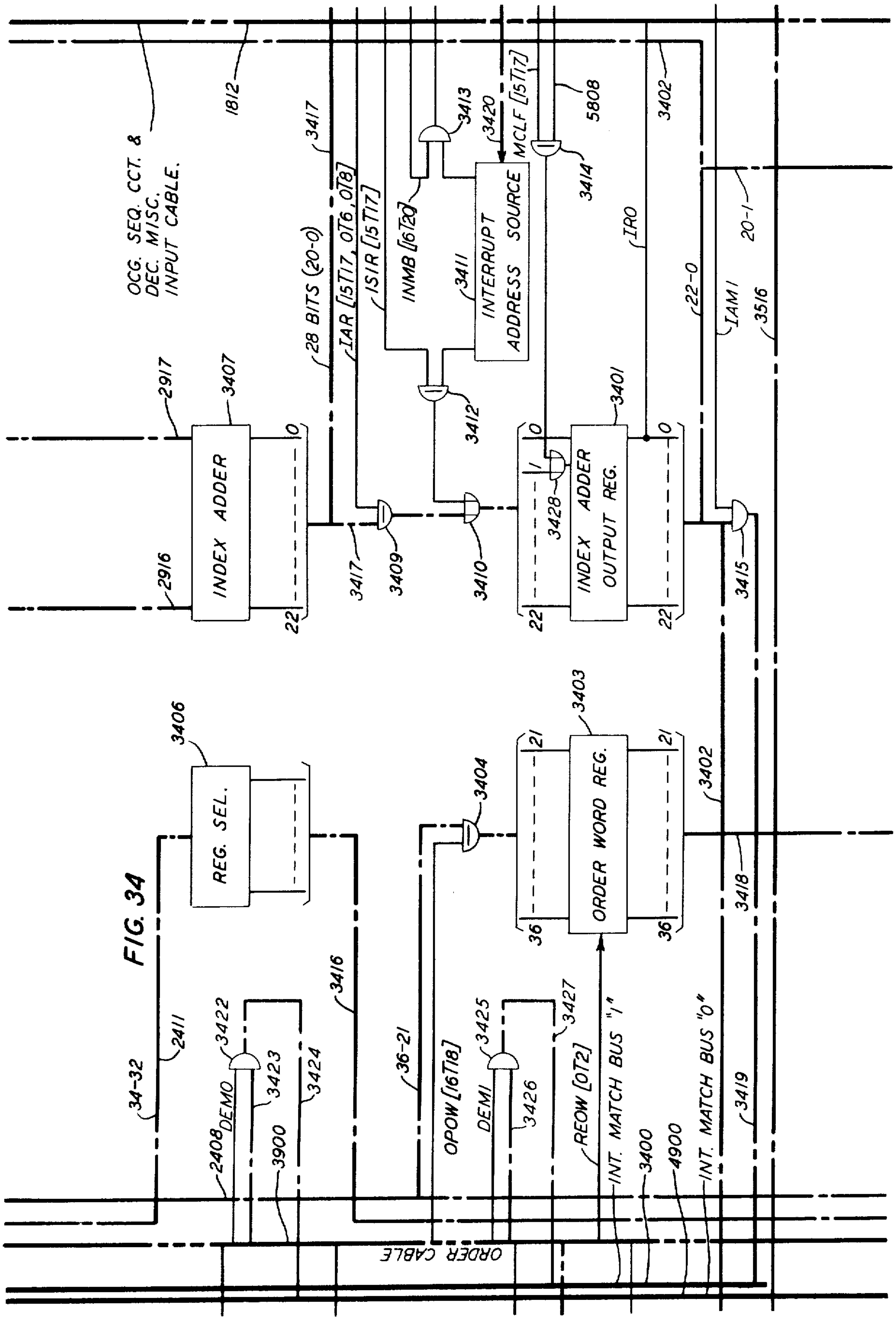

The sync pulse SYNC [FIG. 33] is employed as a gating signal at the program stores and serves to reduce the time during which the program stores are vulnerable to noise signals on their command buses.

The code and address portions of the program store commands are obtained from the Program Address Register 4801 or the Auxiliary Storage Register 4812 and the four mode bits and the synchronizing bit are obtained from the Order Cable 3900. The four mode bits are required to be selectively other than "0" in all modes other than the normal mode and in these modes the mode bits are defined by the program order word being executed.

The contents of the Program Address Register 4801 (PAR) or the contents of the Auxiliary Storage Register 4812 (ASR) are selectively gated via AND gates 4805 and 4813, respectively, to the input terminals of the OR gate 4806. AND gate 4805 is enabled by an order cable signal on conductor 48PAPS and AND gate 4813 is enabled by an order cable signal on conductor 48ASPS. Information appearing on selected output conductors of OR gate 4806 is encoded, and the encoded information is transmitted to the cable 4804. Bits 0 through 11 and 13 through 15 are passed without modification; however, bits 6 and 12 are combined in the EXCLUSIVE-OR gate 4803 to form bit 12 of the command address. The EXCLUSIVE-OR function involving bits 6 and 12 of the address provides information which is required at the program store to choose the appropriate program store tape, i.e., the A tape or the B tape. Bits 16 through 19 as received from the OR gate 4806 are translated from the 4 bit binary code to a 2-out-of-4 code in the Translator 4802. As previously explained, the Program Store 102 is arranged to selectively respond to 2-out-of-4 code signals.

The translated code-address is transmitted via cable 4804 to the Program Store Transmit Bus Selection Gates 3300. The remaining information signal inputs to the Program Store Transmit Bus Selection Gates 3300 comprise the mode bits CM, HM, GM, and CRW which are received from the Order Cable 3900 via conductor group 3317 and the synchronizing bits PS-B1T [FIG. 33] and PS-B0T [FIG. 33].

The Program Store Transmit Bus Selection Gates 3300 are divided into two groups, namely, those employed for transmitting to the "0" bus 3306 of the Program Store Address Bus System 6400 and those associated with the "1" bus 3307 of the Program Store Address Bus System 6400. The command information is selectively transmitted to the "0" bus and/or the "1" bus of the Program Store Address Bus System 6400 in accordance with the Program Store 102-Central Control 101 bus configuration which is being employed. That is, if information is being transmitted from the Central Control 101 to the Program Store 102 via the "0" bus 3306, AND gates 3302, 3308, and 3312 and amplifier 3310 are employed; however, if commands are being transmitted by the "1" bus 3307, AND gates 3303, 3309, and 3313 and amplifier 3311 are employed. The address bits A0 through A15 are selectively gated through the AND gates 3302 and 3303 by signals on order cable conductors ADRPS-B0 and ADRPS-B1 [FIG. 33], respectively. Similarly, the K bits K0 through K3 and the mode bits are selectively transmitted via AND gates 3308, 3312, 3309 and 3313 by order cable signals on conductors PS-B0T and PS-B1T, respectively. Signals on PS-B0T and PS-B1T are also transmitted through their associated amplifiers 3310 and 3311 to provide the synchronizing bit of the program store command.

The output conductors of AND gates 3302, 3308, and 3312 and amplifier 3310 are transmitted via the Cable Driver 3304 to the "0" bus 3306; and the output conductors of AND gates 3303, 3309 and 3313 and amplifier 3311 are transmitted via the Cable Driver 3305 to the "1" bus 3307. The Cable Drivers 3304 and 3305 each comprise a plurality of pulse inverting amplifiers and transformers which couple the Program Store Transmit Bus Selection Gates 3300 to the "0" bus 3306 and the "1" bus 3307.

Figure 55:
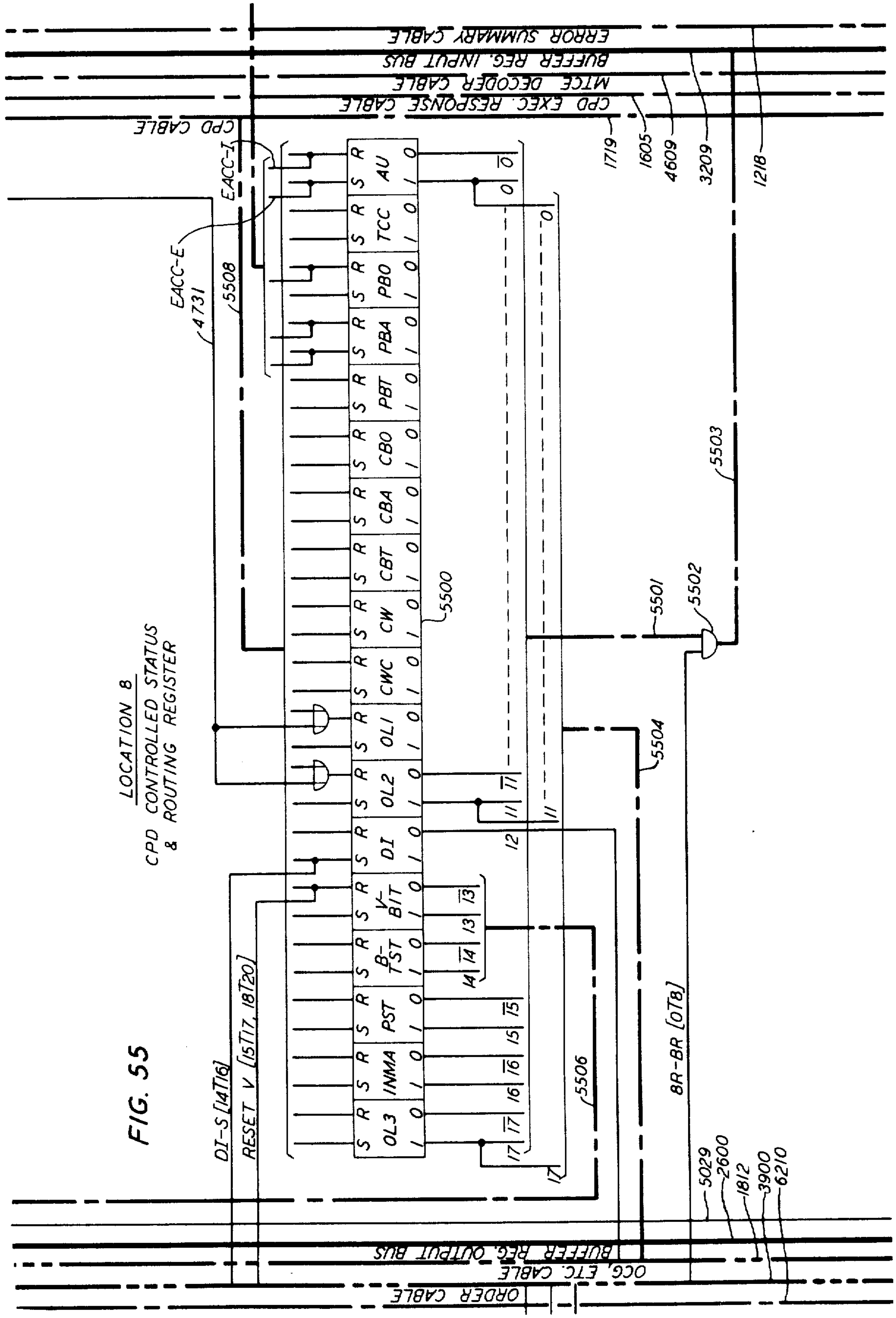
Figure 56:
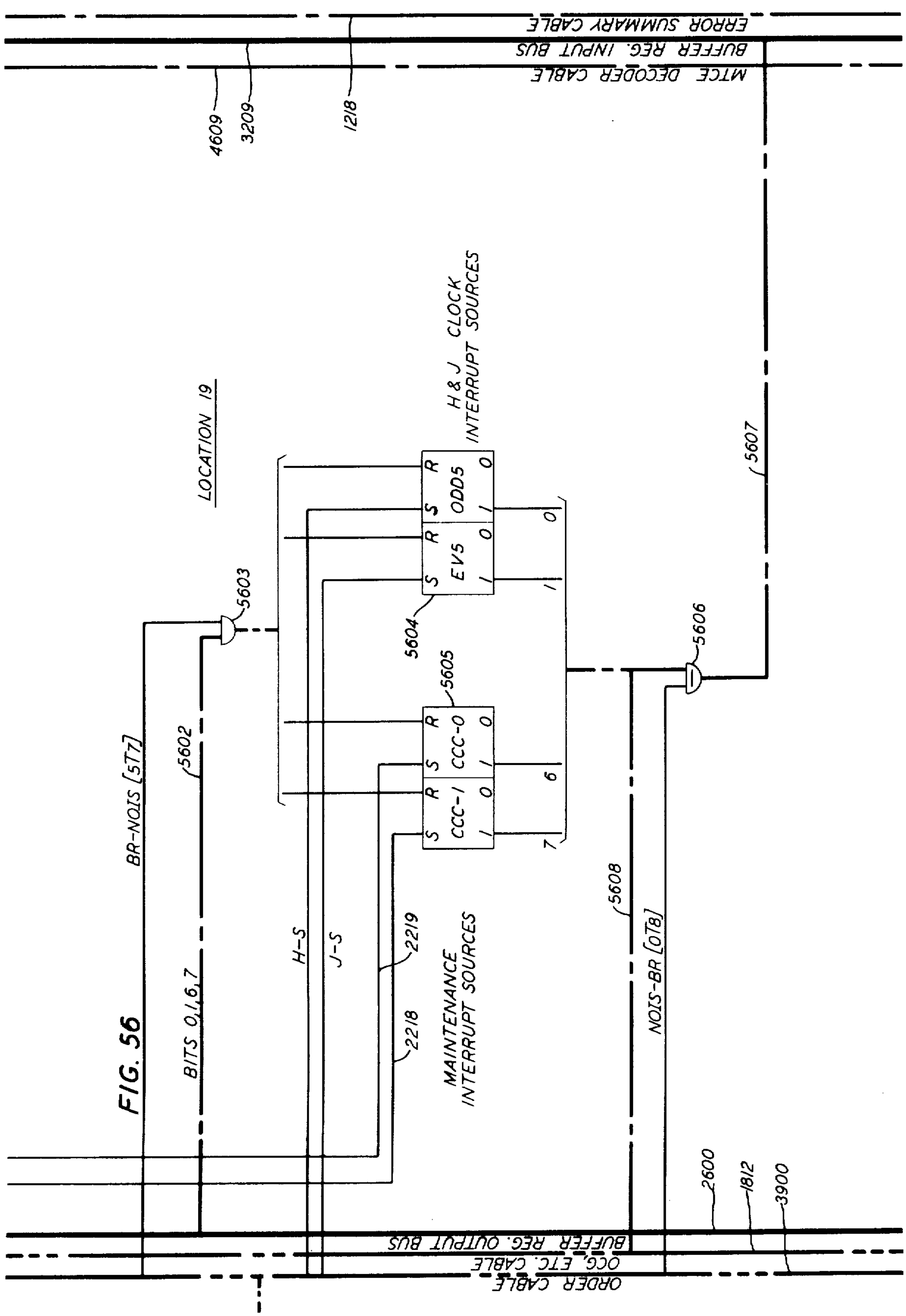
Figure 57:
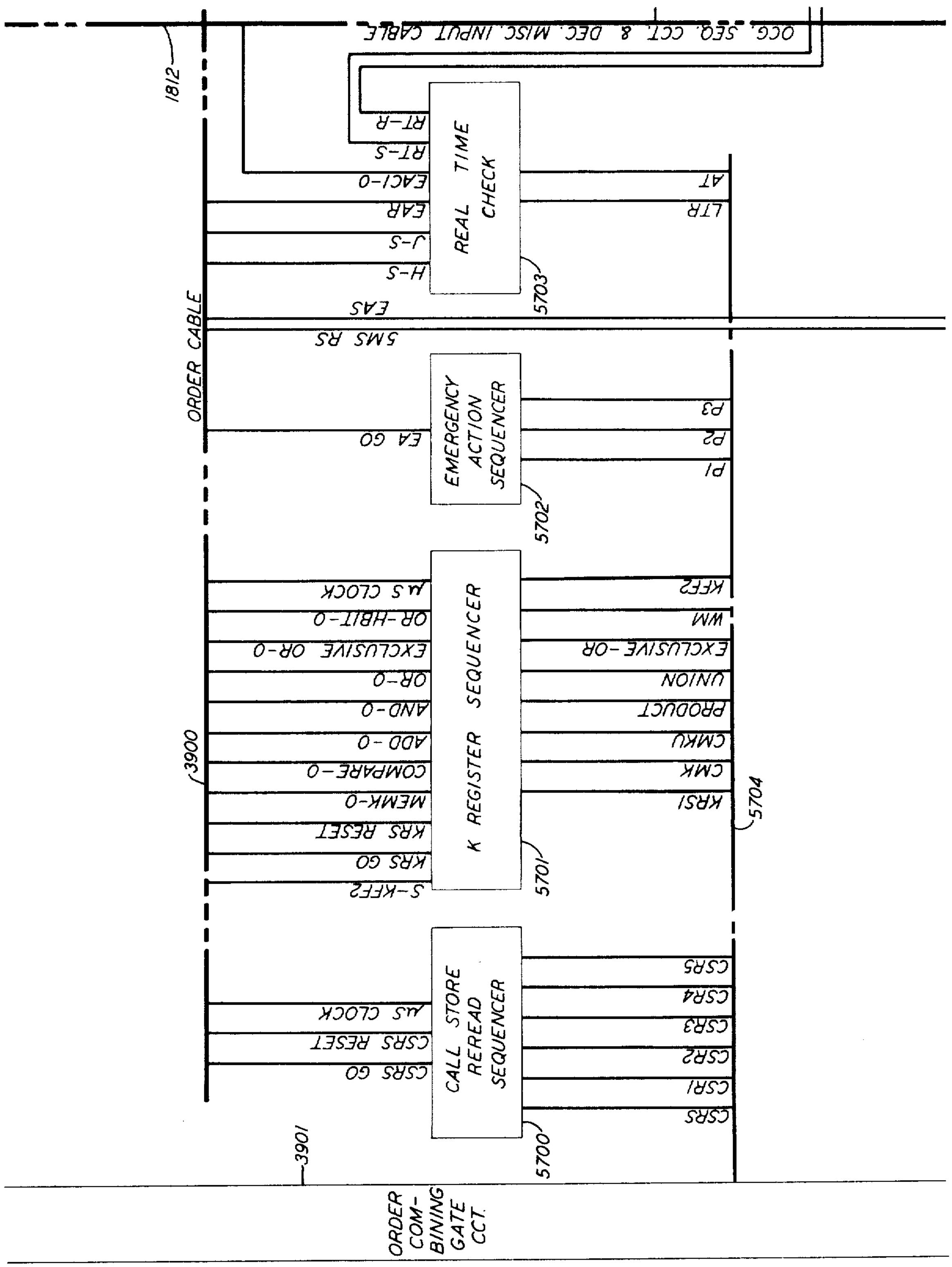
Figure 58:
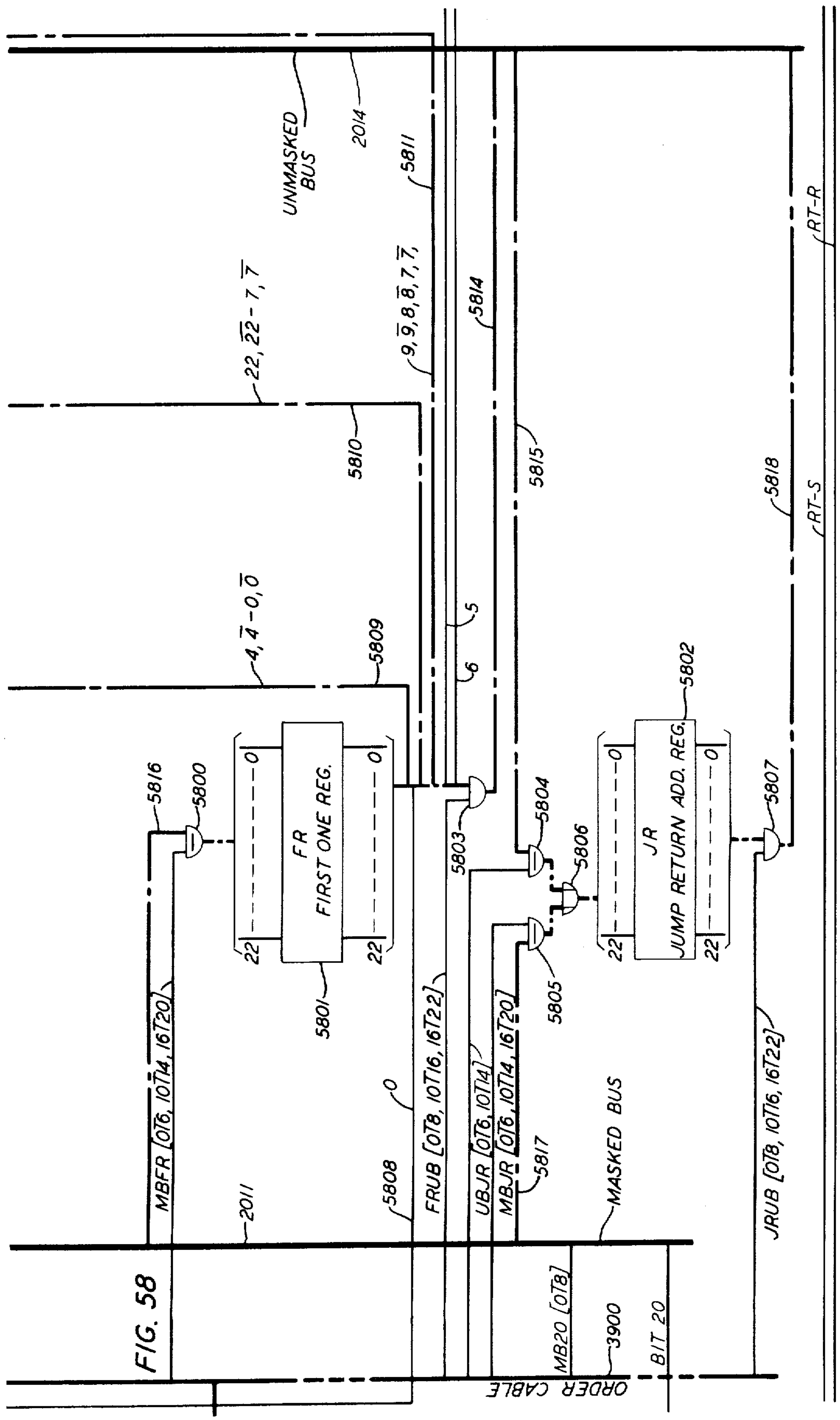

The Program Store Transmit Bus Selection Gates 3300 are selectively enabled in accordance with the setting of the central pulse distributor controlled status and routing register flip-flops AU, PBO, PBA, and PBT [FIG. 55]. The state of flip-flop AU indicates which of the two units is the active central control. The flip-flops PBO, PBA, and PBT (except for commands to read or write control or maintenance data) have the following significance:

| | | | Active CC | | Standby CC | |
|---|---|---|---|---|---|---|
| PBO | PBA | PBT | Send | Receive | Send | Receive |
| 0 | 0 | 0 | 0 | 0 | 1 | 1 |
| 0 | 1 | 0 | 1 | 1 | 0 | 0 |
| 1 | 0 | 0 | 0&1 | 0 | X | 1 |
| 1 | 1 | 0 | 0&1 | 1 | X | 0 |
| 1 | 0 | 1 | 0&1 | 0 | X | 0 |
| 1 | 1 | 1 | 0&1 | 1 | X | 1 |

In the above table the X indicates that the standby CC is to send on neither the "0" nor the "1" bus as the active CC is engaged in transmitting to both buses.

The status and routing flip-flops AU, PBO, PBA, and PBT are selectively set and reset by pulses received from the Central Pulse Distributor 143 via selected pairs of the Bipolar Cable 6700, the transformer 1707, amplifiers 1708 and 1711, AND gates 1709 and 1712 and the CPD cable 1719.

The flip-flops PBO, PBA, and PBT in the two central controls are driven by the same CPD points, that is, when the flip-flop PBO in the first central control is set its counterpart PBO in the other central control is also set. The flip-flops AU (active unit) in the two central controls are controlled by a single central pulse distributor bipolar signal point; however, the bipolar signal which serves to set the AU flip-flop in the first central control serves to reset the AU flip-flop in the second central control. Similarly, the CPD signal which serves to reset the AU flip-flop in the first central control serves to set the AU flip-flop in the second central control.

Figure 43:
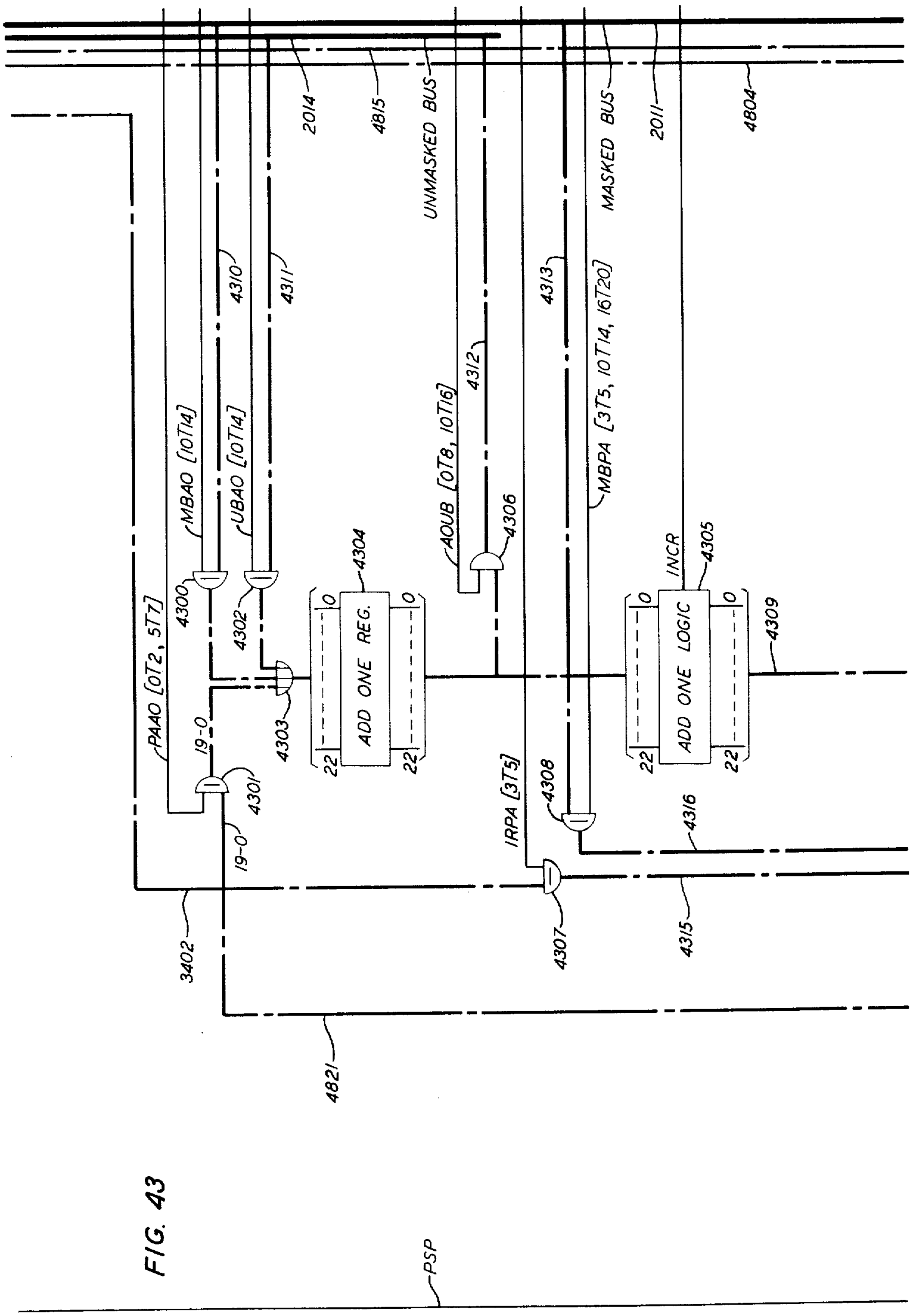
Figure 44:
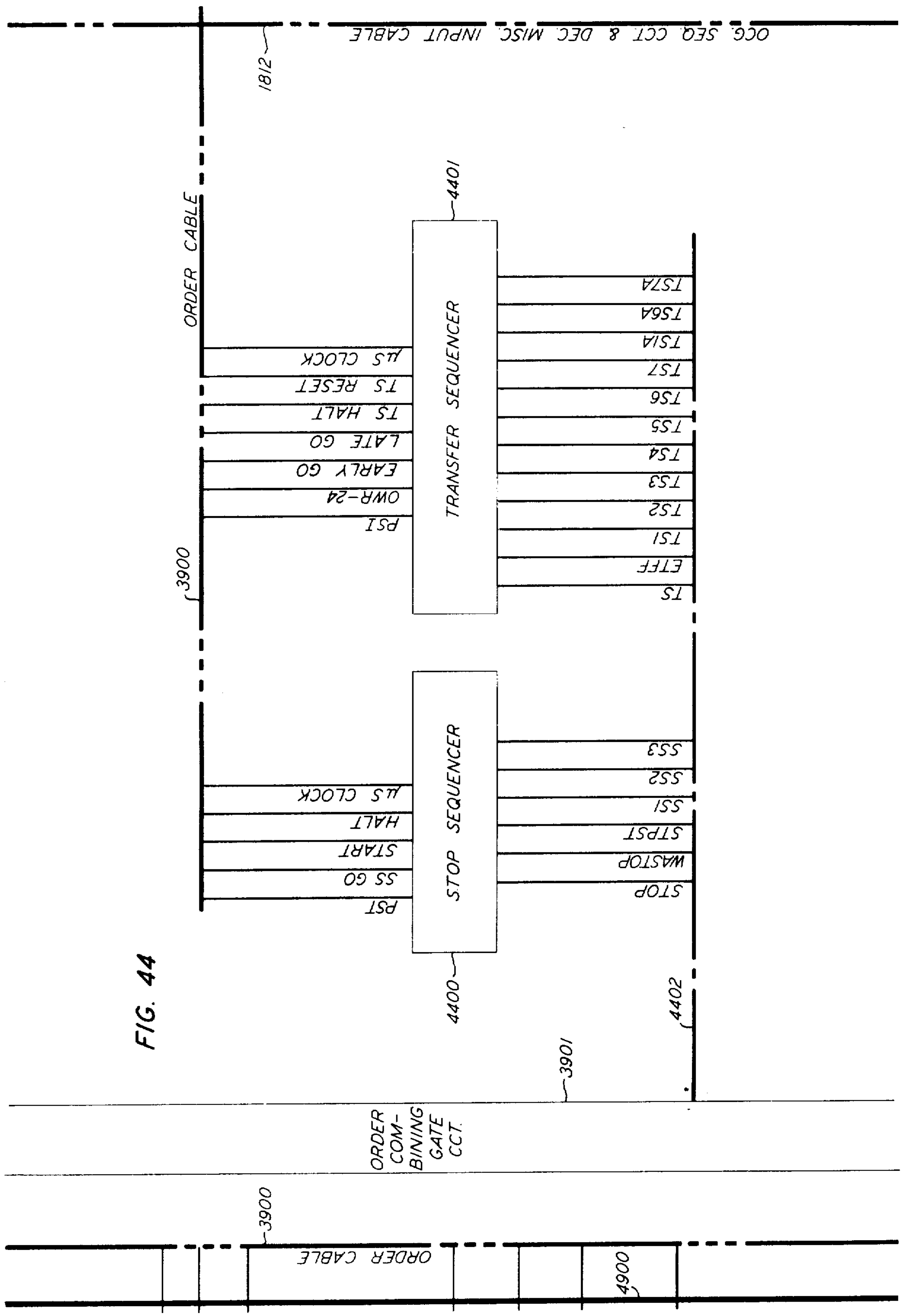
Figure 45:
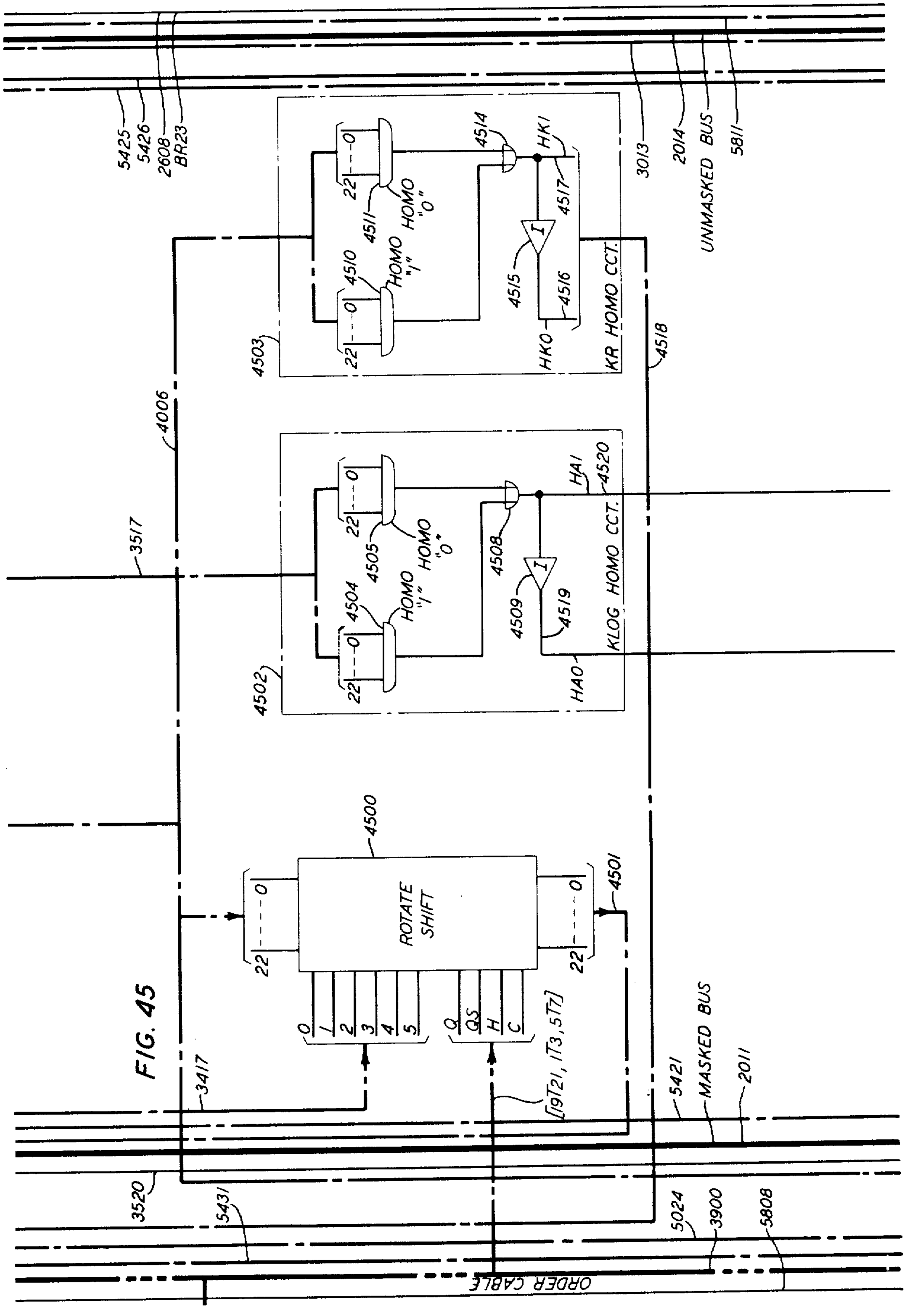
Figure 46:
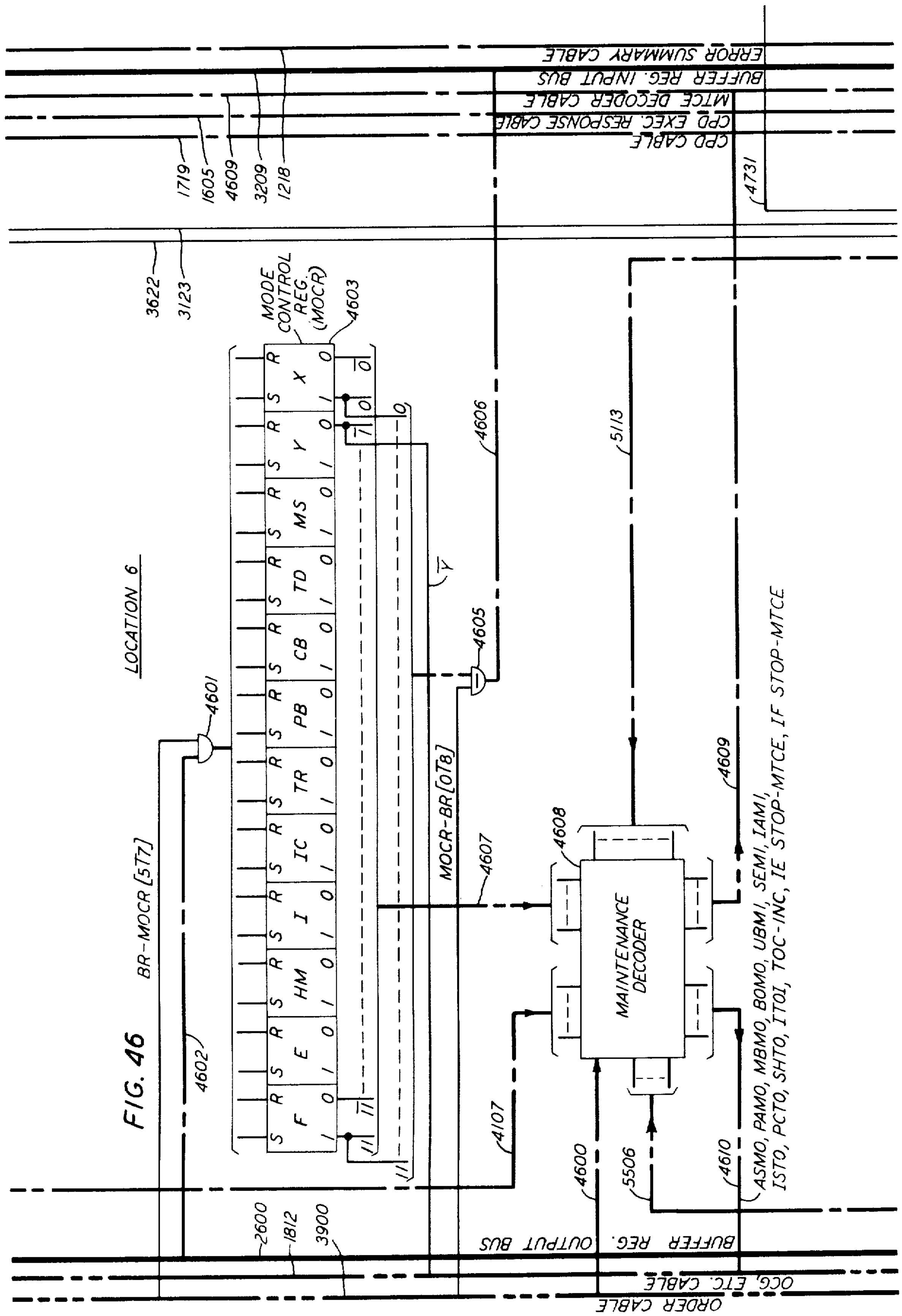
Figure 47:
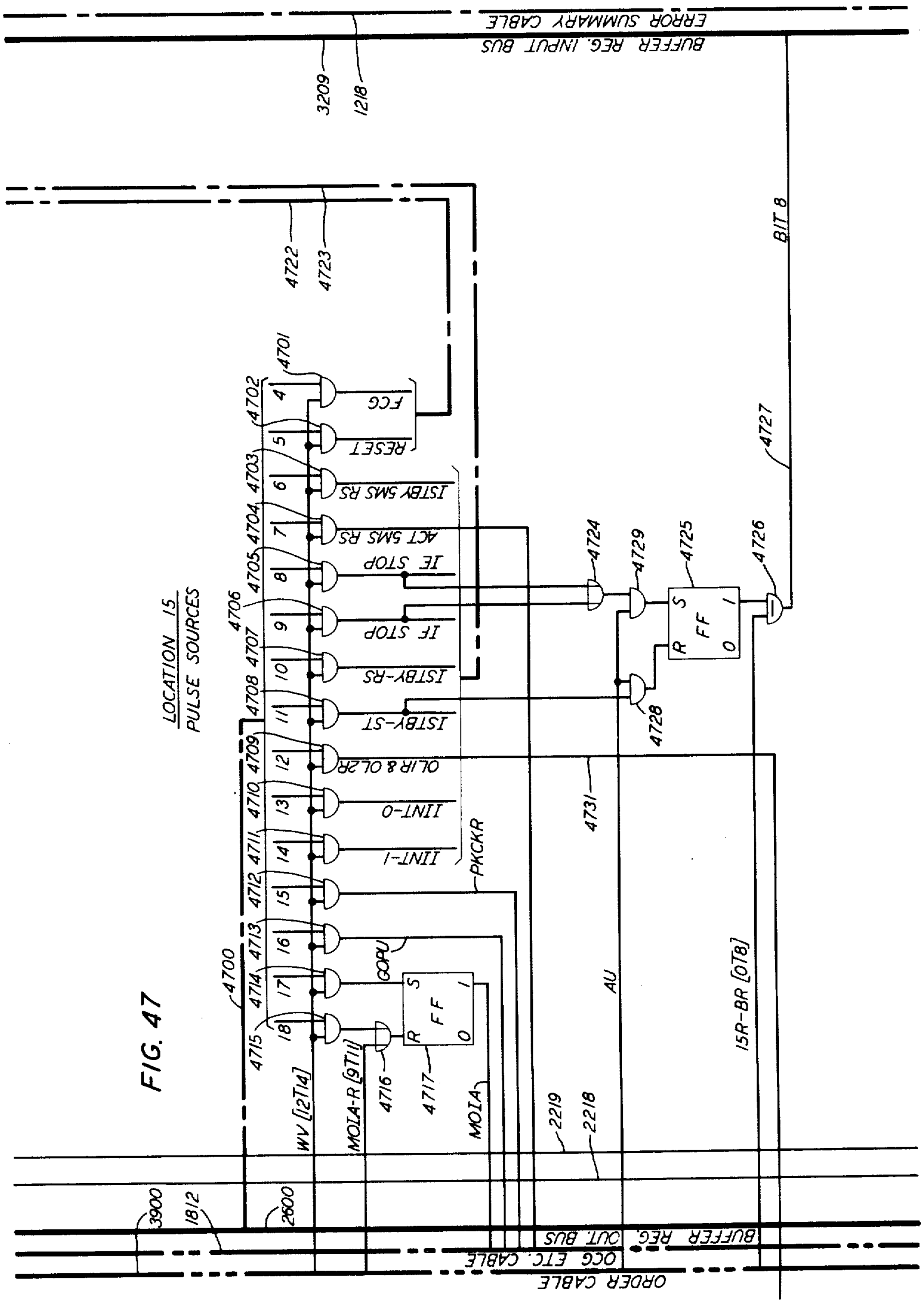
Figure 48:
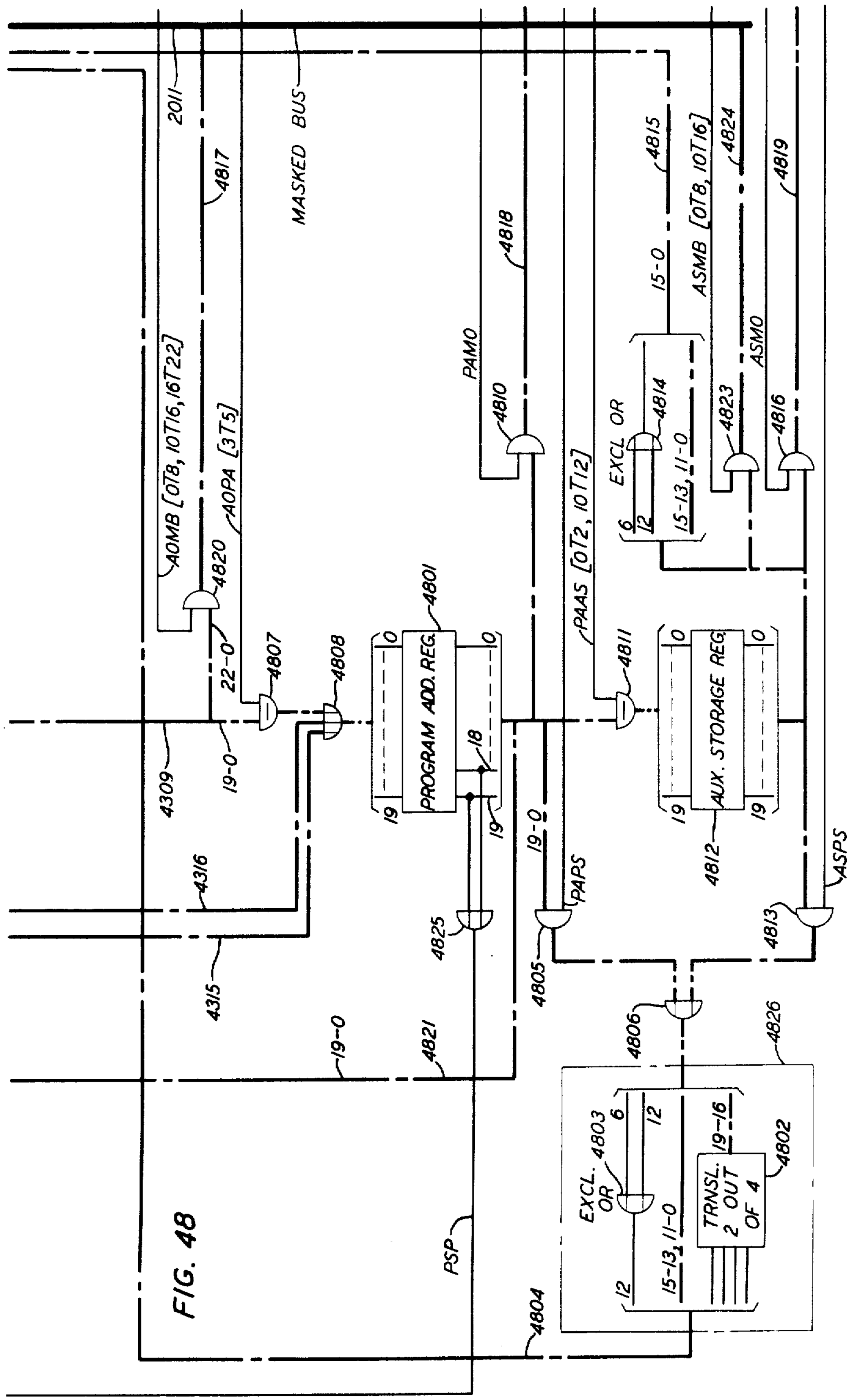
Figure 49:
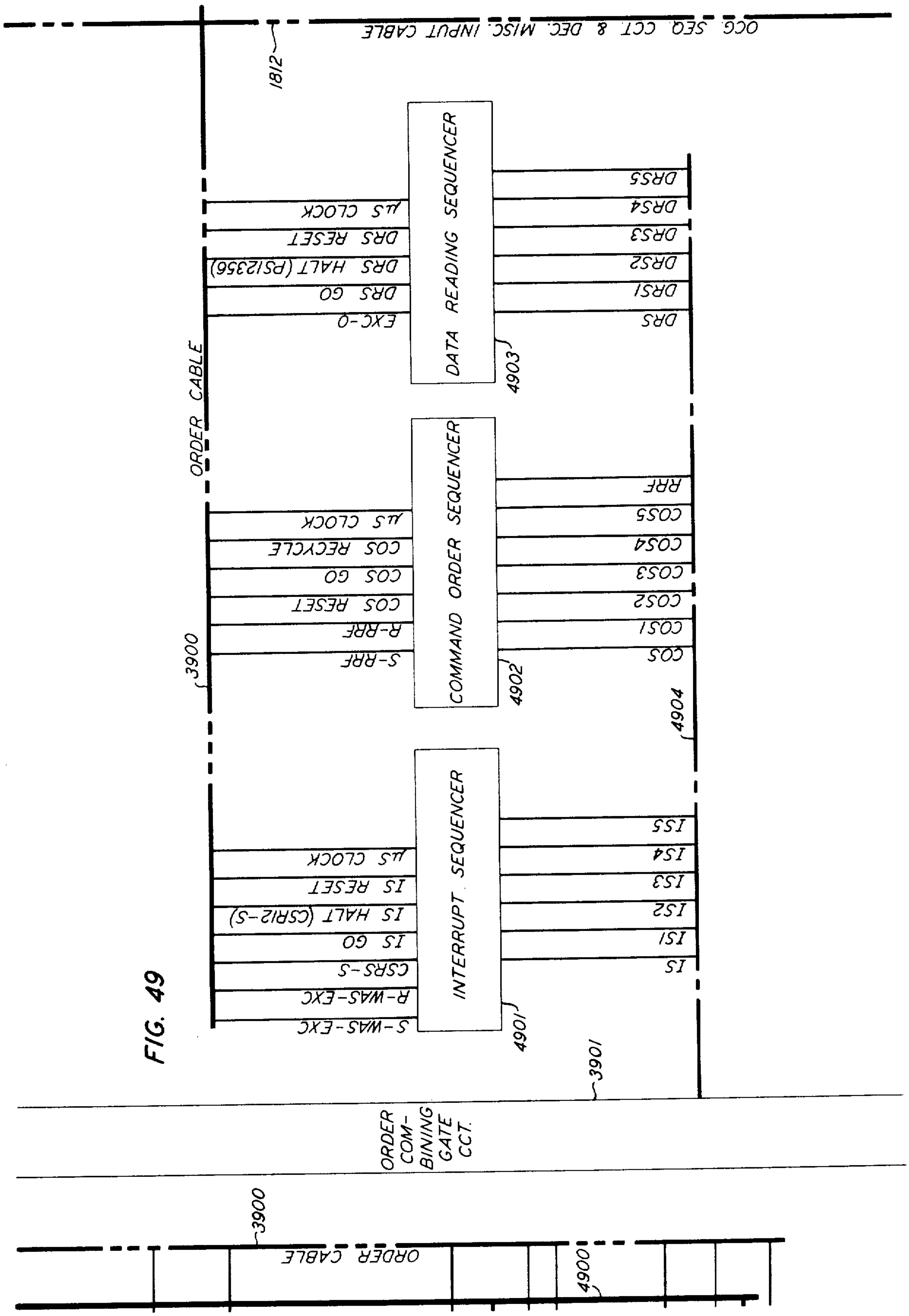

The information required to define the code-address of a program store command is transmitted to the Program Address Register 4801 by one of three possible paths, the chosen path being determined by the sequence of events which lead to the determination of the desired address and code. The desired code-address is selectively obtained by one of the following methods:

A. In the course of executing a sequence of program order words and in the absence of a transfer decision, the code-address of the next order word in the sequence is obtained by incrementing the code-address of the preceding order word by a count of 1. This incrementing function is accomplished by means of the Add-One Register 4304 and the Add-One Logic 4305. The contents of the Program Address Register 4801 are transmitted via cable 4821, AND gate 4301, and OR gate 4303 to the Add-One Register 4304. The AND gate 4301 is enabled by an order cable signal on conductor PAAO [FIG. 43] at time OT2. The code-address in the Add-One Register 4304 comprises the input to the Add-One Logic 4305 which when enabled by signals on conductor INCR [FIG. 43] serves to increment the input word by a count of 1. The output of the Add-One Logic 4305 is gated to the Program Address Register 4801 via AND gate 4807 and OR gate 4808 at time 3T5 by a signal on order cable conductor AOPA [FIG. 48].

From the above sequence it is seen that a very small portion of the 5.5 microsecond operational step cycle is employed in incrementing the address in the Program Address Register 4801. That is, the total time required to increment the address and to return the incremented address to the PAR 4801 is the period of time 0T5. Completion of address incrementing in this period of time frees the Add-One Register 4304 and the Add-One Logic 4305 to permit their use for other work functions during the remainder of the cycle. The Add-One Register 4304 and the Add-One Logic 4305 are arranged to operate with twenty-three bit words for these other work functions.

B. The second source of program store code-address words is the Index Adder Output Register 3401. The Index Adder Output Register 3401 is provided to store the DAR word as described earlier herein. The contents of the Index Adder Output Register 3401 are transmitted via cable 3402, AND gate 4307, and OR gate 4808 to the Program Address Register 4801. This transfer of information is accomplished by enabling order cable conductor IRPA [FIG. 43].

C. The third source of code-address information is the Masked Bus 2011, the contents of which are gated to the Program Address Register 4801 via cable 4313, AND gate 4308, and OR gate 4808 at time 3T5 by enabling order cable conductor MBPA [FIG. 43]. This path is employed in the case of interrupts to gate code-address words to the Program Address Register 4801 from the Interrupt Address Source 3411 and is also employed on early transfer orders to gate the contents of the J Register 5802 or the Z Register 3002 to the Program Address Register 4801.

The transmittal of commands from the Central Control 101 to the Program Store 102 and the transmittal of the program store responses to the Central Control 101 may be understood by reference to FIG. 84. In FIG. 84 the three horizontal lines represent functions which occur with respect to arbitrary orders X-1, X, and X+1, respectively. A machine cycle, as employed in the time scale of this figure, comprises a 5.5 microsecond period of time. A portion of an arbitrary cycle 1 and all of the following cycles 2 and 3 are shown. As seen in FIG. 84, the period of time between the transmission of the command to the Program Store 102 and the completion of the operational step associated with that command require greater than one 5.5 microsecond machine cycle. However, also as seen in FIG. 84, there are work functions relating to three separate orders being simultaneously performed; therefore, it is possible to complete single cycle orders at the rate of one order per 5.5 microsecond cycle.

At line X of FIG. 84 the code-address of order X is shown as being transmitted to the Program Store 102 during phase 1 of cycle 1 and the program store response thereto returned to the Central Control 101 sometime during the latter portion of cycle 1 or the early portion of cycle 2. The program store response comprises parallel ½ microsecond pulses which represent the 44 bit program order word, the response synchronizing signal and the All Seems Well signal.

Figure 12:
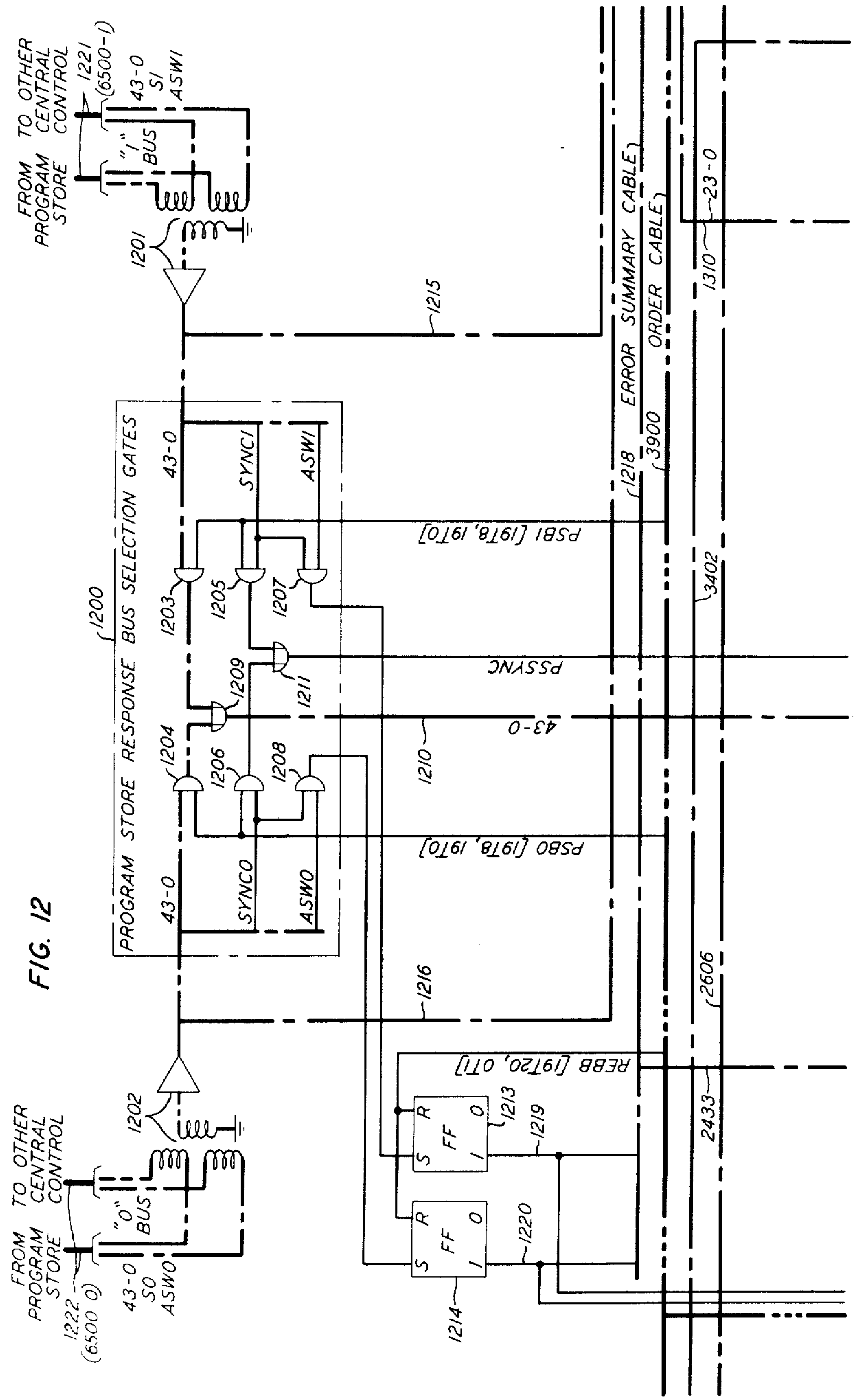

The exact time at which the program store response arrives at the Central Control 101 depends on central control response times, the lengths of the buses connecting the Central Control 101 and the Program Store 102 and the variations in the response times of the program stores of the Program Store System 102. These variations can result in the program store response arriving at the Central Control 101 as early as T19 of the same cycle in which the program store command was transmitted or as late as T6 of the following cycle. Accordingly, the Program Store Response Bus Selection Gates 1200 are activated by order cable signals on conductors PSB0 and PSB1 [FIG. 12] in the period 19T8. This assures the acceptance of the full pulse width (approximately 0.5 microseconds) of the program store response. The Program Store Response Bus Selection Gates 1200 are selectively enabled to accept the response from the "0" bus 6500-0 or from the "1" bus 6500-1 of the Program Store Response Bus System 6500. The particular gates enabled are determined in accordance with the setting of the CPD controlled status and routing flip-flops, as enumerated in the earlier table. If the response is to be accepted over the "0" bus 6500-0, the AND gates 1204, 1206, and 1208 are enabled by a signal on order cable conductor PSB0 and if the response from the "1" bus 6500-1 is to be accepted, the AND gates 1203, 1205, and 1207 are enabled by a signal on order cable conductor PSB1.

The 44 bit response word is transmitted through OR gate 1209 and cable 1210 for insertion in the Auxiliary Buffer Order Word Register 1901 and the Buffer Order Word Register 2410. Bits 0 through 20 (the data-address field) and bits 37 through 43 (the Hamming encoding bits) are gated directly into the Buffer Order Word Register 2410 via AND gates 1907 and 1906, and OR gates 2428 and 2425, respectively. Bits 21 through 36 (the operation field) are inserted into the Auxiliary Buffer Order Word Register 1901 via AND gate 1905. The synchronizing signal is transmitted through OR gate 1211 and is employed to enable AND gates 1905, 1906, and 1907 which serve to gate the received 44 bit word to the Auxiliary Buffer Order Word Register 1901 and the Buffer Order Word Register 2410.

The All Seems Well signal, if received from the "0" bus 6500-0, serves to set flip-flop 1214 to its "1" state and if received from the "1" bus 6500-1, sets the flip-flop 1213 to its "1" state. The flip-flops 1213 and 1214 comprise two of the inputs to the Error Detection and Correction Circuit 2400. Failure to receive an All Seems Well signal along with a program store response is an indication of possible trouble within the Program Store 102 therefore the validity of the response is in question. The All Seems Well signals summarize a number of hardware checks made within the Program Store 102, and the utilization of the All Seems Well signal as a maintenance tool is discussed later herein.

Figure 19:
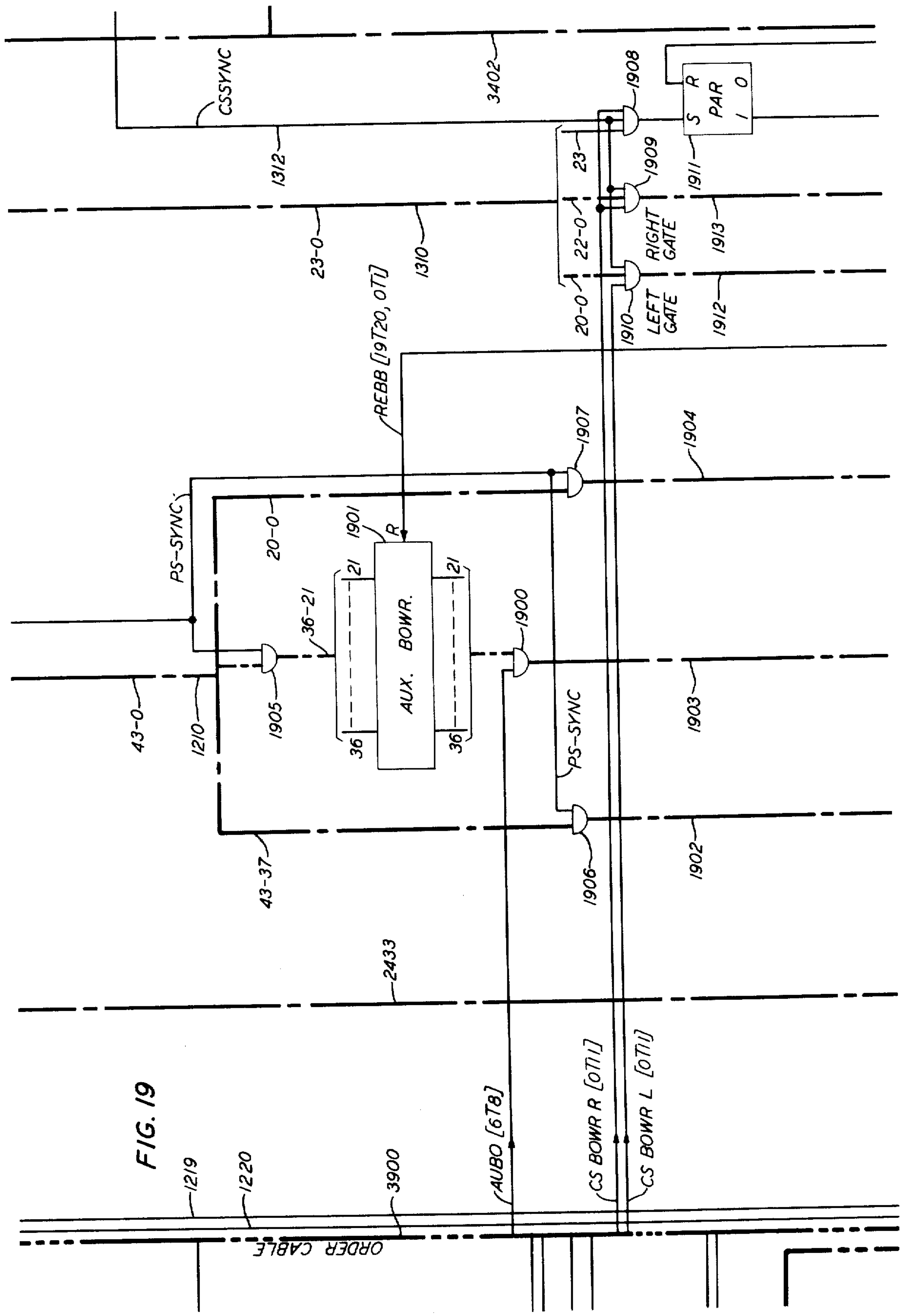

The data-address field and the Hamming encoding bits are gated directly to the Buffer Order Word Register 2410 as the portions of the register which are employed to store this information are no longer required by the immediately preceding order; however, the work operations with respect to the operation field of the preceding order may not have been completed by the time the program store response has arrived at the Central Control 101. Therefore the operation field is first inserted into the Auxiliary Buffer Order Word Register 1901 and then at time 6T8 by means of signal on order cable conductor AUBO [FIG. 19] is gated via AND gate 1900, cable 1903 and OR gates 2426, and 2427 to the Buffer Order Word Register 2410.

Figure 24:
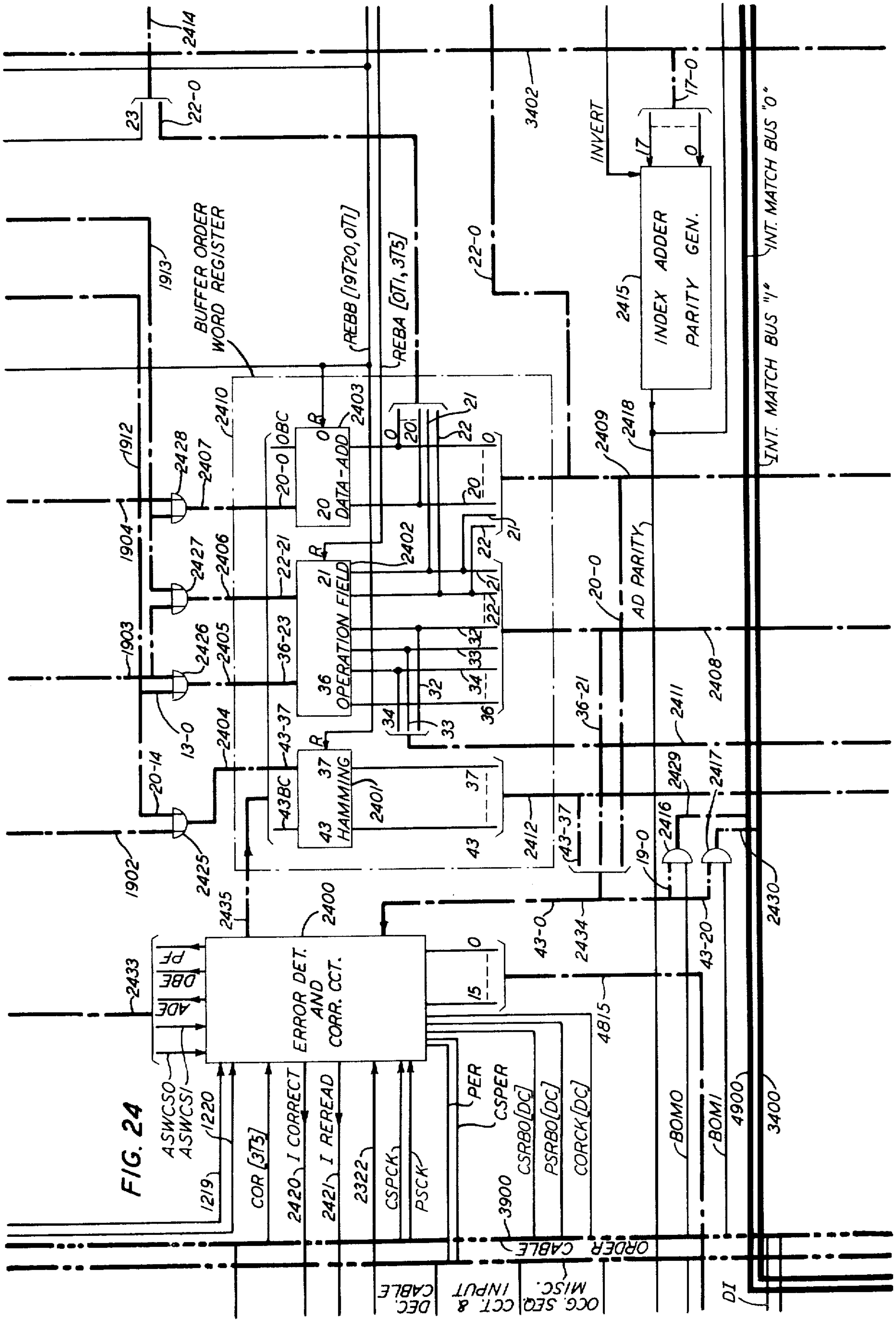

The information which is received both by the Auxiliary Buffer Order Word Register 1901 and the Buffer Order Word Register 2410 is on a single rail basis; therefore, both the Auxiliary Buffer Order Word Register 1901 and all of the portions 2401, 2402, 2403 of the Buffer Order Word Register 2410 are selectively reset prior to the time of the inserting of new information. A signal on order cable conductor REBB [FIG. 24] at time 19T20 serves to reset the data address portion 2403 and the Hamming portion 2401 of the Buffer Order Word Register 2410 and to reset the Auxiliary Buffer Order Word Register 1901. An order cable signal on conductor REBA [FIG. 24] at time 3T5 serves to reset the operation field 2402 of the Buffer Order Word Register 2410.

In a few special instances (principally in the course of maintenance actions) a transfer may be made to one of a number of short sequences of program orders which are located in the Call Store 103. The program sequences in the Call Store 103 may be reached through a system interrupt or through a transfer. In either event, the call store code-address corresponding to the first program order word of the sequence is gated into the Index Adder Output Register 3401 and from there to the Call Store Transmit Bus Selection Gates 1000. The detailed control of the call store bus selection gates will be described with respect to the reading and writing of data from and into the Call Store 103. The call store, in response to a program order command, returns a 23 bit reading to the Central Control 101 via the Call Store Response Bus System 6501. This response is gated through the Call Store Response Bus Selection Gates 1300 to the Buffer Order Word Register 2410.

The Call Store 103 returns approximately one-half of a program order word with a single reading. Therefore, two successive call store locations must be read. Conveniently, the Program Address Register 4801 and the add-one circuit comprising the Add-One Register 4304 and the Add-One Logic 4305 are employed to obtain the second code-address and subsequently the code-addresses for the following program order words to be obtained from a Call Store 103. To provide protection against an unwanted response from a Program Store 102 the call store code-addresses are not gated from the Program Address Register 4801 to the Program Store Address Bus System 6400.

The first call store word of a pair of words comprising a program order word is transmitted from OR gate 1309 via cable 1310, the right AND gate 1909, cable 1913 and the OR gates 2427 and 2428 to bits 22 through 0 of the Buffer Order Word Register 2410. The second call store word of the pair is transmitted from the OR gate 1309 via cable 1310, the left AND gate 1910, cable 1912 and the OR gates 2425 and 2426 to the bits 43 through 23 of the Buffer Order Word Register 2410. The reading of program order words from the Call Store 103 is most unusual. Two successive readings are required to obtain a single program order word. Therefore, the fetching of program order words from the Call Store 103 is under the control of the Call Store Program Sequencer 5302 which is described in greater detail later herein. It should be noted that Call Store Program order word responses are gated directly to the Buffer Order Word Register 2410 and not via the Auxiliary Buffer Order Word Register 1901. This simplification is permissible since the code-addresses for the next succeeding order are not transmitted until after the operational step for the preceding order has been completed.

Data Words

As previously described, a large body of information organized as data words as opposed to program order words is stored principally in the Call Store 103 and the Program Store 102. The more volatile information is stored principally in the Call Store 103, while the more stable information is stored in the Program Store 102. Additionally, maintenance data which is stored internally in the control and access circuits of the Program Store 102, the Call Store 103, and the standby central control is treated as data for purposes of communication.

Data words may be read from a memory location or written into a memory location by the execution of program orders termed "memory orders". Included in this term are "memory read orders" and "memory write orders". Memory orders cause the generation and transmission of commands to the various memory locations as follows:

| Memory | Read Command | Write Command |
|---|---|---|
| Call Store 103 | | |
| Memory Proper | X | X |
| Control and access | X | X |
| Program Store 102 | | |
| Memory Proper | X | — |
| Control and access | X | X |
| Standby Central Control 101 | — | X |
| Auxiliary Buffer Registers | X | X |

The above table shows that both memory read and memory write commands apply to many of the data memories; however, memory write commands cannot be employed with respect to the memory proper of the Program Store 102 nor can memory read commands be employed with respect to the standby Central Control 101.

Call Store Memory Orders

Memory reading (writing) orders which obtain (store) data from the Call Store 103 include call store reading (writing) commands as part of their operational step. The operational step of such orders is indicated by the example of order X in FIG. 84; in that example call store commands are generated and transmitted during phase 3 of the indexing cycle. If X is a memory reading order, the call store response will be transmitted from the Call Store 103 to the Data Buffer Register 2601 during phase 1 of the execution cyce; if X is a memory writing order, the word to be stored is transmitted frm the Data Buffer Register 2601 to the Call Store 103 during phase 1 of the execution cycle. Call store commands are also generated for multicycle orders under control of sequence circuits, but the command and data generation and transmission have the same format and relative time sequence as described below.

A call store command comprises:

A. 12 address bits A0 through A11

B. 6 code bits K0 through K5

C. 3 mode bits HM, GM, CM

D. A first synchronizing bit Sync 1

E. 2 order bits R and W

F. 1 address parity bit

G. A second synchronizing bit Sync 2.

The code bits K0 through K5 define the block of information in which the selected call store data word is located and the address bits A0 through A11 define the memory location within the above defined block of information. The code bits K0 through K5 and the address bits A0 through A11 comprise the call store code-address. The three mode bits specify the mode of operation of the Call Store 103 and the order bits specify whether the cmmand is to read or to write. It should be noted that the Call Store 103 is always operated in the normal mode in the execution of memory read and memory write commands relating to call processing. The maintenance read and write commands and the control read and write commands are reserved for obtaining information frm the Call Store 103 and writing into the Call Store 103 in the execution of special memory read and memory write orders relating to system maintenance. Pulses on the leads HM, GM, and CM specify the mode of operation of the Call Store 103 as follows:

| HM | GM | CM | Mode |
|---|---|---|---|
| 0 | 0 | 0 | Normal |
| 0 | 1 | 1 | H Maintenance |
| 1 | 0 | 1 | G Maintenance |
| 1 | 1 | 0 | Control |

Pulses on the R and W conductors specify that the order is a call store read command or a call store write command, respectively.

The 12 address bits A0 through A11, the six code bits K0 through K5, and the address parity bit comprise a 19 bit segment of the command in which odd parity is maintained.

The first synchronizing signal Sync 1 accompanies the address, code, and mode bits and the second synchronizing signal Sync 2 accompanies the information on the R, W, and parity conductors. The synchronizing pulse S1 and S2 are employed as gating signals at the Call Store 103 and serve to reduce the time during which the Call Store 103 is vulnerable to noise signals on its command buses.

The execution of memory orders by Central Control 101 to move data words between the Call Store 103 and the Central Control 101 is initiated by the transmission of call store commands from Central Control 101 to the Call Store 103 via the Call Store Address Bus System 6401. If the command is to write a data word into the Call Store 103, then the command is followed by the transmission of the data word via the Call Store Write Data Bus System 6402. If the command is to read a data word, then the call store read command is followed by the transmission of the data word from the Call Store 103 to Central Control 101 via the Call Store Response Bus System 6501.

In executing a call store command the code-address is always composed in the Index Adder Output Register 3401 which is connected to the Call Store Transmit Bus Selection Gates 1000 via the cable 3402. Bits 17 through 12 of the index adder output register comprise the code portion of the command and bits 11 through 0 comprise the address portion of the command. The three mode bits, the synchronizing bits, and the read-write bits are all obtained from the Order Cable 3900. The three mode bits are required to be selectively other than zero in all modes other than the normal mode and in these modes the mode bits are defined by the program order word being executed. In all mode of operation the read and write bits and the synchronizing bits are also obtained from the Order Cable 3900 according to the call store command required.

The parity signal generated as part of the call store command is generated in the Index Adder Parity Generator 2415 in response to the code-address appearing at the outputs of the Index Adder Output Register 3401 and transmitted thereto via the cable 3402.

The Call Store Transmit Bus Selection Gates 1000 are divided into two groups, namely, those employed for transmitting to the "0" bus 1004 of the Call Store Address Bus System 6401 and those associated with the "1" bus 1003 of the Call Store Address Bus System 6401. The command information is selectively transmitted to the "O" bus 1004 or the "1" bus 1003 in accordance with the Call Store 103-Central Control 101 bus configuration which is being employed. That is, whenever information is being transmitted from the Central Control 101 to the Call Store 103 via the "O" bus 1004, AND gates 1006, 1008, 1012, 1014, and 1016 and amplifiers 1010, 1018 are employed; however, when commands are transmitted via the "1" bus 1003, AND gates 1005, 1007, 1011, 1013 and 1015 and amplifiers 1009 and 1017 are employed. The address bits A0 through A11 and the code bits K0 through K5 are selectively transmitted through AND gates 1016 and 1015 enabling order cable conductors ADRCSB0 and ADRCSB1 [FIG. 10], respectively. Similarly, the mode bits HM, GM, and CM and the first of the two synchronizing pulses S1 are transmitted to the "0" and "1" buses under the control of the same order cable conductors. It should be noted that the order cable conductors ADRCSB0 and ADRCSB1 are enabled at time 17T19. Order cable conductors RWCSB0 and RWCSB1 are enabled at time 19T21 and serve to gate the READ, the WRITE, the ADDRESS PARITY and SYNC 2 pulses to their respective buses.

The Call Store Transmit Bus Selection Gates 1000 are selectively enabled in accordance with the setting of the central pulse distributor controlled status and routing register flip-flops AU, CBO, CBA, and CBT [FIG. 55]. The state of flip-flop AU indicates which of the two central controls is active. The flip-flops CBO, CBA, and CBT (except for commands to read or write maintenance data) have the following significance:

| | | | Active CC | | Standby CC | |
|---|---|---|---|---|---|---|
| CB0 | CBA | CBT | Send | Receive | Send | Receive |
| 0 | 0 | 0 | 0 | 0 | 1 | 1 |
| 0 | 1 | 0 | 1 | 1 | 0 | 0 |
| 1 | 0 | 0 | 0& 1 | 0 | X | 1 |
| 1 | 1 | 0 | 0& 1 | 1 | X | 0 |
| 1 | 0 | 1 | 0& 1 | 0 | X | 0 |
| 1 | 1 | 1 | 0& 1 | 1 | X | 1 |

In the above table the X indicates that the standby CC is to send on neither the "0" nor the "1" bus as the active CC is engaged in transmitting to both buses.

The status and routing flip-flops AU, CBO, CBA, CBT are selectively set and reset by pulses from the Central Pulse Distributor 143 which are received via selected pairs of the Bipolar Cable 6700, the transformer 1707, amplifiers 1708 and 1711, AND gates 1709 and 1712, and the CPD cable 1719.

Call Store Writing Commands

A call store writing command utilizes as data to be stored a 23 bit word in the Data Buffer Register 2601. The outputs of the Data Buffer Register 2601 are transmitted via the cable 2606 to the Call Store Write Data Bus Selection Gates 1020, and from there to the selected one, or both, of the duplicated buses of the Call Store Write Data Bus System 6402. The selection of the "0" bus or the "1" bus for the transmission of data is determined by the appearance of signals on the order leads BRCSB0 and BRCSB1 [FIG. 10]. The selection of signals on one, or both, of BRCSB0 and BRCSB1 is determined by the setting of the CPD controlled status and routing flip-flops as enumerated in the send column of the earlier table. In the execution of the call store command to write data into the memory signals appear on one or both, of BRCSB0 or BRCSB1 during 5T7 following the transmission of the initial parts of the call store command onto the Call Store Address Bus System 6401. Accordingly, a synchronizing signal, S3, is transmitted via the amplifiers 1024 or 1023, and the 23 bit data word is transmitted via the AND gates 1028 or 1027, and a data parity signal is transmitted via the AND gates 1026 or 1025.

The D A Parity Generator (2609)

Figure 26:
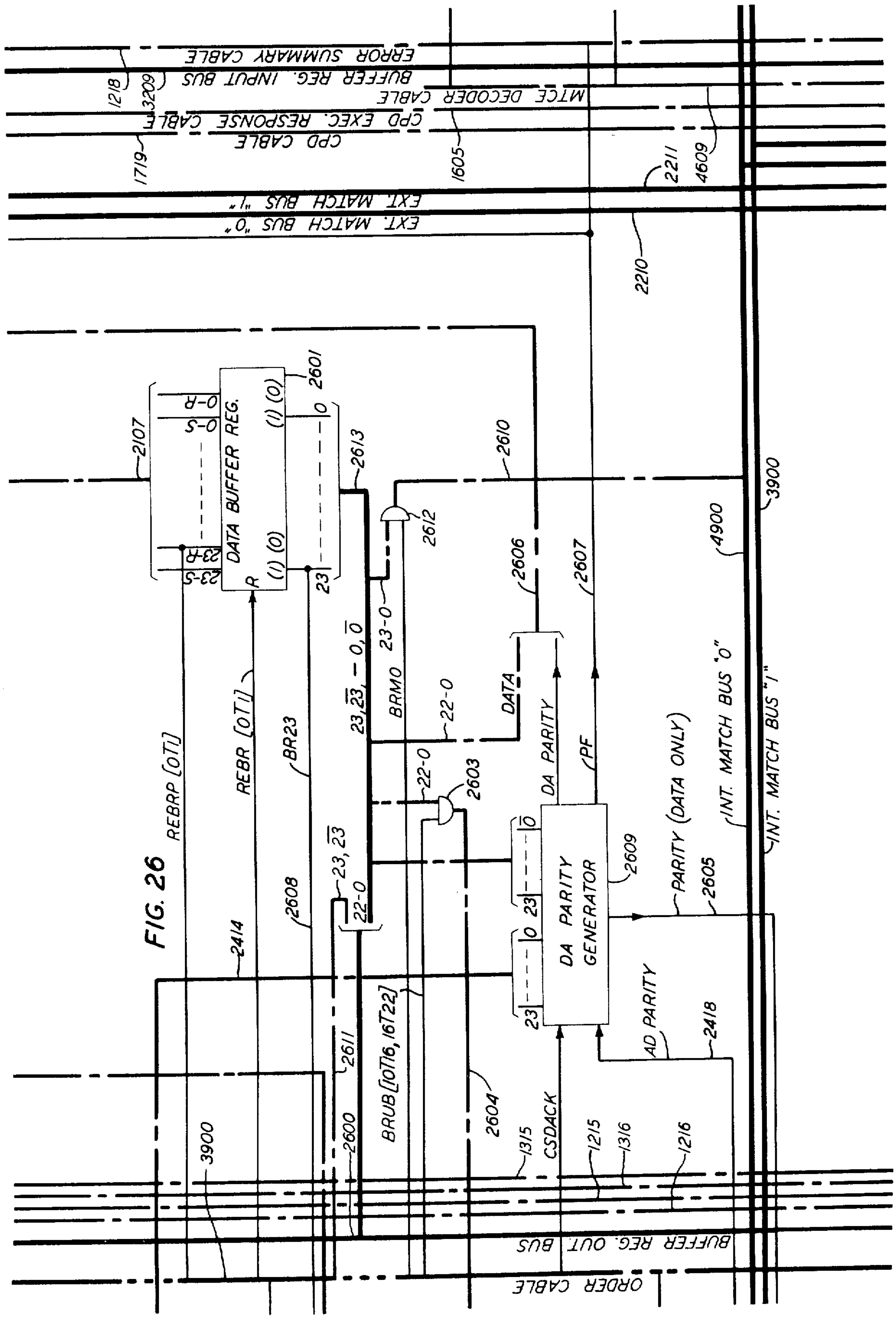

The twelve address bits A0 through A11, the six code bits K0 through K5, the 23 bit data word D0 through D22, and the data parity bit comprise a 42 bit command segment in which odd parity is maintained. The signal on the conductor D A PARITY [FIG. 26] is generated by the D A Parity Generator 2609 as required to maintain odd parity for call store writing commands. The Index Adder Parity Generator 2415 serves to examine the eighteen bit segment of the command which comprises the 12 address bits and the six code bits and provides an appropriate output signal on conductor 2418. If the parity of the code-address bits at the input of the Index Adder Parity Generator 2415 are even, a signal will appear on conductor 2418; however, if the parity of these bits is odd, there will be no signal on conductor 2418. Conductor 2418 thus serves to summarize the parity of the code-address bits and is employed as an input signal to the D A Parity Generator 2609 along with the data bits at the output of the Data Buffer Register 2601. All 24 bits of the Data Buffer Register 2601, that is, bits 0 through 23, are connected to the input of the D A Parity Generator 2609; however, the twenty-fourth bit which appears in the Data Buffer Register 2601 is always a zero as stage 23 is reset at time 21T1 by enabling cable conductor REBRP [FIG. 26]. Summarizing, in executing a call store writing command the D A Parity Generator 2609 provides the data parity signal on conductor D A PARITY which is transmitted along with the data from the output of the Data Buffer Register 2601 via cable 2606 to the Call Store Write Data Bus Selection Gates 1020.

The D A Parity Generator 2609 is also employed in the execution of call store reading commands which either (1) obtain a data word and store that word in the Data Buffer Register 2601, or (2) obtain a transfer code-address which is placed in the Buffer Order Word Register 2410. In the case of indirect addressing bits 0 through 22 of the Buffer Order Word Register 2410 and the state of the Parity Flip-Flop 1911 are employed as the input signals to the D A Parity Generator 2609. An order cable signal on conductor CSDACK [FIG.

26] serves to substitute these conductors for the contents of the Data Buffer Register 2601. In checking a call store response for data readings the contents of the Data Buffer Register 2601 serve as the input information to the D A Parity Generator 2609.

All Seems Well Signals

Figure 13:
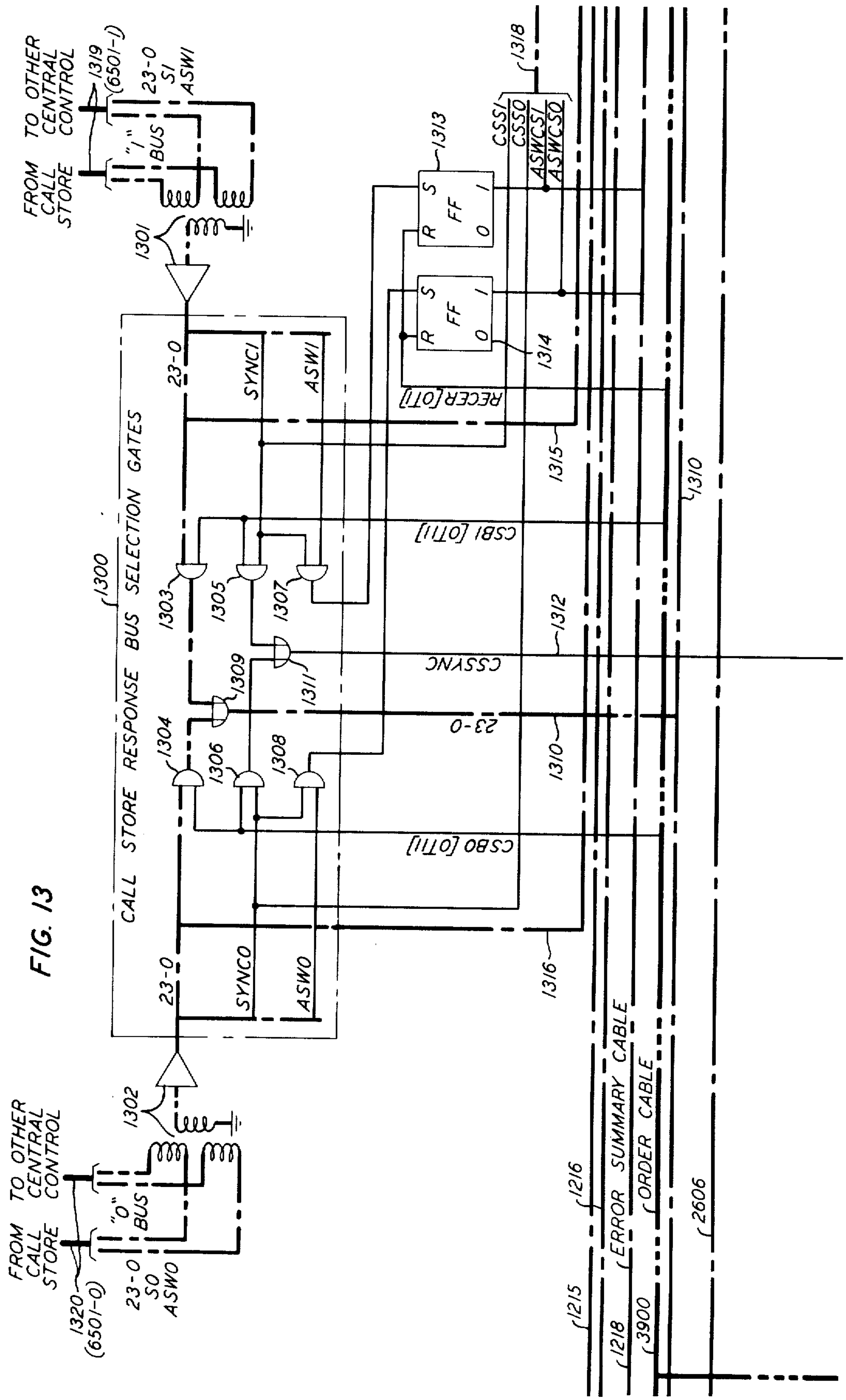

In response to call store commands (both reading and writing), the Call Store 103 executes the command and, upon the successful completion of the execution responds by transmitting All Seems Well and synchronizing signals via the Call Store Response Bus System 6501 to Central Control 101. These signals are transmitted via Cable Receivers 1302 and 1301 (according to their appearance on the "0" bus 6501-0 or "1" bus 6501-1, respectively) to conductors SYNCO, AWSO, AND SYNC1 and ASW1 [FIG. 13]. The synchronizing and All Seems Well signals appearing at the inputs of AND gates 1308 and 1307 generate corresponding signals to set the flip-flops 1314 and 1313. Since the All Seems Well and the synchronizing signals are provided on a single rail basis, these flip-flops are previously reset in preparation by enabling order cable conductor RECER. The All Seems Well signals summarize a number of hardware checks which are made within the Call Store 103; the utilization of these signals as a maintenance tool is discussed later herein.

Call Store Reading Commands

In the execution of call store reading commands the response includes a 24 bit word of data, an All Seems Well signal, and a synchronizing signal appearing as ½ microsecond pulses on the Call Store Response Bus Sysbem 6501. The 24 bit word includes 23 bits of information to be utilized for data processing within Central Control 101 and a data parity bit. The call store response signals appear in parallel at the input terminals of the Call Store Response Bus Selection Gates 1300. The Call Store Response Bus Selection Gates 1300 are selectively enabled to accept the response from the "0" bus 6501-0 or from the "1" bus 6501-1, and the gates enabled are determined in accordance with the setting of the CPD control status and routing flip-flops as enumerated in the earlier table. If the response is to be accepted from the "0" bus 6501-0, the AND gates 1304 and 1306 are enabled by a signal on order cable conductor CSB0 and if the response from the "1" bus 6501-1 is to be accepted, the AND gates 1303 and 1305 are enabled by a signal on conductor CSB1.

Signals on order cable conductors CSB0 and CSB1 occur at time 0T11.

In FIG. 84 it is indicated that within Central Control 101 the data processing of reading from a memory other than a Program Store 102 occurs in phase 2 during the execution cycle and with the Call Store Response Bus Selection Gates 1300 enabled for the time OT11 the call store response is returned prior to this time, that is, it is returned during phase 1 during the execution cycle. It should be noted that the Call Store Response Bus Selection Gates 1300 are enabled for a period of time which greatly exceeds the period, i.e., ½ microsecond of the call store response signals. This greater period of time permits acceptance of the full pulse width (approximately 0.5 microseconds) of the call store bus response signals without regard for variations in time of response of the Call Store 103 and variations in length of cable connecting the Call Store 103 and the Central Control 101.

Figure 21:
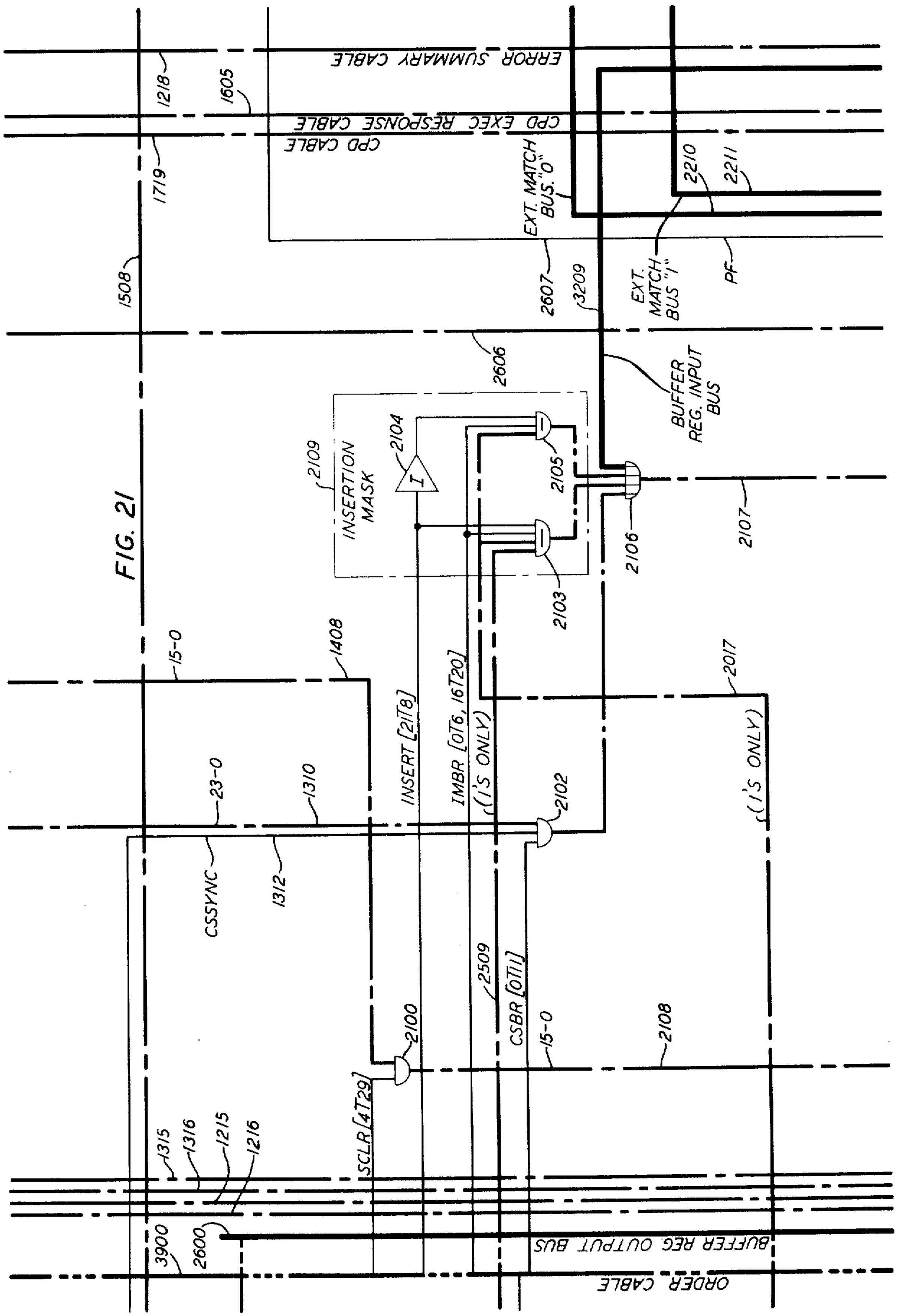

The 24 bit response word is transmitted through OR gate 1309, cable 1310, and AND gate 2102. The synchronizing signal is similarly transmitted to AND gate 2102. When the call store response is to be placed in the Data Buffer Register 2601 the gating of data readings from the Call Store Response Bus System 6501 via AND gate 2102 and OR gate 2106 is controlled by enabling order cable conductor CSBR [FIG. 21].

The information which is received both by the Data Buffer Register 2601 and the special flip-flops 1313 and 1314 is on a single rail basis; therefore, the Data Buffer Register 2601 and the special flip-flops 1313 and 1314 are reset prior to the time at which the information is received. Enabling order cable conductors REBR and REBRP [FIG. 26] resets the Data Buffer Register 2601, and a signal appearing on the order cable conductor RECER resets the special flip-flops 1313 and 1314. Both of these signals occur during OT1 prior to the receipt of information from the Call Store Response Bus System 6501.

Call Store Error Detection Circuit 2200

In the performance of obtaining data from the Call Store 103 for memory reading orders the D A Parity Generator 2609 is utilized to check the parity of the data received and the address transmitted to obtain that data. The state of conductor 2418 indicates the parity of the 18 bit code-address, and the contents of the Data Buffer Register 2601 including the 24th bit comprise the remaining inputs to the D A parity Generator 2609. The parity of the returned data and the address which was employed in obtaning that data should be odd. In the event of failure of parity, a signal on the PF conductor 2607 is transmitted to the Call Store Error Detection Circuit 2200.

Figure 27:
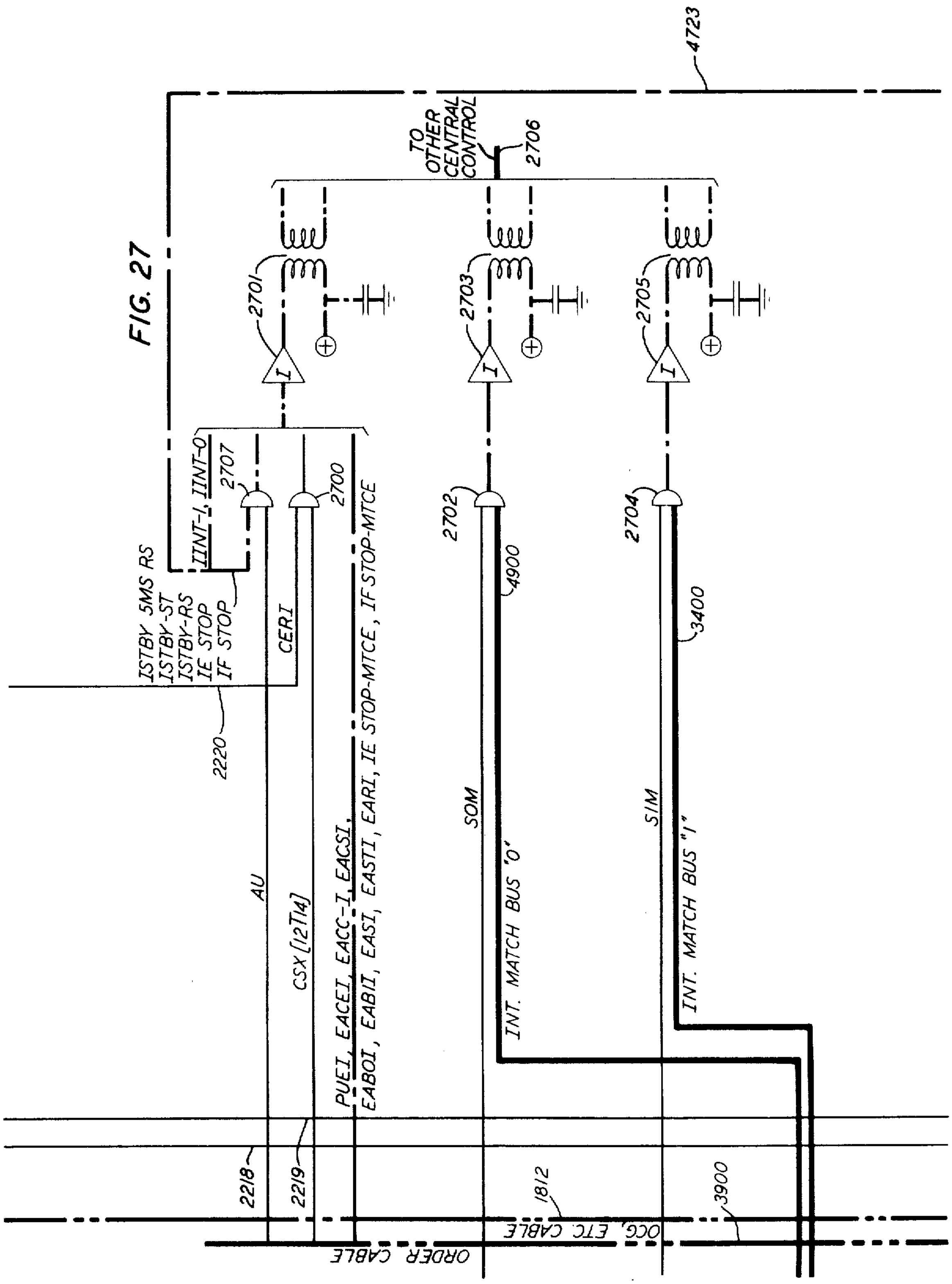

The Call Store Error Detection Circuit 2200 serves to summarize the hardware checks which are made in carrying out call store commands. The input signals to the Call Store Error Detection Circuit 2200 comprise the call store synchronizing signal conductors CSS1 and CSS0 [FIG. 13], the call store All Seems Well conductors ASWCS0 and ASWCS1 [FIG. 13], the Parity Failure conductor 2607 and oder cable conductor CSCK, and READCK [FIG. 22]. The Call Store Error Detection Circuit 2200 is enabled by a signal on order cable conductor CSCK and if the parity check of a data reading is to be made order cable conductor READCK [FIG. 22] is also enabled. If one or more of the hardware checks enumerated above fails, the Call Store Error Detection Circuit 2200 enables output conductor CERI [FIG. 22]. A signal on conductor CERI sets the CSEI flip-flop 2201 which in turn activates the Call Store Reread Sequencer 5700, the operation of which will be described later herein. The AND gate 2700 is enabled by a signal on order cable conductor CSX [FIG. 27] and serves to transmit to the other central control the error indication on conductor CERI. The Call Store Error Detection Circuit 2200 is enabled for normal call store memory commands; it is not enabled for maintenance and control read and write commands.

Program Store Memory Orders

Memory reading orders may also address memory locations within the Program Store 102. In such instances the indexing step produces a code-address corresponding to a program store memory location to be read. Memory reading orders for obtaining data from a Program Store 102 utilize the same channels for addressing the store and for receiving the response employed in obtaining program order words. When data is to be read from a Program Store 102 the Data Reading Sequencer 4903 is activated. The sequencer is required since the obtaining of data from a Program Store 102 must be interleaved with the obtaining of program order words. Accordingly, this sequencer responds by storing the code-address of the next program order word temporarily in the Add-One Register 4304 and placing into the Program Address Register 4801 the data code-address by gating the outputs of the Index Adder Output Register 3401 thereto. The Data Reading Sequencer 4903 extends the processing time of a memory reading order by two 5.5 microsecond cycles. These two cycles are inserted in the operational step as set forth in FIG. 84 at the end of the indexing cycle and before the execution cycle. In the first cycle injected by the Data Reading Sequencer 4903 the order following the memory reading order is ignored and the data code-address is transmitted to the Program Address Register 4801. From there this code-address is transmitted as part of a program store command onto the Program Store Address Bus System 6400. In the second machine cycle injected by the Data Reading Sequencer 4903 the data reading is returned from the Program Store 102 via the Program Store Response Bus System 6500 to the Buffer Order Word Register 2410. From there a selected half of the 44 bit data reading is transmitted to the Data Buffer Register 2601, the selected half determined by bit 20 of the code-address formed in the indexing step of the order. When these functions are completed the Data Reading Sequencer 4903 is returned to the inactive state, and the memory reading order proceeds to its execution cycle wherein the data (now appearing in the Data Buffer Register 2601) is utilized to complete the operational step.

Auxiliary Buffer Register Memory Orders

Figure 31:
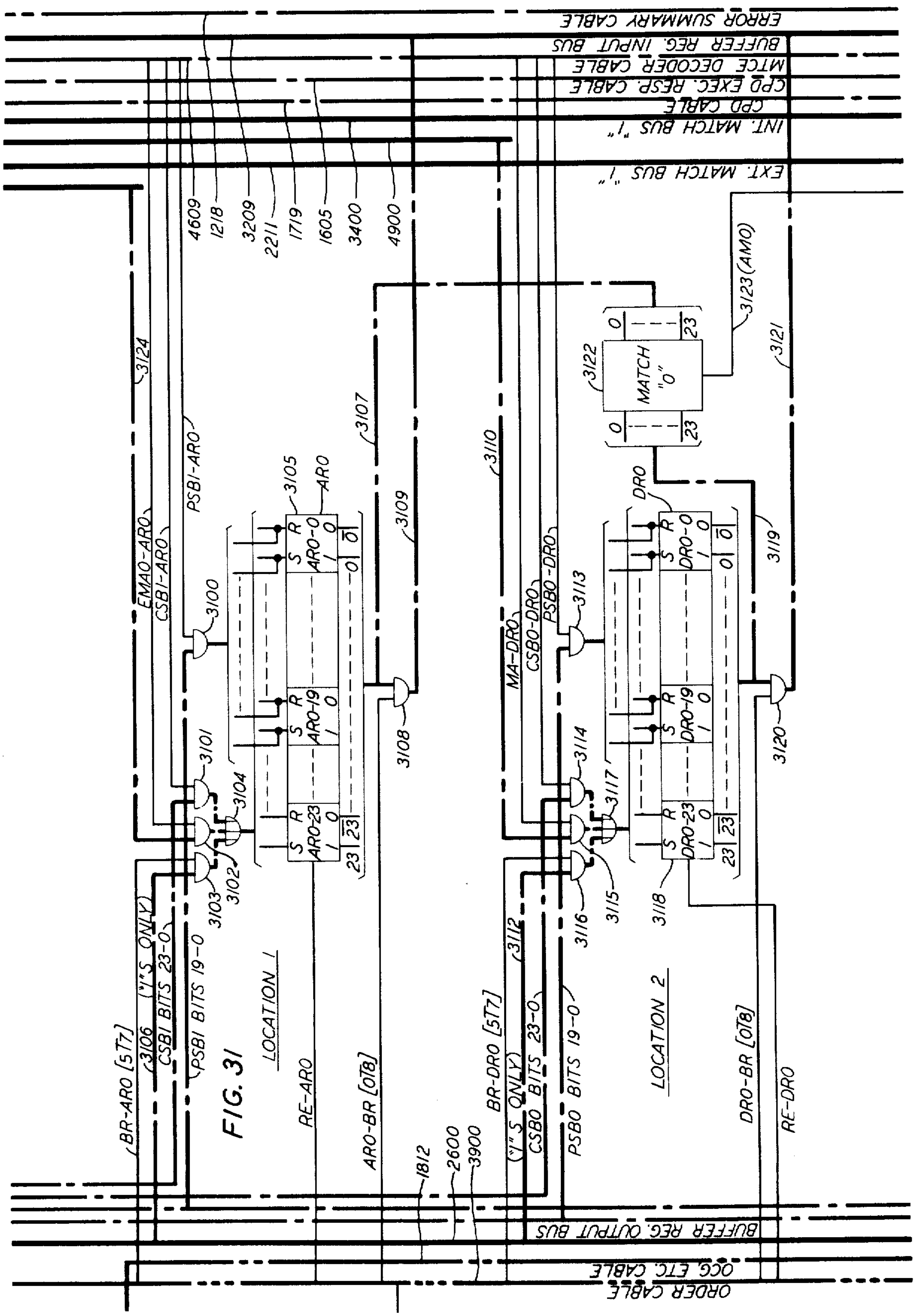
Figure 32:
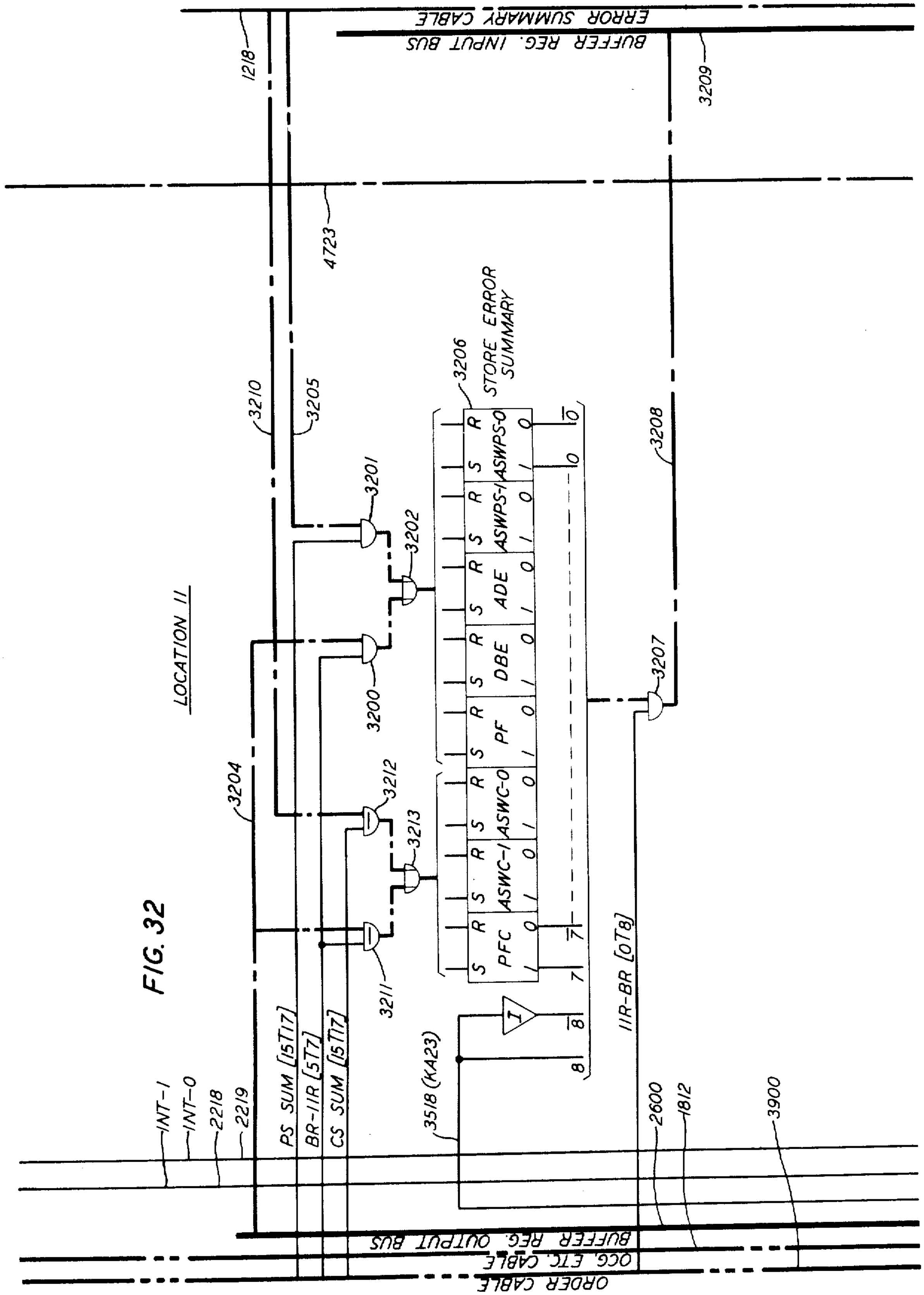
Figure 36:
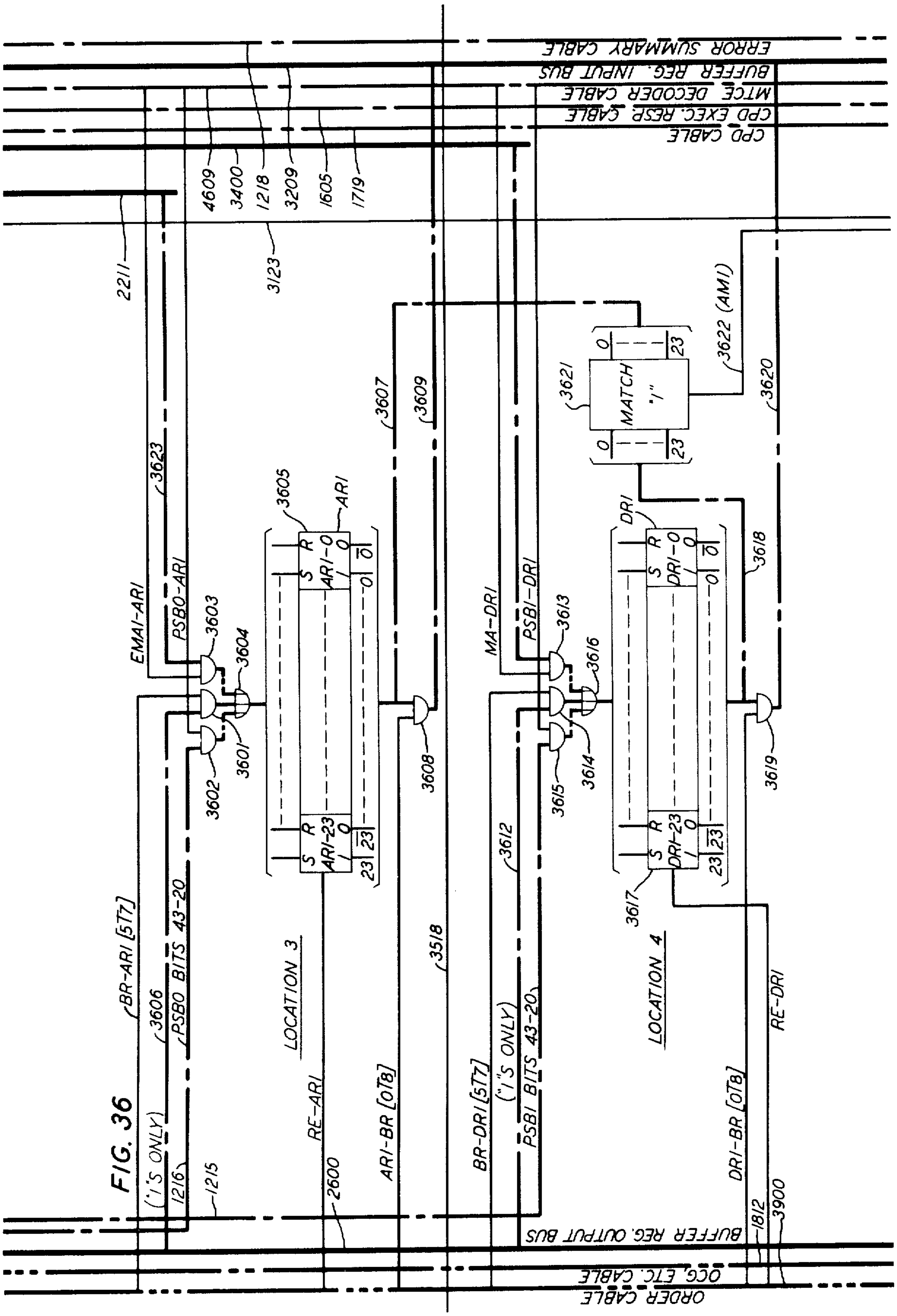
Figure 37:
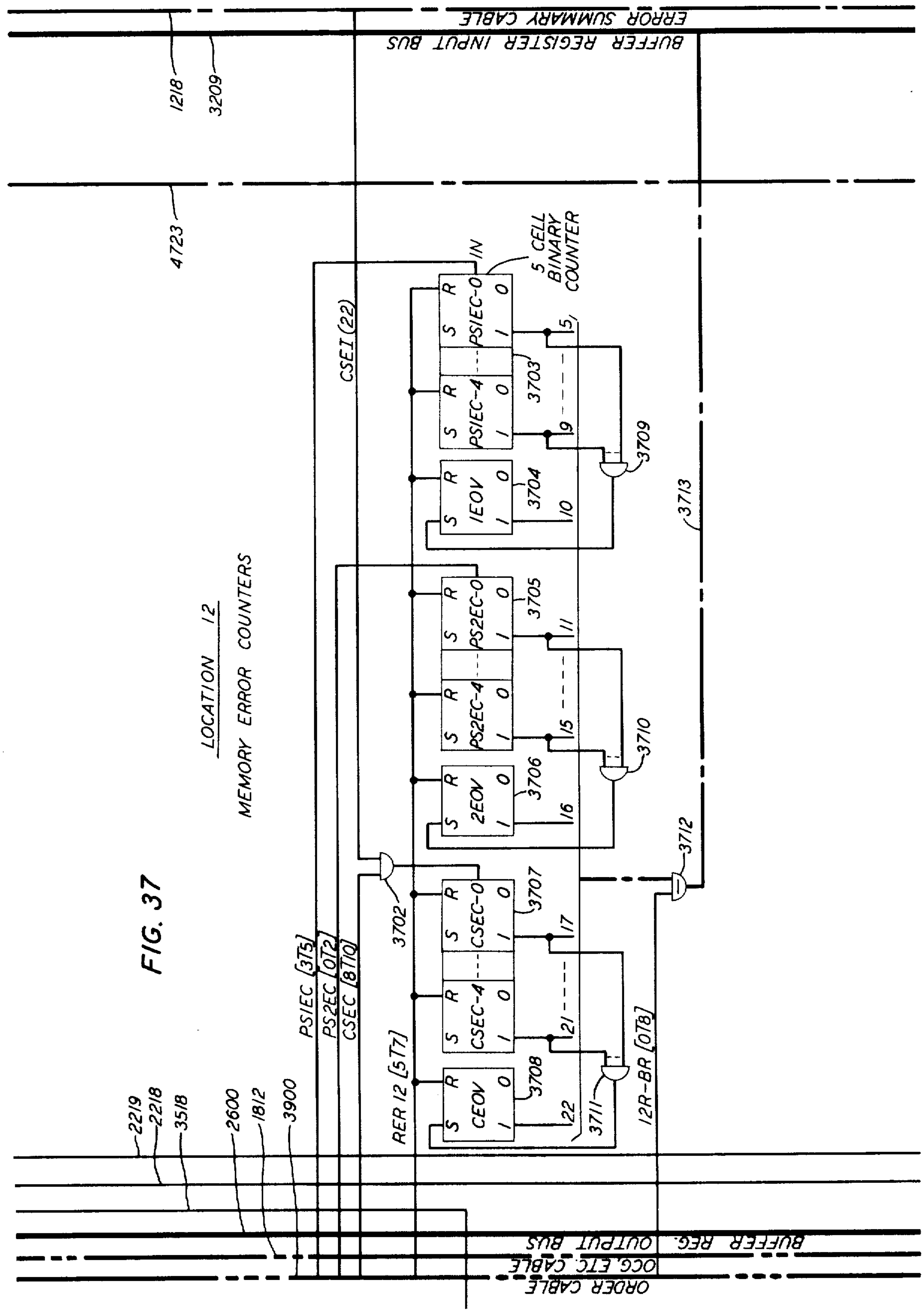

Memory reading and writing orders may also address a selected one of the auxiliary buffer registers such as DR0 (3118), AR0 (3105) [FIG. 31], DR1 (3617) [FIG. 36], et cetera. In such instances the DAR word is a code-address corresponding to the selected one of the auxiliary buffer registers. This code-address appears in the Index Adder Output Register 3401 and is utilized to transmit data from the Data Buffer Register 2601 to a selected one of the auxiliary buffer registers for memory writing orders or to transmit data from a selected one of the auxiliary buffer registers to the Data Buffer Register 2601 for memory reading orders.

A memory reading order which addresses a selected one of the auxiliary buffer registers selects by means of a signal appearing on one of the order cable leads AR0-BR, DR0-BR [FIG. 31], AR1-BR [FIG. 36], et cetera, to transmit the contents of a selected one of the auxiliary buffer registers via the AND gates 3108, 3120, 3608, et cetera, via the Buffer Register Input Bus 3209 and the OR gate 2106 to the inputs of the Data Buffer Register 2601. This gating action occurs during OT8 (phase 1) of the execution cycle.

Memory writing orders which place data into a selected one of the auxiliary buffer registers utilize the contents of the Index Adder Output Register 3401 to generate a signal on a selected one of the order leads BR-AR0, BR-DR0, BR-AR1, et cetera, to transmit the contents of the selected one of the registers via the Data Buffer Register 2601 and the Buffer Register Output Bus 2600 to a selected one of the AND gates 3103, 3116, 3601, et cetera, to the inputs of the selected one of the auxiliary buffer registers AR0, DR0, AR1, et cetera. In that certain of the auxiliary buffer registers 3105, 3118, 3605, and 3617, have a 24 bit capacity as opposed to the 23 bit length of data words as processed within Central Control 101, the additional bit is provided in one of the bits of the indexed code-address as it appears in the Index Adder Output Register 3401.

The address which selects the particular auxiliary buffer register for reading or writing appears in bit positions 1 through 5 of the Index Adder Output Register 3401 during the execution of the memory order. When a memory writing order specifies a 24 bit auxiliary buffer register, then bit 0 of the code-address appearing in the Index Adder Output Register 3401 serves as the twenty-fourth bit of data. Order cable conductor 23 or $\overline{23}$ of cable 2611 is enabled according to contents of the least significant bit of the Index Adder Output Register 3401 thereby supplying the twenty-fourth bit of data on the Buffer Register Output Bus 2600. The 24th bit of this bus is transmitted whenever a memory writing order specifies one of the Match Registers AR0, AR1, DR0 and DR1 [FIGS. 31, 36].

Memory writing orders which place data into a selected one of the auxiliary buffer registers utilize the contents of the Index Adder Output Register 3401 to generate a signal on a selected one of the order leads BR-AR0, BR-DR0, BR-AR1, et cetera, to transmit the contents of bits 0 through 22 of the Data Buffer Register 2601 via the cable 2600 to a selected one of the AND gates 3103, 3116, 3601, et cetera, to the inputs of the selected one of the auxiliary buffer registers AR0 3105, DR0 3118, AR1 3605, et cetera

Communication Via Command Orders

The third major class of communication involves the generation and transmission of "commands" to the Central Pulse Distributor 143, the Switching Network 120, the Master Scanner 144, et cetera. These commands are employed in controlling the noted units in the performance of both telephone and maintenance functions.

The Central Control 101 utilizes program orders designated herein as "command" orders to generate such commands. Certan of these orders generate commands to be transmitted only to the Central Pulse Distributor 143; these orders are designated herein as "CPD orders" and the commands associated with these orders are designated as "CPD commands." Other command orders generate information on the Network Command Bus 6406; these are designated as "network command orders" and the generation of information on the Network Command Bus 6406 is designated herein as "network commands". Network command orders are utilized to transmit information to not only the Switching Network 120 but to all units connected to the Central Control 101 via the Network Command Bus 6406 such as the Master Scanner 144, the Teletype Unit 145, et cetera. For convenience these units which are controlled by way of the Network Command Bus System 6406 are termed "Network Command Units" herein. The network command order employs the CPD command to designate a particular network command unit which is to respond to the network command.

In that the Central Pulse Distributor 143 is employed in the execution of both CPD orders and network command orders, communication with the Central Pulse Distributor 143 will be described first. The Central Pulse Distributor 143 is a high speed electronic translator which provides two classes of output signals in response to CPD commands. The first class of output signals is termed unipolar signals and the second class is termed bipolar signals. Commands are transmitted from the Central Control 101 to the Central Pulse Distributor 143 in the form of half microsecond pulses. The information required to control a Central Pulse Distributor 143 is transmitted in three successive waves which are each separated by 1.25 microseconds. The bus choice information which indicates that the central pulse distributors are to accept information from either the "0" or "1" bus of the CPD Address Bus System 6403 is transmitted in the first wave to all central pulse distributors via the CPD Bus Choice Bus 6405. This bus choice information is determined by the state of flip-flops CPDB [FIG. 59] and OL1 [FIG. 55] as determined subsequently herein. The second wave consists of the CPD address transmitted on a selected "0" or "1" bus of the CPD Address Bus System 6403 to all central pulse distributors. The CPD address consists of signals which are to be translated by the Central Pulse Distributor 143 into a half microsecond output pulse appearing on a selected unipolar or bipolar output. The third wave consists of a half microsecond execute pulse transmitted on one of a plurality of cable pairs in the Execute Cable 6404. Corresponding to each cable pair in the execute cable is a discrete unit of the Central Pulse Distributor 143, and the execute pulse serves to select the unit which is to carry out the translation of the CPD address signals. The central pulse distributor units which do not receive the execute pulse do not carry out this translation, and the third wave serves thereby as part of the translation of the coded data within Central Control 101 into a pulse appearing on a selected discrete unipolar or bipolar output of the Central Pulse Distributor 143.

The operational step of command orders includes the information of data to specify the CPD address, the CPD execute signal, and/or the network command information. If, for example, the order X in FIG. 84 is a command order, the data is placed in the appropriate flip-flop registers within Central Control 101 during phase 2 of cycle 3, and accordingly the second and third wave information is generated only after this data is so registered. The generation of the three waves of CPD command information for the order X is correspondingly generated during 10T12, 15T17, and 20T22 of cycle 3.

The Central Pulse Distributor 143 in executing commands returns responses to the Central Control 101 as half microsecond pulses; the time of arrival of these pulses at Central Control 101 is dependent on the response time of the Central Pulse Distributor 143 and the lengths of the buses connecting the Central Control 101 and the Central Pulse Distributor 143. In the example of FIG. 84 gating signals lasting from T19 of cycle 3 until T12 of cycle 4 (a 3.75 microsecond span) are employed to gate these responses of the Central Pulse Distributor 143. It may be noted that this last gating action as well as the transmission of the second and third waves of the CPD command are generated after the order X has been replaced by the orders X+1 and X+2 in the Central Control 101; the Command Order Sequencer 4902 is therefore activated in the execution of the order X to carry out these gating actions.

If the order X is a network command order, the Command Order Sequencer 4902 is also employed to carry out the gating actions associated with the CPD command, and further the gating actions associated with the transmission of address information to the network command bus. In the execution of network command orders the network command unit returns responses to the Central Control 101 within a span of time that may extend to T5 of cycle 5. Accordingly, the Command Order Sequencer 4902 remains active to carry out all of the gating actions of the network command order which may extend to the end of phase 1 of cycle 5. It is with the aid of the Command Order Sequencer 4902 that the Central Control 101 extends the degree of overlap beyond that exhibited in FIG. 84. If the order X is a network command order, then gating actions associated with the operational step of order X will be simultaneously occurring with the execution cycle of the order X+2, at the time the order X+3 is arriving at the Buffer Order Word Register 2410, and at the time the address of the order X+4 is being transmitted on the Program Store Address Bus System 6400.

CPD Command Gating Actions

Figure 59:
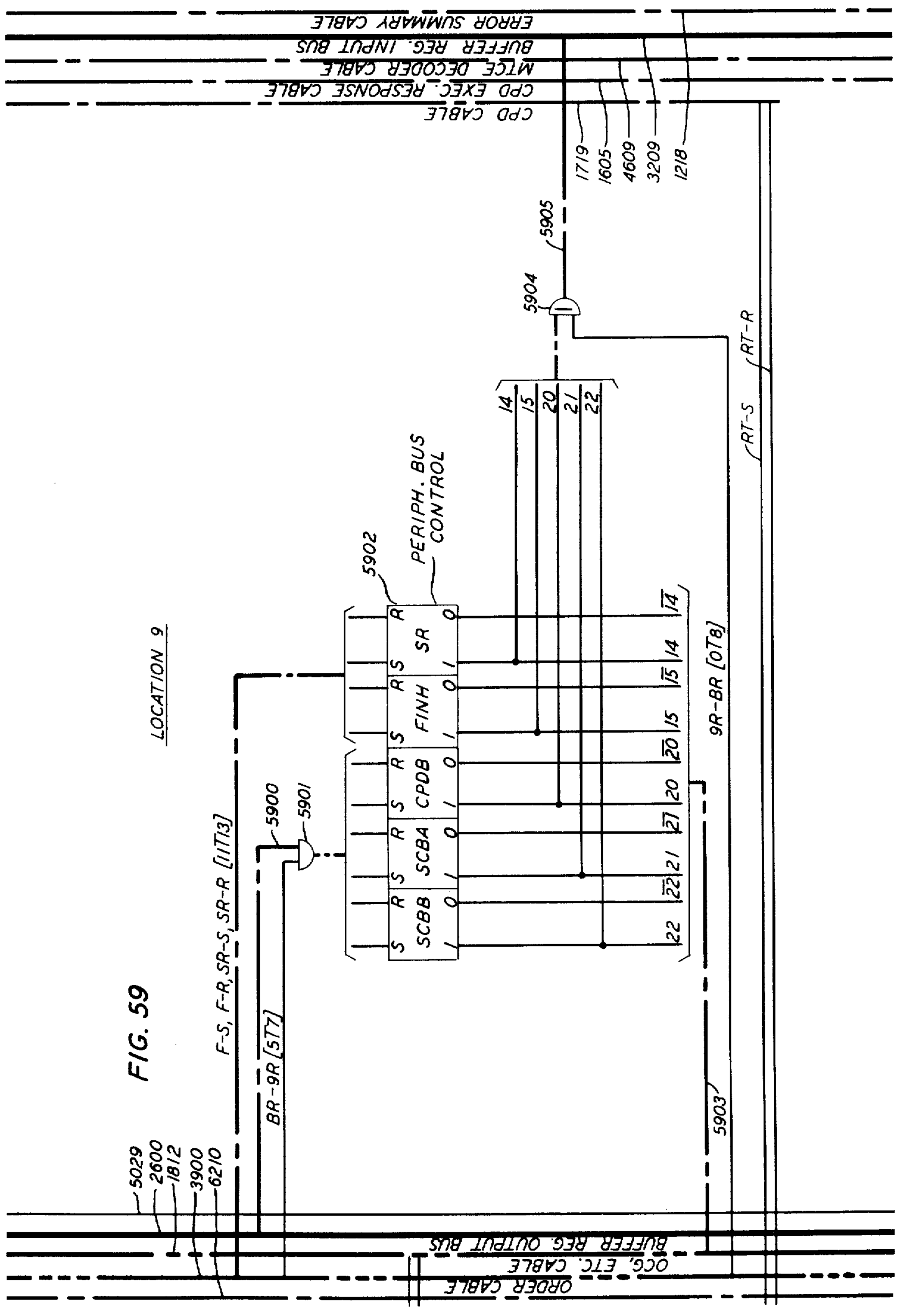
Figure 60:
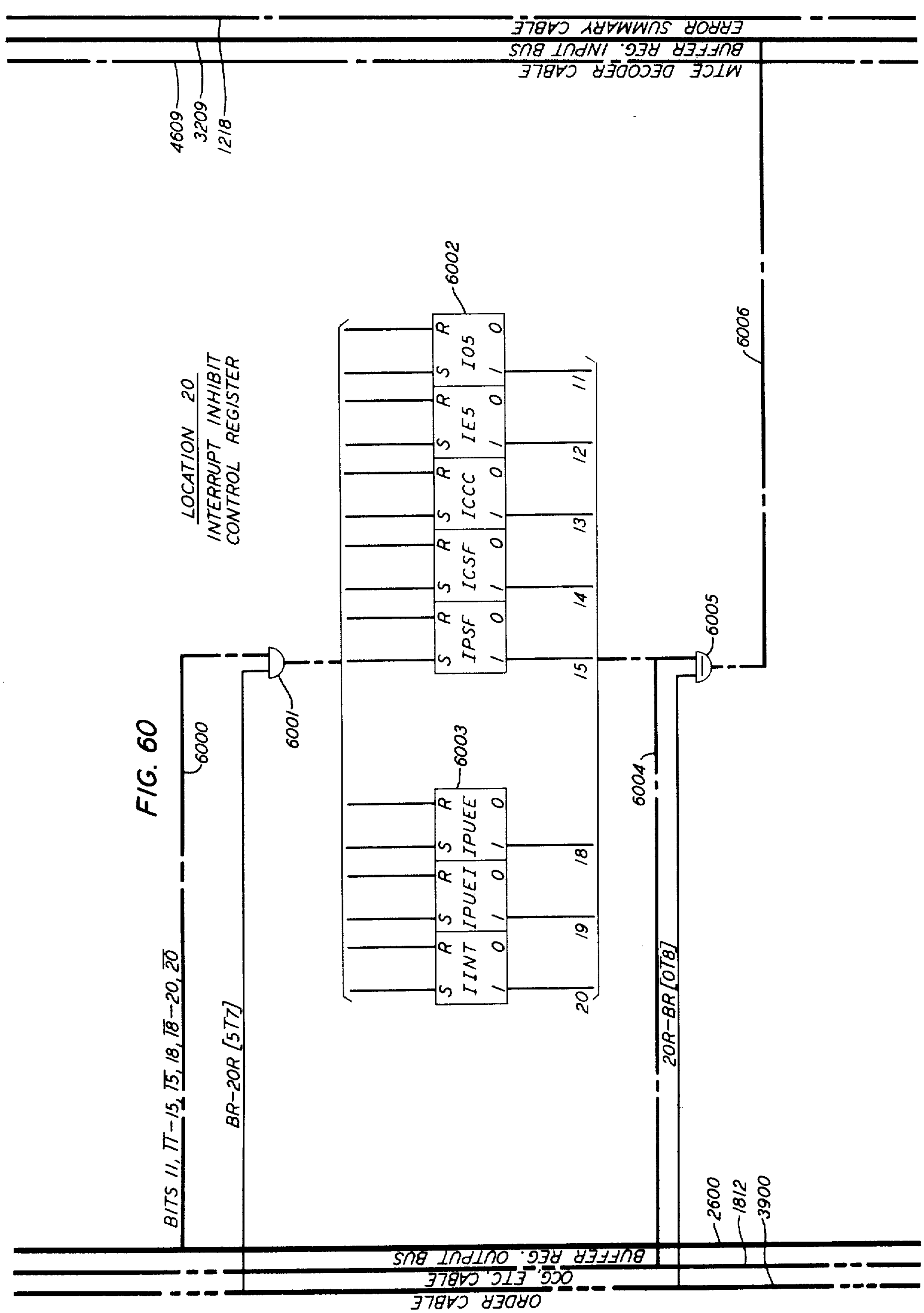

The choice of the "0" or "1" of the CPD address bus system is made according to the state of special flip-flops CPDB [FIG. 59] and OL1 [FIG. 55] within the Central Control 101. These flip-flops are set and reset under control of program sequences to indicate the routing of CPD address information as indicated in the following table:

| CPDB | OL1 | Active CC Sends | Standby CC Sends |
|---|---|---|---|
| 0 | 0 | 0 | X |
| 0 | 1 | X | 0 |
| 1 | 0 | 1 | X |
| 1 | 1 | X | 1 |

In the above table the entry X indicates that the command is transmitted on neither bus. According to the choice of bus, signals appear on one of the order cable conductors BC0 or BC1 [FIG. 38] during 10T12 and are transmitted via the Cable Driver 3801 to the Bus Choice Bus 6405.

Signals to select a unipolar or bipolar output (the CPD address) are generated either by the CPD translator 5422 in response to the binary representation of the CPD address appearing in a portion of the First-One Register 5801 or (according to the command order) the CPD address is generated directly from outputs of portions of the K Register 4001 and the K A Input Register 3502. The CPD translator 5422 is employed in most instances; the outputs of the K Register 4001 and the K A Input Register 3502 are used in transmitting special test or control signals to the Central Pulse Distributor 143.

Figure 54:
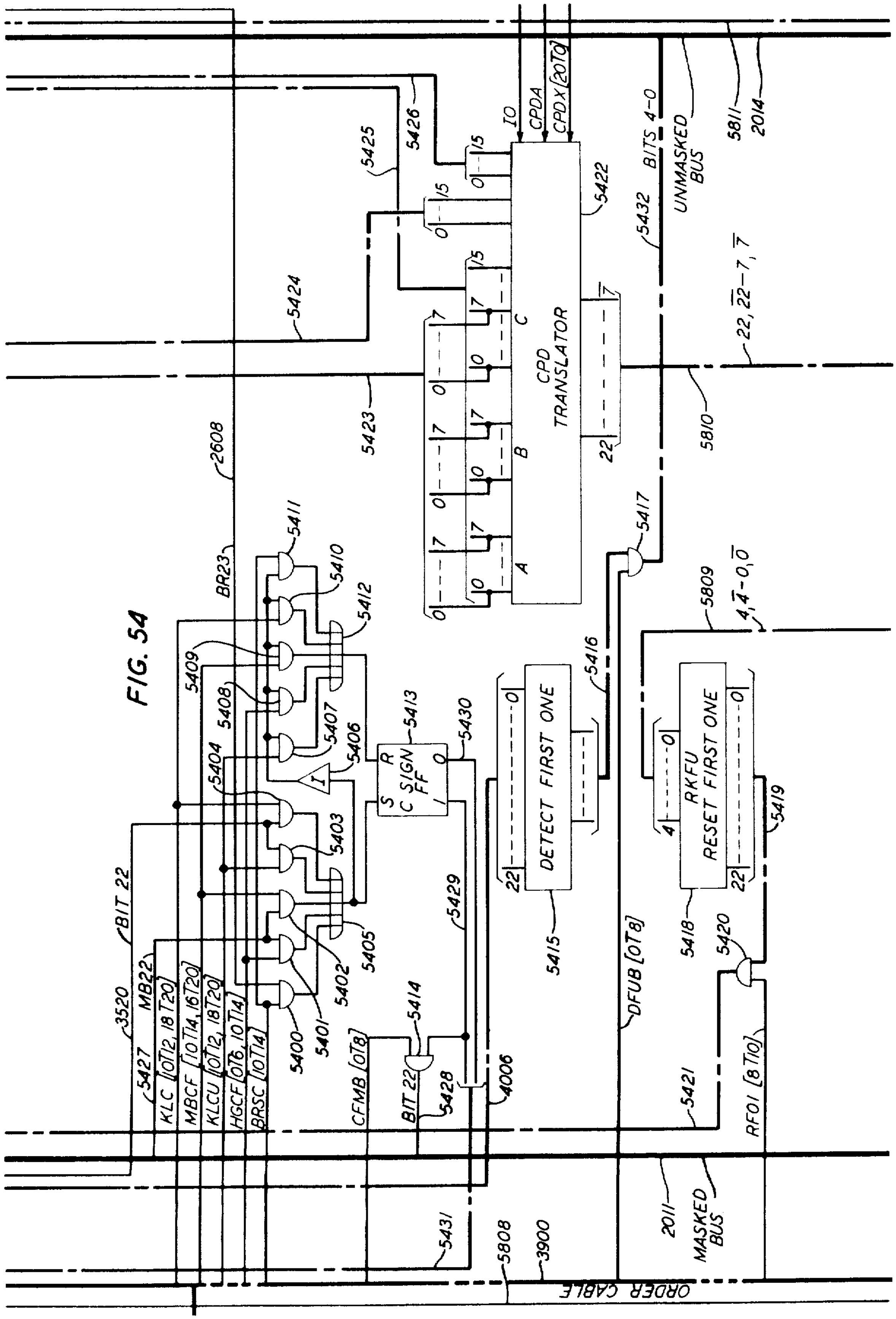

A signal appearing on the order cable lead CPDA [FIG. 54] causes the CPD translator 5422 to generate the CPD address on the output conductors 5425 which is transmitted to the OR gate 4004 onto a second bus 4005 and from there to the input of the CPD Transmit Bus Selection Gates 3812. The CPD address is in this instance determined by the contents of bit positions 9, 14–22 of the First-One Register 5801 which are transmitted to the CPD translator via connecting cable 5810. Here the "bus choice" is implemented by the appearance of a signal on A0B or A1B [FIG. 38] during 15T17 to transmit the CPD address via the AND gates 3814 and 3815 and the Cable Driver 3802 to the "0" bus 3804 or via the AND gates 3816 and 3817 and the Cable Driver 3803 to the "1" bus 3805.

Figure 38:
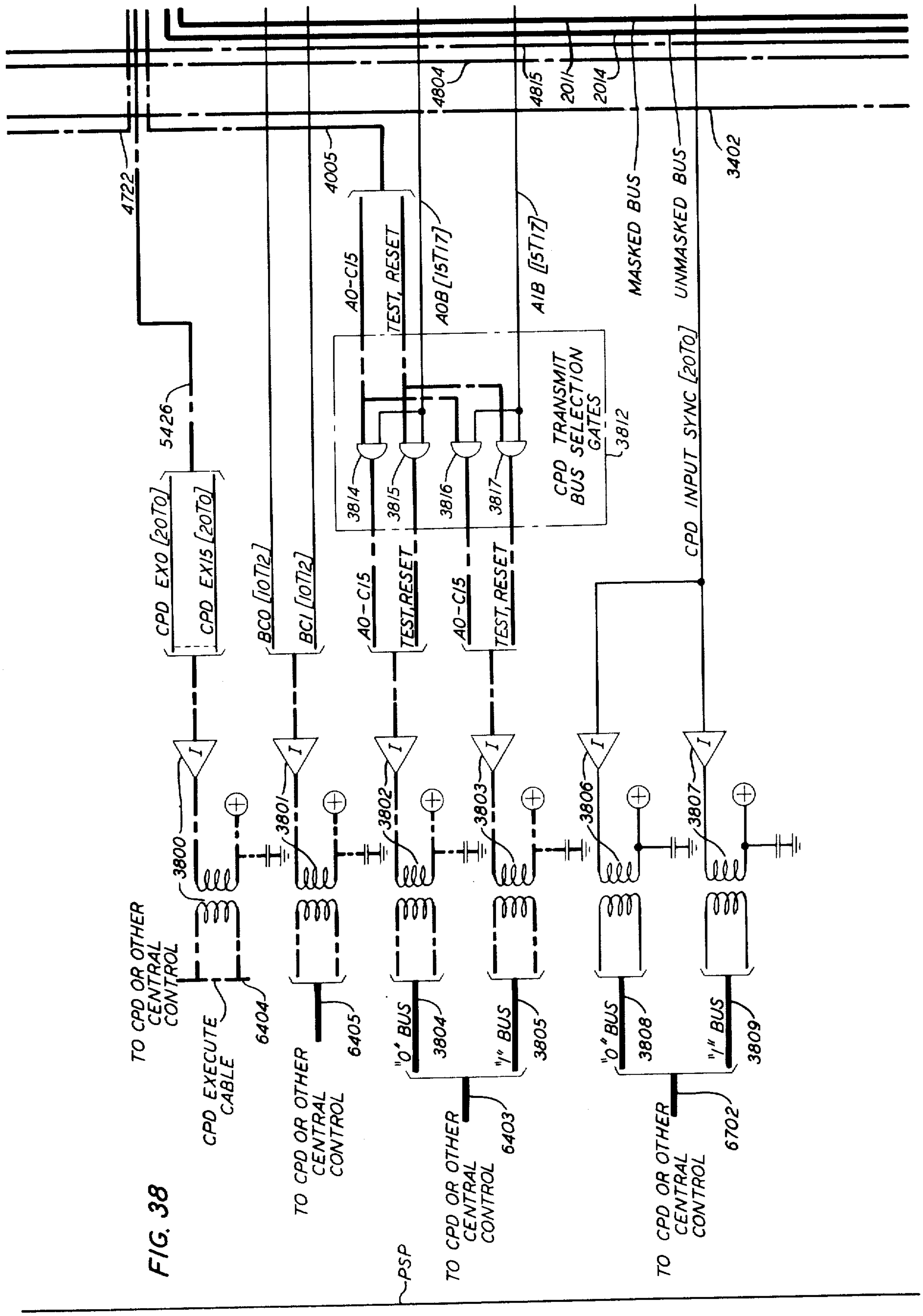
Figure 39:
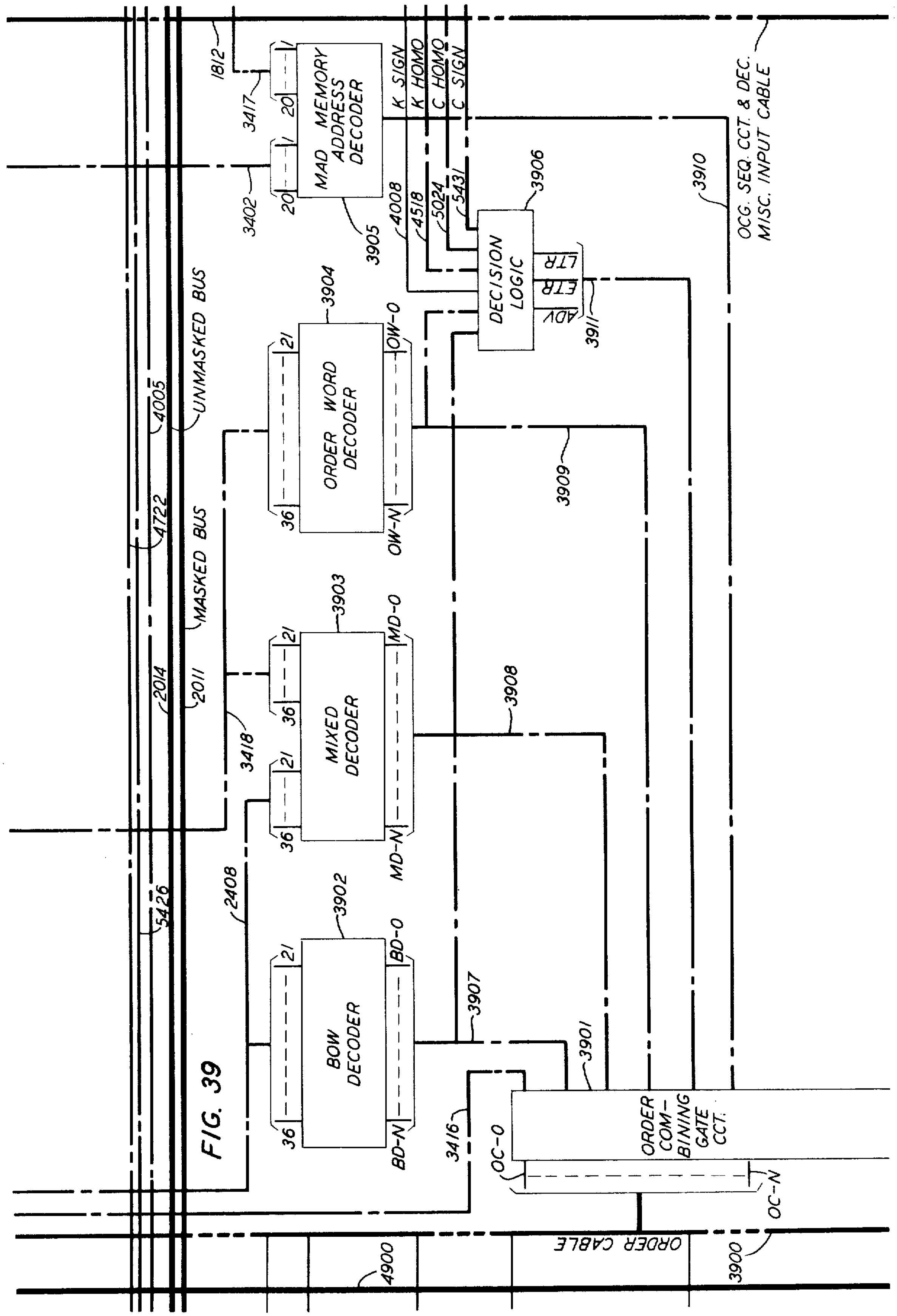

A signal appearing on the order cable conductor 3810 and signals appearing on the output conductors 7, 8 and 9 of the First-One Register 5801 indicates the alternative of deriving the CPD address or special signals TEST or RESET [FIG. 38] from information contained in portions of the K Register 4001 and the K A Input Register 3502. The outputs of the K Register 4001 and the K A Input Register 3502 are gated via the buses 4006 and 3519, the AND gates 4002 and 4003 (and in part via the OR gate 4004) to the bus 4005. From there the gating of the CPD address, TEST and RESET signals to the CPD Address Bus System 6403 is as previously described.

The third wave of information is generated by the appearance of a signal on CPDX [FIG. 54] during 20T22; the execute signal appears on one of the conductors 5426 according to the contents of bit positions 10 through 13 of the F Register 5801. The execute signal is transmitted via the conductors 5426 and the Cable Driver 3800 to the CPD Execute Cable 6404.

In the execution of CPD commands the bipolar output signals are in some instances accompanied by a synchronizing security signal (WRMI). In such instances the CPD command utilizes the outputs of the CPD translator 5422 and the appearance of the synchronizing security signal is specified by the appearance of a "1" in bit position 8 of the First-One Register 5801. If the synchronizing security signal is so specified, a pulse appears during 20T22 on order cable conductor CPD INPUT SYNC [FIG. 38] and is transmitted through the Cable Drivers 3806 and 3807 to both the "0" bus 3808 and the "1" bus 3809 of the CPD Input Sync Bus System 6702.

In response to the bus choice, CPD address, and execute signals the Central Pulse Distributor 143 generates an output pulse on the selected unipolar or bipolar output point. In addition, the Central Pulse Distributor 143 generates maintenance signals that are transmitted to the Central Control 101 to permit a check on the execution of the CPD command. These signals comprise the execute response signals transmitted via the Execute Response Bus System 6502, an All Seems Well signal transmitted via the CPD Verify Bus System 6704, and CPD maintenance signals transmitted via the CPD Maintenance Response Bus 6904.

The execute response signals appear as half microsecond pulses on the Execute Response Bus 6502 and are transmitted through the Cable Pulse Receivers 1600. Signals appearing on the order cable conductor CPDEW [FIG. 16] during 19T12 (a 3.75 microsecond interval from time T19 of one machine cycle to time T12 of the following machine cycle) transmit the execute response through AND gate 1601 to the CPD Execute Response Cable 1605 and the set inputs of bit positions 0 through 15 of the Command Order Maintenance Summary Register 6205. The All Seems Well signal is returned to the Central Control 101 via the "0" bus or "1" bus of the CPD Verify Bus System 6704 and the Cable Receivers 1502 or 1051. A signal appearing on CPDEW [FIG. 15] serves to transmit these All Seems Well signals through the AND gates 1506 and 1505 and the OR gate 1509 of the CPD Verify Bus Selection Gates 1500 to conductor 1510 of the Error Summary Cable 1218. The further appearance of the same signal on order cable conductor CPDEW [FIG. 62] transmits the All Seems Well signal from the Error Summary Cable 1218 and the bus 6200 through the AND gate 6203 to the set input of the flip-flop 62ASW CPD.

Figure 16:
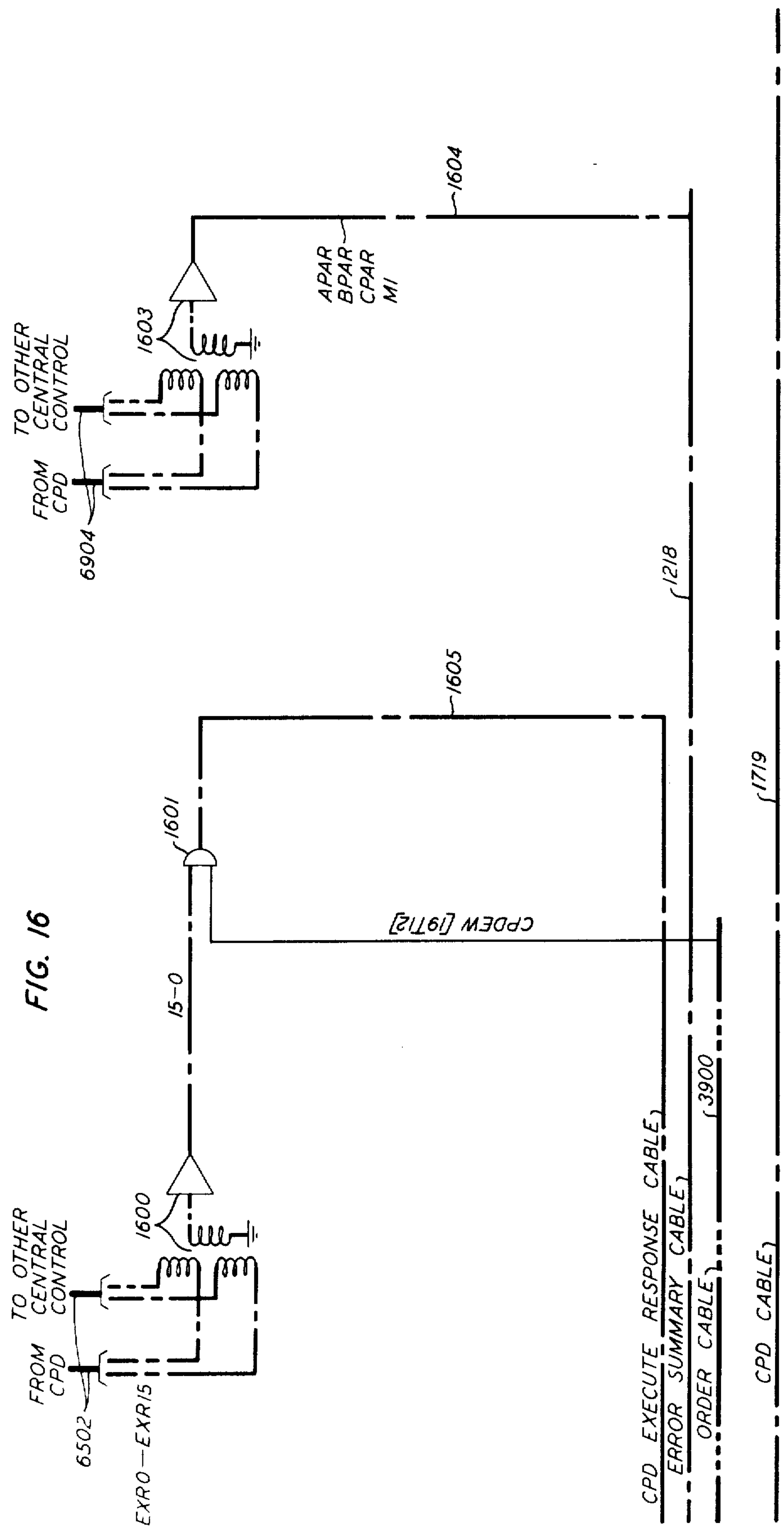
Figure 17:
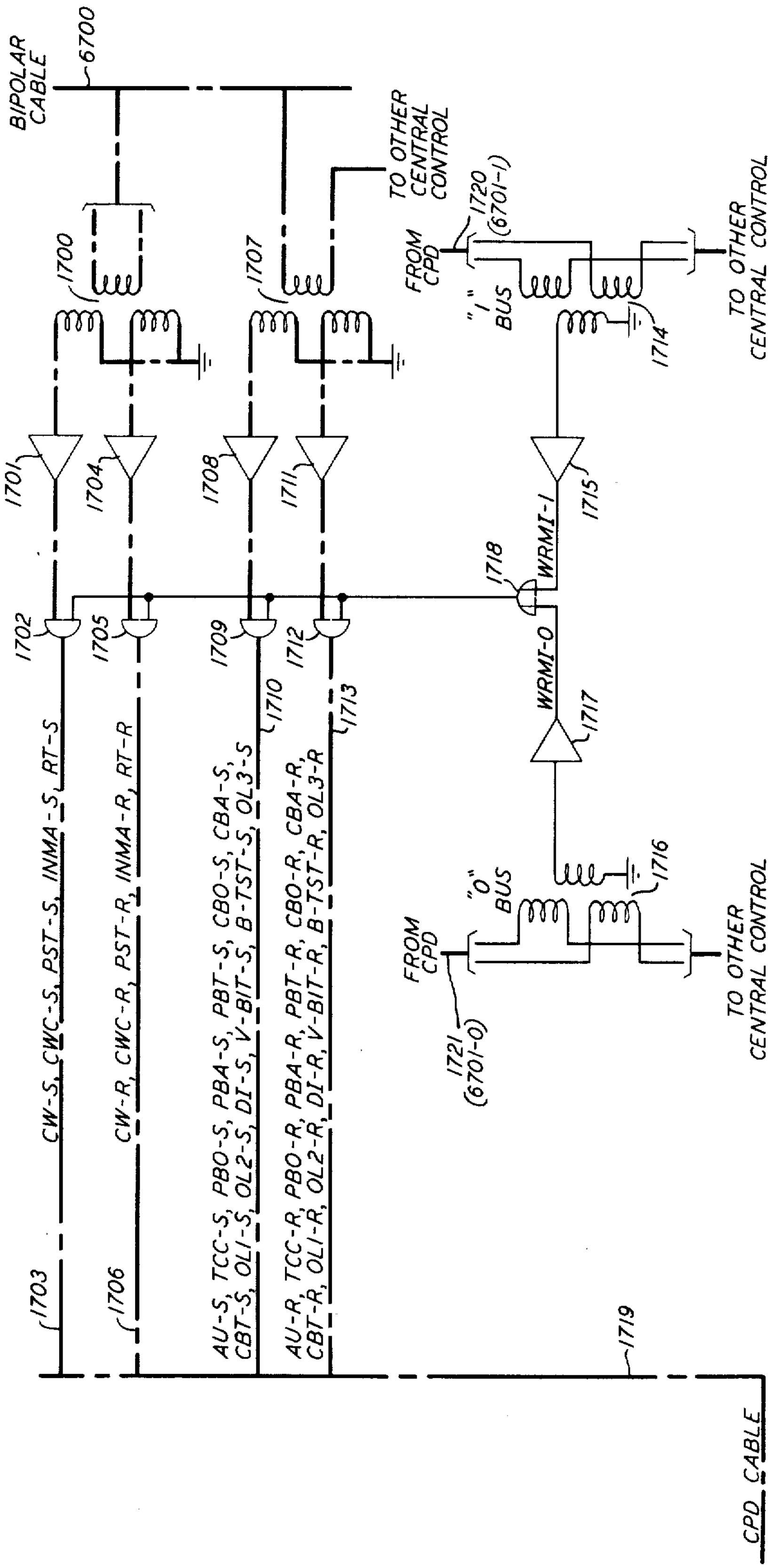
Figure 18:
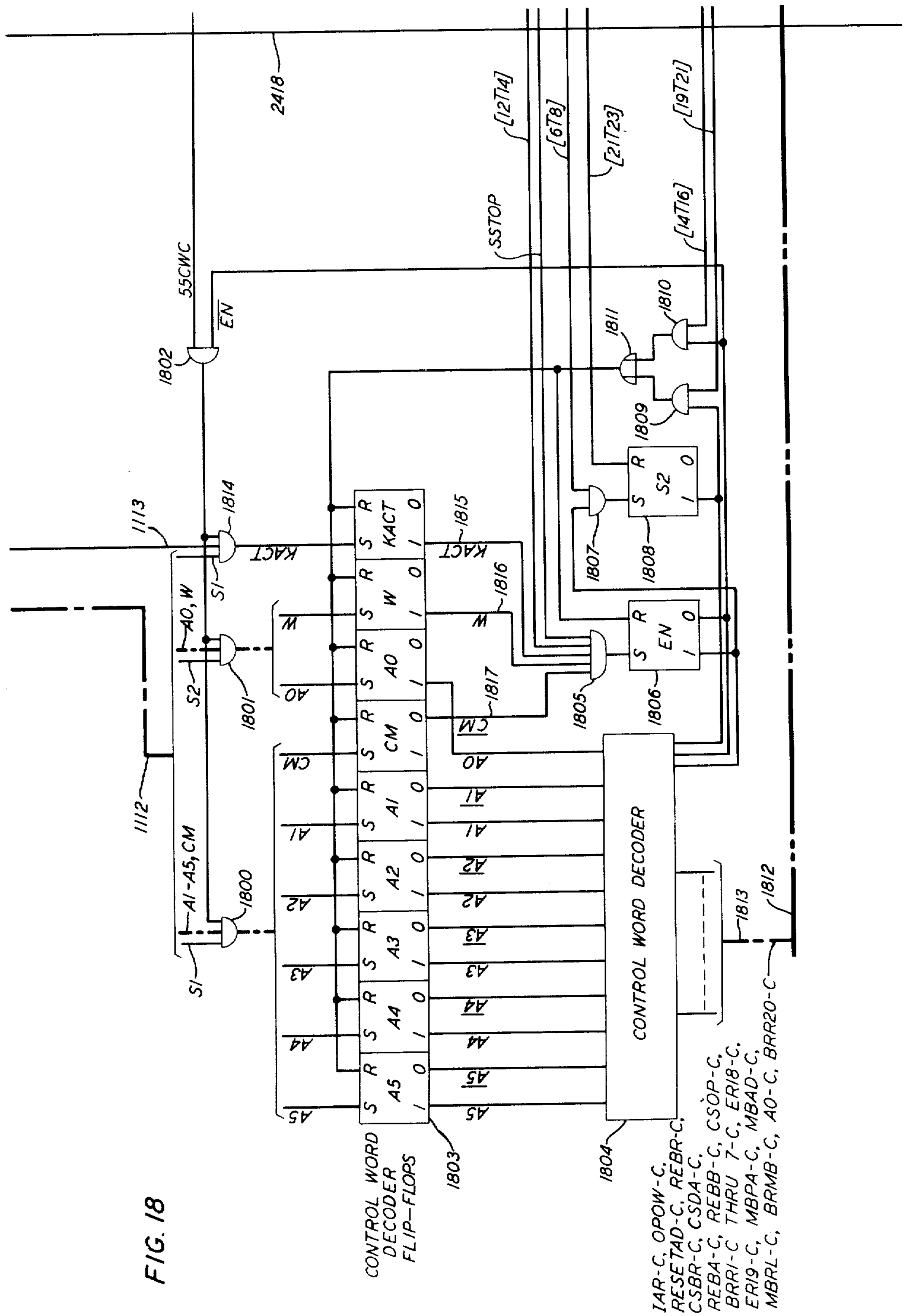

The maintenance response of a Central Pulse Distributor 143, appearing as the signals APAR, BPAR, CPAR, and MI [FIG. 16], is returned via the CPD Maintenance Response Bus 6904 and the Cable Receiver 1603 to the Error Summary Cable 1218. From there these signals are transmitted as previously described to the set inputs of the flip-flops PCA, PCB, PCC, and MCE, respectively.

The execute response signals, the All Seems Well signals, et cetera, appear on the Error Summary Cable 1218 and the CPD Execute Response Cable 1605 as single rail half microsecond pulses sometime within the previously defined 3.75 microsecond interval 19T12. Accordingly, bits 0 through 21 of the Command Order Maintenance Summary Register 6205 are reset prior to this interval by the appearance of a signal on the order cable conductor RCPD [FIG. 62] during 17T19.

CPD Command Hardware Checks

Figure 50:
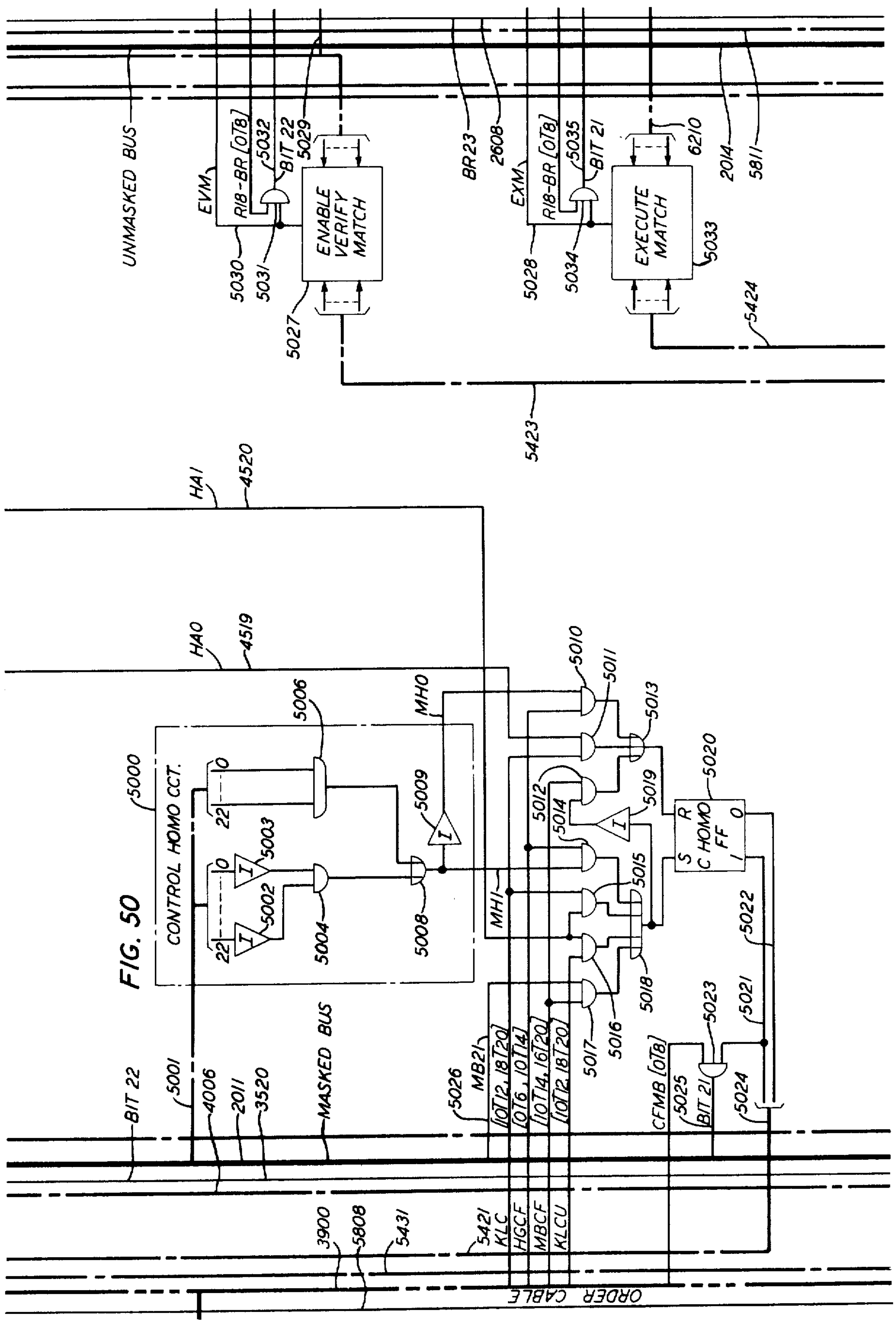
Figure 51:
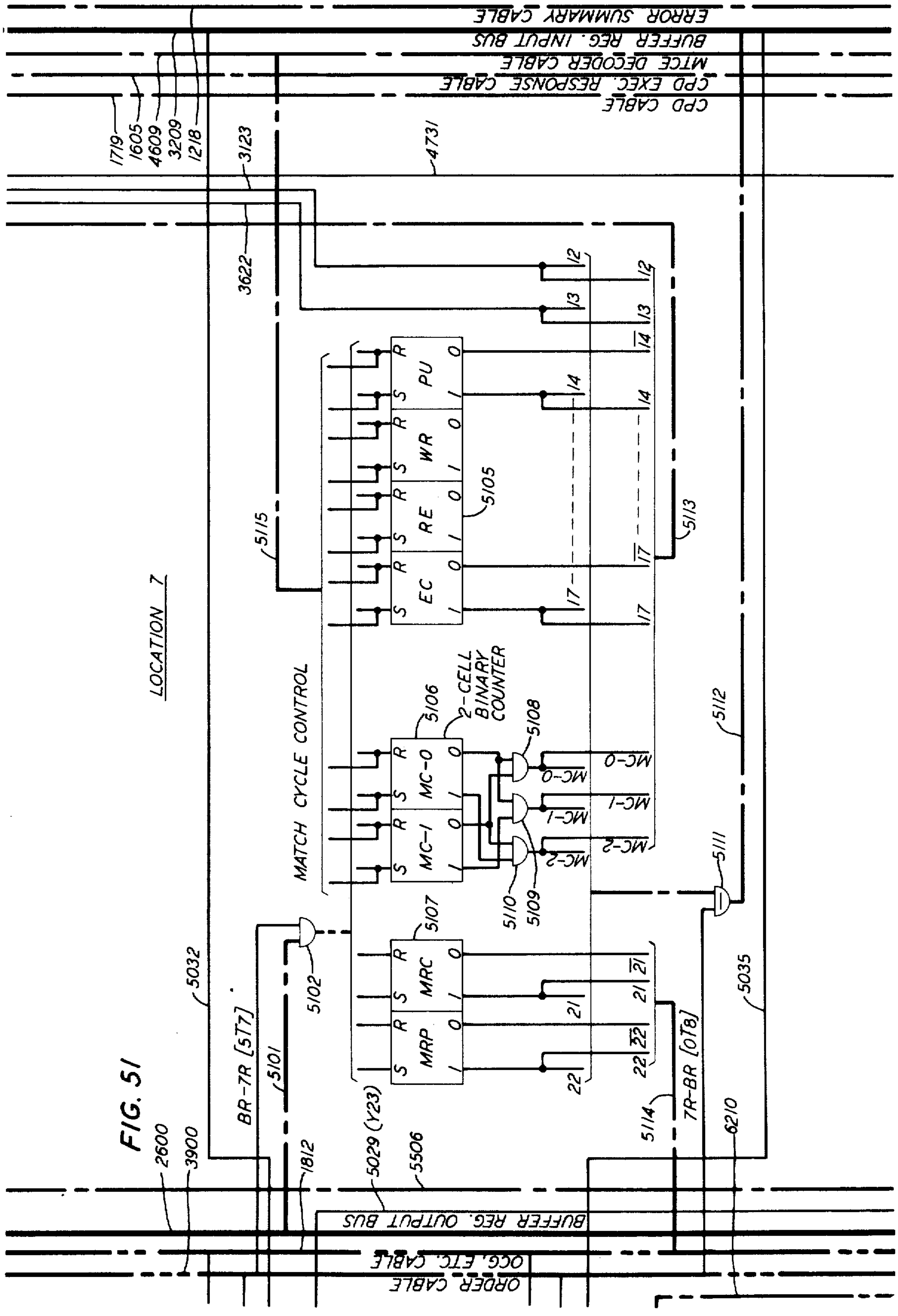
Figure 52:
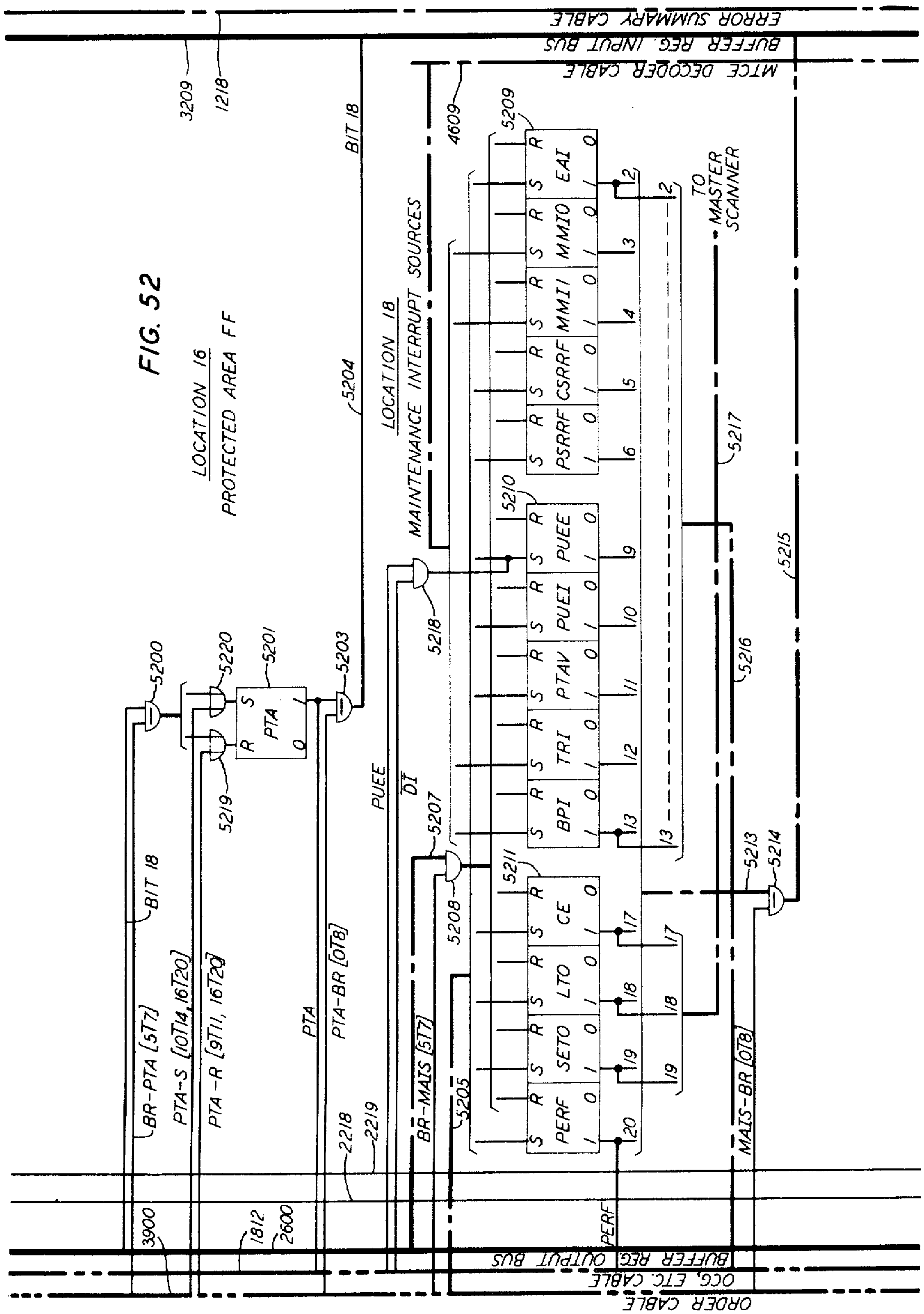
Figure 53:
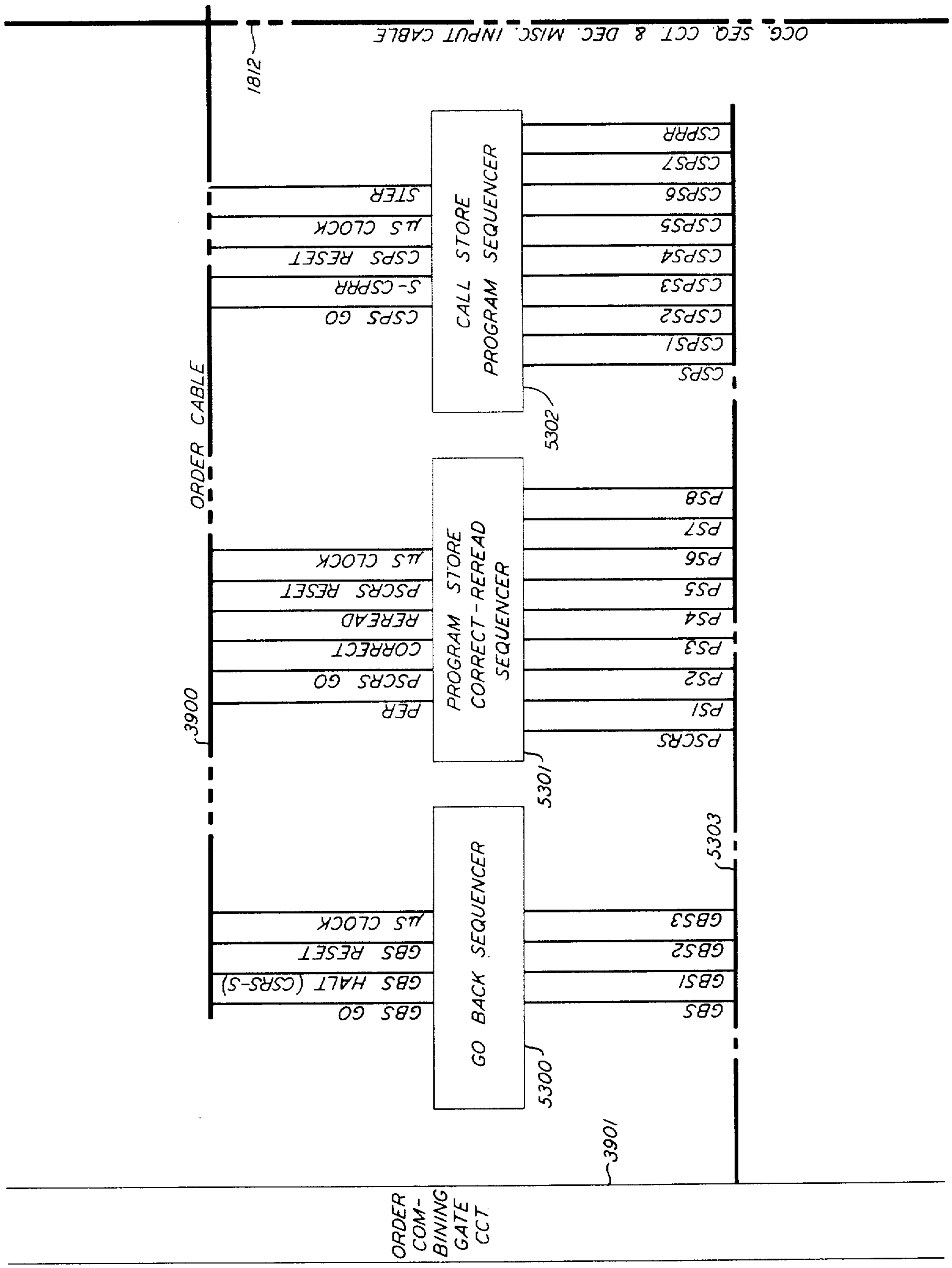

In the execution of CPD commands the proper response of the Central Pulse Distributor 143 includes the transmitting of the All Seems Well signal to Central Control 101 and the transmission of execute response signals which match the execute signals sent in the third wave of the CPD command. Accordingly, the command order sequencer interrogates the flip-flop ASW CPD [FIG. 62] and the output of the Execute Match Circuit 5033 sometime after the 3.75 microsecond interval 19T12 in which the execute response and All Seems Well information appear. The Execute Match Circuit 5033 compares the signals appearing on the conductors 5424 (the execute signals appearing at the output of the CPD translator 5422) and the signals appearing on conductor 6210 (the execute response as registered in bits 0 through 15 of the Command Order Maintenance Summary Register 6205). If a match occurs, a signal appears on the conductor EXM [FIG. 50], and if the All Seems Well signal is returned to Central Control 101, a signal appears on ASW CPD [FIG. 62]. Failure of Signals to appear on these leads causes the Command Order Sequencer 4902 to set the flip-flop PUEI [FIG. 52] which results in ensuing maintenance program designated to determine the nature and location of the trouble.

Figure 62:
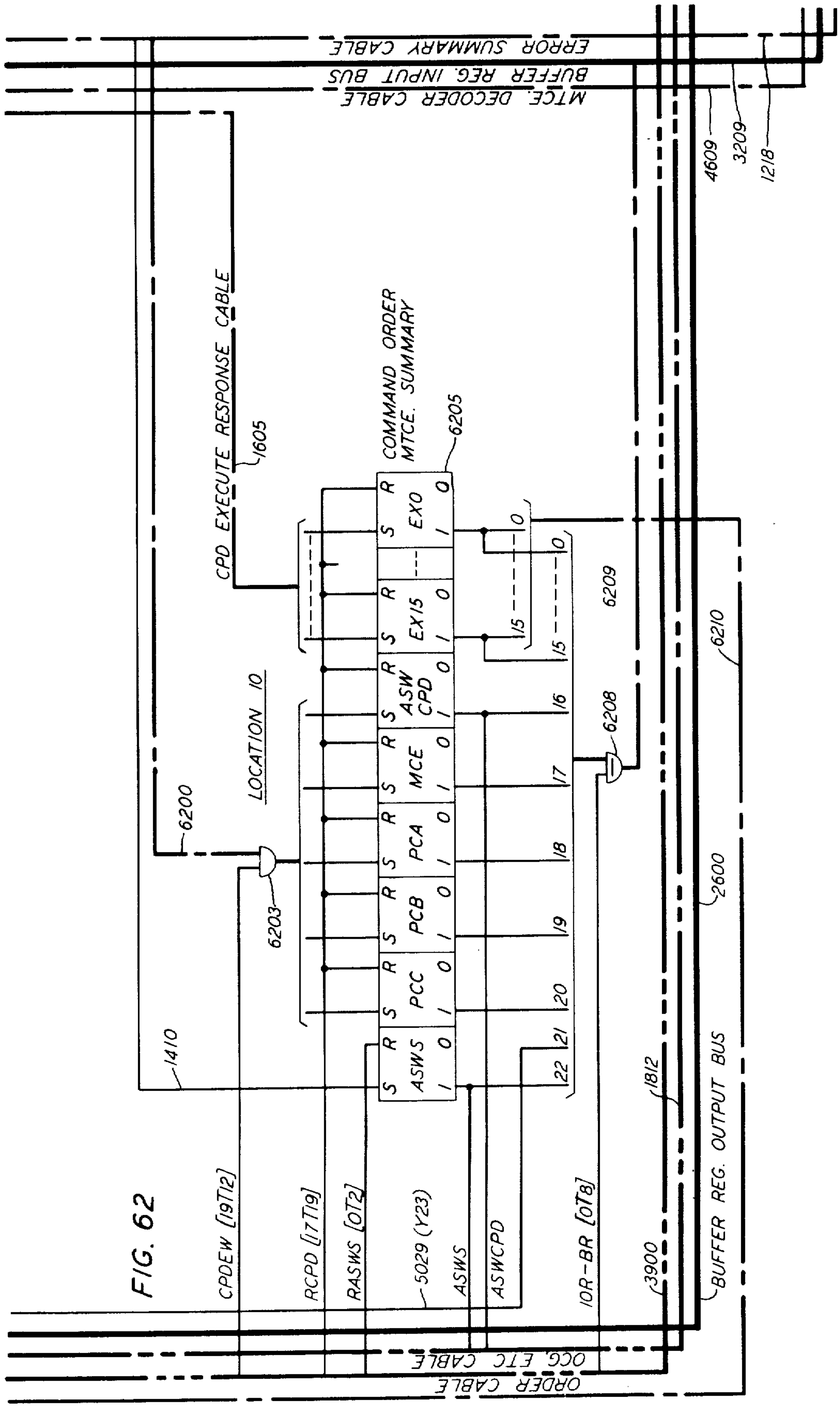

The response of the Central Pulse Distributor 143 stored in the flip-flops MCE, PCA, PCB, and PCC [FIG. 62] are not examined by the Command Order Sequencer 4902, but serve as additional maintenance information in the event of troubles indicated by improper execute response signals or the failure of the appearance of an All Seems Well signal.

Network Command Gating Actions

Figure 28:
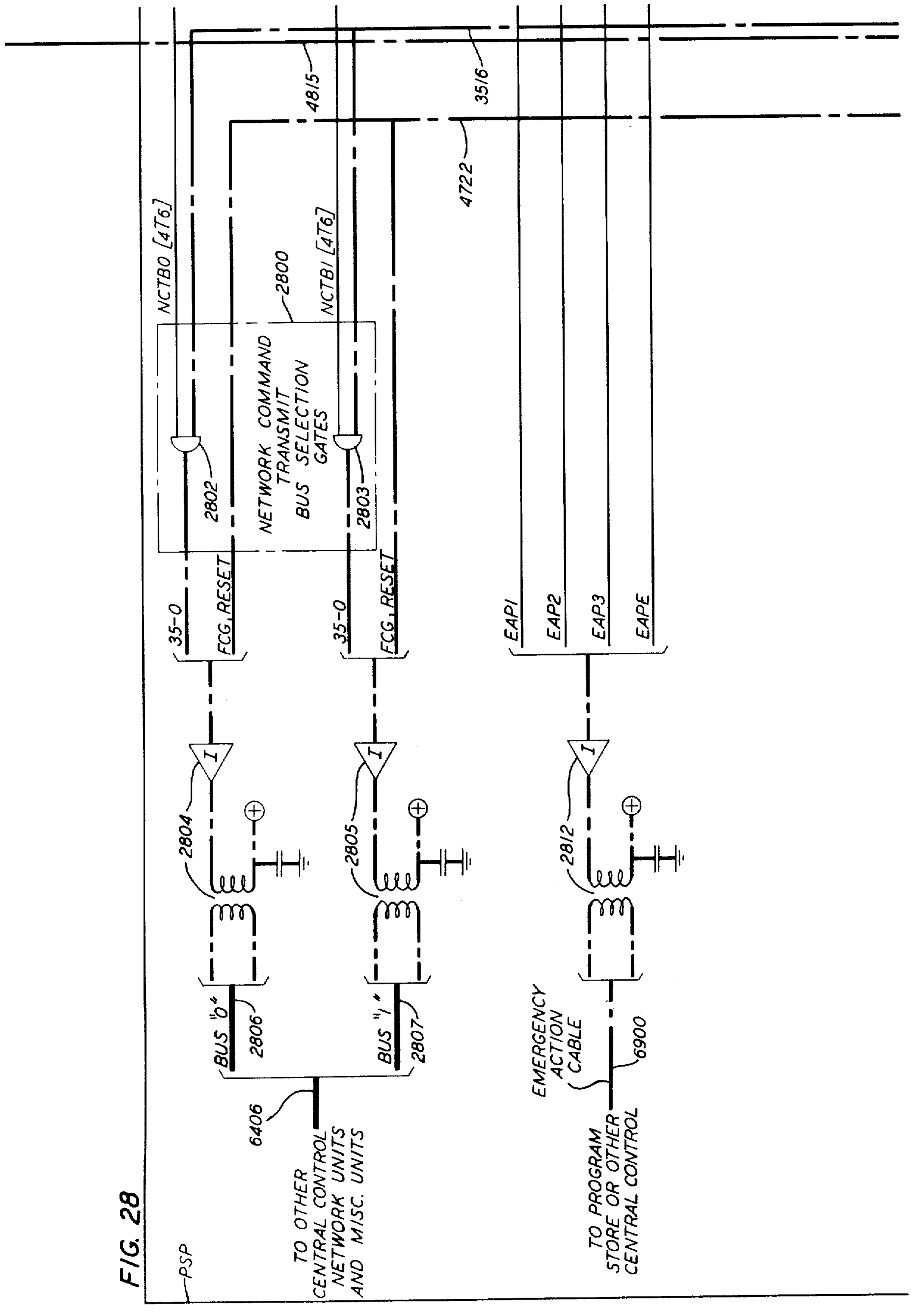
Figure 29:
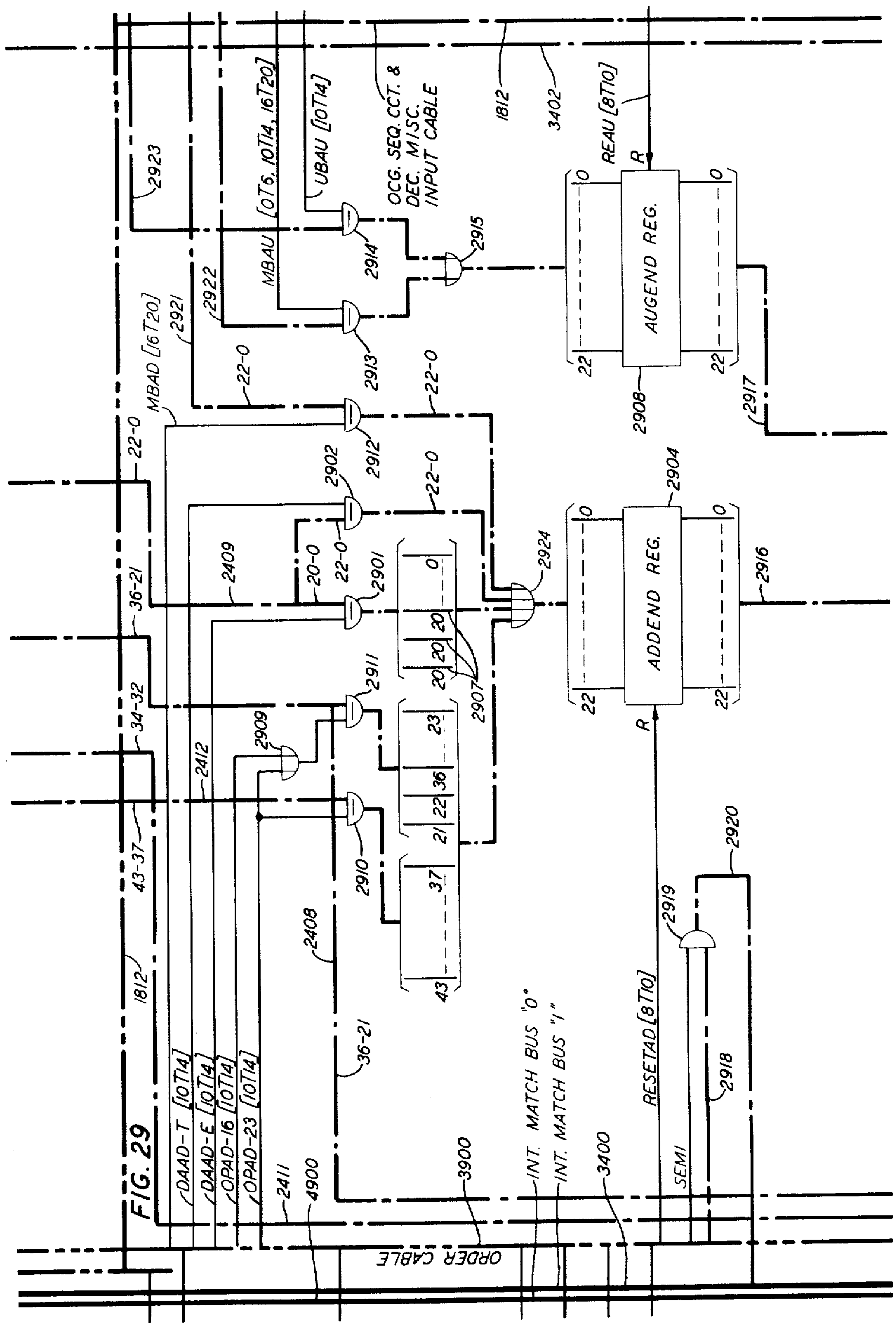

The operational step of network command orders include the generation of a network command on cable 3516 and the transmission of these signals through the Network Command Transmit Bus Selection Gates 2800 to the Cable Drivers 2804 and 2805 and the bus "0" 2806 and bus "1" 2807 of the Network Command Bus System 6406. If the order X in FIG. 84 is a network command order, then signals appearing on NCTB0 or NCTB1 [FIG. 28] during 4T6 of cycle 4 (not shown in FIG. 84) transmits the command to the "0" or "1" bus, respectively, of the Network Command Bus System 6406. The selection of the duplicate bus for transmission is controlled by the state of the flip-flops OL2 [FIG. 55] and bit position 14 of the First-One Register F14 as indicated in the following table:

| 55OL2 | F14 | Active CC Send | Standby CC Send |
|---|---|---|---|
| 0 | 0 | 0 | X |
| 0 | 1 | 1 | X |
| 1 | 0 | X | 0 |
| 1 | 1 | X | 1 |

In the above table the entry X indicates that the command is transmitted on neither bus.

Figure 35:
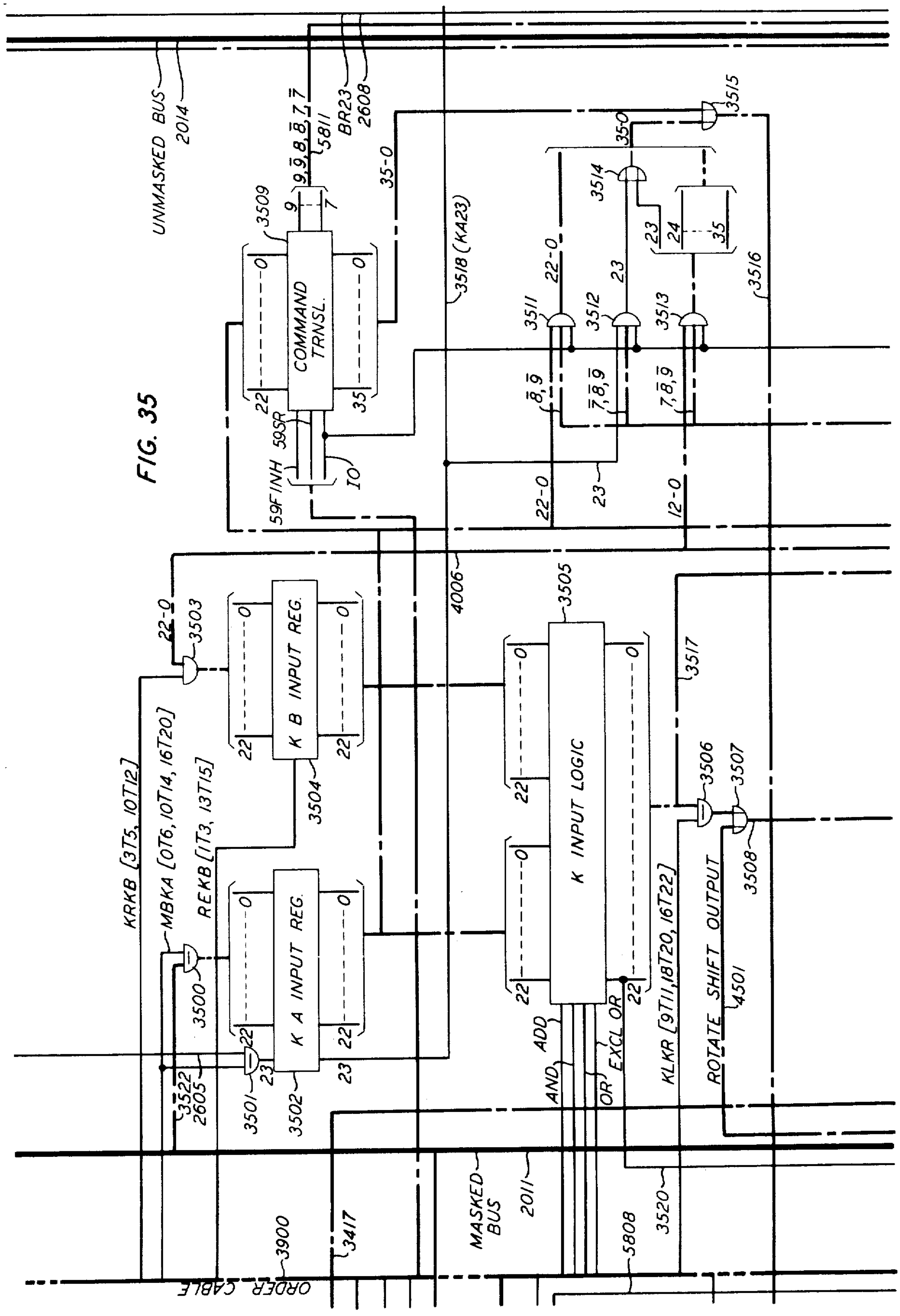

The network command generated on the cable 3516 is obtained from portions of the contents of either the K A Input Register 3502 or the K Register 4001 and the K A Input Register 3502 depending on the command order being executed and the contents of bit positions 7, 8, and 9 of the First-One Register 5801. That is, according to the combination of signals on 7, $\overline{7}$, 8, $\overline{8}$, 9, and $\overline{9}$ conductors of cable 5811 and the state of order cable conductors 10, FINH, and SR [FIG. 35], the network command is obtained from:

1. Portions of the K A Input Register 3502 via AND gates 3511, 3512 and OR gates 3514, 3515;

2. Portions of the K Register 4001 and the K A Input Register 3502 via AND gates 3513, 3511 and OR gates 3514, 3515; or 3. From portions of the K A Input Register 3502 via the Command Translator 3509 and OR gate 3515.

In the last instance, signals on cable 5811 further select the portion of the K A Input Register 3502 that are translated and the translation to be employed.

Whenever a network command is generated it is simultaneously transmitted to all network command units. The CPD command performed in the execution of a network command order serves to select which of the network command units is to execute the network command. Associated with each of the network command units are distinct unipolar outputs of the Central Pulse Distributor 143. A pulse appearing on a selected one of these unipolar outputs causes the corresponding network command unit to execute the transmitted network command. In carrying out this network command certain of the network command units transmit responses to the Central Control 101. These responses may include verify signals transmitted on the CPD Verify Bus System 6704 and data transmitted on the Scanner Answer Bus System 6600. With reference to FIG. 84, if the order X is a network command order, these responses appear as half microsecond signals within a 6.25 microsecond span of time beginning with T4 of cycle 4 and ending with T7 of cycle 5. The time interval is designated herein as 4T29 to emphasize that the time interval is in excess of one machine cycle.

The enable verify signals appear on the "0" bus 6704-0 or "1" bus 6704-1 of the CPD Verify Bus System 6704 and are transmitted via the Cable Receivers 1502 and 1501, respectively, to the CPD Verify Bus Selection Gates 1500. Accordingly, signals appearing on the order cable conductors CPDB0 or CPDB1 [FIG. 15] during 4T29 serve to transmit the CPD verify signals through the AND gate 1504 or 1503 and the OR gate 1507 to the cable 1508. Single rail signals appearing on the bus 1508 are thereby transmitted to the set inputs of the Y Register 3001 via the AND gate 3004 and the OR gate 3005. A signal on order cable conductor VBYR [FIG. 30] enables AND gate 3004. The CPD verify signals so placed in the Y Register 3001 must be identical in form to the CPD address appearing on the output leads 5423 of the CPD Translator 5422. The leads 5423 and the outputs of the Y register (transmitted on the cable 3013) are inputs to the Enable Verify Match Circuit 5027. In the performance of network command orders for which the CPD verify signals are to be placed in the Y Register 3001 the Command Order Sequence 4902 interrogates the output of the Enable Verify Match Circuit 5027 upon the receipt of the CPD verify signals. This interrogation serves as a check on the proper operation of the network command; if improper operation is indicated by a mismatch, this mismatch information appearing on the lead EVM [FIG. 50] is transmitted under control of the Command Order Sequencer 4902 to set the interrupt source flip-flop PUEI [FIG. 52]. The setting of this flip-flop may lead to an ensuing interrupt program designed to determine the circuit trouble causing the detected improper operation.

Figure 15:
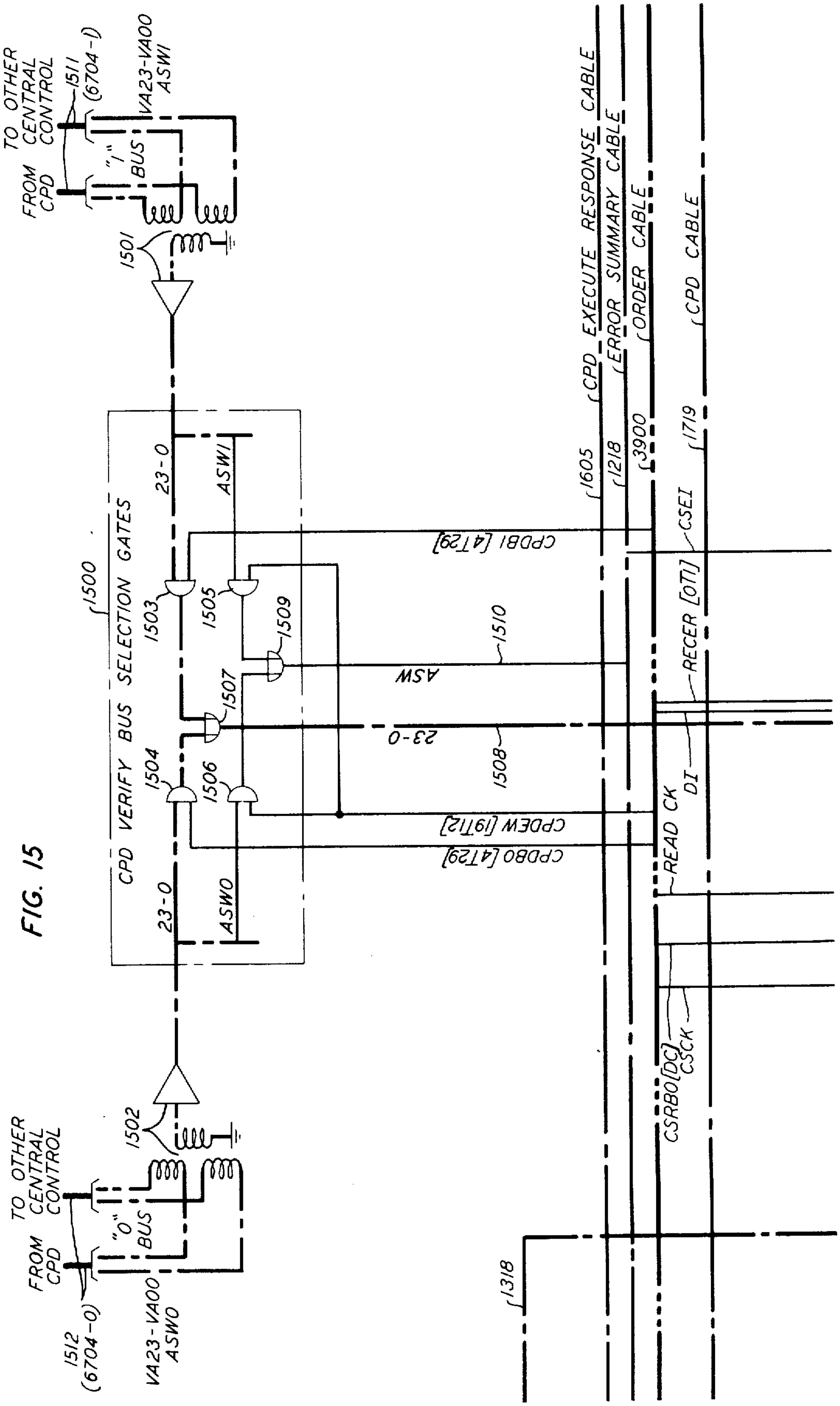

The selection of the "O" bus or the "1" bus as determined by the appearance of signals on the order cable leads CPDB0 or CPDB1 [FIG. 15]are determined by the state of flip-flop CPDB [FIG. 59]. This flip-flop serves to indicate the state of connections of the CPD Verify Bus System 6704 and indicates that the "0" bus is to be used if the flip-flop is reset, otherwise the "1" bus is to be examined for CPD verify signals.

Figure 14:
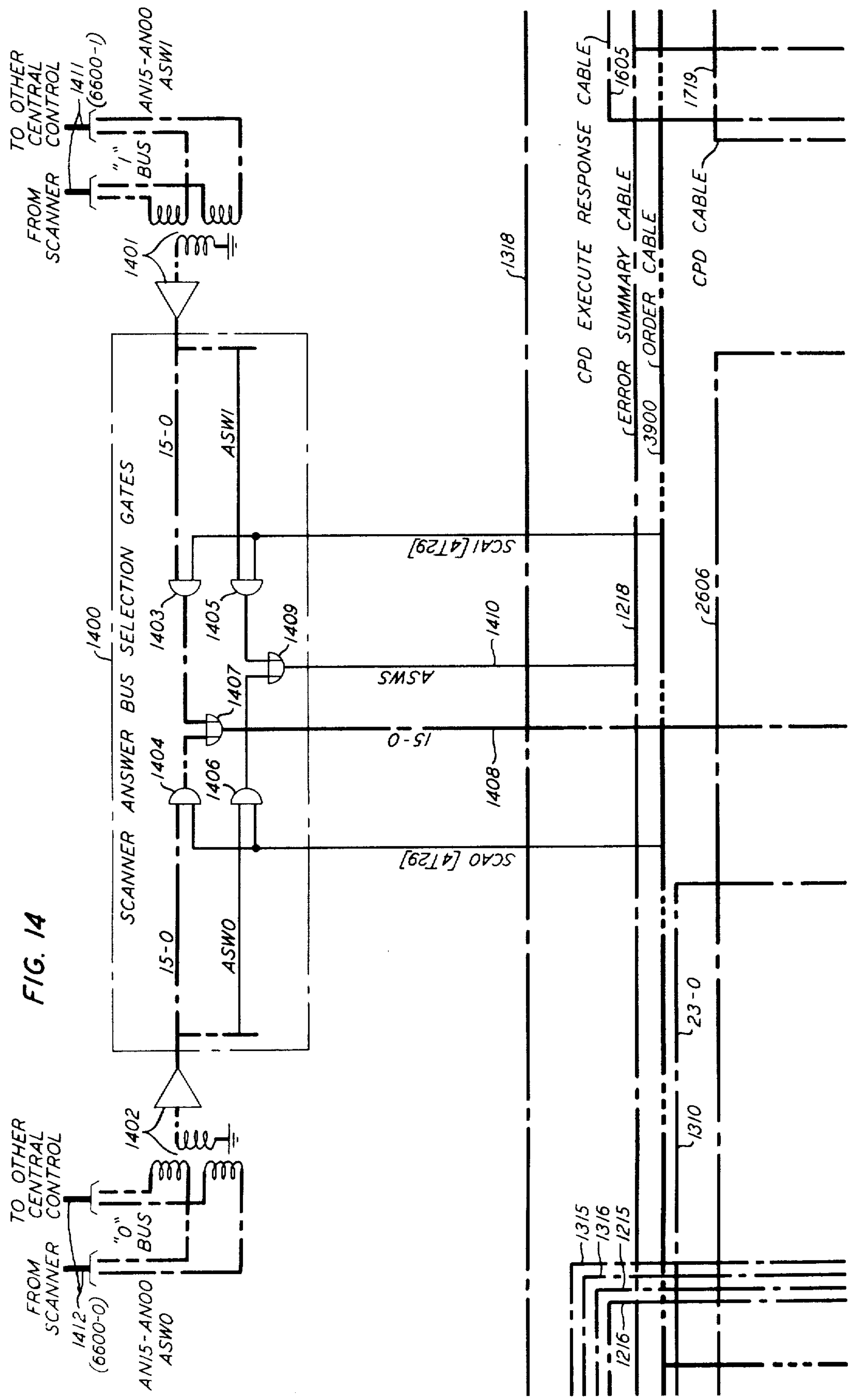

The operational step of certain of the network command orders results in the returning of data on the Scanner Answer Bus System 6600 to the Central Control 101. In such instances gating signals under the direction of the Command Order Sequencer 4902 transmit scanner answers from the "0" bus 6600-0 or "1" bus 6600-1 through the Scanner Answer Bus Selection Gates 1400 onto the bus 1408 through the AND gate 2100 to the inputs of the Logic Register 2508. The "0" bus 6600-0 or "1" bus 6600-1 is examined by the appearance of signals on the order cable lead SCA0 or SCA1 [FIG. 14], respectively, during 4T29. The scanner answer is transmitted through the AND gate 1404 or 1403 and the OR gate 1407 to the bus 1408. The simultaneous appearance of a signal on the order lead SCLR [FIG. 21] transmits these single rail signals through the AND gate 2100 to the set inputs of the Logic Register 2508.

The selection of the "0" bus or "1" bus is determined by the states of flip-flops AU [FIG. 55], SCBA [FIG. 59], and 59SCBB according to the following table.

| 55AU | 59SCBA | 59SCBB | Bus Selected |
|---|---|---|---|
| 0 | 0 | 0 | 0 |
| 0 | 0 | 1 | 1 |
| 0 | 1 | 0 | 0 |
| 0 | 1 | 1 | 1 |
| 1 | 0 | 0 | 0 |
| 1 | 0 | 1 | 0 |
| 1 | 1 | 0 | 1 |
| 1 | 1 | 1 | 1 |

In the execution of network command orders on All Seems Well signal is returned in some instances via ASW0 or ASW1 of the Scanner Answer Bus System 6600. This signal serves to indicate the proper response to the command by the selected network command unit. In such instances a signal on order cable conductor SCA0 or SCA1 [FIG. 14] transmits the All Seems Well signal through the AND gates 1406 or 1405 and the OR gate 1409 to the Error Summary Cable 1218. The All Seems Well signal is thereby transmitted to the set input of the flip-flop ASWS [FIG. 62]. When specified by a network command order being executed, the output of the flip-flop ASWS is interrogated by the Command Order Sequencer 4902 to determine the appearance of the All Seems Well signal; if this signal is not so registered in the flip-flop, further gating actions are undertaken by the Command Order Sequencer 4902 which lead to an ensuing interrupt program to examine the system for the cause of the trouble.

Figure 25:
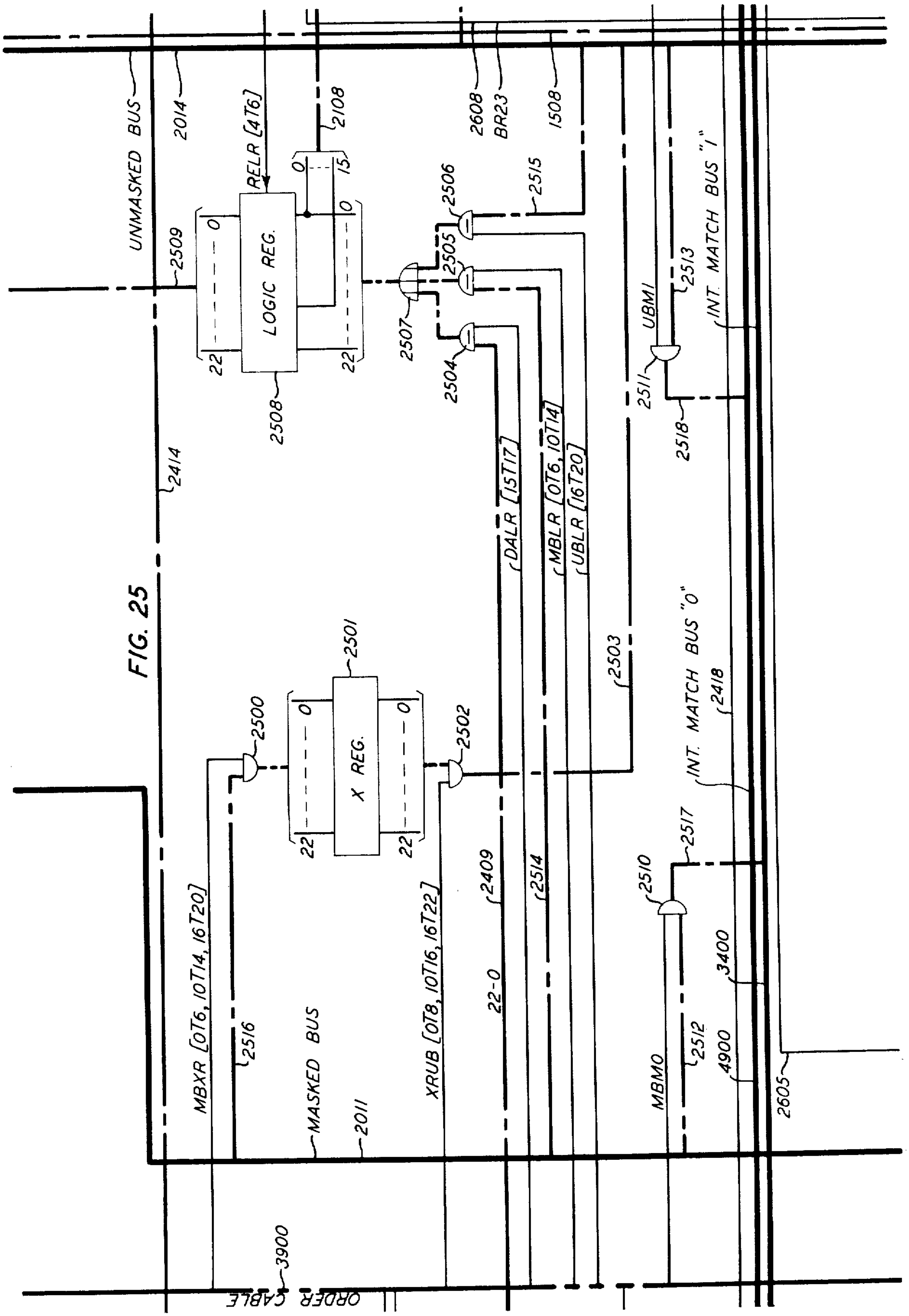

The CPD verify signals, and information returned on the Scanner Answer Bus System 6600 appear as single rail half microsecond pulses which are to set selected flip-flop registers within Central Control 101. To prepare for the reception of such single rail information the corresponding flip-flop registers are previously reset. If information is to be transmitted from the Scanner Answer Bus System 6600 to the Logic Register 2508, then a signal appearing on the order lead RELR [FIG. 25] during 4T6 of cycle 4 resets that register. Similarly, signals appearing on order cable leads REYR [FIG. 30] and RASWS [FIG. 62] provide the initial resetting of the Y Register 3001 and the flip-flop ASWS [FIG. 62].

Cross-Connection of Error Signals in Central Control 101

The Central Control 101 is duplicated, and at any time one of the two units is designated the "active unit" and the remaining unit is referred to as the "standby unit". The active unit serves to execute all of the call processing and most of the maintenance program sequences. That is, in most instances the control of the telephone switching system emanates from the execution of program sequences within the active central control unit; the standby central control unit may also be executing the same program sequences, but the standby central control unit does not transmit CPD commands or network commands and therefore has no direct influence in the operation of the telephone switching system.

When difficulties in the operation of the Central Processor 100 are detected by one or more of hardware or program checks remedial maintenance programs are called in which may determine that the difficulty lies within the active central control unit. If this is the case the Emergency Action Sequencer 5702 or a program sequence executed in the active central control "switches" the units. That is, the active central control unit is made to be the standby unit, and the standby central control unit is simultaneously designated the active unit. This switch is made by a CPD command which simultaneously changes the states of the CPD controlled status flip-flops AU [FIG. 55] in both central control units. The state of this flip-flop places its central control in the standby or active state. By resetting flip-flop AU an active central control is switched to the standby state.

In the absence of trouble the various duplicate units (the Central Control 101, the Program Store 102, the Call Store 103, and connecting address and response bus systems) may be assembled into two distinct or partially shared duplicates of a central processor. The active central control unit is the nucleus for an "Active Central Processor", and the standby central control serves in the "Standby Central Processor". The duplicate central processors are advantageously used in our system in two modes. The first mode is the running of the duplicate central processors in "step". That is, both active and standby central processors are executing the same program sequences (from the same or duplicate program store units), reading and writing data (from the same or duplicate call store units), but only the active central processor is controlling the Central Pulse Distributor 143 and the network command units. In the second mode of operation the active central processor is carrying on the call processing function using one set of program sequences while the standby central processor is performing diagnostic exercises utilizing different program sequences and only "unshared" units of the duplicate central processors.

In the first mode the execution of program sequences in duplicate within the Central Processor 100 is employed to detect the occurrence of circuit troubles therein by periodically matching strategic data processing nodes in both central control units. (In this embodiment two pairs of words are matched per 5.5 microsecond cycle.) The nodes matched include the Unmasked Bus 2014, the Masked Bus 2011, the Index Adder Output Register 3401, and the Data Buffer Register 2601, the Program Address Register 4801, the Buffer Order Word Register 2410, and sequencer test points.

When circuit troubles occur in one central processor unit and cause the data processing to be altered this alteration results in a mismatch of two like nodes in the duplicate central processors. The detection of the mismatch will lead to a maintenance interrupt and program sequences designed to determine the unit in trouble. It should be noted that the matching scheme works only if the duplicate program sequences are running in step. That is, if the execution of one program sequence falls behind its "twin", then mismatches of like nodes may occur as a result of different data processing steps rather than circuit troubles. The result would be the occurrence of the C level maintenance interrupt leading to the above-mentioned program sequences which is not only unnecessary but also may cause subscriber dissatisfaction by a lengthy interruption of call processing to execute exhaustive program sequences which search for a non-existent trouble.

As previously indicated, there exist partially or wholly independent "loops" of communication between the two central control units and two or more units in the Program Store 102 and/or the Call Store 103. It is therefore possible that an error be generated in one such loop while no corresponding error occurs in the duplicate loop. For example, one central control unit may detect an error in reading program words or data while the second unit receives a valid word of program or data. In such instances one central processor unit inserts one or more 5.5 microsecond cycles to correct or reread the program or data word; to keep the two program sequences in step, for purposes of matching, the duplicate unit must also insert the same one or more 5.5 microsecond cycles. The duplicate central processors are kept in step by the "cross connecting" of error information so that correction or rereading actions are initiated in both central processors in response to hardware troubles detected in either duplicate central processor. That is, when one central control unit detects a failure of one or more hardware checks in reading or writing words in the Program Store 102 or the Call Store 103 or in executing a CPD command and/or a network command, the information is transmitted to the second central control unit. A similar transmission of information from the second central control unit to the first is included to provide the "cross connection".

This cross connection of trouble information is only relevant when the two central controls are running in step. When the central processors are executing independent programs matching is dropped. In this independent mode trouble information transmitted from one central control unit to another is irrelevant and must be ignored. This is accomplished by setting the CPD controlled status flip-flop DI [FIG. 55] which, as described below, disables the cross connection.

The hardware check of program or data words read from the Program Store 102 by the Central Control 101 is performed in the Error Detection and Correction Circuit 2400. Checks are also made therein of program words obtained from the Call Store 103. When a correctable error is detected, a signal appears on the I Correct conductor 2420; when an error requiring a rereading is detected, a signal appears on the I Reread conductor 2421.

A signal appearing on conductor 2420 sets the I Correct flip-flop 2312, and a signal on conductor 2421 sets the I Reread flip-flop 2313. The flip-flops 2312 and 2313 serve as the indication of hardware check failures within the central control unit. The setting of either of these flip-flops results in a signal being transmitted through the OR gate 2317 and the conductor 2322 to the Error Detection and Correction Circuit 2400 which in turn generates signals leading to the required actions of correcting or rereading.

Figure 23:
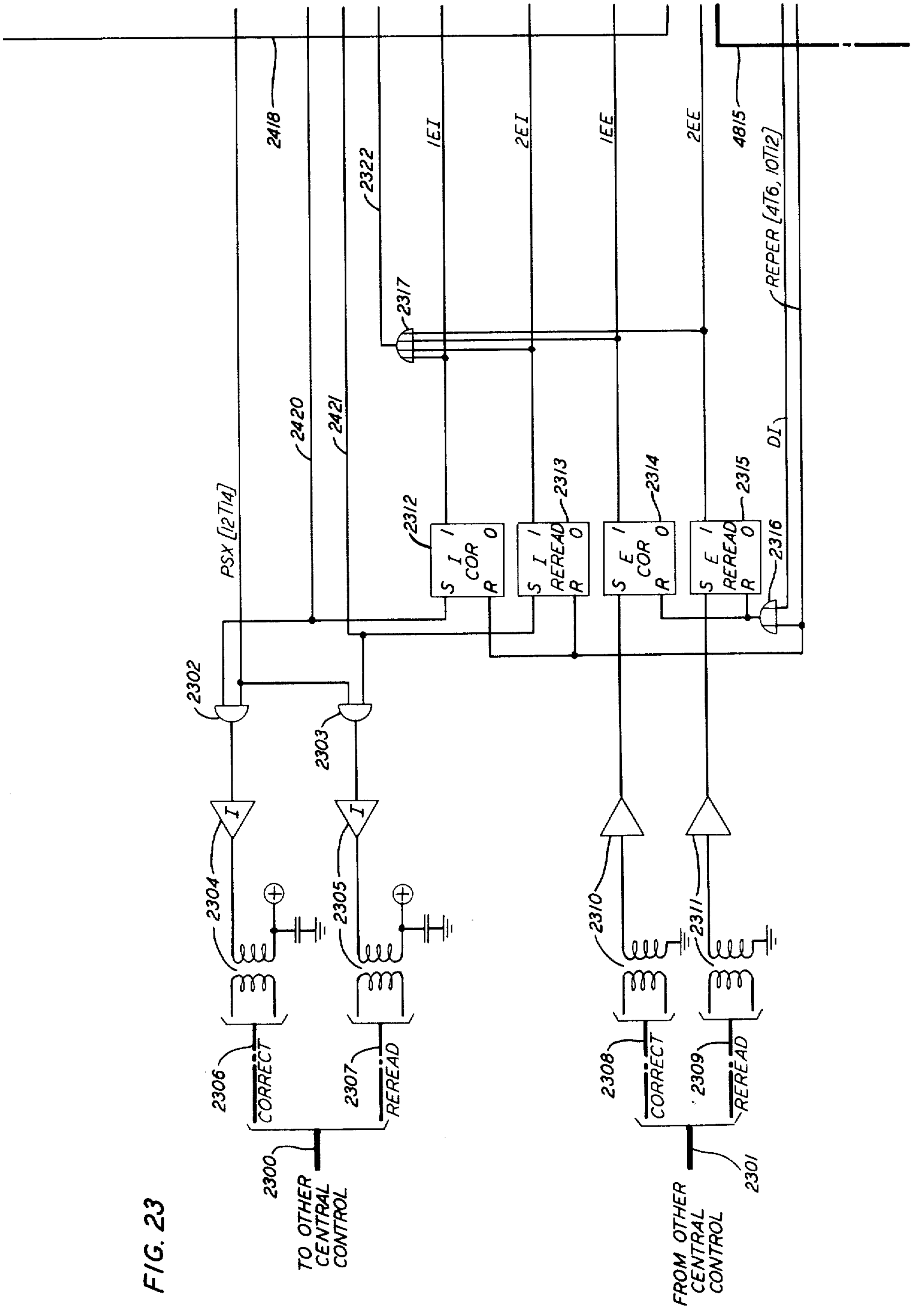

Signals appearing on conductors 2420 and 2421 are transmitted through the AND gates 2302 and 2303, respectively, by the appearance of a signal on order cable conductor PSX [FIG. 23] during 12T14 of the 5.5 microsecond cycle in which the program store reading is being checked. These signals are thereby transmitted as half microsecond pulses through the Cable Drivers 2304 and 2305 and the bus 2300 to the other central control unit. The bus 2300 in each central control unit is the bus 2301 in the other central control unit; the half microsecond signals corresponding to conductors 2420 and 2421 generated in one central control unit appear on the bus 2301 of the other central control unit and are transmitted via the Cable Receivers 2310 and 2311 to the set inputs of the E Correct flip-flop 2314 and the E Reread flip-flop 2315, respectively. The setting of either the E Correct or E Reread flip-flops causes a signal to be transmitted via the OR gate 2317 and the conductor 2322 to the Error Detection and Correction Circuit 2400. Thus errors detected in reading the Program Store 102 for program words or data or the Call Store 103 for program words within one central control unit are transmitted to the other central control unit to cause the Program Store Correct-Reread Sequencer 5301 or the Call Store Program Sequencer 5302 in both units to insert the same number of machine cycles and thereby keep the program execution in step.

When the duplicate central processors are executing different program sequences the flip-flop DI [FIG. 55] must previously be set in both central control units; a signal then continually appears on the order cable lead DI [FIG. 23] and is transmitted through the OR gate 2316 to the reset inputs of the E Correct and E Reread flip-flops. This reset signal over-rides any trouble signals transmitted from the other central control so that the Error Detection and Correction Circuit 2400 does not respond to any externally generated trouble signals.

A similar cross connection applies to the reading or writing of data from the Call Store 103. In this instance hardware check failures are summarized in the Call Store Error Detection Circuit 2200 and appear as a signal on the CERI output conductor 2220 which sets the CSEI flip-flop 2201 and is transmitted via the AND gate 2700 and Cable Driver 2701 to the bus 2706. The bus 2706 in each central control unit is connected to the bus 2208 of the other central control unit; the call store error signal generated as a half microsecond pulse in AND gate 2700 of one central control is thereby transmitted through Cable Receiver 2205 of the other central control unit to the CERE conductor 2212 and to the set input of the CSEE flip-flop 2202. The setting of either of the CSEI or CSEE flip-flops causes a signal to be transmitted through the OR gate 2203 to the conductor CER [FIG. 22]; a signal appearing on CER leads to the activation of the Call Store Reread Sequencer 5700.

Figure 22:
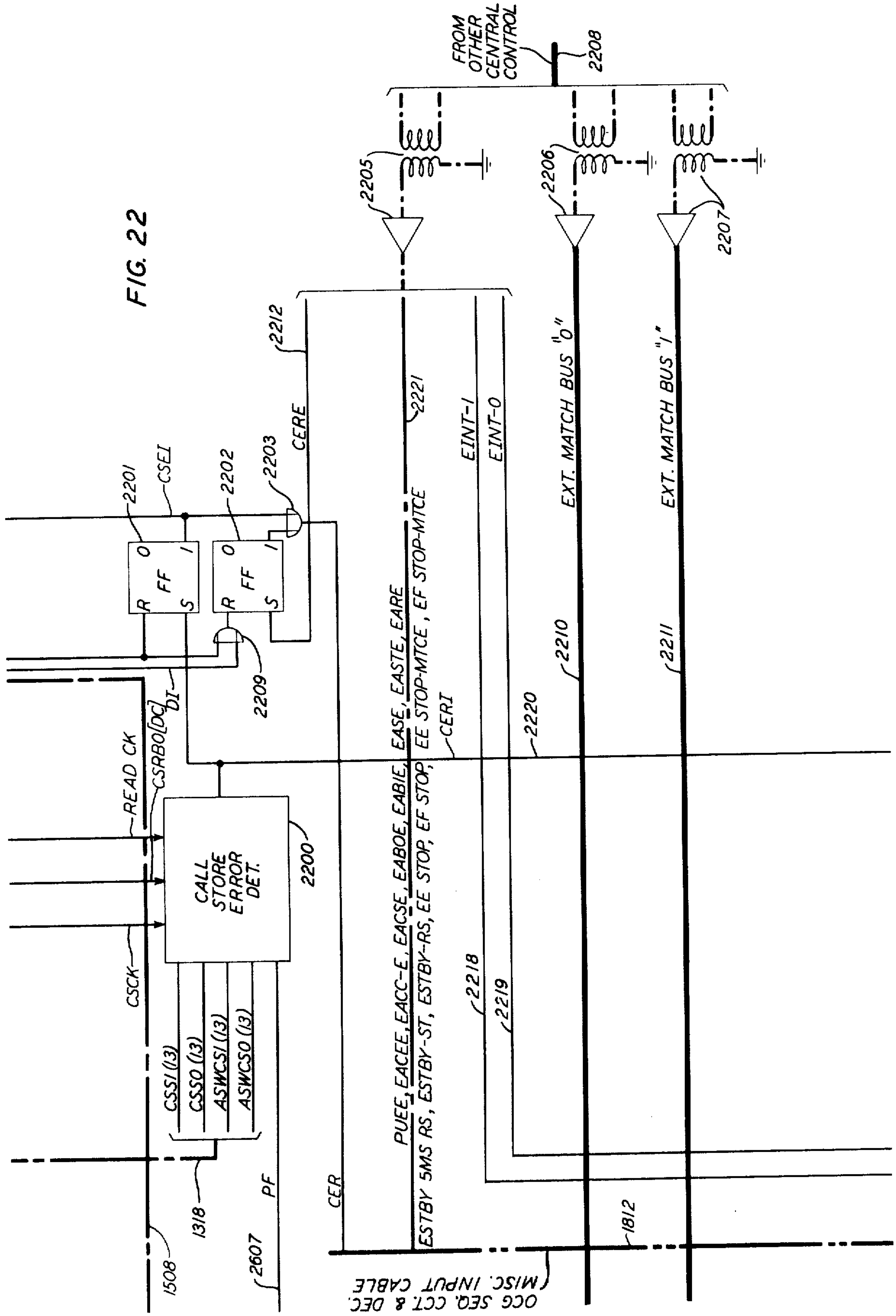

Setting the flip-flop DI [FIG. 55] causes a signal to continually appear on DI [FIG. 22] and be transmitted through the OR gate 2209 to the reset input of the CSEE flip-flop 2202; the setting of DI [FIG. 55] serves to disable the cross connection of call store error information.

A cross connection of hardware check failure information is also provided as part of the execution of CPD commands and network commands. These commands and the hardware checks are executed under control of the Command Order Sequencer 4902; upon completion of a CPD command or a network command any hardware check failures are summarized as a half microsecond pulse appearing on the order cable conductor PUEI [FIG. 27] which is connected via the bus 5205 to the set input of the Maintenance Interrupt Source Flip-Flop PUEI [FIG. 52]. This same signal is transmitted via the Cable Driver 2701 and bus 2706 to the other central control unit. This signal is transmitted to the bus 2208 of the other central control unit and within that unit through the Cable Receiver 2205 to the conductor PUEE [FIG. 22]. Unless the flip-flop DI [FIG. 55] is set the signal appearing on PUEE [FIG. 22] is transmitted through the AND gate 5218 to the set input of the Maintenance Interrupt Source Flip-Flop PUEE [FIG. 52]; setting either PUEI or PUEE leads to a level F maintenance interrupt and interrupt program sequences which investigate difficulties in CPD command or network command communications.

Emergency Actions

During the course of normal call processing troubles are detected both by program checks and by hardware checks. The first approach to recover the call processing ability upon detection of trouble is by the way of program sequences which are calculated to isolate troubles to faulty subsystems and to rearrange the configurations of equipments which are related to the faulty subsystems. This approach is possible only if an operable combination of central control, program store, and intercommunicating bus systems is currently active. That is, even though each of these system elements is duplicated and even though only one duplicated element may be faulty, such duplication is of no avail if the Central Control 101 is unable either to properly process or to acquire program information when employing the currently active combination of equipments. That is, for the Central Processor 100 to recover its call processing ability by way of program fault recognition sequences and attain program rearrangements of faulty subsystems there must first be a currently active "sane" combination of central control, program store, and intercommunicating bus systems. When one of the hardware checks detects trouble which is related to the Central Control 101, the Program Store 102, or the Call Store 103 the 40 Millisecond Emergency Action Timer of the Real Time Check 5703 is enabled and this timer is not reset until the call processing ability of the Central Processor 100 is assured. That is, after it is determined that it was possible to rearrange subsystems by way of program actions, the emergency action timer is reset to preclude unwanted emergency actions. However, if the program actions are not successful in recovering the call processing ability of the Central Processor 100, the 40 Millisecond Emergency Action Timer times out and provides one of the several signals to activate the Emergency Action Sequencer 5702. This sequencer is designed to recover the central processor's call processing ability without reliance on program actions for effecting rearrangements of equipment in the active combination of central control, program store, and their communicating buses. The Emergency Action Sequencer 5702 employs program sequences which are obtained from the Program Store 102 to evaluate its independent remedial actions; however, the remedial actions regarding the rearrangements of equipment are implemented by hardware means, i.e., circuitry as opposed to program means.

As noted above, the 40 Millisecond Emergency Action Timer provides but one of the several signals which serve to enable the Emergency Action Sequencer 5702.

The detection of trouble by way of the program checks and hardware checks which attend the normal call processing is an obvious source of information indicating the system's inability to perform its normal work functions. There are a number of other basic fact situations which represent serious system operational troubles and which are not detectable by these program checks and hardware checks. If no corrective actions are taken these undetectable troubles may grossly mutilate the telephone processing and the maintenance functions and thus cause a substantial degree of subscriber dissatisfaction. Accordingly, a number of specialized independent checking circuits are provided within the Central Control 101 to detect certain basic classes of trouble. If any of these independent checks fails within the active central control, the Emergency Action Sequencer 5702 within the central control is enabled and undertakes steps to correct such troubles. The basic situations which lead to enablement of the Emergency Action Sequencer 5702 and which are defended against by independent check circuits are as follows:

1. Certain of the sequencers which perform certain repetitive system control functions assume control of the Central Control 101 to the exclusion of the decoders 3902–3904. The occurrence of a fault in one or more of these sequencers may result in that sequencer remaining in an active state indefinitely; the sequencer would thus indefinitely block the continuation of call processing. Accordingly, a six stage binary counter (the Time-Out Counter 4109) is utilized to summarize periods of activity of such sequencers. That is, when one of these sequencers is active the Time-Out Counter 4109 is incremented once per 5.5 microsecond machine cycle and is reset when the sequencer is returned to its inactive state. The sequencers checked in this manner are:

Transfer Sequencer 4401
Interrupt Sequencer 4901
Data Reading Sequencer 4903
Go Back Sequencer 5300
Program Store Correct-Reread Sequencer 5301
Call Store Program Sequencer 5302
Call Store Reread Sequencer 5700.

During any 5.5 microsecond cycle in which one or more of the above-noted sequencers are in an active state, the Time-Out Counter 4109 is incremented by a signal on the order cable conductor 41TOC-INC; if none of these sequencers is active, a signal will occur during each 5.5 microsecond cycle on the order cable conductor 41TOC-R to return or retain the Time-Out Counter 4109 in the all zero state (000000). It should be noted that the monitoring of sequencers is but one of the uses to which the Time-Out Counter 4109 is employed and that the above description applies only when the Match Control Register 4103 dictates sequencer time-out monitoring.

The output terminals of the Time-Out Counter 4109 are matched with the outputs of the Time-Out Counter Register 41TOCR-5 . . . 41TOCR-0 by means of the Time-Out Match Circuit 4108. The Time-Out Counter Register 41TOCR-5 . . . 41TOCR-0 is preset to a value which represents the maximum number of machine cycles that the monitored sequencers should be continually active. If the number accumulated in the Time-Out Counter 4109 reaches the value contained in the Time-Out Counter Register 41TOCR-5 . . . 41TOCR-0, the output conductor 41SQC will be enabled. A signal on this conductor activates the Emergency Action Sequencer 5702 and sets flip-flop 52SETO.

The above-noted sequencers are all monitored as described since program interrupts, even the emergency action B level interrupt, permits the combination of the actions of these sequencers before the interrupt is executed. Not all of the sequencers within the Central Control 101 are monitored in this manner. However, other trouble detection steps are taken to insure their correct operation. The Emergency Action Sequencer 5702, for example, is not so monitored since it is inherently incapable of correcting its internal defects. Instead, it is checked by a maintenance routine program sequence which temporarily activates the Emergency Action Sequencer 5702 and monitors the resulting action.

The Stop Sequencer 4400 is not directly monitored since if it remained active the Real Time Check 5703 would activate the Emergency Action Sequencer 5702.

The Command Order Sequencer 4902 is also excluded from the time-out check since in the course of its normal operation it may carry out long sequences of command orders and thereby be active for relatively long spans of time which exceed the interval of time established in the Time-Out Counter Register 41TOCR-5 . . . 41TOCR-0. Further, the monitoring of both this sequencer and the K Register Sequencer 5701 is not critical, since the Interrupt Sequencer 4901 may be activated even though either of the K Register Sequencer 5701 or the Command Order Sequencer 4902 remains active.

2. The output terminals of the Microsecond Clock 5100 are wired directly to the Clock Check 6102 which continually monitors the clock output signals. If one or more of the clock signals fail to appear as they are shown in FIG. 83, a signal is generated on the output conductor 61CKC which is one of the input signals to the Order Combining Gate Circuit 3901 which causes order cable conductor 57EA GO to be enabled. This, in turn, activates the Emergency Action Sequencer 5702 and sets flip-flop 52CE. Since the Microsecond Clock 5100 may fail to produce any clock outputs the signal on conductor 61CKC is a D-C signal.

3. A program check of the normalcy of call processing is made (a) to assure that call processing has not resulted in continually performing a limited number of functions to the exclusion of the many other program functions which are required to accomplish all of the normal tasks of a telephone switching office, and (b) to compare the passage of "real time" as indicated by the state of a real time binary counter in the Real Time Check 5703 and the passage of time as indicated by the execution of program orders which are scheduled within the call processing sequences. This check is analogous to the previously described check which was made to assure that none of the sequencers were stuck.

The Real Time Check 5703 comprises a seven-stage binary counter which is incremented at 10 millisecond intervals by the occurrence of the even 5 millisecond output pulses of the Millisecond Clock 6101 on conductor 57J-S. The Real Time Check 5703 also, as previously noted, includes a 40 millisecond analog timer which has been previously referred to herein as the 40 Millisecond Emergency Action Timer. The 40 Millisecond Timer, as previously described, is employed to assure that upon detection of trouble within the central processor that such trouble is cleared up within 40 milliseconds. The 40 Millisecond Timer operates on an analog basis rather than a digital basis and is employed in the performance of several independent checks which are executed on a mutually exclusive basis. In the course of normal call processing the 40 Millisecond Analog Timer is employed to monitor the occurrence of the odd and even 5 millisecond pulses and in the event that these pulses fail to appear for more than a relatively few consecutive 5 millisecond intervals, the 40 Millisecond Emergency Action Timer will time out and enable conductor 57AT. A signal on conductor 57AT enables the Emergency Action Sequencer 5702 and sets flip-flop 52LTO.

As will be described later herein, the 40 Millisecond Emergency Action Analog Timer of the Real Time Check 5703 is also employed as a back up to the "sanity counter" which is located within the Millisecond Clock Circuit 6101.

A real time check cycle comprises a maximum of 640 milliseconds. At the beginning of a real time cycle the seven-stage real time counter in the Real Time Check 5703 is set to the all zero state. The even 5 millisecond pulses on conductor 57J-S serve to increment this counter and after the passage of 320 milliseconds, as indicated by stage 6 of the counter, having been set to its "1" state, a real time check "window" condition is generated. Scheduled within the call processing programs are program orders which generate two specific central pulse distributor commands, namely, a real time check set command (RT-S) and a real time check reset command (RT-R) which occur within prescribed time limits in this stated order. The CPD command for the RT-S signal occurs some time after the passage of 320 milliseconds of time in the basic 640 millisecond real time cycle (nominally at 400 milliseconds) and the CPD command for the RT-R signal occurs before the passage of the total 640 millisecond period (nominally at 500 milliseconds).

If the CPD command for the RT-R signal occurs before the passage of 320 milliseconds or after the passage of 640 milliseconds, the real time check is considered to have failed. In response to this failure conductor 57LTC is enabled which in turn enables the Emergency Action Sequencer 5702 and sets the flip-flop 52LTO.

During the course of the 640 millisecond cycle, call processing, if proceeding normally, is accomplished at the base level L in accordance with the previously described frequency list. Associated with each sublevel of the base level is a register location within the Call Store 103 which is set to its "1" state after the sublevel job supervisory program has visited and served each of the jobs of that sublevel. That is, within the base level L there are five sublevels $L_a$ through $L_e$ associated with each of these sublevels is a register cell in Call Store 103. The central pulse distributor commands which serve to generate the signals on conductors 57RT-S and 57RT-R are executed by means of "interjets" which are planted into the base level by means of an emergency action control program which is activated at interrupt level H.

The base level executive program is designed to serve the various base level jobs at approximate intervals of time. These approximate times are determined by the previously described frequency table and the design of the program sequences which implement each of the different jobs performed at the various base sublevels. The base level executive program always advances sequentially through the various sublevel jobs and there is no provision for interrupting one base level job with another base level job. Base level work is regularly "interrupted" by the H level and J level interrupts which are employed in the performance of input-output functions associated with the gathering of new call information and with the transmittal of call information. The jobs performed at an H or J level interrupt may require a relatively large number of machine cycles. Therefore, it is practical to enable the Interrupt Sequencer 4901 and to expand the time required to effect the transfer to the interrupting program and to subsequently return to the interrupted program. The jobs which are performed by interject must be performed with a degree of timing precision; however, each of these jobs requires a relatively few machine cycles. Therefore, it is not practical to execute these jobs at an interrupt level which requires enablement of the Interrupt Sequencer 4901. Interject is thus a means of accomplishing a relatively short job within a prescribed time interval without resorting to a program interrupt. The planting of the interject into the base level is but one of many jobs which is accomplished at the H level interrupt. Therefore, the H level interrupt is a general purpose interrupt and is not merely for the purpose of planting the interject.

In the course of executing the base level executive program and the base level job supervisory programs, an interject register in the Call Store 103 is examined from time to time to determine whether or not an interject request is present. The planting of the interject by the emergency action control program during the H level interrupt comprises the marking of a job activity flag in the interject register in the call store and placing in the interject register the information necessary to execute the interject, e.g., in the case of the interject which is to accomplish the CPD command to generate the RT-S signal, the information required to execute this particular CPD command.

The emergency action control program in addition to planting the interject requests and interject details in the interject register also serves to increment a binary counter which is located within the Call Store 103. That is, within the Call Store 103, there are six memory cells which are treated by the program as a binary counter which is incremented approximately once every 10 milliseconds. Thus, this counter is capable of accumulating up to 640 milliseconds. At the end of approximately 400 milliseconds, as indicated by the state of this counter, the emergency action control program plants the interject for the CPD command to generate the RT-S signal and then subsequently when this counter reaches approximately 500 milliseconds, the emergency action program plants the interject for the CPD command to generate the RT-R signal.

The CPD command which serves to generate the RT-S signal is executed without condition. However, the CPD command which generates the RT-R signal is conditioned upon the states of the cells of the sublevel job completion register which was previously described. As previously noted, there are five register cells which are individually associated with each of the base sublevels. These cells are set to the "1" state upon completion of all the work functions associated with its sublevel and, in that the frequency table is designed to be re-entered approximately once per second, even the cell associated with sublevel $L_e$ should be set to its "1" state approximately once per second. The frequency table is designed so that the cells associated with sublevel $L_a$, $L_b$, and $L_c$ are set more frequently than once per 500 milliseconds, while those associated with sublevel $L_d$ and $L_e$ are set more frequently than once very 1,000 milliseconds. The execution of the CPD command which generates the signal on conductor 57RT-R is conditioned upon the states of these five cells. Since the long-term check maximum interval of 640 milliseconds does not correspond to the approximate one second interval of the frequency table, the memory cells associated with sublevels *d* and *c* may or may not be set at successive interjects which generate the RT-R signal. However, since sublevels $L_d$ and $L_e$ are served more often than once every 1,000 milliseconds, there is assurance that the cells associated with these sublevels will each be set at least once during two successive long-term check intervals. Accordingly, at each interject which executes a CPD command to generate a signal on conductor 54RT-R the states of the five memory cells associated with the five sublevels are stored in five auxiliary cells for use at the next succeeding similar interject and the five cells associated with the sublevels are all reset. At each such interject the logical AND of the states of the cells associated with sublevels $L_a$, $L_b$, $L_c$ and their associated auxiliary cells along with the logical OR of the cells associated with $L_d$ and $L_e$ and their associated auxiliary cells must provide a 5 bit word in which all bits are "one". This logical combining of information thus insures that the work associated with sublevels $L_a$ through $L_c$ was completed at each of two successive interjects and that the work associated with sublevels $L_d$ and $L_e$ was completed at least once at successive interjects.

The flip-flops 52SETO, 52CE, and 52LTO serve to register the occurrence of the above described difficulties in the central control experiencing the difficulty. That is, if a sequencer time out occurs, the flip-flop 52SETO will be set in the central control experiencing the difficulty; if the Clock Check 5103 detects trouble in the Microsecond Clock 6100, the flip-flop 52CE will be set; and if a Real Time Check 5703 failure occurs, the flip-flop 52LTO will be set.

The states of these flip-flops within a central control can be interrogated by that central control by reading the memory at auxiliary buffer register location 18. Further, these flip-flops within both central controls may be interrogated by network commands addressed to master scanner locations corresponding to scan point terminals connected to these flip-flops via cable 5217. The provision of scanning access to these flip-flops provides means by which the active central control can interrogate the states of these flip-flops in the standby central control.

We have summarized the various system conditions which lead to the activation of the Emergency Action Sequencer 5702 during normal call processing and in this discussion it is seen that each of these conditions represents a serious trouble which may adversely affect the system's "sanity". The term "sanity" as employed herein relates to the ability of the Central Processor 100 to properly process program orders and to acquire such orders from the Program Store 102. The term "basic sanity" is limited to mean that the active configuration of Central Control 101, Program Store 102, and interconnecting communication paths permits the correct processing of specific sequences of program order words and the correct acquisition of such sequences of words from the Program Store 102. Normal call processing and normal maintenance functions require a degree of "sanity" beyond "basic sanity." That is, for the system to properly carry on all of the required telephone and maintenance functions, not only must the Central Processor 100 be capable of executing a prescribed "basic sanity" maze program, but, in addition, must be capable of executing all of the varied sequences which are employed in call processing and in normal preventive maintenance.

The probability is very high that the occurrence of one of the system conditions which enables the emergency action sequencer reflects a serious system fault which has rendered the system incapable of performing normal call processing with the current configuration of subsystems.

The Emergency Action Sequencer 5702 follows a prescribed series of "emergency actions". The first emergency action is limited to checking the sanity of the system with the current active configuration. However, succeeding emergency actions effect rearrangements of active configurations of Central Control 101, Program Store 102, and input and output transmission buses. After each emergency action a series of tests, which are identical to the tests performed at the first enablement of the Emergency Action Sequencer 5702, are performed to determine whether or not the new active configuration of equipments is capable of performing normal call processing. If these tests indicate that the Central Processor 100 is incapable of normal call processing, additional configuration charges are ındertaken. However, if it appears that the Central ›rocessor 100 is capable of performing normal call ›rocessing, the information relative to the operation of he Emergency Action Sequencer 5702 is recorded and hen a return is made to call processing.

The tests which are performed at each enablement of he Emergency Action Sequencer 5702, for purposes ›f discussion, may be divided into four basic categories ›s follows:

1. Basic Sanity Maze Program

The basic sanity check program comprises a number ›f program tests, each of which tests requires less than 28 machine cycles for completion. At the beginning of ach test the sanity timer, which is located within the Aillisecond Clock Circuit 6101, is recycled and, if the est is not completed within the basic 128 machine ycle period of time of the sanity timer, the conductor ›1-704 μsec will be enabled and this causes a further nablement of the Emergency Action Sequencer 5702. 'he Millisecond Clock Circuit 6101 comprises a pluality of binary counter stages which serve to provide he nominal odd and even 5 millisecond output signals, he 704 μsec signal, and other discrete output signals vhich may be monitored via the buffer bus system to heck the operation of Millisecond Clock Circuit 6101.

The basic sanity maze program comprises sequences ›f order words which are calculated to test the ability ›f the Central Processor 100 to process data, and to cquire program words from the Program Store 102. 'he maze program requires the execution of various ypes of orders including transfer orders and, after the naze program is successfully executed, a transfer will ıe made to a program which checks the operability of he central pulse distributors.

2. CPD Check Program

This program is designed to test the ability of the Central Control 101, to communicate with the various ınits of the Central Pulse Distributor 143 and the ability of the Central Pulse Distributor 143 to execute ommands and to return hardware check responses to he Central Control 101.

3. Call Store Check

If it appears that the Central Processor 100 is capable ›f executing central pulse distributor commands, a heck is then made of the central controls ability to ommunicate with the units of the Call Store System 03. Further, if the emergency actions have included a ransfer of program stores, the program stores beyond rogram stores 0 and 1 are individually called into the ystem to complete the central processor configuraıon.

4. Emergency Action Evaluation Program

This program is employed to determine, among other ıings, the rate at which emergency actions are occuring. The execution of emergency actions requires a elatively long period of time; therefore, rapidly recuring sequences of emergency actions will reduce the ata processing capacity of the system. It is possible ıat a trouble condition will lead to enablement of the Emergency Action Sequencer 5702 and, after one or ıore successive emergency actions, it is determined ıat the Central Processor 100 is capable of normal call rocessing. Subsequently, after a relatively short period f time, another trouble condition serves to enable the emergency action sequencer. Repeated enablements of the Emergency Action Sequencer 5702 within relatively short intervals of time must be explored to remedy the cause.

At the time the emergency action evaluation program determines that the checks set forth in 1 through 3 above have passed, an emergency action register which comprises an entry in the Call Store 103 is updated to reflect information concerning the just completed emergency action. The emergency action register includes a short-term entry wherein the number of repeated emergency actions, which were required to bring about sanity, is entered and a long-term entry which sets forth the time at which the emergency action occurred. It is thus possible to sequentially determine which units were switched and the period of time between successive enablements of the Emergency Action Sequencer 5702.

As previously noted, each segment or program test of the basic sanity maze program is monitored by the sanity timer in the Millisecond Clock Circuit 6101. In addition, all of the above steps of 1 through 4, including the emergency action evaluation program are monitored by the 40 Millisecond Emergency Action Timer. The 40 Millisecond Timer is enabled at the time the sanity check maze program is initiated and is not reset until after the emergency action evaluation program has reached a decision that machine sanity appears to exist and that a return may be made to normal call processing. If this decision is not reached within the 40 millisecond time-out interval, a subsequent emergency action is undertaken and the above sequence of tests is again followed.

Emergency Action Sequencer (5702)

We have described the system checks which lead to enablement of the Emergency Action Sequencer 5702 and the basic tests which are undertaken to evaluate the effectiveness of such emergency actions. We will now proceed to a discussion of the emergency action sequencer itself and the effect is has on the system components.

The Emergency Action Sequencer 5702 functionally includes a plurality of flip-flops which are conveniently situated at location 14 (FIG. 42) of the buffer bus system. This is a deviation from the arrangement of equipments in the other sequencers and advantageously provides access to these flip-flops for reading and writing by way of the buffer bus system.

The Emergency Action Sequencer 5702 must be capable of performing its work functions even in the absence of an operable pulse source, i.e., an operable Microsecond Clock 6100 and Millisecond Clock 6101 within its central control. The Emergency Action Sequencer 5702 comprises a monostable circuit, the output of which is distributed sequentially to the sequencer outputs 57P1, 57P2, and 57P3 by tapped delay lines within the sequencer 5702. When the Emergency Action Sequencer 5702 is activated, a first of a sequence of ½ microsecond pulses appears on conductor 57P1 during an interval designated herein as time P1; a second ½ microsecond pulse appears on conductor 57P2 four microseconds later during an interval designated herein as time P2; and a third ½ microsecond pulse appears on conductor 57P3 another four microseconds later during a time interval designated time P3. This sequence of pulses is employed to effect the work functions of the Emergency Action Sequencer 5702.

The four flip-flops which comprise the Three Cell Binary Counter 4206 and the Overflow Cell 4211 are termed herein the Emergency Action State Counter 4206, 4211. The state counter is reset to all zeros during normal call processing and is incremented during each successive enablement of the Emergency Action Sequencer 5702. The state counter serves to maintain a record of the number of successive enablements of the Emergency Action Sequencer 5702 and is employed to define the specific actions which the sequencer is to perform during repeated enablements.

The four cells 42EAC0 through 42EAC3 are termed herein Emergency Action Control Flip-Flops 4208 and are employed as follows. The first control flip-flop 42EAC0 is set to its "1" state whenever a condition within the central control indicates that the Emergency Action Sequencer 5702 should be enabled. The "1" output conductor of the control flip-flop 42EAC0 comprises an input to the Order Combining Gate Circuit 3901 and therein this information is combined with central control status information to generate a D-C signal on order cable conductor 57EA GO to activate the sequencer 5702. It should be noted that the Emergency Action Sequencer 5702 is activated only in the active central control and that the P1-P3 output signals of that sequencer serve to effect specific gating actions within both the active and the standby central control. In summary, the flip-flop 42EAC0 is set when a trouble indiction dictates that the sequencer 5702 is to be enabled and is reset after the emergency action sequencer has completed its sequence of actions.

The control flip-flop 42EAC1, when set to its "1" state, initiates the timing cycle of the Emergency Action 40 Millisecond Timer within the Real Time Check 5703. In the absence of a setting of the flip-flop 42EAC1, the odd and even 5 millisecond pulses continually recycle the 40 Millisecond Timer. When the Emergency Action Sequencer 5702 is activated, the flip-flop 42EAC1 is set and these pulses are disconnected. Thus, this time will time out if it is not recycled prior to completion of its period. The control flip-flop 42EAC2 performs a similar function for the 128 cycle (704 microseconds) sanity timer. That is, when flip-flop 42EAC2 is set, sanity timing is initiated.

The control flip-flop 42EAC3 is set whenever the Emergency Action Sequencer 5702 is enabled by the Real Time Check 5703.

Each activation of the Emergency Action Sequencer 5702 generates the previously noted output pulses on conductors 57P1, 57P2, and 57P3. These pulses are combined in the Order Combining Gate Circuit 3901 with output signals of the Emergency Action State Counter 4206, 4211 to execute the desired gating actions. Since, the Emergency Action Sequencer 5702 is activated only in the active Central Control 101 and since many gating actions are to be performed in both duplicate units of the Central Control 101, the signals generated by the Emergency Action Sequencer 5702 are cross-connected from the first central control to the second and vice versa.

The Emergency Action State Counter 4206, 4211 is reset to "0" during normal call processing and is incremented when the Emergency Action Sequencer 5702 is first enabled and when it is repeatedly enabled because of system failure to pass the various sanity checks. The states of the counter 4206, 4211 along with the central processor status information define the specific remedial actions which are dictated. Accordingly, the State Counters 4206, 4211 in the duplicate central controls must be kept in step so that control of configuration changes proceeds in an ordered pattern.

The Emergency Action Sequencer 5702 in accordance with the states of the state counter flip-flops 42SC0-42SC3 and the states of the status flip-flops 55PBA, 55PBT, 55AU, and 55TCC selectively generates signals on the order cable conductors 27EACCI, 27EACSI, 27EABOI, 27EABII, 27EASI, 27EASTI, 27EARI, and 27EACEI. The I suffix on these order cable conductors indicates that they are generated by the Emergency Action Sequencer 5702 within the central control unit containing these conductors. Signals on these conductors are transmitted from one central control to the other central control via Cable Drivers 2701 and cable 2706. Cable 2706 of one central control is connected to the cable 2208 in the second central control; thus, the above-mentioned signals are transmitted via the Cable Receivers 2205 to the conductors 22EACCE, 22EACEE, 22EACCE, et cetera. The E suffix indicates that the Emergency Action Sequencer 5702 signals appearing on these conductors are generated in response to the activation of the Emergency Action Sequencer 5702 in the other central control. A similar connection of the emergency action sequencer signals from the second central control to the first central control completes the required cross-connection. The corresponding internally and externally generated sequencer signals are combined in OR gates within the Order Combining Gate Circuit 3901 of each central control to carry out the necessary gating actions therein in response to the activation of the Emergency Action Sequencer 5702 in either of the two central controls.

There are a number of functions performed at every activation of the Emergency Action Sequencer 5702 without regard for the state of the Emergency Action State Counter 4206, 4211 and the states of the status flip-flops 55PBA, 55PBT, and 55TCC. These functions are accomplished by signals on order cable conductors 57EAS and 42EAST.

A signal on order cable conductor 57EAS (the logical OR of internal conductor 27EASI and external conductor 27EASE) at time P1:

1. Sets the B level interrupt source flip-flop 52EAI by a signal on an order cable conductor of cable 5205.

2. Rephases the Millisecond Clock 6101 by a signal on order cable conductor 57EAS which is transmitted through the OR gate 6104 to the reset input of the Millisecond Clock 6101.

3. Sets the flip-flop 42EAC1 and thereby starts the 40 Millisecond Emergency Action Timer within the Real Time Check 5703 by inhibiting the gating of signals on order cable conductors 57H-S and 57J-S.

4. Sets the flip-flop 42EAC2 thereby starting the 128 cycle (704 microsecond) "sanity timer."

5. Resets the flip-flop 41PCTO in the Match Control Register 4103. This inhibits any program controlled time-out counting that may have been in progress prior to the activation of the Emergency Action Sequencer 5702 thus preventing false activation of the Emergency Action Sequencer 5702 via the Time-Out Match Circuit 4108.

6. Resets the Time-Out Counter 4109 to all "zeros" to initialize the Time-Out Match Circuit 4108. Thus, in the event that one of the sequencers which is checked by the Time-Out Counter 4109 remains on and again becomes active and is in fact stuck, the Time-Out Counter 4109 will be advanced to its terminal count to again enable the Emergency Action Sequencer 5702. Accordingly, a change of active units of the controlling central processor will be made and the central control having the stuck sequencer will eventually be removed from the active combination of equipments.

7. Sets the disjoin flip-flop 55DI to inhibit the cross-connection of central control error signals. If one central control unit is experiencing difficulties in its communication to the Program Store 102, the Call Store 103, or difficulty in executing command orders, such difficulties will reduce the data processing capacity of the other combination of equipments; in such instances it is desirable to confine these difficulties to one combination of units so that the other (if free from these difficulties) may be placed or retained in the controlling central processor.

A signal on either the internal conductor 27EASTI or the external conductor 22EASTE enables order cable conductor 42EAST which:

1. Provides a signal on order cable conductor 44START to place or retain the Stop Sequencer 4400 in its inactive state. This insures that the active central control unit currently appearing in the controlling central processor or just placed there by emergency action sequencer gating action is not in the stop state and can therefore obtain and execute sequences of program orders.

2. Resets the flip-flops 42EAC3 and 42EACO to place or retain the Emergency Action Sequencer 5702 in its inactive state.

3. Increments the Emergency Action State Counter 4206, 4211 in preparation for the next action in the sequence of emergency actions if required.

In addition to the emergency actions which are performed at each successive enablement of the Emergency Action Sequencer 5702 other emergency actions which are discrete to the individual states of the Emergency Action State Counter 4206, 4211 are performed at successive enablements of the sequencer 5702. Certain of these emergency actions, as previously noted, effect changes in the active combinations of central control program store and interconnecting bus systems. After each configuration change a B level interrupt is generated during which time the interrupt program determines whether or not basic machine "sanity" has been achieved with the new configuration of active units.

At the time of the occurrence of a detected trouble which leads to the first enablement of the Emergency Action Sequencer 5702 the active combination of equipments is not of a fixed arrangement but, rather, the active combination of equipments may be any one of the possible combinations of equipments since the currently active combination was established either by prior program rearrangements or prior emergency actions.

Before proceeding to a discussion of the specific actions which are taken to effect configuration changes a review of the rules of combining the various units will provide a basis of understanding for the changes which are effected by the Emergency Action Sequencer 5702. As previously noted, there are two central control units which make up the Central Control 101. At any given time one of these is specified as the active central control and the other is specified as the standby central control. In the active central control the status flip-flop 55AU is set while in the standby central control the status flip-flop 55AU is reset.

The Program Store Address Bus System 6400 comprises a "O" bus and a "1" bus and the Program Store Response Bus System 6500 also comprises a "O" and a "1" bus. The active central control for purposes of communicating with the program stores may transmit information on either or both of the address buses and may receive information on either of the response buses.

Although the Program Store System 102 may comprise any number of store units from two to six, the program information which is required to test the basic sanity of the system after an emergency action configuration change has been effected is duplicated in only two units of the store system, namely, store 0 and store 1. This information is found in the right half (G block) of store 0 and in the left half (H block) of store 1. During the course of emergency action configuration changes all stores other than store 0 and store 1 are treated as "other stores" as the information contained therein is not of significance until after "basic sanity" has been recovered.

The Emergency Action State Counter 4206, 4211 during normal call processing and during normal maintenance routines not associated with the Emergency Action Sequencer 5702 is in the all zero state (0000) and only after a trouble indication which leads to the activation of the Emergency Action Sequencer 5702 is the state counter advanced to other states. As previously noted herein, when the Emergency Action Sequencer 5702 is first enabled, its actions are limited to a standard series of tests. If by these tests it is concluded that basic "sanity" does not exist, remedial emergency actions are dictated. The Emergency Action State Counter 4206, 4211 is advanced to its-first active state (0001) in preparation for the possible occurrence of succeeding emergency actions. At each successive enablement of the Emergency Action Sequencer 5702 the same basic test programs are executed, and if the remedial action dictated by the Emergency Action State Counter 4206, 4211 is not effective, further emergency actions are required. If the remedial action is effective as indicated by proper execution of the test programs, the State Counter 4206, 4211 is retained in the last active state for a short probationary period of time. During this period of time system operation is observed by the various checking means previously described and if in fact serious difficulty again arises which leads to enablement of the Emergency Action Sequencer 5702 the emergency actions will be those defined by the present state of the state counter. After the probationary period of time has elapsed, the State Counter 4206, 4211 is reset to all zeros under program control. The probationary period of time and the resetting of the State Counter 4206, 4211 is under control of the emergency action control program which is stored in the program store.

A 4-stage binary counter is capable of defining 16 active states. For convenience these states are divided into a first group of eight and a second group of seven with the 16th state 0000 being the inactive state. In earlier discussions herein it has been noted that equipments such as the Program Store 102 and the Central Control 101 upon detection of trouble relating to these units may be placed in trouble states. For example, Program Store 102 includes the trouble flip-flops 79TBLO and 79TBL1 which may be selectively set by central pulse distributor commands. Similarly, the status flip-flop 55TCC when set indicates that the standby central control is in trouble.

The successive emergency actions effect configuration changes in the active combination of Central Control 101, Program Store 102, and their intercommunicating bus systems to test the acceptability of all possible combinations of units. Included in the emergency actions performed at the occurrence of each successive emergency action beyond the first, a "clear stop" is executed in both central controls. A clear stop is initiated by a signal on either internal conductor 27EACSI or external conductor 22EACSE which leads to activation of the Stop Sequencer 4400 via a signal on order cable conductor 44HALT. The Stop Sequencer 4400, when activated, serves to reset the Order Word Register 3403, the Buffer Order Word Register 2410, and also deactivates any of the sequencers which, as described above, are monitored by the Time-Out Counter 4109 and the Time-Out Match 4108. After the emergency action for the current state has been completed the central control is restarted by Emergency Action Sequencer 5702 which causes a signal to occur on conductor 44START which serves to deactivate the Stop Sequencer 4400.

At each successive enablement of the Emergency Action Sequencer 5702 the emergency action 704 microsecond timer in the Millisecond Clock Circuit 6101 is recycled by a signal on conductor 61EAS and the 40 millisecond emergency action timer in the Real Time Check 5703 is similarly recycled.

The following discussion is directed to the steps which are taken to effect configuration changes without reference to the details concerned with the testing of the new configuration.

At the time of the initial enablement of the Emergency Action Sequencer 5702, any one of the possible combinations of Central Control 101, Program Store 102, and intercommunicating bus system may exist. Accordingly, certain of the emergency actions as described below merely switch active central controls and program stores without regard for the particular program store or central control which is made active. Other steps, however, specifically assign bus "0" and bus "1" of the address and response bus systems as being the active component.

The emergency actions which are performed according to the states of the State Counter 4206, 4211 are listed according to these states:

0000

This is the initial state and, as previously described, emergency actions are limited to testing the active configuration and if these tests fail, to advance state counter.

0001

This is the first active state and the emergency action is limited to switching the currently active central control to the standby state and the standby central control to the active state. This is accomplished by resetting flip-flop 55AU in the currently active central control and setting flip-flop 55AU in the standby central control. The Emergency Action Sequencer 5702 is enabled only in the active central control. Conductor 27EACC-I is enabled in the active central control to reset flip-flop 55AU therein and when cross connected, by means of conductor 22EACC-E, sets flip-flop 55AU in the standby central control.

0010

The emergency actions of this state serve to exchange the roles of the active and standby buses of both the Program Store Address Bus System 6400 and the Response Bus System 6500.

0011

Figure 86:
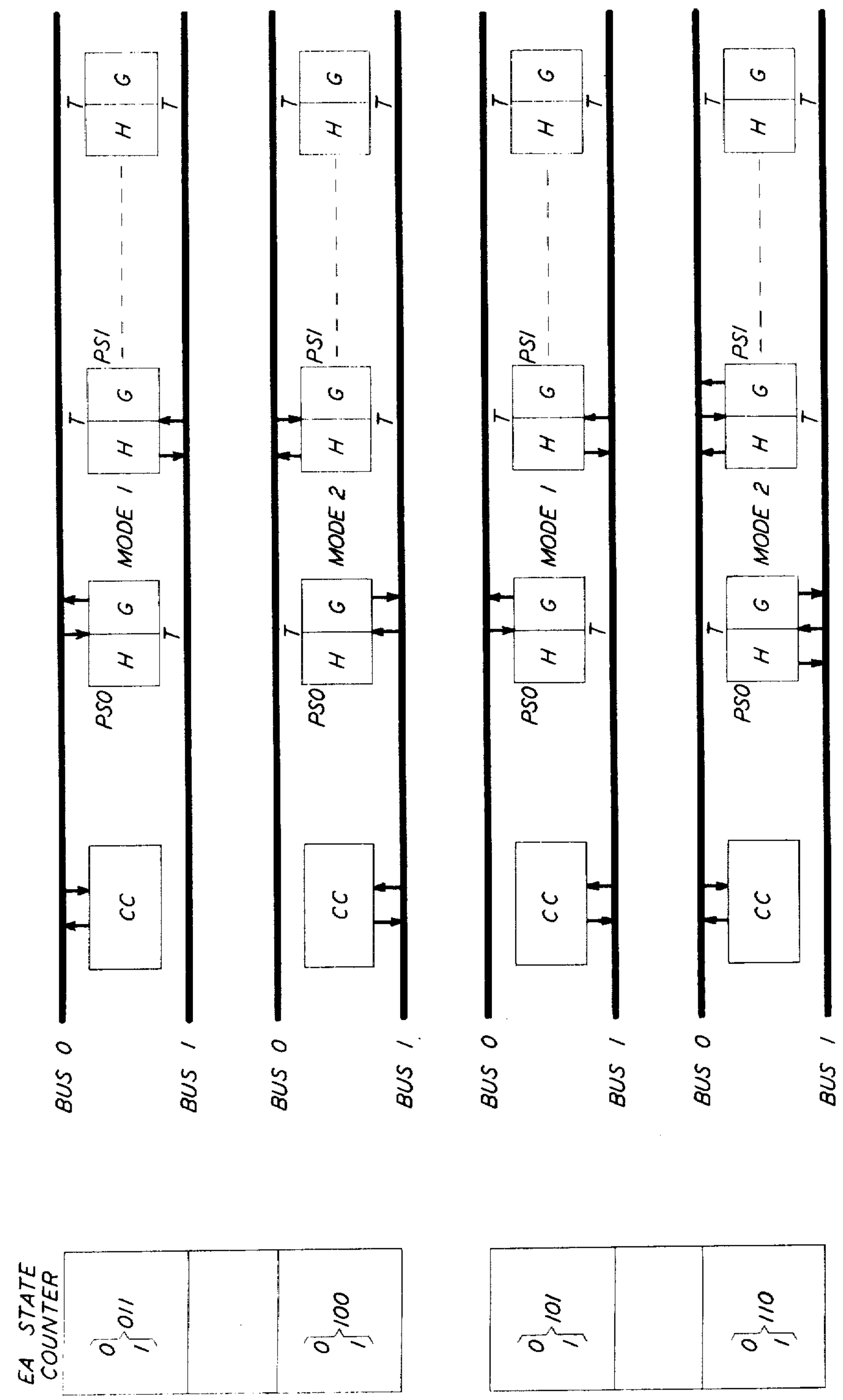
FIG. 86 illustrates the central processor responses to successive emergency actions.

In this state bus "0" of both bus systems is placed or retained in the active state and program store mode 1 shown at the top of FIG. 86 is effected. That is, the two base program stores, program store 0 and program store 1, receive signals via the Emergency Action Cable 6900 to place them in the configuration shown. Thus, store 0 which has the sanity test programs located in its G half receives a signal which sets the flip-flop 79TBL1 to preclude operation of that store with bus "1" of both the address bus system and the response bus system, while program store 1 receives the signal to set flip-flop 79TBL0 to preclude responses to commands via bus "0" of the address bus system. Having reached this state of the Counter 4206, 4211 the emergency actions have specifically defined the particular program store which is active and the buses of the bus systems which are active. However, the choice of central control is dependent on the status of the system prior to the first enablement of the Emergency Action Sequencer 5702.

0100

The emergency actions of this state serve to place the program stores in mode 2 as shown in FIG. 86 and to make bus "1" of both the address bus system and response bus system the active communication paths.

0101

The emergency actions of this state cause the program stores to assume the mode 1 configuration as shown in FIG. 86. Thus program store 1 becomes the active store as in this configuration both it and the Central Control 101 are connected to the active buses, i.e., bus "1" of both the address bus system and the response bus system.

0110

The emergency actions of this mode serve to make bus "0" the active bus and to effect change of the program stores from mode 1 to mode 2. Thus, program store 1 is retained as the active program store.

In the execution of the emergency actions of states 0001 and 0010 of the counter, the states of the trouble flip-flops 55TCC and 55PBT are respected. The flip-flop 55TCC when set indicates that the central control in which it is located has been diagnosed to be in trouble and the flip-flop 55PBT when set indicates that the bus system which is not currently in use is in trouble. Accordingly, as successive enablements of the Emergency Action Sequencer 5702 occur, those actions of states 0001 and 0010 which would tend to switch the units which are indicated to be faulty to the active state are inhibited. Thus even though certain configurations for states 0001 and 0010 are dictated, the presence of trouble as noted above would preclude effecting the changes to these prescribed configurations.

1000

The eighth state of the first group of states is a spare state and there are no changes in configuration effected. The succeeding states starting with state 1001 effect configuration changes as explained below without respect for the states of the trouble flip-flops 55TCC and 55PBT.

1001

The emergency actions of this state serve to switch active central controls. Thus, the configuration shown in FIG. 86 for the state 0110 is modified to the extent that the roles of central controls are exchanged.

1010

The emergency actions of this state serve to place the standby buses into the active configuration.

1011

The emergency actions of this state serve to place or retain bus "0" as the active bus and to effect the change of program stores to mode 1 as shown in FIG. 86.

1100, 1101, 1110

The emergency actions of these states serve to effect configuration changes to the arrangements set forth in FIG. 86. Hopefully, in the course of advancing the Emergency Action Sequencer 5702 through its active states, machine sanity will be achieved and the system will be restored to normal call processing. In the event, however, that machine sanity cannot be achieved, the Emergency Action State Counter 4206, 4211 will be advanced to state 1111 which will initiate the demand for intervention by maintenance personnel. Such an occurrence, however, is most unlikely in that preventive maintenance routines are being continually performed with a view towards maintaining all elements of the system in an operable state. In the absence of complete system failures the Emergency Action Sequencer 5702 is capable of recovering machine sanity and thus capable of returning the system to normal call processing.

It is possible that difficulties in the Central Processor 100 which lead to a succession of emergency actions will hamper the incrementing of the Emergency Action State Counter 4206, 4211. Accordingly, an additional means of synchronizing the State Counter 4206, 4211 is provided. The Real Time Check 5703 generates an output signal on conductor 57LTC and this signal, as previously noted, activates the Emergency Action Sequencer 5702 and, in addition, causes a signal to appear on order cable conductor 42SC-R which resets the Three Cells 4206 of the Counter 4206, 4211. This signal is also transmitted on conductor 27EARI to the other central control unit. This signal appears in the other central control on conductor 22EARE which resets the three cells of the Counter 4206 therein. Accordingly, the occurrence of a "long-time" check period is indicated by a signal on conductor 57LTC which causes the state counter to be advanced to the state 0000 or 1000 according to the state of the flip-flop 4211 at the time of this emergency action.

What is claimed is:

1. A data processing system comprising a program store containing sequences of program order words and data, a data store for storing a plurality of words of data, and a central control;

said central control comprising means responsive to said program order words for controlling said data processing system including means for reading information from said stores and for writing information into said data store;

characterized in that said central control further comprises a plurality of operational checking means to detect at least one class of incorrect response of said data processing system and for generating corresponding error signals, said sequences of program order words including a basic sanity program which comprises at least one fixed length sequence of order words which when properly executed by the data processor system is completed within a predetermined period of time to indicate that the processor is able to perform useful basic data processing, and said central control including means responsive to error output signals of said operational check circuits to initiate said basic sanity program.

2. In combination, a program store system comprising a plurality of program stores, said stores containing sequences of program order words including a basic sanity maze program of order words, a central control system comprising a "0" and a "1" central control, a program store command bus system interconnecting said central control system and said program store system and comprising a "0" bus and a "1" bus, a program store response bus system interconnecting said program store system and said central control system and comprising a "0" bus and a "1" bus, means in said program store system and means in said central control system for operatively associating said program stores, said central controls, and said buses of said command bus system and said response bus system into at least one active operative combination comprising at least one program store, a selected one of said central control and a selected one of said command buses and a selected one of said response buses, means in said central control for detecting at least one class of faulty system operation and for generating corresponding trouble signals in response thereto, means responsive to said trouble signals for initiating said basic sanity program, timing means for checking for the completion of said basic sanity seuqence within a prescribed period of time and for generating a failure signal when said prescribed period of time is exceeded, means in said central control responsive to said failure signal for redefining the active combination of central control, program store and program store command and response buses and means to again initiate said basic sanity sequence.

3. The combination in accordance with claim 2 wherein said central control further comprises clock means defining discrete machine cycles and wherein said means responsive to said failure signal comprises an independent sequencer circuit, said sequencer circuit including output signal pulse generating means independent of said central control clock means.

4. The combination in accordance with claim 3 wherein said output signal pulse generating means comprises a monostable signal generating circuit and a tapped delay line.

5. A data processor system comprising a program store system comprising a plurality of program stores, the information capacity of each of said stores separated into first and second portions, the information in said first and second portions of each of said stores duplicated in first and second portions of different other stores, the information contained in said program store system comprising sequences of program order words, said sequences comprising a basic sanity program which comprises at least one fixed length sequence of order words which when properly executed by the processor system is completed within a prescribed period of time, a data store system a central control system comprising a first and a second central control, clock means in said central control system defining machine cycles, a program store command bus system interconnecting said central controls and said program stores, said command bus system comprising a "0" bus and a "1" bus, a program store response bus system interconnecting said program stores and said central controls, status means in said central control system and in said program stores defining active and standby combinations of central control, program store command buses, program store response buses and program stores, means in each of said central controls for detecting faulty system operation and for generating corresponding trouble signals in response thereto, means in the active one of said central controls responsive to a trouble signal generated by said active central control for initiating the processing of the basic sanity program in the active program store, means in said active central control responsive to an immediately succeeding trouble signal for changing the active and standby combinations of central control, program stores and interconnecting bus systems to include said standby central control in said active combination of equipments and to include said active central control in said standby combination of equipments and means to again initiate said sanity program.

6. A data processor system in accordance with claim 5 wherein said means in each of said central controls for detecting faulty system operation comprises timing means for checking the completion of said basic sanity sequence within said prescribed period of time and for generating a trouble signal when said prescribed period is exceeded.

7. A data processor system in accordance with claim 6 wherein said timing means comprises a digital counter and a backup analog timer and said processor system comprises, means for resetting said digital timer and said analog timer to an initial count when said basic sanity program is initiated.

8. A data processor system in accordance with claim 7 wherein said digital timer is incremented once per machine cycle under the control of output signals of said clock means and wherein said analog timer provides output signals independently of said clock means.

9. A data processor system in accordance with claim 5 wherein said central control comprises means for obtaining said sequences of program order words from said program store and for executing said sequences, and wherein said central control further comprises a plurality of sequence circuits corresponding respectively to certain of said program order words for performing repetitive machine functions defined by said certain order words, said sequence circuits selectively enabled in the course of execution of said corresponding program order words, and wherein said means in said central controls for detecting faulty system operation comprises sequence circuit monitoring means for detecting faulty sequence circuit operations and for generating corresponding trouble signals.

10. A central data processor of a program controlled data processing system comprising a program store system including a plurality of program stores, said store system containing sequences of program order words including a basic sanity program which comprises at least one sequence of order words which when properly executed by said processing system is completed within a prescribed period of time, a data store system, a central control system, said central control system comprising a "0" and a "1" central control, a program store command bus system comprising a "0" bus and a "1" bus interconnecting said central control system and said program store system, a program store response bus system comprising a "0" and a "1" bus interconnecting said program store system and said central control system, means in each of said central controls for detecting faulty central processor system operation and for generating trouble signals in response thereto;

status means in said central control system and in said program stores defining active and standby combinations of central control, program store command buses, program store response buses and program stores, an emergency action sequence circuit enabled in response to said trouble signals, said emergency action sequence circuit comprising means for initiating said basic sanity sequence, timing means for checking for the completion of said basic sanity program within said prescribed period of time and for generating a failure signal if said period of time is exceeded, said emergency action sequence circuit responsive to said failure signal for controlling said status means for redefining the active combination of central control, program store and program store command and response buses and for again initiating said basic sanity program.

11. A central data processor in accordance with claim 10 wherein said emergency action sequencer further comprises means for recording successive enablements thereof in response to said trouble signals and said failure signal and means for effecting a different rearrangement of active combinations of central control, program store and program store command and response buses after each succeeding one of said successive enablements and to initiate said basic sanity sequence after each of said rearrangements.

12. A central data processor in accordance with claim 11 wherein said means for recording successive enablements comprises a three cell binary counter and an overflow flip-flop.

13. A central data processor in accordance with claim 12 wherein said central control further comprises timing means and means responsive to said timing means for resetting said counter cell and said flip-flop cell.

14. A central data processor in accordance with claim 13 wherein said sequences of program order words include an emergency action control program and wherein said timing means and said resetting means comprise means for reading said emergency action control program from said program store and decoding means responsive to portions of said emergency action control program.

15. A central data processor in accordance with claim 1 wherein said central control further comprises a central control trouble flip-flop which when set indicates that the other or standby central control is in the trouble state, and a program store bus system trouble flip-flop which when set indicates that the standby buses of the command bus system and of the response bus system are in the trouble state, and wherein said central control comprises gating means responsive to output signals of said central control trouble flip-flop and of said program store bus trouble flip-flop to limit the active configurations of program store, central control and program store command and response buses to those elements not indicated to be in the trouble state.

16. A central data processor in accordance with claim 15 wherein said means for recording successive enablements comprises a three stage binary counter and an overflow flip-flop cell, and the output terminals of said three cells binary counter and of said overflow flip-flop cell are connected to said gating means to selectively inhibit the actions of said central control trouble flip-flop and of said program store bus trouble flip-flop.

17. A central data processor of a program controlled data processing system comprising a program store system comprising a plurality of program stores, the information in each of said stores duplicated in another of said stores, said information contained in said program stores system comprising sequences of program order words, said sequences including a basic sanity program, a data store system, a central control system comprising a first and a second central control, a program store command bus system interconnecting said central controls and said program stores, said command bus system comprising a "0" bus and a "1" bus, a program store response bus system interconnecting said program stores and said central controls, status means in each of said central controls and in said program stores defining active and standby combinations of central control, the program store command buses, program store response buses and program stores, means in both said central controls for detecting faulty system operation and for generating a trouble signal in response thereto, an emergency action sequence circuit in each of said central controls for generating emergency action output signals, said emergency action sequence circuit in said active central control responsive to a trouble signal generated by said active central control for initiating the processing of said basic sanity program stored in the program store in the active combination, timing means within said active central control for checking for completion of said basic sanity program within a prescribed period of time and for generating a failure signal when said period of time is exceeded, and register means in each of said central controls for recording successive enablements of said emergency action sequence circuit in either of said central controls.

18. A central data processor in accordance with claim 17 wherein said active central control comprises means responsive to said emergency action sequence circuit output signals and the state of said register means for generating control signals for controlling said status means in said central controls and said program stores for changing the active and standby combinations of central control, program stores and interconnecting bus systems.

19. A central data processor in accordance with claim 17 wherein said central control further comprises means for presetting said register means to a selected state.

20. A central data processor in accordance with claim 17 wherein said central control further comprises; a data memory, a data buffer register for receiving information from said data memory, a plurality of auxiliary data buffer register locations, a data buffer register bus system interconnecting said data buffer register and said auxiliary data buffer register locations and wherein said register means comprise one of said auxiliary data buffer register locations.

21. A central data processor of a program controlled data processing system comprising a program store system having a plurality of program stores, the information in each of said stores duplicated in another of said stores, said information contained in said program store system comprising sequences of program order words, said sequences comprising a basic sanity program comprising at least one sequence of order words which when properly executed are performed within a predetermined period of time, a data store system, a central control system comprising a first and a second central control, a program store command bus system interconnecting said central controls and said program stores, said command bus system comprising a "0" bus and a "1" bus, a program store response bus system interconnecting said program stores and said central controls, said program store response bus system comprising a "0" bus and a "1" bus, status means in said central control system and in said program stores defining active and standby combinations of central control, program store command buses, program store response buses and program stores, said status means including an active unit flip-flop in each of said central controls, said active unit flip-flop set to the "1" state in the active one of the central controls and reset to the "0" state in the standby one of the central controls, clock means in each of said central controls defining discrete machine cycles, means in both said central controls for detecting faulty system operation and for generating a trouble signal in response thereto, an emergency action sequence circuit in each of said central controls, means in each of said central controls responsive to the "1" state of the active unit flip-flop in said central control and to said trouble signal generated in said central control for enabling said emergency action sequence circuit therein, each of said sequence circuits including output signal pulse generating means independent of said central control clock means, said sequence circuit when enabled generates control signals to change the active and standby combinations of central control, program stores and interconnecting bus systems to include said standby central control in said active combination of equipments and to include said active central control in said standby combination of equipments.

22. In combination, a program store system having a plurality of program stores containing sequences of program order words, a data store system, a central control system comprising a first and a second central control, a program store command and response bus system comprising a "0" bus and a "1" bus, status means in each of said central controls and in said program stores defining active and standby combinations of said central control, said command and response buses and said program stores, means in both said central controls for detecting faulty system operation and for generating a trouble signal in response thereto, an emergency action sequence circuit in each of said central controls, said emergency action sequence circuit in said active central control enabled by a trouble signal generated by said active central control, said enabled emergency action sequence comprising means for generating signals for changing the active and standby combinations of central control, program stores and interconnecting bus systems.

23. In combination, a program containing a plurality of sequences of program order words corresponding to process jobs, a central control, means in said central control for reading said program sequences from said program store and for executing said sequences, clock means in said central control defining machine cycles, first recording means responsive to output signals of said clock means for maintaining a record of the passage of time as indicated by said clock means for generating first record output signals corresponding to discrete times, second recording means for storing data indicating the completion of certain of said process jobs in accordance with the execution of corresponding ones of said program sequences for maintaining a record of the passage of time as indicated by the execution of said program sequences and for generating second record output signals, and means for comparing the passage of time as indicated by said output signals of said first and second recording means and for generating a trouble signal when said output signals indicate a lack of correspondence of time.

24. The combination in accordance with claim 23 wherein said first recording means comprises a binary counter in said central control and wherein the combination further comprises a data memory containing a class-visited register comprising an ordered list of classes of process jobs to be performed, said ordered list defining an executive cycle, said ordered list comprising a plurality of sets of repeated entries with one entry in a set for each time a class of job is to be performed in said executive cycle, said classes of jobs corresponding in number to said plurality of sets of entries;

and said central control further comprises means responsive to the execution of said sequences of order words for updating said class-visited register upon execution of the program sequences corresponding to the classes of jobs.

25. In combination, a program store containing sequences of program order words, a data store containing system data, a central control comprising means for reading order words and data from said stores and for executing said sequences of order words, clock means defining machine cycles, first means responsive to the execution of certain of said program sequences for generating a real-time check signal, second means responsive to output signals of said clock means for generating a real-time check window signal and a real-time check timeout signal, and third means responsive to said window signal and to said check signal to inhibit generation of said timeout signal by said second means.

26. The combination in accordance with claim 25 wherein said system data includes an ordered list of classes of jobs to be performed, said list defining an executive program and comprising a plurality of entries with identical entries for each time a class of job is to be performed in the execution of said executive program, said program sequences including sequences for executing said executive program once every predetermined number of milliseconds;

said system data further comprises indicia in a class-visited register defining the state of completion of the jobs of said executive program, said central control comprises means responsive to said sequences of order words for updating said class-visited register upon completion of a class of job;

said sequences of program order words comprising normal processing sequences and maintenance program sequences, said maintenance program sequences including a real-time check signal subroutine discretely interspersed among said normal processing sequences, and said first means comprises means responsive to said real-time check signal subroutine and the state of said class-visited register for generating said real-time check signal.

27. In combination, a program store containing sequences of program order words, a data store containing system data, a central control comprising means for reading information from said stores and for executing said program sequences, clock means, counting means responsive to particular output signals of said clock means for maintaining a record of the passage of time as indicated by said clock, said particular clock signals occurring at predetermined fixed time intervals;

said system data includes an ordered list of class of jobs to be performed, said ordered list defining an executive program, said ordered list comprising a plurality of repeated entries with one entry for each time a class of job is to be performed during the execution of said executive program, said program sequences including executive program subroutines, said central control responsive to said executive program subroutines to perform said executive program at predetermined intervals;

said system data comprises a real-time check counter, said real-time check counter comprising a plurality of data memory elements defining a binary counter;

said program sequences including a plurality of real-time check subroutines discretely interspersed among said normal call processing sequences, said real-time check subroutines comprising real-time check counter incrementing subroutine, a real-time check circuit enable subroutine and a real-time check circuit reset subroutine;

said central control comprises means responsive to said real-time check counter incrementing subroutine for incrementing said real-time check counter once every predetermined number of milliseconds, said central control further comprises means responsive to said real-time check circuit enable subroutine and the state of said real-time check counter for generating a real-time check enable signal;

said system data comprises a class-visited register;

said class-visited register comprising a plurality of register words each comprising a plurality of memory elements equal in number to the number of class of jobs to be performed during said executive program;

said central control comprising means responsive to said real-time check reset subroutine and the state of said real-time check counter for generating a real-time check reset signal, said central control comprises means responsive to said real-time enable signal and the state of said counting means for generating a real-time check window signal having a fixed time duration, said last named means further responsive to said real-time check window signal and said real-time check reset signal to generate a trouble signal if said real-time check reset signal occurs outside the time duration of said window signal and reset counting means.

28. In a complex of plural relatively independent data processing elements, including means for conveying information signals between elements, a configuration control system for selectively controlling the handling of information between elements comprising:

a plurality of first means, one for each said element, for selectively controlling transfers of signals between the respective elements and other elements;

at least two second means incorporated in respective at least two of said elements for issuing reconfiguration signals; and means in each element selectively responsive to said reconfiguration signals to selectively condition the respective first means of the element to a signal transfer control state determined by the reconfiguration signals.

29. In a complex of plural relatively independent data processing elements, including means for conveying information signals between elements, a configuration control system for selectively controlling the reception of information by each element from other elements comprising:

a plurality of configuration control means, one individually associated with each said element, for selectively controlling the reception of signals by the respective elements from other elements;

at least two means associated individually with at least two of said elements for issuing reconfiguration signals;

and means coupled between said at least two reconfiguration signal issuing means and said plurality of configuration control means for selectively conditioning said configuration control means in accordance with said reconfiguration signals to selectively vary the receptiveness of associated elements to signals transmitted by other elements.

30. In a complex of plural relatively independent data processing elements, including plural program executing elements and means for circulating information between elements, a configuration control system in which each element can be conditioned to selectively control its reception of information from other elements without interruption of data processing functions being performed by the conditioned element comprising:

a configuration control register individual to each element;

first means individual to each element for selectively controlling transfers of signals to the individual element in accordance with the information contents of the individual register;

second means individual to each element for controlling the entry of new information into the individual register; and means for coupling any of said program executing elements to all of said second means for selectively entering new information into said registers under stored program control.

31. In a multiprocessor including a plurality of relatively independent data handling elements, the combination useful for reliably controlling communication of intelligence relative to an element comprising:

control register means associated with one of said elements for controlling translation of intelligence signals between said one element and a plurality of others of said elements;

control input means associated with said one element for selectively conveying a plurality of conditioning input signals to said control register means; and a plurality of signaling means; individual to a plurality of other elements, coupled to said one element for supplying a plurality of conditioning input signals to said control input means for selection thereat to condition said control register means.

32. In a multiprocessor including a plurality of relatively independent data handling elements, the combination useful for reliably controlling communication of intelligence relative to an element comprising:

control register means associated with one of said elements for controlling gates within said one element directing external signals produced by other elements inwardly to said one element;

control input means individual to said one element for selectively conveying conditioning input signals to said control register means; and a plurality of signaling means, individual to a plurality of other elements, coupled to said one element for supplying input conditioning signals to said control input means to condition said control register means.

33. In a computer system including a memory for storing information and an arithmetic and control unit for normally executing a main program, the combination comprising:

signal means for generating a request to interrupt the main program being executed by the arithmetic and control unit, program interrupt means normally responsive to the program interrupt request generated by said signal means for servicing the program interrupt request by interrupting the main program being executed by the arithmetic and control unit, and timing means connected to said signal means and responsive to detection of the failure of said program interrupt means to service the program interrupt request generated by said signal means within a predetermined period for providing an error signal.

34. In a computer system including a memory having a plurality of storage locations for storing information and an arithmetic and control unit for normally executing a main program, the combination comprising:

signal means for generating a request to interrupt the main program being executed by the arithmetic and control unit, program interrupt means normally responsive to the program interrupt request generated by said signal means for servicing the program interrupt request by interrupting the main program being executed by the arithmetic and control unit, timing means connected to said signal means responsive to detection of the failure of said program interrupt means to service the program interrupt request generated by said signal means within a predetermined time for providing an error signal, and means responsive to the error signal provided by said timing means for causing the contents of a predetermined storage location of the memory to be transferred to the arithmetic and control unit.

35. In a computer system including a memory having a plurality of storage locations for storing information and an arithmetic and control unit for normally executing a main program, the combination comprising:

signal means for generating a request to interrupt the main program being executed by the arithmetic and control unit, program interrupt means normally responsive to the program interrupt request generated by said signal means for servicing the program interrupt request by interrupting the main program being executed by the arithmetic and control unit, timing means connected to said signal means responsive to detection of the failure of said program interrupt means to service the program interrupt request generated by said signal means within a predetermined time for providing an error signal, first means responsive to the error signal provided by said timing means for causing the contents of a predetermined storage location of the memory to be transferred to the arithmetic and control unit, and second means responsive to the error signal provided by said timing means for inhibiting normal execution of the main program by the arithmetic and control unit.

36. A programmable data processing system comprising: first and second central controls each comprising processing circuits and maintenance circuits; and first and second storage means, one of said storage means being adapted respectively to be connected in signal communication with one of said central controls and the other storage means being adapted to be connected in signal communication with the other central control under normal operating conditions, said maintenance circuits sensing conditions within said system to generate error signals upon detection of error conditions, said system further including a system test program, wherein the improvement comprises:

subsystem circuit means comprising active-standby control means in each central control for selectively connecting said first and second central controls with said first and second storage means to form predetermined operating configurations of storage means and central controls thereof, one of said central controls being active and the other being passive at any one time, said subsystem circuit means further comprising recovery control circuit means including state control circuit means for generating a plurality of state signals representative of a corresponding plurality of predetermined states, and control logic circuit means responsive to said error signals to actuate said state control circuit to generate said state signals in predetermined order as defined by the circuitry of said state control circuit means, said state signals including a central control switch signal for controlling said active-standby control means for determining one central control as being active and corresponding to at least one of said plurality of states, and further including a storage means switch signal in one of said states for determining one of said storage means as being primary and being operatively associated with the active central control, said recovery control circuit means further including means for generating a system recovery signal to initiate said system test program when said central processor switch signals and said storage means switch signals are generated;

maintenance access circuit means responsive to program controlled signals for generating configuration signals representative of a desired configuration of said central processors and storage means; and configuration control circuit means responsive to said central processor switch signal and said storage means switch signal of said recovery control circuit means and responsive to said configuration signals of said maintenance access circuit means, and including a first switching circuit means for controlling the switching of said central processors and second switching circuit means for controlling the coupling of said first and second storage means with said first and second central processors.

37. The system of claim 36 further comprising input/output circuit means responsive to said second switching circuit means of said configuration control circuit means for selectively communicating a designated storage means as the primary storage means in a configuration.

38. The system of claim 37 wherein each of said storage means includes an address bus and a return bus, and wherein said input/output circuit means include gating means for selectively communicating each of said buses of said storage means for communication with a selected one of said central processors.

39. The system of claim 38 wherein said second switching circuit means of said configuration control circuit means comprises a plurality of bistable circuits responsive to instruction signals received from said maintenance access circuit means for selecting predetermined ones of each of said buses of each of said storage means for selective communication with said central processors in accordance with a desired configuration, whereby independent program control over the resulting configuration may be achieved.

40. In combination first and second central control circuits, first and second signal storage means, and maintenance circuits, said maintenance circuits sensing conditions within said central controls to generate error signals upon the detection of corresponding faulty operation, said central control circuits and said storage means being adapted to be reconfigured to provide different operative combinations;

wherein the improvement comprises: recovery control circuit means including control circuit means responsive to said error signals for generating an emergency action sequencer start signal;

a timing generator circuit within said sequencer responsive to said start signal for generating sequential timing signals, a predetermined number of said timing signals defining a sequencer timing cycle, one of said timing signals for each timing cycle being a state change signal;

said control circuit means including means receiving said timing signals for generating a system recovery signal; and state control circuit means responsive to said system recovery signal and including a sequential count circuit for defining permissible configuration states of said processing circuits and signal storage means, said state control circuit means including means for storing signals representative of the instant configuration for determining the next permissible configuration state, said state control circuit further including means for generating an advance state signal and transmitting the same to said control circuit means to actuate said control circuit during predetermined state changes;

said control circuit means further comprising means responsive to said timing signals and the state of said sequential count circuit for generating reconfiguration signals defining a new predetermined configuration of said processing circuits and storage means.

41. The apparatus of claim 40 wherein said recovery control circuit means comprises a first recovery control circuit in said first central control and a second recovery control circuit means in said second central control, each recovery control circuit means associated with its own central control circuit, and said central controls cooperating such that only one central control is active at one time, said active central control including circuit means for generating and transmitting an activity signal to its associated recovery control circuit indicative of which central control is active, the recovery control circuit means in each central control circuit being dependent upon receipt of an activity signal from its associated central control to generate said timing signals.

42. The apparatus of claim 41 further comprising external recovery circuit bus means communicating said first and second recovery control circuit means and wherein the recovery control circuit means in each central control also includes bus control circuit means for controlling the state control circuit means in the other recovery control circuit means when its associated central control is active.

43. In combination first and second central controls each comprising processing circuits and maintenance circuits; and first and second storage means, said maintenance circuits sensing conditions within said combination to generate error signals upon the detection of corresponding faulty conditions therein, said first and second central controls and said first and second storage means being adapted to form different operative configurations including an active central control with a primary storage means, and a standby central control with a secondary storage means;

wherein the improvements comprise:

recovery control circuit means in each central control, each recovery control circuit means being responsive to its associated central control such that only the recovery control circuit in the active central control is itself active, each recovery control circuit comprising control circuit means responsive to said error signals from its associated central data processor for generating a sequencer circuit start signal;

a sequencer circuit comprising a timing generator circuit responsive to said start signal for generating sequential timing signals a predetermined number of which define a timing cycle, one of said timing signals of each timing cycle being a state change signal; and state control circuit means responsive to said state change signal and comprising a sequential count circuit for defining permissible re-configuration states of said first and second central controls and said first and second storage means, said state control circuit means further including means for instant configuration signals representative of the instant configuration, said state control circuit further including means for generating an advance state signal and transmitting the same to said control circuit means;

said state control circuit means being further responsive to said advance state signal for generating signals for forming a new predetermined configuration of one of said central controls and one of said instruction storage means; and conductive bus means coupling together said recovery control circuit means of said first and second central data processors, whereby the recovery control circuit means of the active central data processor will control the state control circuit means of the recovery control circuit means of the standby central data processor.

44. A state control circuit for defining the permissible configurations of first and second central controls and first and second storage means such that one central control is active and associated with one storage means which is primary, and the other central control is inactive and associated with the other storage means which is secondary, each of said central controls having an associated state control circuit, comprising:

a configuration control bistable circuit;

a plurality of memory bistable circuits arranged as a counter circuit for generating output signals defining the states of permissible configurations of said data processors and storage means;

input logic circuit means responsive to the output signals of said counter circuit and a first timing signal for advancing the stage of said configuration control bistable circuit only when said counter circuit is permitted to so advance as determined by the instant state of said counter circuit; and second logic circuit means responsive to said output signals of said control bistable circuit for advancing the state of said counter circuit in response to a subsequent timing signal.

45. A data processor system comprising:

memory means containing sequences of program order words and data;

central control means comprising:

means for reducing program sequences and data from said memory means, for writing information into said memory means, means for executing said sequences of order words, clock means for generating signal defining a plurality of cyclically recurring periods of time, one of said recurring periods of time being a real time check cycle comprising a real time check "window" period of time; bistable means selectively set and reset in response to said first and second control signals, means for initiating execution of program sequences comprising program orders, which when executed cause said central control to selectively generate said first and second control signals, means for checking that said first and second control signals occur within said window period of time and that said first and second control signals occur in the stated order, and means for generating a failure signal in the event of failure of either of said conditions.

* * * * *